United States Patent
Curren et al.

(10) Patent No.: US 10,781,273 B2
(45) Date of Patent: Sep. 22, 2020

(54) MULTIPLE REACTOR AND MULTIPLE ZONE POLYOLEFIN POLYMERIZATION

(71) Applicant: Chevron Phillips Chemical Company LP, The Woodlands, TX (US)

(72) Inventors: Joseph A. Curren, Kingwood, TX (US); Rebecca A. Gonzales, Houston, TX (US); Scott E. Kufeld, Houston, TX (US); Joel A. Mutchler, Porter, TX (US); Eric J. Netemeyer, Kingwood, TX (US); Jamie N. Sutherland, Kingwood, TX (US); Paul J. Deslauriers, Owasso, OK (US); Jeffrey S. Fodor, Bartlesville, OK (US)

(73) Assignee: CHEVRON PHILLIPS CHEMICAL COMPANY LP, The Woodlands, TX (US)

(*) Notice: Subject to any disclaimer, the term of this patent is extended or adjusted under 35 U.S.C. 154(b) by 0 days.

(21) Appl. No.: 16/234,153

(22) Filed: Dec. 27, 2018

(65) Prior Publication Data
US 2020/0207882 A1 Jul. 2, 2020

(51) Int. Cl.
| | |
|---|---|
| C08F 10/02 | (2006.01) |
| B01J 8/18 | (2006.01) |
| B01J 8/00 | (2006.01) |
| B01J 19/24 | (2006.01) |
| C08F 2/01 | (2006.01) |

(52) U.S. Cl.
CPC ............ *C08F 10/02* (2013.01); *B01J 8/0055* (2013.01); *B01J 8/1827* (2013.01); *B01J 8/1836* (2013.01); *B01J 8/1863* (2013.01); *B01J 19/245* (2013.01); *B01J 2208/00761* (2013.01)

(58) Field of Classification Search
USPC ................ 526/62, 65; 525/53; 422/134, 613
See application file for complete search history.

(56) References Cited

U.S. PATENT DOCUMENTS

| | | | | |
|---|---|---|---|---|
| 4,486,207 A | * | 12/1984 | Baillie | B01D 45/12 209/718 |
| 4,640,963 A | * | 2/1987 | Kreider | B01J 8/004 526/67 |

(Continued)

FOREIGN PATENT DOCUMENTS

| | | |
|---|---|---|
| EP | 2722347 A1 * 4/2014 | ............. C08F 10/02 |
| WO | 1997004015 A1 | 2/1997 |
| WO | 2000002929 A1 | 1/2000 |

OTHER PUBLICATIONS

Xiong, et al, "Development of a cyclone separator with high efficiency and low pressure drop in axial inlet cyclones," Powder Technology 253 (2014) 644-649. (Year: 2014).*

(Continued)

*Primary Examiner* — Fred M Teskin
(74) *Attorney, Agent, or Firm* — Conley Rose, P.C.

(57) ABSTRACT

Apparatuses and processes that produce multimodal polyolefins, and in particular, polyethylene resins, are disclosed herein. This is accomplished by using two reactors in series, where one of the reactors is a multi-zone circulating reactor that can circulate polyolefin particles through two polymerization zones optionally having two different flow regimes so that the final multimodal polyolefin has improved product properties and improved product homogeneity.

21 Claims, 20 Drawing Sheets

(56) References Cited

U.S. PATENT DOCUMENTS

| | | | |
|---|---|---|---|
| 5,104,570 | A | 4/1992 | Cymbaluk et al. |
| 5,191,153 | A | 3/1993 | Cymbaluk et al. |
| 5,259,986 | A | 11/1993 | Cymbaluk et al. |
| 5,376,742 | A | 12/1994 | Krause |
| 5,523,512 | A | 6/1996 | Cymbaluk et al. |
| 5,698,642 | A | 12/1997 | Govoni et al. |
| 5,769,927 | A | 6/1998 | Gottschlich et al. |
| 6,413,477 | B1 | 7/2002 | Govoni et al. |
| 6,689,845 | B1 | 2/2004 | Govoni et al. |
| 6,818,187 | B2 | 11/2004 | Govoni et al. |
| 7,652,108 | B2 | 1/2010 | Mei et al. |
| 7,687,588 | B2 | 3/2010 | Mei et al. |
| 7,807,761 | B2 * | 10/2010 | Chamayou ............... B01J 8/003 422/131 |
| 7,816,447 | B2 * | 10/2010 | Lawson .................. B01J 8/003 422/134 |
| 8,198,383 | B2 | 6/2012 | Mazzucco et al. |
| 8,597,582 | B2 | 12/2013 | Hottovy et al. |
| 8,883,940 | B2 | 11/2014 | Kufeld et al. |
| 9,023,945 | B2 | 5/2015 | Mavridis et al. |
| 9,133,291 | B2 | 9/2015 | Covezzi et al. |
| 9,340,627 | B1 | 5/2016 | Kufeld et al. |
| 9,399,688 | B2 | 7/2016 | Penzo et al. |
| 9,598,514 | B2 | 3/2017 | Kufeld et al. |
| 2005/0095176 | A1 * | 5/2005 | Hottovy ................. B01J 8/0015 422/131 |
| 2007/0093621 | A1 | 4/2007 | Meier et al. |
| 2010/0056732 | A1 | 3/2010 | McElvain et al. |
| 2014/0243375 | A1 | 8/2014 | El Qacemi et al. |
| 2017/0204206 | A1 | 7/2017 | Penzo et al. |

OTHER PUBLICATIONS

Gas Processors Association, "Engineering Data Book", 10th Edition, FIG. 19-16.
Partial International Search Report issued in corresponding application No. PCT/US2019/067012 dated Mar. 25, 2020, 3 pages.

* cited by examiner

MULTIPLE REACTOR AND MULTIPLE ZONE POLYOLEFIN POLYMERIZATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field of the Invention

This disclosure generally relates to the polymerization of polyolefins in multiple reaction zones.

Background of the Invention

Polyolefins have various applications such as use in pipe, films, large and small containers, cups, bottles, molded articles, and the like. There is an ongoing need for polyolefin compositions having improved properties and processability, especially when formed into the aforementioned items.

SUMMARY

A process for producing a multimodal polyolefin includes (a) polymerizing ethylene in a first reactor to produce a first polyolefin, (b) polymerizing ethylene in a first reaction mixture in a riser of a second reactor to produce a second polyolefin, (c) passing the first reaction mixture through an upper conduit from the riser to a separator, (d) recovering, in the separator, the second polyolefin from the first reaction mixture, (e) passing the second polyolefin from the separator into a downcomer of the second reactor, optionally via a liquid barrier, (f) polymerizing ethylene in a second reaction mixture in the downcomer to produce a third polyolefin, (g) passing the second reaction mixture through a lower conduit from the downcomer to the riser, and (h) one of (1) after step (a) and before steps (b)-(g), receiving the first polyolefin into the second reactor, or (2) before step (a) and after steps (b)-(g), receiving the second polyolefin and the third polyolefin into the first reactor.

Another process for producing a multimodal polyolefin includes (a) polymerizing ethylene in a first reactor to produce a first polyolefin, (b) polymerizing ethylene in a first reaction mixture in a riser of a second reactor to produce a second polyolefin contained in a riser product mixture, (c) passing the riser product mixture through an upper conduit from the riser to a separator, (d) recovering, in the separator, the second polyolefin from the riser product mixture, (e) passing the second polyolefin from the separator into a downcomer of the second reactor, optionally via a liquid barrier, (f) polymerizing ethylene in a second reaction mixture in the downcomer to produce a third polyolefin in a downcomer product mixture, (g) passing the downcomer product mixture through a lower conduit from the downcomer to the riser, and (h) one of (1) after step (a) and before steps (b)-(g), receiving the first polyolefin into the second reactor, or (2) before step (a) and after steps (b)-(g), receiving the second polyolefin and the third polyolefin into the first reactor.

Another process for producing a multimodal polyolefin, performed with i) a first reactor having a first polymerization zone, and ii) a second reactor having a second polymerization zone in a riser and a third polymerization zone in a downcomer, includes (a) polymerizing ethylene in the first polymerization zone to produce a first polyolefin, (b) passing a first reaction mixture upward through the second polymerization zone of the riser, wherein a second polyolefin is produced in the second polymerization zone, (c) receiving the first reaction mixture from the second polymerization zone in a separator, (d) separating, by the separator, a first polyolefin product from the received first reaction mixture, (e) passing the first polyolefin product through a barrier section of the second reactor and into the third polymerization zone, (f) adding, in the third polymerization zone, the first polyolefin product to a second reaction mixture, (g) passing the second reaction mixture downward through the third polymerization zone of the downcomer, wherein a third polyolefin is produced in the third polymerization zone, (h) repeating steps (b)-(g) n times, wherein n=1 to 100,000 and (i) one of 1) adding the first polyolefin to the second reactor at a location upstream of the second polymerization zone with respect to a direction of flow of the first reaction mixture in the second polymerization zone, and withdrawing the multimodal polyolefin from the downcomer, or 2) withdrawing a portion of a second polyolefin product from the second reactor, adding the portion of the second polyolefin product to the first polymerization zone of the first reactor, and withdrawing the multimodal polyolefin from the first reactor.

An apparatus for producing a multimodal polyolefin includes a first reactor configured to produce a first polyolefin, a second reactor configured to produce a second polyolefin and a third polyolefin, where the second reactor comprises a riser configured to produce the second polyolefin, an upper conduit having an end fluidly connected to a top portion of the riser, a separator fluidly connected to an opposite end of the upper conduit, a downcomer configured to produce the third polyolefin, wherein a top portion of the downcomer is fluidly connected to the separator, optionally via a liquid barrier in the top portion of the downcomer, and a lower conduit having an end fluidly connected to a bottom portion of the downcomer and an opposite end fluidly connected to a bottom portion of the riser, wherein the second reactor is configured to receive the first polyolefin from the first reactor, or, the first reactor is configured to receive the second polyolefin and the third polyolefin from the second reactor.

A multimodal polyolefin can comprise the first polyolefin (e.g., a low molecular weight component), the second polyolefin (e.g., an intermediate molecular weight component), and the third polyolefin (e.g., a high molecular weight component) made in accordance with an above apparatus and/or process. The multimodal polyolefin can have one or more of: a density in a range of from about 0.930 to about 0.970 g/ml, a melt index in a range of from about 0.1 to about 30 g/10 min when tested under a force of 2.16 kg and at a temperature of 190° C., a high load melt index of from about 1 to about 45 g/10 min under a force of 21.6 kg and a temperature of 190° C., a comonomer content in a range of from 0 to about 6 wt. %, a $M_w$ in a range of from about 250 to about 1,500 kg/mol, a $M_z$ in a range of from about 500 to about 5,000 kg/mol, a Mw/Mn in a range of from about 18 to about 52, a long chain branching index in a range of from 0 to about 0.96, and a shear induced crystallization (SIC) index in a range of from about 0.15 to about 8. The multimodal polyolefin can be in the form of a polyethylene resin.

Another multimodal polyolefin in the form of a polyethylene resin can have a low molecular weight (LMW) component, an intermediate molecular weight (IMW) component, and a high molecular weight (HMW) component; wherein the LMW component is present in an amount of from about 20 wt. % to about 75 wt. %; wherein the IMW component is present in an amount of from about 5 wt. % to about 40 wt. %; wherein the HMW component is present in an amount of from about 10 wt. % to about 60 wt. %; wherein the LMW component has a weight average molecular weight of from about 20 kg/mol to about 150 kg/mol; wherein the IMW component has a weight average molecular weight of from about 85 kg/mol to about 350 kg/mol; wherein the HMW component has weight average molecular weight of greater than about 350 kg/mol; wherein the weight average molecular weight of the IMW component is greater than the weight average molecular weight of the LMW component; wherein the LMW component has a short chain branching content of from about 0 to about 5 short chain branches per 1,000 carbon atoms; wherein the IMW component has a short chain branching content of from about 0.1 to about 10 short chain branches per 1,000 carbon atoms; wherein the HMW component has a short chain branching content of from about 1 to about 15 short chain branches per 1,000 carbon atoms; and wherein the polyethylene resin has a magnitude of slip-stick of from about 300 psi to about 1,000 psi (about 2.07 MPa to about 6.89 MPa).

Another multimodal polyolefin in the form of a polyethylene resin can have a low molecular weight (LMW) component, an intermediate molecular weight (IMW) component, and a high molecular weight (HMW) component; wherein the LMW component is present in an amount of from about 40 wt. % to about 60 wt. %; wherein the IMW component is present in an amount of from about 5 wt. % to about 15 wt. %; wherein the HMW component is present in an amount of from about 30 wt. % to about 50 wt. %; wherein the LMW component has a weight average molecular weight of from about 25 kg/mol to about 65 kg/mol; wherein the IMW component has a weight average molecular weight of from about 100 kg/mol to about 200 kg/mol; wherein the HMW component has weight average molecular weight of from about 400 kg/mol to about 925 kg/mol; wherein the LMW component has a short chain branching content of from about 0 to about 2 short chain branches per 1,000 carbon atoms; wherein the IMW component has a short chain branching content of from about 0.1 to about 5 short chain branches per 1,000 carbon atoms; wherein the HMW component has a short chain branching content of from about 2 to about 12 short chain branches per 1,000 carbon atoms; and wherein the polyethylene resin has a resistance to slow crack growth of equal to or greater than about 3,000 h, when tested in accordance with ASTM F1473, wherein the resistance to slow crack growth is defined as the polyethylene notch tensile test (PENT) failure time.

Another multi-modal polyolefin in the form of a polyethylene resin can have a low molecular weight (LMW) component, an intermediate molecular weight (IMW) component [from riser], and a high molecular weight (HMW) component; wherein the LMW component is produced in a first reaction zone in the substantial absence of a comonomer, and wherein the LMW component is present in an amount of from about 20 wt. % to about 75 wt. %; wherein the IMW component is produced in a second reaction zone in the presence of a first amount of comonomer and a first amount of hydrogen, and wherein the IMW component is present in an amount of from about 5 wt. % to about 40 wt. %; wherein the HMW component is produced in a third reaction zone in the presence of a second amount of comonomer and a second amount of hydrogen, wherein the second amount of comonomer is greater than the first amount of comonomer, wherein first amount of hydrogen is greater than the second amount of hydrogen, and wherein the HMW component is present in an amount of from about 10 wt. % to about 60 wt. %; wherein the LMW component has a weight average molecular weight of from about 20 kg/mol to about 150 kg/mol; wherein the IMW component has a weight average molecular weight of from about 85 kg/mol to about 350 kg/mol; wherein the HMW component has weight average molecular weight of greater than about 350 kg/mol; wherein the weight average molecular weight of the IMW component is greater than the weight average molecular weight of the LMW component; wherein the LMW component has a short chain branching content of from about 0 to about 5 short chain branches per 1,000 carbon atoms; wherein the IMW component has a short chain branching content of from about 0.1 to about 10 short chain branches per 1,000 carbon atoms; wherein the HMW component has a short chain branching content of from about 1 to about 15 short chain branches per 1,000 carbon atoms; and wherein the polyethylene resin has an $\eta_{251}$ (eta_251) of less than about $1.5 \times 10^3$ Pa-s.

The foregoing has outlined rather broadly the features and technical advantages of the disclosed inventive subject matter in order that the following detailed description may be better understood. The various characteristics described above, as well as other features, will be readily apparent to those skilled in the art upon reading the following detailed description of the preferred embodiments, and by referring to the accompanying drawings.

DESCRIPTION OF THE DRAWINGS

For a detailed description of the preferred embodiments of the disclosed processes and apparatuses, reference will now be made to the accompanying drawings in which.

DETAILED DESCRIPTION

Figure 1:
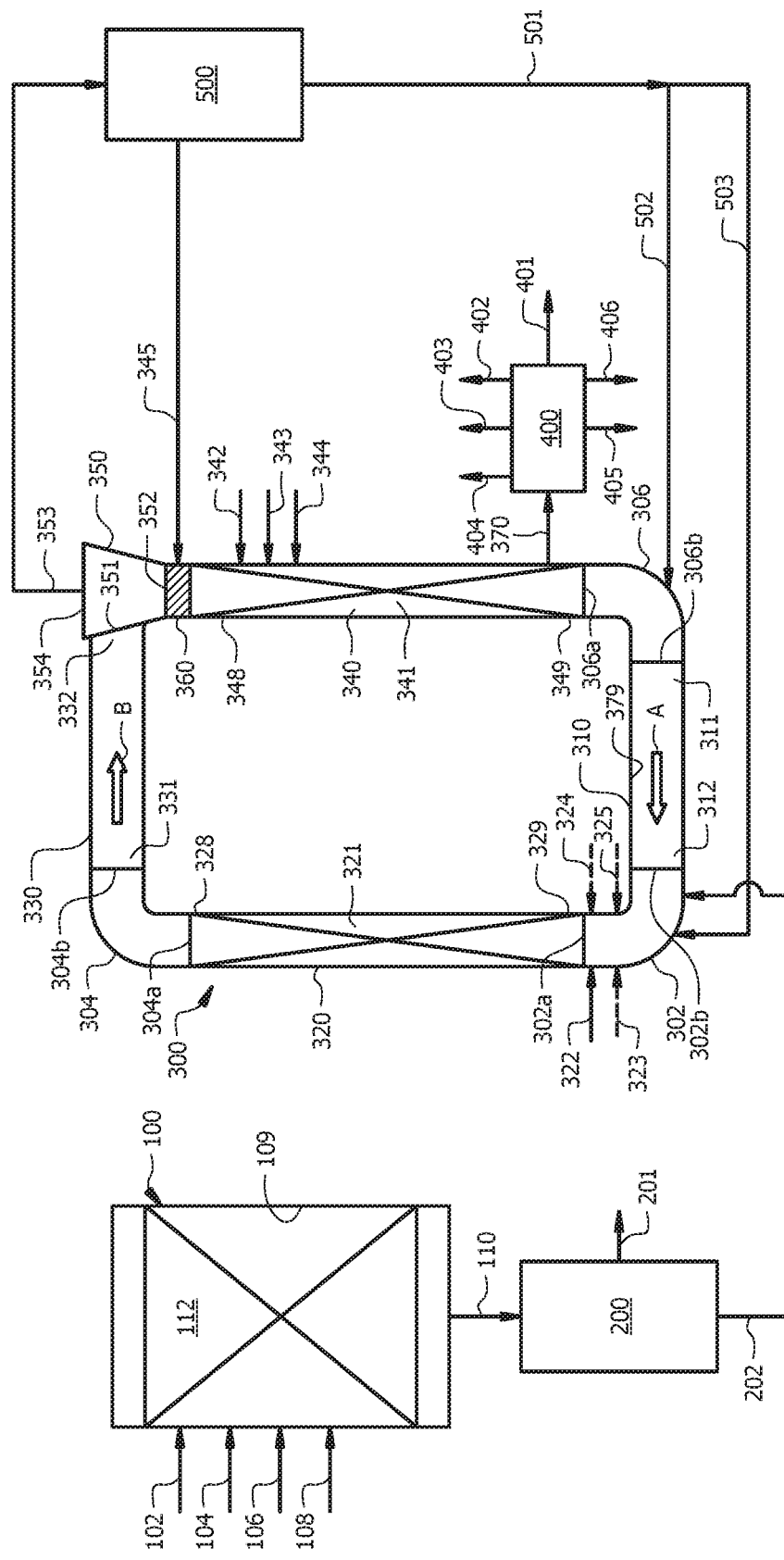
FIG. 1 illustrates a multiple reactor and multiple zone polyolefin polymerization according to the disclosure, where a multi-zone circulating reactor is connected downstream of a first reactor.

Disclosed herein are apparatuses and processes for multiple reactor and multiple zone polyolefin polymerization, as well as the polyethylene resins that can be produced by the apparatus and processes. The description may be in context of the apparatus or in context of process steps; however, it is contemplated that aspects of the disclosed process can include aspects discussed in apparatus context and that aspects of the disclosed apparatus can include aspects discussed in the process context. Also, while polyethylene resins are described herein, it is contemplated that the disclosed apparatuses and processes can produce various other polyethylene resins and otherwise various other multimodal polyolefins by utilizing different embodiments and aspects of the discloses apparatuses and processes.

The disclosed apparatus and processes are configured to produce a multimodal polyolefin, and particular the polyethylene resins, disclosed herein. This is accomplished by using two reactors in series, where one of the reactors is a multi-zone circulating reactor that can implement two polymerization zones having two different flow regimes in order to produce two polyolefins that have different molecular weights so that the final multimodal polyolefin has improved product properties, improved product homogeneity, and a reduced the number of gels compared to a bimodal polyolefin.

The term "polyolefin" as used herein refers to unimodal or multimodal polymers such as polyethylene, ethylene-alpha olefin copolymers, ethylene copolymers having at least about 50 percent by weight of ethylene polymerized with a lesser amount of a comonomer, polypropylene, polybutene, and other polymeric resins within the "olefin" family classification.

The term "unimodal" as used herein refers to a polyolefin homopolymer having a molecular weight distribution curve showing a single peak in a molecular weight distribution curve. Molecular weight distribution curves can be displayed in a graph of the polyolefin weight fraction as a function of its molecular weight, as measured by, e.g., gel permeation chromatography (GPC). The polyolefin weight fraction refers to the weight fraction of polyolefin molecules of a given size.

The term "multimodal" as used herein refers to a polyolefins having a molecular weight distribution curve showing more than one peak in a molecular weight distribution curve. It is acknowledged that, in some instances, a multimodal polyolefin may appear to have a single peak via, for example, GPC analysis, when in fact the polyolefin is multimodal, and the single peak is due to overlap of multiple peaks. The term "multimodal" includes a polyolefin having a curve showing two distinct peaks, also referred to as a bimodal or a bimodal-like polyolefin, and a polyolefin having a curve showing three distinct peaks, also referred to as trimodal or a trimodal-like polyolefin.

The term "polymerization zone" as used herein refers to a volume of space inside a polymerization reactor where conditions are such that an olefin polymerization reaction occurs.

The terms "conduit" and "line" are interchangeable, and as used herein, refer to a physical structure configured for the flow of materials therethrough, such as pipe or tubing. The materials that flow in the "conduit" or "line can be in the gas phase, the liquid phase, the solid phase, or a combination of these phases.

The term "stream" as used herein refers to a physical composition of materials that flow through a "conduit" or "line".

The term "diameter" as used herein refers to an inner diameter. Thus, a pipe or conduit having a diameter disclosed herein refers to the inner diameter of the pipe or conduit. Wall thicknesses of the pipe or conduit can be separately specified or otherwise can be a wall thickness appropriate for the application.

The term "length" as used herein refers to the distance of a first end of a straight section of pipe or tube to the second end of the straight section of pipe or tube and includes any straight portions that may be part of an elbow. For avoidance of doubt, no arcuate portions of an elbow are included in the length of an elbow.

Figure 2:
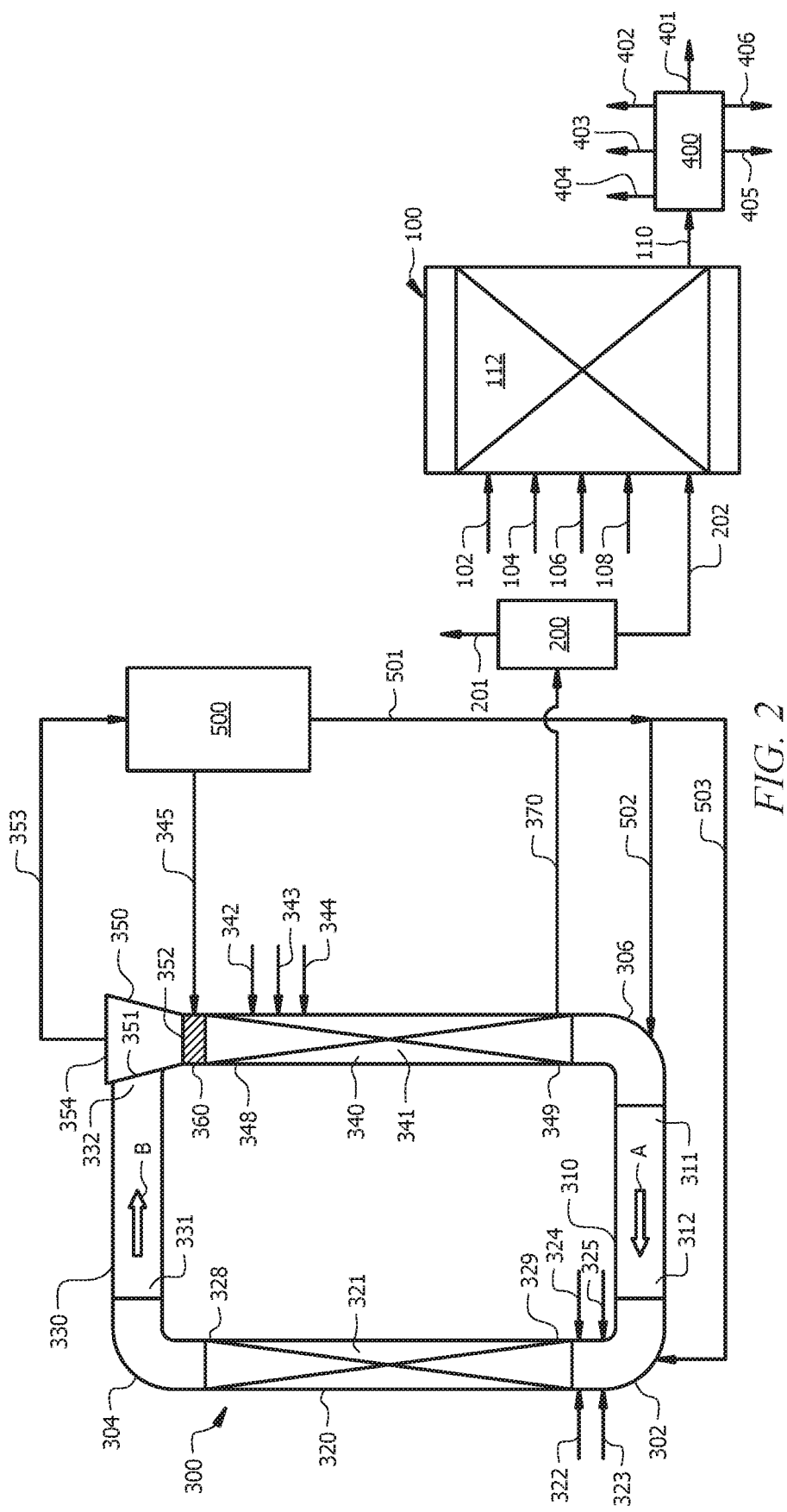
FIG. 2 illustrates another multiple reactor and multiple zone polyolefin polymerization according to the disclosure, where a multi-zone circulating reactor is connected upstream of a first reactor.

FIG. 1 illustrates multiple reactor and multiple zone polyolefin polymerization according to the disclosure, where a multi-zone circulating reactor 300 is connected downstream of a first reactor 100. FIG. 2 illustrates another multiple reactor and multiple zone polyolefin polymerization according to the disclosure, where the multi-zone circulating reactor 300 is connected upstream of the first reactor 100. Each of the reactors 100 and 300 is a polymerization reactor configured to polymerize one or more olefins in the presence of one or more polymerization catalysts at conditions suitable for the production of one or more polyolefins.

Multiple polymerization zones are present in each of FIG. 1 and FIG. 2. That is, the first reactor 100 has at least one polymerization zone 112, and the multi-zone circulating reactor 300 has two polymerization zones 321 and 341. Each polymerization zone 112, 321, and 341 can be configured to produce a different polyolefin than the other zones. For example, polymerization zone 112 of the first reactor 100 can produce a first polyolefin, second polymerization zone 321 of the MZCR 300 can be configured to product a second polyolefin, and third polymerization zone 341 of the MZCR 300 can be configured to product a third polyolefin. Alternatively, polymerization zone 112 of the first reactor 100 can be configured to produce a first polyolefin and the second and third polymerization zones 321 and 341 of the MCZR 300 can be configured to produce a second polyolefin.

In aspects, the ratio of the amount of the first polyolefin produced in the first reactor 100 that becomes part of the multimodal polyolefin to the amount of the polyolefin(s) produced in the MZCR 300 that becomes part of the multimodal polyolefin can be about 10/90 wt. %, about 20/80 wt. %, about 30/70 wt. %, about 40/60 wt. %, about 50/50 wt. %, about 60/40 wt. %, about 70/30 wt. %, about 80/10 wt. %, or about 90/10 wt. % of the multimodal polyolefin.

In aspects, the ratio of the amount of the second polyolefin produced in the riser 320 of the MZCR 300 to the amount of the third polyolefin produced in the downcomer 340 of the MZCR 300 can be about 10/90 wt. %, about 20/80 wt. %, about 30/70 wt. %, about 40/60 wt. %, about 50/50 wt. %, about 60/40 wt. %, about 70/30 wt. %, about 80/10 wt. %, or about 90/10 wt. % based on the total weight of the second polyolefin and the third polyolefin that becomes part of the multimodal polyolefin.

FIG. 1 shows the MZCR 300 is configured to receive the first polyolefin from the first reactor 100. FIG. 2 shows the first reactor 100 can be configured to receive the second polyolefin and the third polyolefin from the MCZR 300.

The first reactor 100 can be embodied as one or more loop slurry reactors, one or more fluidized bed reactors, one or more autoclave reactors, one or more tubular reactors, one or more horizontal gas phase reactors, one or more continuous stirred-tank reactors, one or more solution reactors, or a combination thereof. Configurations for these types of polymerization reactors are known, each capable of having the polymerization zone 112 that produces the first polyolefin. In an aspect, the first reactor 100 can be embodied as two or more reactors operated in parallel, each having a polymerization zone, and each having a product discharge conduit 110 that feed the first reactor product mixture to a product separation system 200. In one such aspect, the polymerization zone 112 can produce a low molecular weight (LMW) component of the multimodal polyolefin (e.g., a polyolefin resin).

Polymerization of olefin monomer and optional olefin comonomer in the first reactor 100 occurs by contacting a polymerization catalyst and the olefin monomer(s) in the polymerization zone 112 under polymerization conditions. Polymerization conditions in the polymerization zone 112 can include a temperature ranging from about 20° C. (68° F.) to about 260° C. (500° F.) and a pressure ranging from about 14.7 psia to about 4,000 psia (0.101 MPaa to about 27.6 MPaa); alternatively, a temperature ranging from about 60° C. (140° F.) to about 110° C. (230° F.) and a pressure ranging from about 250 psia to about 600 psia (about 1.7 MPaa to about 4.1 MPaa). In one or more aspects, polymerization in the polymerization zone 112 can be conducted batchwise such as in a continuous-stirred tank reactor or continuously such as in a loop slurry reactor or a gas phase reactor.

The olefin monomer polymerized in the first reactor 100 can be an aliphatic 1-olefin containing from 2 to 8 carbon atoms, e.g., ethylene, propylene, 1-butene, 1-pentene, 1-hexene, 1-heptene, or 1-octene. In an embodiment, the olefin monomer is ethylene or propylene.

Polymerization of the olefin monomer can optionally be performed with one or more comonomers that are an aliphatic 1-olefin containing from 3 to about 10 carbon atoms, e.g., propylene, 1-butene, 1-pentene, 1-hexene, 1-pentene, 1-heptene, 1-octene, 1-nonene, or 1-decene. In embodiments, the olefin comonomer can be ethylene, propylene, 1-butene, 1-hexene, 1-octene, or a combination thereof.

Polymerization in the polymerization zone 112 can occur in the presence of a hydrocarbon diluent that is inert to the polymerization reaction. Examples of a diluent include propane, isobutane, n-butane, n-pentane, isopentane, neopentane, n-hexane, cyclohexane, n-heptane, methylcyclohexane, or combinations thereof.

The olefin monomer used to produce the first polyolefin can be fed to the reactor 100 via conduit 102. The optional olefin comonomer used to produce the first polyolefin can be fed to the reactor 100 via conduit 106. The diluent can be fed to the reactor 100 via conduit 104. The polymerization catalyst can be fed to the reactor 100 in a catalyst feed conduit 108. The polymerization catalyst can be fed via conduit 108 in a solution (e.g., catalyst dissolved in solvent liquid), in a slurry (e.g., solid catalyst particles suspended in a liquid medium such as a hydrocarbon suitable for use as the polymerization diluent), or in gas mixture (e.g., solid catalyst particles in a carrier gas such as nitrogen). Equipment such as metering valves and/or control valves can be utilized in any of conduits 102, 104, 106, and 108 to regulate the flow of the respective component into the reactor 100.

Additional conduits can be utilized for feeding hydrogen and nitrogen to the reactor 100. Hydrogen can be used to regulate the molecular weight of the polyolefin produced in the reactor 100. Nitrogen can be used as a pressure source when controlling the pressure of the reactor 100. Additional conduits and equipment can also be utilized when reactor 100 is a continuous gas phase reactor. For example, when reactor 100 is in a gas phase reactor configuration that operates in condensing mode, additional conduits can be configured for recycle of gases recovered from the top of the reactor 100 back to the bottom of the reactor 100 in the form of a liquid phase. In such configuration, the conduits can be configured to remove gas from a top of the reactor 100, and a compressor and heat exchanger can be interconnected among the conduits and configured to condense and cool the gas for recycle as a liquid phase back to the bottom of reactor 100.

In aspects, the first reactor 100 is configured to produce the first polyolefin such that the first polyolefin has an average residence time in the polymerization zone 112 of about 1 second to about 14 hours; alternatively, about 1 second to about 12 hours; alternatively, about 1 second to about 10 hours; alternatively, about 1 second to about 8 hours; alternatively, about 2 hours to about 14 hours; alternatively, about 4 hours to about 14 hours; alternatively, about 4 hours to about 12 hours; alternatively, from about 1 hour to about 3 hours; alternatively, about 1 second to about 5 minutes; alternatively, less than 10 hours; alternatively, greater than 1 hour.

A product mixture containing polyolefin particles (e.g., the first polyolefin or the multimodal polyolefin) is withdrawn from the reactor 100 via the product discharge conduit 110. In FIG. 1, a product mixture containing the first polyolefin is withdrawn from the first reactor 100 via the product discharge conduit 110. FIG. 1 shows the product discharge conduit 110 located on a bottom of the first reactor 100; however, it is contemplated that the product discharge conduit 110 can be located anywhere on the reactor 100 of FIG. 1, such as a side of the reactor 100. In FIG. 2, a product mixture containing the multimodal polyolefin is withdrawn from the first reactor 100 via the product discharge conduit 110. FIG. 2 shows the product discharge conduit 110 located on the side of the first reactor 100; however, it is contemplated that the product discharge conduit 110 can be located anywhere on the reactor 100 of FIG. 2, such as the bottom of the reactor 100. In an embodiment, the product discharge conduit 110 can include a take-off valve that is configured as a continuous take-off valve or a discontinuous take-off valve. A continuous take-off valve can regulate the removal of the produce mixture from the first reactor 100 such that product mixture is removed on a continuous basis. A discontinuous take-off valve can regulate the removal of the product mixture on a discontinuous basis, for example, opening and shutting such that the flow of the product mixture through the discontinuous take-off valve is not continuous.

In aspects, at least a portion of the reactor 100 can be made carbon steel, stainless steel, or a combination of these materials. In a further aspect the carbon steel can be a low temperature carbon steel. In an embodiment, an internal surface 109 of the reactor 100 can have a rust inhibitor coating.

The multi-zone circulating reactor (MZCR) 300 generally polymerizes olefin monomer and optional olefin comonomer in gas phase polymerization and has two interconnected polymerization zones 321 and 341. The direction of flow of the reaction mixture(s) in the MZCR 300 is shown in FIG. 1 and FIG. 2 by arrows A and B. The flow path for the reaction mixture(s) in the MCZR 300 is in the form of a loop, formed by a lower conduit 310 fluidly connected to a riser 320, the riser 320 additionally being fluidly connected an upper conduit 330, the upper conduit 330 additionally being fluidly connected to a downcomer 340, and the downcomer 340 additionally being fluidly connected to the lower conduit 310. A separator 350 can be fluidly connected to each of the upper conduit 330 and to a liquid barrier 360 (interchangeably referred to as a barrier section 360) of the downcomer 340.

In an aspect, the polymerization zone 321 of the riser 320 can produce an intermediate molecular weight (IMW) component, and the polymerization zone 341 of the downcomer 340 can produce a high molecular weight (HMW) component of the multimodal polyolefin (e.g., a polyethylene resin).

As illustrated in both FIG. 1 and FIG. 2, an end 312 of the lower conduit 310 can be fluidly connected to a bottom portion 329 of the riser 320, a top portion 328 of the riser 320 can be fluidly connected an end 331 of the upper conduit 330, the separator 350 can be fluidly connected to an end 332 of the upper conduit 330, the separator 350 additionally can be fluidly connected to a top portion 348 of the downcomer 340 via the liquid barrier 360 that is in the top portion 348 of the downcomer 340, and a bottom portion 349 of the downcomer 340 can be fluidly connected to the end 311 of the lower conduit 310.

An elbow connector 302 is fluidly connected to the end 312 of the lower conduit 310 and to the bottom portion 329 of the riser 320; an elbow connector 304 is fluidly connected to the top portion 328 of the riser 320 and to an end 331 of the upper conduit 330; the separator 350 is fluidly connected to the end 332 of the upper conduit 330 and to the liquid barrier 360; the liquid barrier 360 is additionally fluidly connected to a top portion 348 of the downcomer 340; and an elbow connector 306 is fluidly connected to the bottom portion 349 of the downcomer 340 and to the end 311 of the lower conduit 310. The scope of this disclosure includes interpretations where the elbow connectors 302, 304, and 306 are pieces of equipment that are separate from the portions of the loop formed by the lower conduit 310, riser 320, upper conduit 330, and downcomer 340. Alternatively, the scope of this disclosure includes interpretations where the elbow connectors 302, 304, 306 are formed as part of an adjacent piece of the loop, e.g., elbow connector 302 can be part of the lower conduit 310 or part of the riser 320, elbow connector 304 can be part of the upper conduit 330 or part of the riser 320, and elbow connector 306 can be part of the downcomer 340 or part of the lower conduit 310.

The lower conduit 310 can be embodied as a tubular structure through which a reaction mixture (e.g., downcomer product mixture, optionally with added recycled monomer, comonomer, and/or diluent) passes from end 311 to end 312. The longitudinal axis of the lower conduit 310 can be oriented substantially horizontally, as shown in FIG. 1 and FIG. 2. Alternatively, the longitudinal axis of the lower conduit 310 can be oriented at an angle greater than 0° and less than 90° with respect to horizontal, as is discussed in FIG. 4. The lower conduit 310 can have a length-to-diameter ratio of greater than about 5; alternatively, greater than about 10; alternatively, greater than about 15; alternatively, in a range of from about 5 to about 20. This ratio can be calculated for embodiments of the lower conduit 310 where the length of the lower conduit 310 does not include the length of elbow connectors 302 and 306. Alternatively, this ratio can be calculated for embodiments of the lower conduit 310 where the elbow connector 302 and/or elbow connector 306 is considered to be part of the lower conduit 310, and the length of the lower conduit 310 includes the length of the tubular structure that is not curved.

The riser 320 can be embodied as a tubular structure through which the reaction mixture (e.g., beginning as the downcomer product mixture, optionally with added recycled monomer, comonomer, and/or diluent, and changing in composition along the length of the riser 320) passes from bottom 329 to top 328. The longitudinal axis of the riser 320 can be oriented substantially vertically, as is shown in FIG. 1 and FIG. 2. The riser 320 can have a width-to-height ratio of less than about 0.1; alternatively, less than about 0.06; alternatively, less than about 0.05; alternatively, less than about 0.03; alternatively, in a range of from about 0.03 to about 0.1. The width of the riser 320 can be the diameter of the tubular structure. The height of the riser 320 can be the height of the polymerization zone 321. This width-to-height ratio can be calculated for embodiments of the riser 320 where the height of the riser 320 does not include the height of elbow connectors 302 and 304. Alternatively, this ratio can be calculated for embodiments of the riser 320 where the elbow connector 302 and/or elbow connector 304 is considered to be part of the riser 320, and the height of the riser 320 includes the height of the tubular structure and the height of one or both of elbow connectors 302 and 304.

The upper conduit 330 can be embodied as a tubular structure through which a reaction mixture (e.g., the riser product mixture) passes from end 331 to end 332. The longitudinal axis of the upper conduit 330 can be oriented substantially horizontally, as shown in FIG. 1 and FIG. 2. Alternatively, the longitudinal axis of the upper conduit 330 can be oriented at an angle greater than 0° and less than 15° with respect to horizontal, as is discussed in FIG. 10. The upper conduit 330 can have a length-to-diameter ratio of greater than about 5; alternatively, greater than about 10; alternatively, greater than about 15; alternatively, in a range of from about 5 to about 20. This ratio can be calculated for embodiments of the upper conduit 330 where the length of the lower conduit 330 does not include the length of the elbow connector 304. Alternatively, this ratio can be calculated for embodiments of the upper conduit 330 where the elbow connector 304 is considered to be part of the upper conduit 330, and the length of the upper conduit 330 includes the length of the tubular structure and the length of the elbow connector 304.

The liquid barrier, or barrier section, 360 is part of the downcomer 340, located in the top portion 348 of the downcomer 340 above the polymerization zone 341. The liquid barrier 360 can be embodied as part of the tubular structure of the downcomer 340 and having a liquid therein, through which polyolefin particles settle and subsequently flow into the polymerization zone 341. The diameter of the tubular structure of the liquid barrier 360 can correspond to the diameter of the downcomer 340. The height of the liquid barrier 360 can contribute to the height of the downcomer 340. The liquid in the liquid barrier 360 can be an inert liquid, in that, the liquid is inert to the polymerization of the olefins. The inert liquid can be any of the hydrocarbons described herein that are suitable for use as a diluent (e.g., one or a combination of alkanes having 2 to 7 carbon atoms, being straight chain or branched, such as propane, isobutane, n-butane, n-pentane, isopentane, neopentane, n-hexane, cyclohexane, n-heptane, methylcyclohexane, or combinations thereof). In an aspect, the concentration of the inert liquid in the liquid barrier 360 is greater than a concentration of the inert liquid in the downcomer 340 and in the riser 320.

The downcomer 340 can be embodied as a tubular structure through which the reaction mixture (e.g., changing in composition along the length of the downcomer 340) passes from top 348 to bottom 349. The longitudinal axis of the downcomer 340 can be oriented substantially vertically, as is shown in FIG. 1 and FIG. 2. The downcomer 340 can have can have a width-to-height ratio of less than about 0.1; alternatively, less than about 0.06; alternatively, less than about 0.05; alternatively, less than about 0.03; alternatively, in a range of from about 0.03 to about 0.1. The width of the downcomer 340 can be the diameter of the tubular structure. The height of the downcomer 340 can be the sum of the height of the polymerization zone 341 and the height of the liquid barrier 360. The width-to-height ratio can be calculated for embodiments of the downcomer 340 where the height of the downcomer 340 does not include the height of elbow connector 306. Alternatively, this ratio can be calculated for embodiments of the downcomer 340 where the elbow connector 306 is considered to be part of the downcomer 340, and the height of the downcomer 340 includes the height of the tubular structure and the height of the elbow connector 306.

In an alternative aspect, the downcomer 340 can have a diameter than varies from top to bottom of the downcomer 340, such as a conical shape. In another alternative aspect, a portion of the downcomer 340 can have a diameter than varies from top to bottom of said portion. In such an aspect, the downcomer 340 may have another portion (e.g., a tubular structure) above the varied portion (e.g., conical structure) and/or another portion (e.g., a tubular structure) below the varied portion. For example, as shown in FIG. 5D, a bottom portion 349 of the downcomer 340 can be conical in shape, while the remaining portion of the downcomer 340 that is above the bottom portion 340 can be a tubular structure. In aspects where both a portion above and a portion below the varied portion are used, the diameter of the portion above the varied portion can be greater than the diameter of the portion below the varied portion. Without being limited by theory, it is believed that varying the diameter of the downcomer 340 such that the diameter decreases in a vertically downward direction at least for a portion of the downcomer 340 can facilitate an increase in the velocity of the polymer bed than moves downwardly through the downcomer 340.

Each of elbow connectors 302, 304, and 306 can be embodied as a tubular structure that changes the direction of flow of the reaction mixture in the MZCR 300. Elbow connector 302 can change the direction of flow of the reaction mixture from the direction of flow provided in lower conduit 310 to the direction of flow in the riser 320. Elbow connector 304 can change the direction of flow of the reaction mixture from the direction of flow provided in the riser 320 to the direction of flow in the upper conduit 330. Elbow connector 306 can change the direction of flow of the reaction mixture from the direction of flow provided in the downcomer 340 to the direction of flow in the lower conduit 310. The angle between the ends of each elbow connector 302, 304, 306 can independently vary from about 45° to about 135°.

Elbow connector 302 can connect to the bottom portion 329 of the riser 320 and to the end 312 of the lower conduit 310. More specifically, end 302a of the elbow connector 302 can connect to the bottom portion 329 of the riser 320, and end 302b of the elbow connector 302 can connect to the end 312 of the lower conduit 310. Elbow connector 304 can connect to the top portion 328 of the riser 320 and to the end 331 of the upper conduit 330. More specifically, end 304a of the elbow connector 304 can connect to the top portion 328 of the riser 320, and end 304b of the elbow connector 304 can connect to the end 331 of the upper conduit 330. Elbow connector 306 can connect to the bottom portion 349 of the downcomer 340 and to the end 311 of the lower conduit 310. More specifically, end 306a of the elbow connector 306 can connect to the bottom portion 349 of the downcomer 340, and end 306b of the elbow connector 306 can connect to the end 311 of the lower conduit 310.

In an aspect, at least one of the elbow connectors 302, 304, or 306 has an inner diameter (d) and a radius ($R_c$) of an inner curvature such that the elbow connector 302, 304, or 306 configured to maintain a Dean number ($D_n$) of the reaction mixture flowing therein to be a value in a range of about 1,000,000 to about 5,000,000, where $D_n = \rho V d/\mu * (d/2R_c)^{1/2}$ and where p is a density of the reaction mixture, V is a circulation velocity of the reaction mixture, and $\mu$ is a dynamic viscosity of the reaction mixture. The density, circulation velocity, and the dynamic viscosity are the values for the reaction mixture in the respective elbow connectors 302, 304, or 306.

The separator 350 of the MZCR 300 can be embodied as a flash tank, a flash vessel, a flash chamber, a cyclone, a high efficiency cyclone, or a centrifuge. The end 332 of the upper conduit 330 can be fluidly connected to the separator 350 proximate a top 354 of the separator 350. The separator 350 is configured to separate the reaction mixture (e.g., the riser product mixture comprising solid polyolefin particles and a gas mixture) received from the upper conduit 330 into polyolefin particles and gases. The gases are removed from the separator 350 via vapor conduit 353. The polyolefin particles settle in bottom of the separator 350 and flow downwardly through an outlet 352 of the separator 350 into the liquid barrier 360.

The MZCR 300 has various feed lines that can be configured to inject components of a reaction mixture for polymerization in the polymerization zone 321 of the riser 320 and to inject components of a reaction mixture for polymerization in the polymerization zone 341 of the downcomer 340.

FIG. 1 shows a catalyst feed line 322 configured to feed catalyst for polymerization of an olefin in the polymerization zone 321 of the riser 320. FIG. 1 also shows an olefin monomer feed line 342, an olefin comonomer feed line 343, a hydrogen feed line 344, and a diluent feed line 345 configured to feed each of the respective components to the downcomer 340 for polymerization of one or more olefins in the polymerization zone 341 of the downcomer 340.

FIG. 2 shows additional inlet feed lines can be configured to deliver components for polymerization in the polymerization zone 321 of the riser 320. An olefin monomer feed line 323, an olefin comonomer feed line 324, and a diluent feed line 345 configured to feed each of the respective components to the downcomer 340 for polymerization of one or more olefins in the polymerization zone 321 of the riser 320.

While FIG. 1 and FIG. 2 show one feed line 322, 323, 324, 325, 342, 343, and 344 configured to inject the respective component into the riser 320 and downcomer 340, it is contemplated that more than one feed line can be used to inject any of the olefin monomer, olefin comonomer, polymerization catalyst, diluent, and hydrogen. Further, in aspects where multiple feed lines for a component are used, it is contemplated that the feed lines for a given components are placed in multiple locations. For example, multiple comonomer feed lines 343 can be located at various locations on the downcomer 340 of the MZCR 300.

Alternative configurations in FIG. 1 include no feed lines for the riser 320. Alternative configurations in FIG. 1 also include additional feed lines 323, 324, and 325 configured to feed components as discussed above into the reaction mixture that flows through the riser 320.

The MZCR 300 includes a product discharge conduit 370 fluidly connected to the bottom portion 349 of the downcomer 340. A product mixture containing polyolefin particles is withdrawn from the MZCR 300 via the product discharge conduit 370. In FIG. 1, a product mixture containing the multimodal polyolefin is withdrawn from the MZCR 300 via the product discharge conduit 370. In FIG. 2, a product mixture containing a polyolefin is withdrawn from the MZCR 300 via the product discharge conduit 370. FIG. 1 and FIG. 2 show the product discharge conduit 370 fluidly connected to a bottom portion 349 of the MZCR 300. However, it is contemplated that the product discharge conduit 370 can fluidly connected anywhere on the MZCR 300 of FIG. 1, such as i) to a bottom half of the downcomer 340, ii) on or near a bottom tangent of the downcomer 340, or iii) somewhere along the outer radius of the elbow connector 306 or on the lower conduit 310.

In an aspect, the bottom tangent of the downcomer 340 is the location at the bottom of the downcomer 340 that is the tangent before any curvature or deviation from vertical.

In aspects, the product discharge conduit 370 can be located at or above the bottom tangent of the downcomer 340. More specification, the product discharge conduit 370 can be located above the bottom tangent of the downcomer 340 for a distance that is 0% to 50% of the total height of the downcomer 340. In an alternative aspect, the product discharge conduit 370 can be located on a curvature of the downcomer 340, such as on the elbow connector 306. In an alternative aspect, the product discharge conduit 370 can be located on a curvature of the elbow connector 306 that is connected to the downcomer 340.

In an embodiment, the product discharge conduit 370 can include a take-off valve that is configured as a continuous take-off valve or a discontinuous take-off valve. A continuous take-off valve can regulate the removal of the produce mixture from the MZCR 300 such that product mixture is removed on a continuous basis. A discontinuous take-off valve can regulate the removal of the product mixture from the MZCR 300 on a discontinuous basis, for example, opening and shutting such that the flow of the product mixture through the discontinuous take-off valve is not continuous. In an aspect, the take-off valve can be part of the polyolefin product separation system 400, such as take-off valve 410 described in FIG. 9 below.

In an aspect, the product mixture in the product discharge conduit 370 can have a concentration of solid polyolefin particles greater than 50 wt. %, 60, wt. %, 70 wt. %, 80 wt. %, 90 wt. % based on a total weight of the mixture.

Polymerization conditions in the polymerization zone 321 and polymerization zone 341 of the MZCR 300 can include the conditions suitable for gas phase polymerization reactions. In aspects, the polymerization zone 321 and the polymerization zone 341 can each operate with a temperature ranging from about 50° C. (122° F.) to about 120° C. (248° F.) and a pressure ranging from about 14.7 psia to about 1,000 psia (0.101 MPaa to about 6.9 MPaa).

The olefin monomer polymerized in polymerization zone 321 and/or polymerization zone 341 of the MZCR 300 can be an aliphatic 1-olefin containing from 2 to 8 carbon atoms, e.g., ethylene, propylene, 1-butene, 1-pentene, 1-hexene, 1-heptene, or 1-octene. In an embodiment, the olefin monomer is ethylene or propylene.

Polymerization of the olefin monomer in the polymerization zone 321 and/or polymerization zone 341 of the MZCR 300 can optionally be performed with one or more comonomers that are an aliphatic 1-olefin containing from 3 to about 10 carbon atoms, e.g., propylene, 1-butene, 1-pentene, 1-hexene, 1-pentene, 1-heptene, 1-octene, 1-nonene, or 1-decene. In embodiments, the olefin comonomer can be propylene, 1-butene, 1-hexene, 1-octene, or a combination thereof.

Polymerization in the polymerization zone 321 and/or polymerization zone 341 of the MZCR 300 can occur in the presence of a hydrocarbon diluent that is inert to the polymerization reaction. Examples of a diluent include propane, isobutane, n-butane, n-pentane, isopentane, neopentane, n-hexane, cyclohexane, n-heptane, methylcyclohexane, or combinations thereof.

A reaction mixture containing polyolefin particles and a gas mixture can flow upwardly through the second polymerization zone 321 in the riser 320, through the upper conduit 330, and into the separator 350. The reaction mixture in the riser 320 (e.g., the riser reaction mixture) can have a gas mixture of at least two components selected from olefin monomer, diluent, and a polymerization catalyst. The reaction mixture exiting the riser 320 (e.g., the riser product mixture) can likewise have a gas mixture of at least two components selected from olefin monomer, diluent, and a polymerization catalyst.

Gases recovered from the reaction mixture (e.g., the riser product mixture) are removed from the separator 350 via vapor conduit 353, while polyolefin particles recovered from the reaction mixture fall to the bottom of the separator 350 and flow downwardly through an outlet 352 of the separator 350 into the liquid barrier 360. The polyolefin particles settle downwardly through the liquid in the liquid barrier 360 by gravity and flow into the top 348 of the downcomer 340. The polyolefin particles become part of a separate reaction mixture in the downcomer 340.

The reaction mixture in the downcomer 340 (e.g., the downcomer reaction mixture) can have a gas mixture of at least two components selected from hydrogen, olefin monomer, olefin comonomer, diluent, and a polymerization catalyst. The reaction mixture exiting the downcomer 340 (e.g., the downcomer product mixture) can likewise have a gas mixture of at least two components selected from hydrogen, olefin monomer, olefin comonomer, diluent, and a polymerization catalyst. The polyolefin particles in the downcomer reaction mixture can flow through the polymerization zone 341 of the downcomer 340 downwardly by gravity, through the lower conduit 310, and back into the polymerization zone 321. A circulation of polyolefin(s) is established in the flow path defined by the lower conduit 310, riser 320, upper conduit 330, separator 350, downcomer 340, and any pieces of conduit considered separate from the lower conduit 310, riser 320, upper conduit 330, and downcomer 340 (e.g., any connecting pieces such as elbow connectors 302, 304, and 306). In an aspect, the reaction mixture in the downcomer 340 (e.g., the downcomer reaction mixture) can have a gas composition that is different than the gas composition in the riser 320 (e.g., the riser reaction mixture).

The MZCR 300 affords the flexibility that the reaction mixture of the downcomer 340 can have a different gaseous composition than the reaction mixture in the riser 320, which advantageously provides for producing two different polyolefins in the MZCR 300. In this aspect, the polyolefin particles flowing in the loop of the MZCR 300 can include the polyolefin made in the riser 320, the polyolefin made in the downcomer 340, and optionally for the order of reactors 100 and 300 shown in FIG. 1, the first polyolefin produced in the first reactor 100. Alternatively, the reaction mixture of the downcomer 340 can have the same gaseous composition as the reaction mixture in the riser 320. Thus, in this aspect, the polyolefin particles flowing in the loop of the MZCR 300 can include the polyolefin made in the MZCR 300, and optionally for the order of reactors 100 and 300 shown in FIG. 1, the polyolefin produced in the first reactor 100. It is believed that the configuration of the MZCR 300 in combination with the first reactor 100 can improve product properties, improve product homogeneity, and reduce the number of gels.

The flow in the second polymerization zone 321 in the riser 320 can be under fast fluidization conditions. The conditions for fast fluidization are obtained when the velocity of the fluidizing gas (e.g., the diluent and/or condensing agent) is higher than the transport velocity of the polyolefin solids, and the pressure gradient along the direction of flow is a monotonic function of the quantity of solid, for equal flow rate and density of the fluidizing gas. In contrast, conventional fluidized-bed technology utilized in gas phase reactors maintains the fluidizing-gas velocity well below the transport velocity, in order to avoid solids entrainment and particle carryover into the gas recycle system of the gas phase reactor.

The flow in the third polymerization zone 341 in the downcomer 340 can be under plug flow conditions. The polyolefin particles can form a moving bed of solid particles that move downwardly through the polymerization zone 341 in the downcomer 340, where polyolefin particles exiting the bed of solid particles into the lower conduit 310 make room for polyolefin particles entering the bed from the liquid barrier 360. It is contemplated that a positive gain in pressure obtained by the downward flow of the reaction mixture in the downcomer 340 can provide momentum of the polyolefin particles that is suitable to reintroduce the polyolefin particles into the riser 320 via the lower conduit 310. In this way, a "loop" circulation is established. For the order of reactors 100 and 300 shown in FIG. 1, the circulation back to the riser 320 can be facilitated by one or more of: 1) the introduction of the first polyolefin produced in the first reactor 100 into the MZCR 300 via conduit 202, 2) the introduction of one or more of unreacted olefin monomer, unreacted olefin comonomer, and diluent via conduit 502 and/or conduit 503. For the order of reactors 100 and 300 shown in FIG. 2, the circulation back to the riser 320 can be facilitated by the introduction of one or more of unreacted olefin monomer, unreacted olefin comonomer, and diluent via conduit 502 and/or conduit 503. Alternative or additional embodiments of the MZCR 300 can include equipment for facilitating the recirculation of the polyolefin particles from the downcomer 340 to the riser 320, such as the eductor 375 shown in FIGS. 5A, 5B, 5D-5H, and 6B and/or standpipe shown in FIGS. 5C, 5I, 5J, and 6B-6C.

In an aspect, the polyolefin particles of the moving bed of solid particles can have a packed bed configuration. That is, the polyolefin particles can have a high concentration in the mixture of solids and gas/liquid moving through the downcomer 340 as compared to the concentration of gas and/or liquid that is contained in the mixture. The concentration of solid polyolefin particles in the moving mixture can be greater than 50 wt. %, 60, wt. %, 70 wt. %, 80 wt. %, 90 wt. % based on a total weight of the mixture (e.g., based on a "plug" of the moving mixture). An advantage of having a high concentration of polyolefin particles in the mixture is that the portion(s) of the mixture removed in the product discharge conduit 370 require smaller capacity for downstream equipment configured to separate the polyolefin particles from the gas and any liquid.

In aspects, the lower conduit 310 can be configured such that the reaction mixture (e.g., the downcomer product mixture, optionally with added recycled components) can flow in the lower conduit 310 at a velocity that is i) greater than a saltation velocity of the reaction mixture and up to about 30.48 m/s (100 ft/sec), ii) i) greater than a saltation velocity of the reaction mixture and greater than about 0.508 m/s (20 ft/sec), iii) greater than a saltation velocity of the reaction mixture and greater than about 0.762 m/s (30 ft/sec), iv) greater than a saltation velocity of the reaction mixture and greater than about 1.016 m/s (40 ft/sec), v) greater than a saltation velocity of the reaction mixture and greater than about 1.27 m/s (50 ft/sec), vi) greater than a saltation velocity of the reaction mixture and greater than about 1.52 m/s (60 ft/sec), vi) from about 1.52 m/s (60 ft/sec) to about 30.48 m/s (100 ft/sec), vii) from about 0.762 m/s (30 ft/sec) to about 1.27 m/s (50 ft/sec), or viii) greater than 110% of the saltation velocity of the reaction mixture. In further aspects of the disclosure, the upper conduit 330 is configured such that the reaction mixture (e.g., the riser product mixture) can flow in the upper conduit 330 at a velocity that is i) greater than a saltation velocity of the reaction mixture and up to about 30.48 m/s (100 ft/sec), ii) i) greater than a saltation velocity of the reaction mixture and greater than about 0.508 m/s (20 ft/sec), iii) greater than a saltation velocity of the reaction mixture and greater than about 0.762 m/s (30 ft/sec), iv) greater than a saltation velocity of the reaction mixture and greater than about 1.016 m/s (40 ft/sec), v) greater than a saltation velocity of the reaction mixture and greater than about 1.27 m/s (50 ft/sec), vi) greater than a saltation velocity of the reaction mixture and greater than about 1.52 m/s (60 ft/sec), vi) from about 1.52 m/s (60 ft/sec) to about 30.48 m/s (100 ft/sec), vii) from about 0.762 m/s (30 ft/sec) to about 1.27 m/s (50 ft/sec), or viii) greater than 110% of the saltation velocity of the reaction mixture.

Circulation of polyolefin particles in the loop of the MZCR 300 can be about 50 to about 250 times the multimodal polyolefin production rate. In aspects, the polyolefin particles can circulate the loop from 1 to about 250 cycles before being withdrawn from the MZCR 300. In a particular aspect, the polyolefin particles can circulate about 40, 50, 60, 70, 80, 90, or 100 cycles before being withdrawn from the MZCR 300. In aspects, the time for a polyolefin particle to circulate the loop of the MZCR 300 can be from about 0.5 minutes to about 10 minutes; alternatively, about 1 minute to about 8 minutes; alternatively, about 1 minute to about 7 minutes; alternatively, about 1 minute to about 6 minutes; alternatively, about 1 minute to about 5 minutes; alternatively, about 1 minute to about 4 minutes; alternatively, about 1 minute to about 3 minutes; alternatively, about 1 minute to about 2 minutes; alternatively, about 2 minutes to about 3 minutes; alternatively, about 2 minutes.

In aspects, the average residence time of polyolefin particles in the MZCR 300 can range from about 0.25 hours to about 5 hours; alternatively, about 0.5 hours to about 4 hours; alternatively, about 1 hour to about 3 hours; alternatively, about 2 hours. In aspects, the average residence time of the riser reaction mixture in the polymerization zone 321 of the riser 320 during a single pass through the polymerization zone 321 is in a range of about 1 second to about 5 minutes. In additional aspects, the residence time of the downcomer reaction mixture in the polymerization zone 341 of the downcomer 340 during a single pass through the polymerization zone 341 is in a range of about 5 second to about 15 minutes. The polyolefin particles can be circulated in the loop of the MZCR 300 from 1 to about 100,000 cycles. The total average residence time of polyolefin particles in the MZCR 300 can be on the order of hours.

In aspects, at least a portion of the MZCR 300 can be made carbon steel, stainless steel, or a combination of these materials. In a further aspect the carbon steel can be a low temperature carbon steel.

In an aspect, an internal surface 379 of the MZCR 300, and optionally any flanges of the MZCR 300, can have a rust inhibitor coating. The rust inhibitor coating can be applied during manufacture of the components of the MZCR 300 and be configured to inhibit rust of the components, for example, during transport to and assembly at a plant site.

In an aspect, the internal surface 379 of the MZCR 300 can be polished to a root mean square of less than about 3.8 microns (150 microinches); alternatively, less than about 2.54 microns (100 microinches); alternatively, less than about 1.27 microns (50 microinches); alternatively, in a range of from about 0.254 m (10 microinches) to about 1.27 microns (50 microinches).

In an aspect, only the internal surface of the downcomer 340 of the MZCR 300 is polished to a root mean square value disclosed herein; alternatively, only the internal surface of the riser 320 of the MZCR 300 is polished to a root mean square value disclosed herein; alternatively, only the internal surfaces of the downcomer 340 and the riser 320 are polished to a root mean square value disclosed herein. In an additional aspect, the internal surface 109 of the first reactor 100 can be polished to a root mean square value disclosed herein.

The multiple zone polyolefin polymerization in FIG. 1 and in FIG. 2 also can include polyolefin product separation systems 200 and 400. FIG. 1 and FIG. 2 generally illustrate that one of reactors 100 and 300 is upstream of the other. The product separation system 200 is configured to recover polyolefin product from the product mixture withdrawn from the upstream reactor and between the reactors 100 and 300 such that the polyolefin produced in the upstream reactor can be fed to the downstream reactor. The product separation system 400 is configured to recovery the multimodal polyolefin from the product mixture withdrawn from the downstream reactor.

The product separation system 200 can be configured to separate one or more components in the product mixture (e.g., unreacted monomer, unreacted comonomer, diluent, catalyst, co-catalyst, or combinations thereof) from the polyolefin produced in the upstream reactor such that the amount of these components fed to the downstream reactor is controlled, which can affect the composition of the polymerization zone(s) in the downstream reactor.

In FIG. 1, the product separation system 200 is configured to receive a product mixture containing the first polyolefin via the product discharge conduit 110, and to separate gaseous components of the product mixture from the first polyolefin. The gaseous components can include one or more of unreacted olefin monomer, unreacted olefin comonomer, diluent, hydrogen, nitrogen, and any additive for the polymerization of the olefin monomer in the first reactor 100. The gaseous components can flow from the product separation system 200 in conduit 201. The first polyolefin can flow in conduit 202 for injection into the MZCR 300.

In FIG. 2, the product separation system 200 is configured to receive a product mixture containing the second polyolefin and the third polyolefin via the product discharge conduit 370, and to separate gaseous components of the product mixture from the second and third polyolefins. The gaseous components can include one or more of unreacted olefin monomer, unreacted olefin comonomer, diluent, hydrogen, nitrogen, and any additive for the polymerization of the olefin monomer in the MZCR 300. The gaseous components can flow from the product separation system 200 in conduit 201. The second and third polyolefins can flow in conduit 202 for injection into the first reactor 100.

Figure 10A:
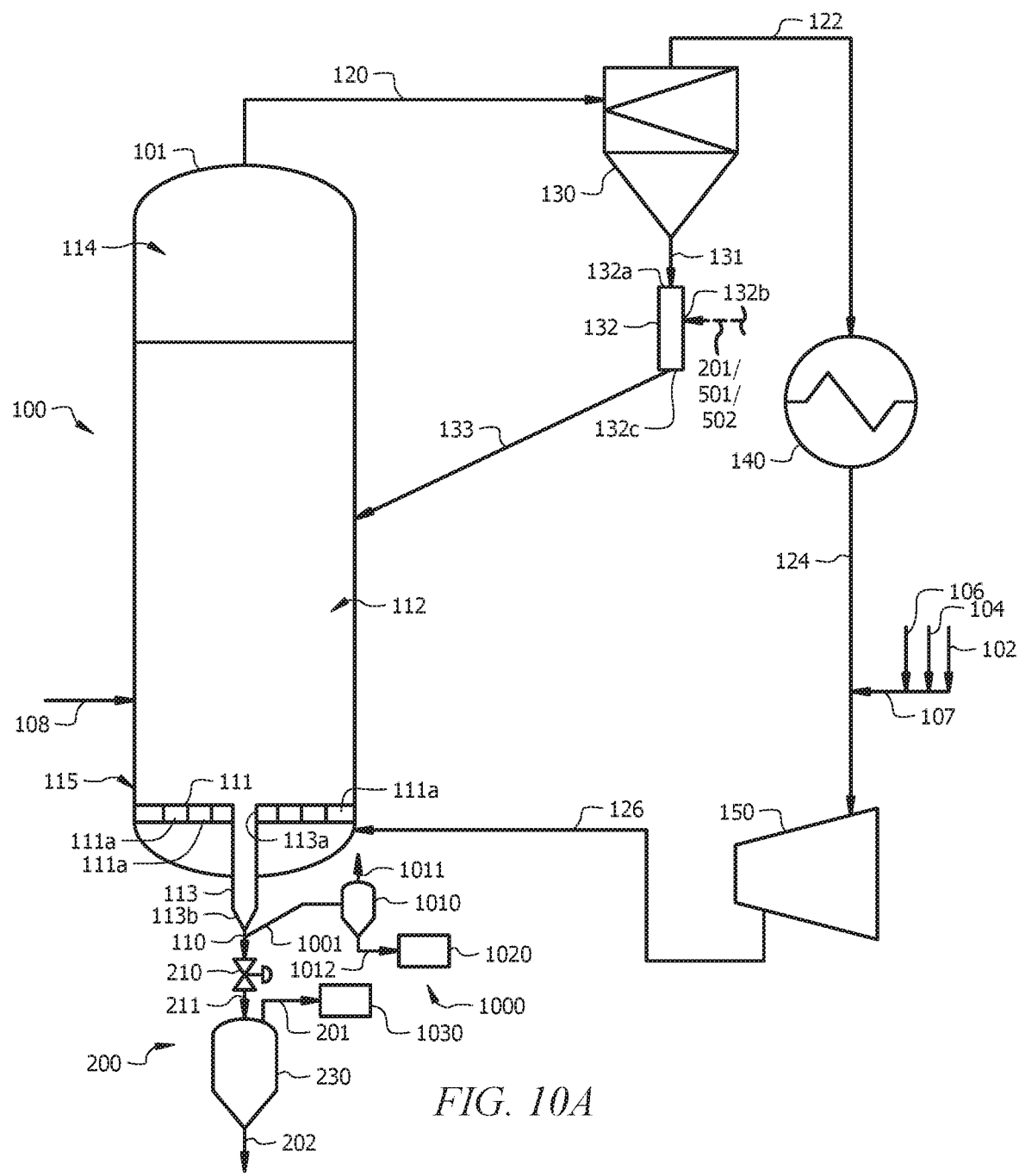
FIG. 10A illustrates the first reactor in a gas phase configuration for use in FIG. 1, utilizing a settling leg to move the reactor effluent to a separator for polyolefin recovery.
Figure 10B:
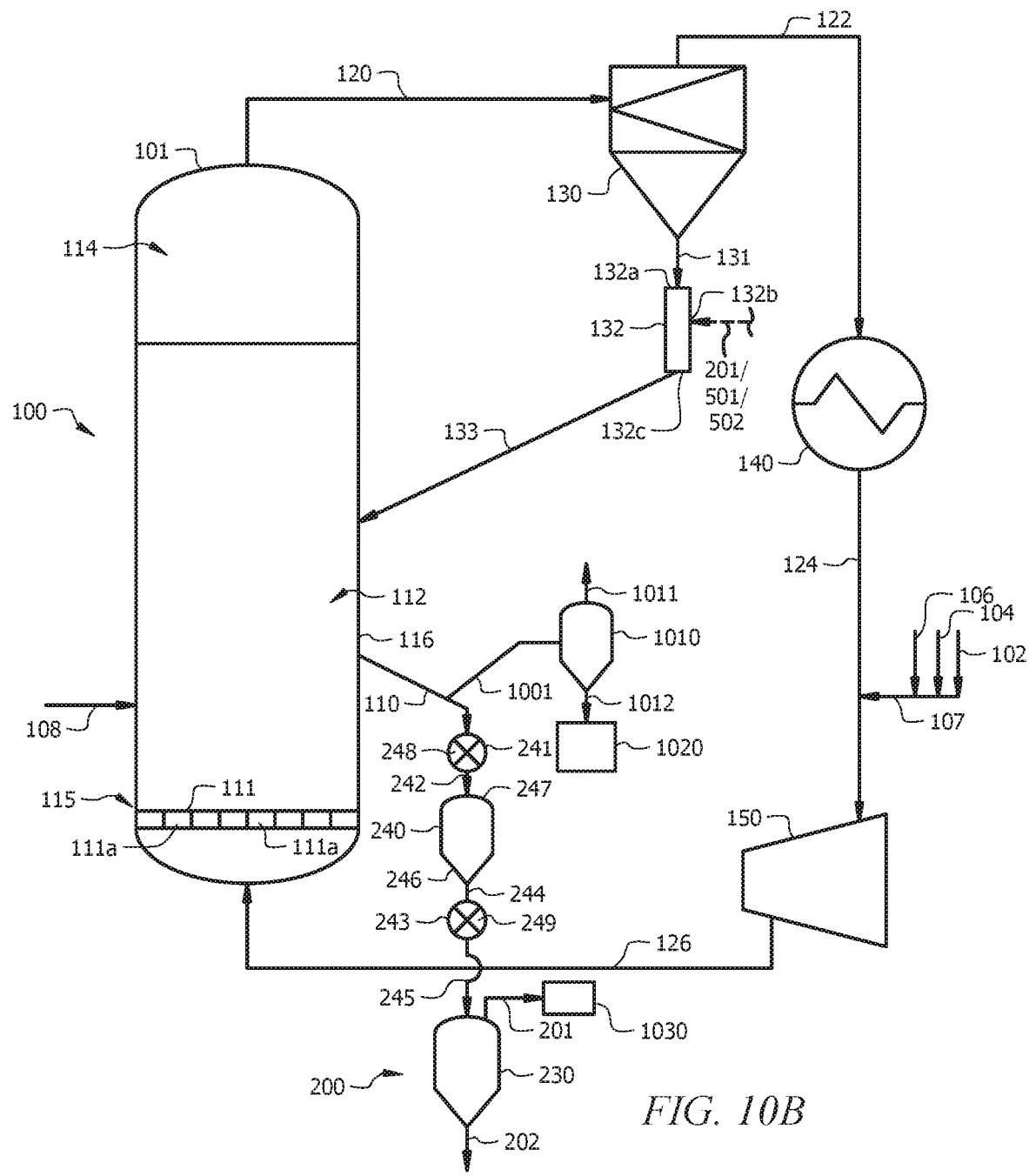
FIG. 10B illustrates the first reactor in a gas phase configuration for use in FIG. 1, utilizing a lock hopper to move the reactor effluent to a separator for polyolefin recovery.
Figure 10C:
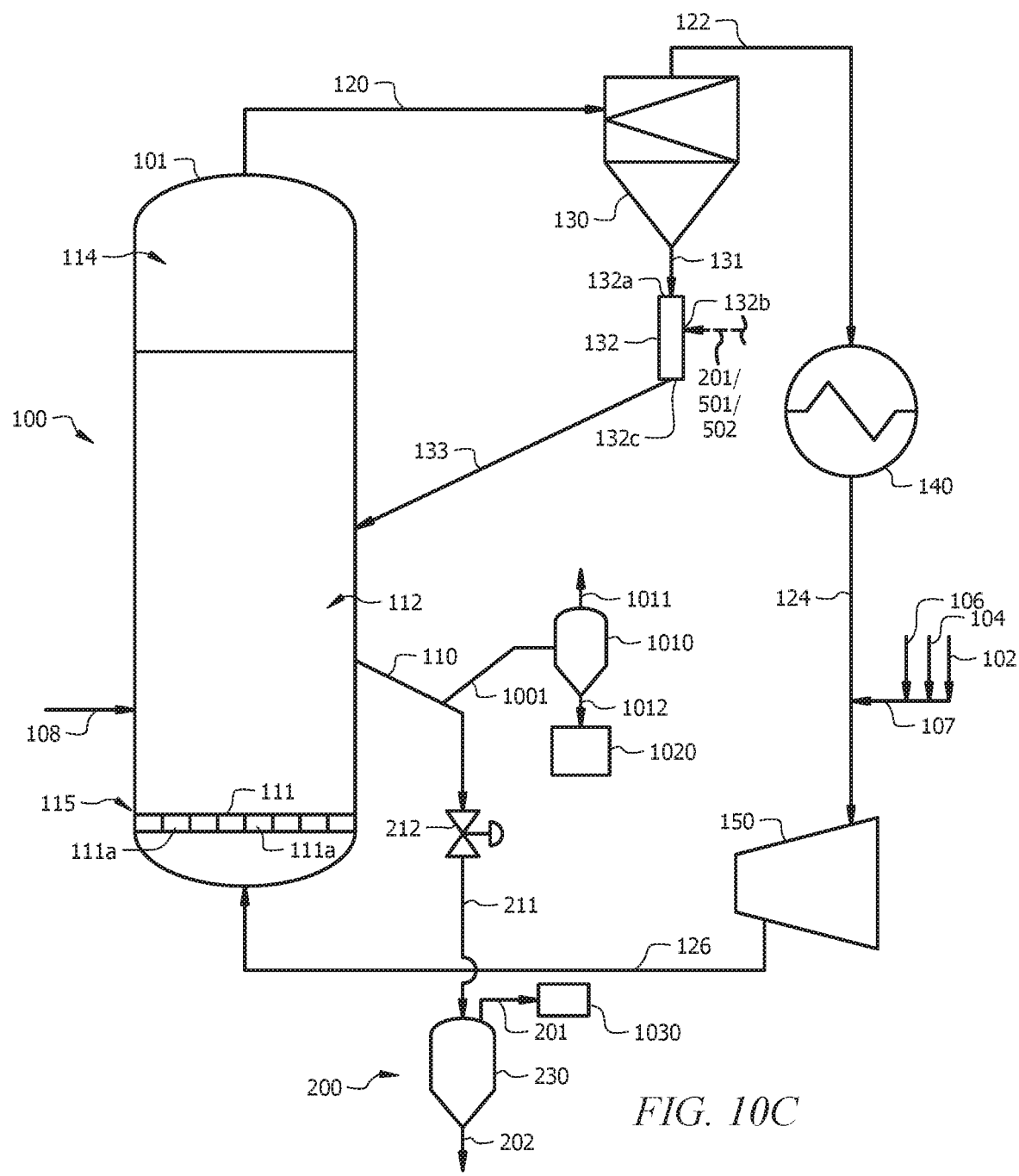
FIG. 10C illustrates the first reactor in a gas phase configuration for use in FIG. 1, utilizing a take-off valve to move the reactor effluent to a separator for polyolefin recovery.

More detailed embodiments and aspects of the product separation system 200 are discussed for FIGS. 10A to 10C.

The product separation system 400 is configured to recover the multimodal polyolefin product of this disclosure from the effluent of whichever reactor 100 or 300 is the downstream reactor (e.g., the MZCR 300 in FIG. 1 or the first reactor 100 in FIG. 2). The product separation system 400 can be configured to separate one or more components in the reaction effluent (e.g., unreacted monomer, unreacted comonomer, diluent, catalyst, co-catalyst, or combinations thereof) from the multimodal polyolefin. The multimodal polyolefin can then be further treated, sent to a container, processed (e.g., processed into pellets), or a combination thereof.

In FIG. 1, the first polyolefin is circulated in the MZCR 300 in the reaction mixtures which flow through the riser 320 and the downcomer 340, so that the second polyolefin is formed in the riser 320 and the third polyolefin is formed in the downcomer 340 in the presence of the first polyolefin to produce a multimodal polyolefin of this disclosure. In FIG. 1, the product separation system 400 is configured to receive a product mixture containing the multimodal polyolefin via the product discharge conduit 370, and to separate the gaseous components of the product mixture from the multimodal polyolefin. The gaseous components can include one or more of unreacted olefin monomer, unreacted olefin comonomer, diluent, hydrogen, anti-static agent, nitrogen, and any additive for the polymerization of the olefin monomer in the MZCR 300.

In its simplest form, the product separation system 400 can be configured to separate polyolefin particles from the gaseous components such that the multimodal polyolefin flows in conduit 401 and the gaseous components flow in another conduit for fluidly coupled for recycle of the components back to the first reactor 100 and/or the MZCR 300. FIG. 1 and FIG. 2 show an alternative recovery in that the product separation system 400 can be configured to separate polyolefin particles from the gaseous components, and the gaseous components can be separated from one another. The multimodal polyolefin can flow in conduit 401 for transport, storage, or processing (e.g., treatment). The product separation system 400 can be configured to separate the gaseous components into olefin monomer that flows in conduit 402, olefin comonomer that flows in conduit 403, diluent that flows in conduit 404, hydrocarbons that are heavier than the diluent that flow in heavies conduit 405, and light gases that are lighter than the unreacted monomer that flow in a waste gas conduit 406.

In FIG. 2, the first polyolefin is formed in the first reactor 100 in the presence of the second and third polyolefins to produce a multimodal polyolefin of this disclosure. In FIG. 2, the product separation system 400 is configured to receive a product mixture containing the multimodal polyolefin via the product discharge conduit 110, and to separate the gaseous components of the product mixture from the multimodal polyolefin. The gaseous components can include one or more of unreacted olefin monomer, unreacted olefin comonomer, diluent, hydrogen, anti-static agent, nitrogen, and any additive for the polymerization of the olefin monomer in the first reactor 100. The multimodal polyolefin can flow in conduit 401 for transport, storage, or processing (e.g., treatment). Like that shown in FIG. 1, the product separation system 400 of FIG. 2 can separate the gaseous components from one another. In an aspect, the product separation system 400 can separate the gaseous components into olefin monomer that flows in conduit 402, olefin comonomer that flows in conduit 403, diluent that flows in conduit 404, hydrocarbons that are heavier than the diluent flow in heavies conduit 405, and light gases that are lighter than the unreacted monomer flow in waste gas conduit 406.

Figure 9:
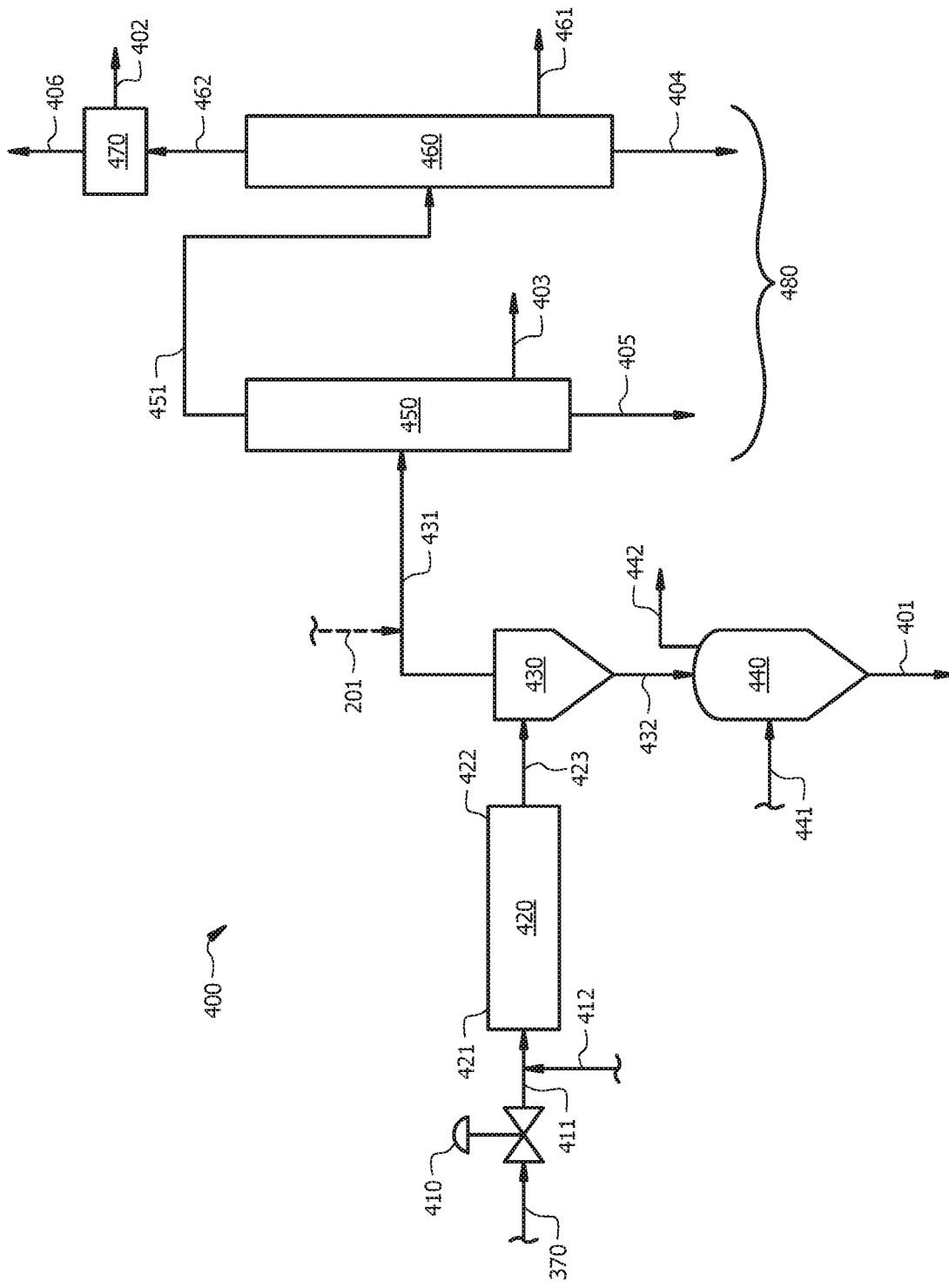
FIG. 9 illustrates an embodiment of a product separation system depicted in FIG. 1 and FIG. 2.

More detailed embodiments and aspects of the product separation system 400 are described for FIG. 9.

In both FIG. 1 and FIG. 2, the vapor recycle system 500 is configured to recycle gases recovered from the separator 350 of the MZCR 300. Gases flow in vapor conduit 353 and into the vapor recycle system 500. The vapor recycle system 500 can be configured to condense at least a portion of the gases in the vapor conduit 353 (e.g., using a compressor, heat exchanger, or both) such that liquid diluent can optionally flow to the liquid barrier 360 in diluent recycle conduit 345. The vapor recycle system 500 can also be configured to recycle other gases recovered from the vapor conduit 353 back to the MZCR 300 via conduits 501, 502, and 503. Particularly, unreacted monomer and optionally unreacted comonomer can be recycled back to the MZCR 300 at the elbow connector 306 via conduit 502 and at the elbow connector 302 via conduit 503. In embodiments, the vapor recycle system 500 can be configured similar to a gas recycle system of a gas phase reactor such as that described for FIGS. 10A to 10C. The vapor recycle system 500 can be configured to condense the diluent for use in the liquid barrier 360 while leaving the unreacted monomer and optional unreacted comonomer in the gas phase.

Having separately described each of the first reaction 100, product separation system 200, MZCR 300, product separation system 400, and vapor recycle system 500 above, the process flow of the multiple zone polymerizations in FIG. 1 and in FIG. 2 is now discussed.

In FIG. 1, the first reactor 100 is operated under polymerization conditions so as to produce the first polyolefin in the polymerization zone 112. Product separation system 200 is configured to receive a product mixture from the first reactor 100 via the product discharge conduit 110 and to separate gaseous components in the product mixture from the first polyolefin in the product mixture. The gaseous components can flow from the product separation system 200 via conduit 201 for further separation, for recycling to the first reactor 100, or combination thereof. The first polyolefin can flow from the product separation system 200 via conduit 202. The MZCR 300 can be configured to receive the first polyolefin, for example, in the elbow connector 302 or in the lower conduit 110. The MZCR 300 can circulate the first polyolefin in one or more reaction mixtures through the loop of the MZCR 300 (discussed above), while operating under polymerization conditions to concurrently produce polyolefin(s) in the polymerization zone 321 of the riser 320 and in the polymerization zone 341 of the downcomer 340. The vapor recycle system 500 is configured to recycle diluent, unreacted monomer, and any unreacted comonomer recovered from the separator 350 of the MZCR 300 back to the elbow connector 302 and elbow connector 306 of the MZCR 300. The resulting polymer that is comprised of the first polyolefin produced in the first reactor 100 and the polyolefin(s) produced in the riser 320 and downcomer 340 of the MZCR 300 is the multimodal polyolefin product of the disclosure. The MZCR 300 is configured to discharge the multimodal polyolefin via the product discharge conduit 370. Product separation system 400 is configured to receive the product mixture from the MZCR 300 via the product discharge conduit 370 and to separate gaseous components in the product mixture from the multimodal polyolefin in the product mixture. The multimodal polyolefin can flow from the product separation system 400 via conduit 401. The gaseous components can flow from the product separation system 400 via conduits 402, 403, 404, 405, and 406, for further use such as treatment and/or for recycle to the first reactor 100 and/or the MZCR 300.

In FIG. 2, the MZCR 300 can circulate polyolefin particles through the loop of the MZCR 300 in the various reaction mixtures (discussed above, e.g., downcomer reaction mixture, downcomer product mixture, riser reaction mixture, and riser product mixture), while operating under polymerization conditions to produce one or more polyolefins in the polymerization zone 321 of the riser 320 and in the polymerization zone 341 of the downcomer 340. The vapor recycle system 500 is configured to recycle diluent, unreacted monomer, and any unreacted comonomer recovered from the separator 350 of the MZCR 300 back to the elbow connector 302 and elbow connector 306 of the MZCR 300. Product separation system 200 is configured to receive a product mixture from the MZCR 300 via the product discharge conduit 370 and to separate gaseous components in the product mixture from the polyolefin(s) in the product mixture. The gaseous components can flow from the product separation system 200 via conduit 201 for further separation, for recycling to the MZCR 300, or combination thereof. The polyolefin(s) can flow from the product separation system 200 via conduit 202. The first reactor 100 can be configured to receive the polyolefin(s). The first reactor 100 is operated under polymerization conditions so as to produce the first polyolefin in the polymerization zone 112 in the presence of the polyolefin(s) produced in the MZCR 300. The resulting polymer that is comprised of the first polyolefin produced in the first reactor 100 and the polyolefin(s) produced in the riser 320 and downcomer 340 of the MZCR 300 is the multimodal polyolefin product of the disclosure. The first reactor 100 is configured to discharge the multimodal polyolefin via the product discharge conduit 110. Product separation system 400 is configured to receive the product mixture from the first reactor via the product discharge conduit 110 and to separate gaseous components in the product mixture from the multimodal polyolefin in the product mixture. The multimodal polyolefin can flow from the product separation system 400 via conduit 401. The gaseous components can flow from the product separation system 400 via conduits 402, 403, 404, 405, and 406, for further use such as treatment and/or for recycle to the first reactor 100 and/or the MZCR 300.

In an aspect, an amount of from about 20 to about 80 wt. %, alternatively from about 40 to about 60 wt. %, alternatively from about 45 to about 55 wt. %, alternatively about 50 wt. % of the multimodal polyolefin can comprise the first polyolefin produced in the first reactor 100 and an amount of from about 80 to about 20 wt. %, alternatively from about 60 to about 40 wt. %, alternatively from about 55 to about 45 wt. %, alternatively about 50 wt. % of the multimodal polyolefin can comprise the second polyolefin and the third polyolefin produced in the MZCR 300.

The concentration of the olefin monomer, olefin comonomer, hydrogen, or combinations thereof can differ between the first reactor 100 and the MZCR 300. Moreover, the concentration of the olefin monomer, olefin comonomer, hydrogen, or combinations thereof can differ between the riser 320 and the downcomer 340 of the MZCR. In an aspect, the concentration of the olefin monomer (e.g., ethylene, propylene, or butene) in the first reactor 100 can be from 0.1 to 10 wt. % on solids-free basis (i.e., the basis is the amount of gas or liquid to the exclusion of any solid polyolefin particles); the concentration of the olefin comonomer (e.g., 1-butene, 1-hexene, or 1-octene) in the first reactor 100 can be from 0.0 to 5 wt. % on a solids-free basis; the concentration of hydrogen in the first reactor 100 can be from 0.0 to about 5 mole % on a solids-free basis; or a combination thereof. In an aspect, the concentration of the olefin monomer (e.g., ethylene, propylene, or butene) in the MZCR 300 can be from 0.1 to 10 wt. % on solids-free basis (i.e., the basis is the amount of gas or liquid to the exclusion of any solid polyolefin particles); the concentration of the olefin comonomer (e.g., 1-butene, 1-hexene, or 1-octene) in the MZCR 300 can be from 0.0 to 5 wt. % on a solids-free basis; the concentration of hydrogen in the MZCR 300 can be from 0.0 to about 5 mole % on a solids-free basis; or a combination thereof. In aspects, the concentration of olefin monomer in the first reactor 100 can vary in the range disclosed above; the concentration of olefin comonomer in the first reactor 100 can vary in the range disclosed above; the concentration of hydrogen in the first reactor 100 can vary in the range disclosed above; the concentration of olefin monomer in the MZCR 300 can vary in the range disclosed above; the concentration of olefin comonomer in the MZCR 300 can vary in the range disclosed above; the concentration of hydrogen in the MZCR 300 can vary in the range disclosed above; or combination thereof.

In a particular aspect, the concentration of olefin monomer (e.g., ethylene, propylene, or butene) in the first reactor 100 can have from 1 to 6 wt. % ethylene, 0.0 to 1 wt. % olefin comonomer, and no hydrogen on a solids-free basis; the riser 230 of the MZCR 300 can have 2 to 10 wt. % ethylene, 0.1 to 3 wt. % olefin comonomer, and 0.2 to 2 mole % hydrogen on a solids-free basis; and the downcomer 340 of the MZCR 300 can have 3 to 20 wt. % ethylene, 0.5 to 8 wt. % olefin comonomer, and 0.0 to 0.5 mole % hydrogen.

In an aspect, the concentration of ethylene can be lowest in the first reactor 100 or in the downcomer 340 of the MZCR 300. In another aspect, the concentration of ethylene can be greatest in the first reactor 100 or in the riser 320 of the MZCR 300.

In an aspect, the concentration of hydrogen in the first reactor 100 can be greater than the concentration of hydrogen in the riser 320 of the MZCR 300, and the concentration of hydrogen in the riser 320 of the MZCR 300 can be greater than the concentration of hydrogen in the downcomer 340 of the MZCR 300.

In an aspect, the concentration of olefin comonomer in the first reactor 100 can be less than the concentration of olefin comonomer in riser 320 of the MZCR 300, and the concentration of olefin comonomer in the riser 320 of the MZCR 300 can be less than the concentration of the olefin comonomer in the downcomer 340 of the MZCR 300.

As discussed for the first reactor 100, hydrogen can be used to regulate the molecular weight of the polyolefin produced in the MZCR 300. In an aspect, the concentration of hydrogen in the first reactor 100 can be different than the concentration of hydrogen in the MZCR 300. For example, the concentration of hydrogen in the first reactor 100 can be lower than the concentration of hydrogen in at least a part of the MZCR 300 (e.g., the downcomer 340). Additionally, the concentration of hydrogen in the MZCR 300 can be different in different parts of the MZCR 300 (e.g., a first concentration in the riser 320 and a second concentration in the downcomer 340).

In an aspect, the concentration of hydrogen can be on a gradient along a flow path in the MZCR 300. For example, the concentration of hydrogen can decrease in a downward direction in the downcomer 340 downstream of the injection point for hydrogen feed line 344; the concentration of hydrogen can decrease in an upward direction in the riser 320; the concentration of hydrogen can decrease in the direction of arrow A in the lower conduit 310; the concentration of hydrogen can decrease in the direction of arrow B in the upper conduit 330; or combinations thereof.

In an aspect, the concentration of comonomer in the first reactor 100 can be different than the concentration comonomer in the MZCR 300. For example, the concentration of comonomer in the first reactor 100 can be lower than the concentration of comonomer in at least a part of the MZCR 300 (e.g., the downcomer 340). Additionally, the concentration of comonomer in the MZCR 300 can be different in different parts of the MZCR 300 (e.g., a first concentration in the riser 320 and a second concentration in the downcomer 340).

In an aspect, the concentration of comonomer can be on a gradient along a flow path in the MZCR 300. For example, the concentration of comonomer can decrease in a downward direction in the downcomer 340 downstream of the injection point for comonomer feed line 343; the concentration of comonomer can decrease in an upward direction in the riser 320; the concentration of comonomer can decrease in the direction of arrow A in the lower conduit 310; the concentration of comonomer can decrease in the direction of arrow B in the upper conduit 330; or combinations thereof.

Catalyst(s)

One or more polymerization catalyst can be used to polymerize olefin monomer(s) in the reactor 100 and in the MZCR 300. The polymerization catalyst can be delivered to the reactor 100 or MZCR 300 in solution (e.g., catalyst dissolved in a solvent liquid), in suspension (e.g., a slurry of the catalyst in a carrier liquid), or in gaseous mixture (e.g., a mixture of particulate catalyst in a carrier gas).

Each polymerization catalyst used to polymerize olefin(s) in the reactor 100 and/or MZCR 300 can be a transition metal-based catalyst system. The transition metal(s) included in the transition metal-based catalyst systems can be selected from Groups IIIB, IVB, VB, VIB, VIIB, or VIIIB. More particularly, the transition metal(s) included in the transition metal-based catalyst systems can be selected from nickel, chromium, titanium, zirconium, hafnium, vanadium, or a combination thereof. Examples of such catalyst systems include, but are not limited to, Ziegler-Natta based catalyst systems (e.g., Ziegler-based catalyst systems), chromium-based catalyst systems, metallocene-based catalyst systems, Phillips catalyst systems, coordination compound catalyst systems, post-metallocene catalyst systems, and the like, including combinations thereof.

The transition metal-based catalyst system can include a solid oxide support for the transition metal compounds. The solid oxide used to produce the support can comprise oxygen and one or more elements from Groups 2, 3, 4, 5, 6, 7, 8, 9, 10, 11, 12, 13, 14, or 15 of the Periodic Table of Elements, or can comprise oxygen and one or more elements from the lanthanide or actinide elements. For instance, the solid oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr. Examples of solid oxide materials that can be used to form the activator-support can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. This includes co-gels or co-precipitates of different solid oxide materials. Accordingly, the solid oxide can comprise silica, alumina, silica-alumina, silica-coated alumina, aluminum phosphate, aluminophosphate, heteropolytungstate, titania, zirconia, magnesia, boria, zinc oxide, any mixed oxide thereof, or any combination thereof. The silica-alumina which can be used typically can have an alumina content from about 5 to about 95% by weight. In one embodiment, the alumina content of the silica-alumina can be from about 5 to about 50%, or from about 8% to about 30%, alumina by weight. In another embodiment, high alumina content silica-alumina compounds can be employed, in which the alumina content of these silica-alumina compounds typically can range from about 60% to about 90%, or from about 65% to about 80%, alumina by weight. According to yet another embodiment, the solid oxide component can comprise alumina without silica, and according to another embodiment, the solid oxide component can comprise silica without alumina. Moreover, as provided hereinabove, the solid oxide can comprise a silica-coated alumina. The solid oxide can have any suitable surface area, pore volume, and particle size, as would be recognized by those of skill in the art.

In another or additional aspect, the solid oxide support can be treated with an electron-withdrawing component. The electron-withdrawing component used to treat the solid oxide so as to form the activator-support can be any component that increases the Lewis or Brønsted acidity of the solid oxide upon treatment (as compared to the solid oxide that is not treated with at least one electron-withdrawing component). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, and the like, including mixtures and combinations thereof. In addition, other ionic or non-ionic compounds that serve as sources for these electron-withdrawing components also can be employed. It is contemplated that the electron-withdrawing component can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Specific examples of the activator-support include, but are not limited to, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof.

In additional aspects, the transition metal-based catalyst system can comprise an activator selected from an aluminoxane compound (e.g., methylaluminoxane), an organoboron compound, an organoborate compound (e.g., borate), an ionizing ionic compound, the solid oxide support treated with an electron-withdrawing component (referred to as an activator support), the like, or any combination thereof.

In additional aspects, the transition metal-based catalyst system can include one or more co-catalysts. Commonly used polymerization co-catalysts can include, but are not limited to, metal alkyl, or organometal, co-catalysts, with the metal encompassing boron, aluminum, zinc, and the like. Representative boron-containing co-catalysts include, but are not limited to, tri-n-butyl borane, tripropylborane, triethylborane, and combinations thereof. Representative aluminum-containing co-catalysts can include, but are not limited to, the organoaluminum compounds of trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Representative zinc-containing co-catalysts include, but are not limited to, diethylzinc.

Each of the polymerization zones 112, 321, and 341 can independently use any one or a combination of the polymerization catalysts disclosed herein. In an aspect of the multiple zone polymerization which produces the multimodal polyolefin disclosed herein, a Ziegler-Natta catalyst can be used in each of the polymerization zone 112 of the first reactor 100, the polymerization zone 321 of the riser of the MZCR 300, and the polymerization zone 341 of the downcomer 340 of the MZCR. In an alternative aspect of the multiple zone polymerization, a chromium-based catalyst can be used in each of the polymerization zone 112 of the first reactor 100, the polymerization zone 321 of the riser of the MZCR 300, and the polymerization zone 341 of the downcomer 340 of the MZCR. In an alternative aspect of the multiple zone polymerization, a metallocene catalyst can be used in each of the polymerization zone 112 of the first reactor 100, the polymerization zone 321 of the riser of the MZCR 300, and the polymerization zone 341 of the downcomer 340 of the MZCR. In an alternative aspect of the multiple zone polymerization, a chromium-based catalyst, a Ziegler-Natta catalyst, or a metallocene catalyst can be used in the polymerization zone 112 of the first reactor 100; in combination with a chromium-based catalyst, a Ziegler-Natta catalyst, or a metallocene catalyst used in the polymerization zone 321 of the riser of the MZCR 300; in combination with a chromium-based catalyst, a Ziegler-Natta catalyst, or a metallocene catalyst used in the polymerization zone 341 of the downcomer 340 of the MZCR. In a particular aspect, a chromium-based catalyst can be used in the polymerization zone 112 of the first reactor 100, in combination with a Ziegler-Natta or metallocene catalyst in the polymerization zone 321 of the riser, in combination with a Ziegler-Natta or metallocene catalyst in the polymerization zone 341 of the downcomer 340.

Figure 3:
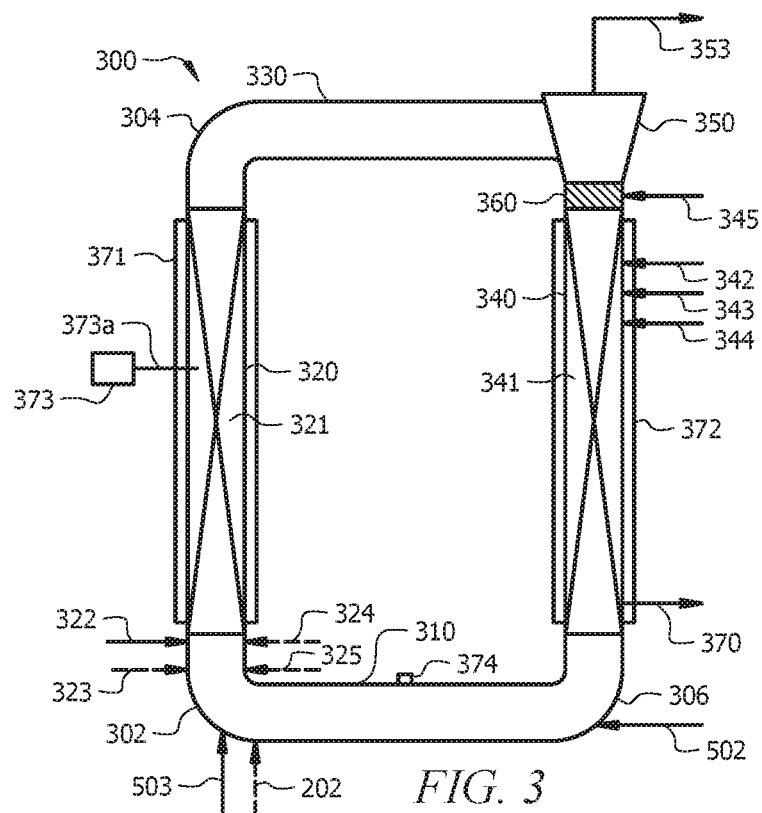
FIG. 3 illustrates a multi-zone circulating reactor having various additional aspects that can be utilized in FIG. 1 and/or FIG. 2.

FIG. 3 illustrates the MZCR 300 having various additional aspects that can be utilized in the MZCR 300 of FIG. 1 and/or FIG. 2. Feed lines 323, 324, and 325 are shown with dashed lines to indicate the optional use of these lines, since it is intended that the aspects and embodiments of the MZCR 300 shown in FIG. 3 can be implemented in the MCZR 300 shown in FIG. 1 and/or FIG. 2.

In embodiments, the MZCR 300 can include a heat apparatus 371 configured to add or remove heat from the riser 320 and/or a heat apparatus 372 configured to add or remove heat from the downcomer 340. The heat apparatus 371 and/or the heat apparatus 372 can be embodied as heat exchange jackets and/or an electric heater placed around the riser 320 and around the downcomer 340, respectively.

During startup of the MZCR 300, the heat apparatus 371 and/or the heat apparatus 372 can be configured to supply heat to the riser 320 and/or to the downcomer 340, respectively, in order raise the temperature of the polymerization zone 321 and/or polymerization zone 341 to the temperature for polymerization. When embodied as heat exchange jackets, a heating fluid such as steam or hot water may be circulated through an annulus between the heat apparatus 371 and riser 320 and/or between the heat apparatus 372 and the downcomer 340. The circulation of the heating fluid can add heat to the polymerization zone 321 and/or polymerization zone 341 via heat transfer through the reactor wall of the MZCR 300. The heating fluid may be circulated to a heating system configured to reheat the heating fluid before returning to the annular region in a heating cycle. When embodied as an electric heater, the heat apparatus 371 and/or the heat apparatus 372 can be appropriately connected to an electrical power supply that supplies power to raise the temperature of electrical heating elements. The heated heating elements can add heat to the polymerization zone 321 and/or polymerization zone 341 via heat transfer through the reactor wall of the MZCR 300.

During operation of the MZCR 300 at polymerization conditions, the heat apparatus 371 and/or the heat apparatus 372 apparatus can be configured to remove excess heat generated by the exothermic polymerization reactions. When embodied as heat exchange jackets, a cooling fluid may be circulated through the annulus between the heat apparatus 371 and riser 320 and/or between the heat apparatus 372 and the downcomer 340. The circulation of the cooling fluid can remove heat from the polymerization zone 321 and/or polymerization zone 341 via heat transfer through the reactor wall of the MZCR 300. The cooling fluid may be circulated to a cooling system configured to cool the cooling fluid before returning to the annular region in a cooling cycle.

In an aspect, the heat apparatus 371 may only cover a portion of the riser 320 and other portions of the riser 320 may not be subject to heat transfer. Likewise, the heat apparatus 372 may only cover a portion of the downcomer 340 and other portions of the downcomer 340 may not be subject to heat transfer. In further aspects, about 10% to about 100%; alternatively, about 20% to about 100%; alternatively, about 30% to about 100%; alternatively, about 40% to about 100%; alternatively, about 50% to about 100%; alternatively, about 60% to about 100%; alternatively, about 70% to about 100%; alternatively, about 70% to about 100%; alternatively, about 80% to about 100%; alternatively, about 90% to about 100% of the outer surface of the riser 320 may be subject to heat exchange via the heat transfer apparatus 371. In further aspects, about 10% to about 100%; alternatively, about 20% to about 100%; alternatively, about 30% to about 100%; alternatively, about 40% to about 100%; alternatively, about 50% to about 100%; alternatively, about 60% to about 100%; alternatively, about 70% to about 100%; alternatively, about 70% to about 100%; alternatively, about 80% to about 100%; alternatively, about 90% to about 100% of the outer surface of the downcomer 340 may be subject to heat exchange via the heat transfer apparatus 372.

FIG. 3 also illustrates that the MZCR 300 can include a thermowell 374. The thermowell 374 is shown on the lower conduit 310; however, it is contemplated than any number of thermowells can additionally or alternatively be included in the lower conduit 310, riser 320, upper conduit 330, separator 350, downcomer 340, elbow connector 302, elbow connector 304, elbow connector 306, or a combination thereof. A temperature sensing element, such as a thermocouple or a resistance temperature detector (RTD) can be housed in each thermowell 374 and configured to sense a temperature at the location in the MZCR 300 at which the temperature sensing element is placed. Each temperature sensing element can be appropriately connected to a process control system or processes monitoring system for reading and/or control of the MZCR 300. The multiple sensed temperature values can be assembled into a temperature profile for any portion or the whole MZCR 300.

FIG. 3 additionally illustrates that the MZCR 300 can include a gas density meter 373. The gas density meter 373 can be configured to measure a density of the reaction mixture at the point where the gas density meter 373 is located. In FIG. 3, the gas density meter 373 is located in the riser 320 and thus measures the gas density of the riser reaction mixture. Gas can flow into the gas density meter 373 via sample conduit 373a. Additionally or alternatively, it is contemplated that the gas density meter 373 can be located in other parts of the MZCR 300, e.g., i) one or more meters in the lower conduit 310 to measure the gas density of the downcomer product mixture along with any added recycled components, ii) one or more meters in the upper conduit 330 to measure the gas density of the riser product mixture, and iii) one or more meters in the downcomer 340 to measure the gas density in the downcomer 340. A commercial embodiment of the gas density meter 373 is an EMERSON® Micro Motion Gas Density Meter based on Coriolis effect. Other suitable gas density meters include on magnetic flow meters or thermodynamic flow meters.

Figure 4:
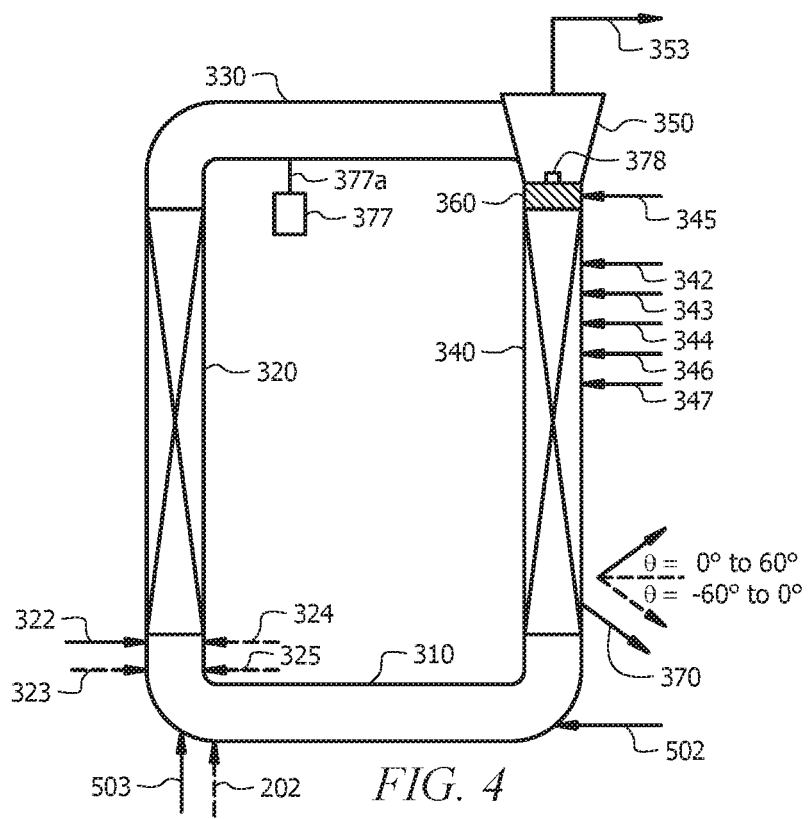
FIG. 4 illustrates a multi-zone circulating reactor having various additional aspects that can be utilized in FIG. 1 and/or FIG. 2 and with any combination of aspects shown in FIG. 3.

FIG. 4 illustrates the MZCR 300 having various additional aspects that can be utilized in FIG. 1 and/or FIG. 2 and with any combination of aspects shown in FIG. 3. Feed lines 323, 324, and 325 are shown with dashed lines to indicate the optional use of these lines, since it is intended that the aspects and embodiments of the MZCR 300 shown in FIG. 4 can be implemented in the MCZR 300 shown in FIG. 1 and/or FIG. 2.

FIG. 4 shows that the product discharge conduit 370 can be connected to the downcomer 340 such that an angle of the product discharge conduit 370 with respect to horizontal is in a range of −60° to 60°; alternatively, −45° to 45°; alternatively, −35° to 35°; alternatively, −25° to 25°; alternatively, 0° to 45°; alternatively, in a range of 10° to 35°; alternatively, in a range of 20° to 25°. For example, the angle of the product discharge conduit 370 with respect to horizontal can be −60°, −59°, −58°, −57°, −56°, −55°, −57°, −56°, −55°, −54°, −53°, −52°, −51°, −50°, −49°, −48°, −47°, −46°, −45°, −44°, −43°, −42°, −41°, −40°, −39°, −38°, −37°, −36°, −35°, −34°, −33°, −32°, −31°, −30°, −29°, −28°, −27°, −26°, −25°, −24°, −23°, −22°, −21°, −20°, −19°, −18°, −17°, −16°, −15°, −14°, −13°, −12°, −11°, −10°, −9°, −8°, −7°, −6°, −5°, −4°, −3°, −2°, −1°, 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, or 60°. In an additional or alternative aspect, the product discharge conduit 370 can be connected to the downcomer 340 such that an angle of the product discharge conduit 370 with respect to a longitudinal axis of the downcomer 340 is in a range of 45° to 90°; alternatively, in a range of 55° to 80°; alternatively, in a range of 65° to 70°. For example, the angle of the product discharge conduit 370 with respect to the longitudinal axis of the downcomer 340 can be 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, or 90°.

FIG. 4 also shows that a sample analyzer 377 configured to: i) analyze a sample of the a reaction mixture at one or more locations in the MZCR 300, ii) determine a concentration of gas, liquid, or solid in the reaction mixture, and iii) determine a concentration of monomer, comonomer, diluent, hydrogen, inert component, or polymer in the reaction mixture. The reaction mixture analyzed by the sample analyzer 377 can be the reaction mixture from the lower conduit 310 (e.g., the downcomer product mixture and any added recycled components), the reaction mixture from the riser 320 (e.g., the riser reaction mixture), the reaction mixture from the upper conduit 330 (e.g., the riser product mixture), or the reaction mixture from the downcomer 340 (e.g., the downcomer reaction mixture). In an aspect, the sample analyzer 377 can be configured to i) analyze a sample of the reaction mixture of the riser 320 and/or the reaction mixture of the downcomer 340 at one or more locations in the MZCR 300, ii) determine a concentration of gas, liquid, or solid in the reaction mixture of the riser 320 and/or the reaction mixture of the downcomer 340, and iii) determine a concentration of monomer, comonomer, diluent, hydrogen, inert component, or polymer in the reaction mixture of the riser 320 and/or the reaction mixture of the downcomer 340. In aspects, multiple sample analyzers similar to sample analyzer 377 can be included at various locations on the MZCR 300. In additional or other aspect, one or more sample analyzers can be included on the product discharge conduit 110 and/or product discharge conduit 370. The sample analyzer 377 can include a gas chromatograph (GC) configured to determine the concentration of the gases sampled via a conduit 377a that is connected to the interior of the MZCR 300. The analysis method can be Raman analysis, for example. The sample analyzer 377 can be configured to analyze a sample at a set frequency of time, i.e., at designated periods of time (e.g., every 1, 5, 10, 15, 20, 30, or 60 minutes). A commercially available sample analyzer 377 is a THERMO FISHER SCIENTIFIC® Raman gas analyzer or other commercially available infrared spectrometer.

FIG. 4 also shows a level controller 378 configured to control a level of polyolefin product in the separator 350 of the MZCR 300. The level controller 378 can be coupled to the separator 350 and configured such that the polyolefin product has a residence time in an range of from about 1 to about 30 minutes; alternatively, from about 1 to about 5 minutes; alternatively, from about 5 to about 10 minutes; alternatively, from about 10 to about 30 minutes in the separator 350.

The level controller 378 can be embodied as a valve, a level sensor, and a computer device connected to both the valve and the level sensor.

The valve of the level controller 378 can be positioned at the bottom of the separator 350 and configured to operate between an open position and a closed position. In the open position, the valve allows polyolefin product to pass from the separator 350 to the liquid barrier 360 of the downcomer 350. In the closed position, the valve prevents the polyolefin product from passing from the separator 350 into the liquid barrier 360. In operation, the valve of the level controller 380 can actuate between the open and closed positions in order to control the amount of polyolefin product that passes from the separator 350 into the liquid barrier 360. The valve can be electrically and/or pneumatically connected to the computer device of the level controller 378 such that actuation of the valve can be accomplished.

The level sensor of the level controller 378 can be configured to sense an amount (e.g., the level) of the polyolefin product in the separator 350. The level sensor can be a pressure sensor or pressure transducer positioned on the bottom of the separator 350 that measures a pressure or weight of the polyolefin product that accumulates in the bottom of the separator 350. Alternatively, the level sensor can be an electro-optical sensor positioned anywhere on the separator 350 so as to measure the presence of the polyolefin product at a threshold level in the separator 350. For example, an electro-optical sensor can be located on the wall of the separator 350 and configured to measure a disruption in light caused by the presence of the polyolefin product in front of the sensor, i.e., the amount of polyolefin product is at a threshold height in the in the separator 350 such that actuation of the valve into the open position is made by the level controller 378. Regardless how the level sensor is embodied, the level controller 378 can be configured to actuate the valve between the open position and the closed position in response to input from the level sensor (e.g., in the form of a pressure sensor, transducer, or electro-optical sensor). The level sensor can be electrically and/or pneumatically connected to the computer device of the level controller 378 such that measurement of the level of the polyolefin product in the separator 350 can be made.

The computer device of the level controller 378 can be specially configured with an input port that connects to the level sensor and an output port than connects to the valve. The computer device of the level controller 378 can be programmed to receive signals (e.g., electrical and/or pneumatic signals) from the level sensor, to analyze the received signals based on a control algorithm, and to send signals (e.g., electrical and/or pneumatic signals) to the valve of the level controller 378 that cause the valve either to actuate to the open position or to the closed position.

FIG. 4 shows additionally that an anti-static agent feed line 346 can be configured to inject an anti-static agent into the MZCR 300. While FIG. 4 shows the feed line 346 fluidly connected near the top portion 348 of the downcomer 340, it is contemplated that the feed line 346 can be connected anywhere on the MZCR 300. Additionally, it is contemplated that the feed line 346 can comprise more than one line configured to inject the anti-static agent at various locations along the downcomer 340 or anywhere along the MZCR 300. In an embodiment, the feed line 346 can be configured to inject a mixture comprising an anti-static agent and a carrier fluid. In an aspect of such embodiment, the concentration of the anti-static agent in feed line 346 (or each feed line when more than one is used) is in an range of from about 1 ppm to about 50 ppm; alternatively, from about 1 ppm to about 5 ppm; alternatively, about 5 ppm to about 10 ppm; alternatively, about 10 ppm to about 50 ppm, based on weight of the carrier fluid in the feed line 346. In an additional or alternative aspect of such embodiment, the concentration of the anti-static agent in feed line 346 (or each feed line when more than one is used) is about 1 ppm to about 50 ppm; alternatively, from about 1 ppm to about 5 ppm; alternatively, about 5 ppm to about 10 ppm; alternatively, about 10 ppm to about 50 ppm, based on weight of the carrier fluid in the MZCR 300. In an aspect, the anti-static agent can be STADIS® 425, STADIS® 450, STATSAFE™ 2000, STATSAFE™ 3000, STATSAFE™ 6000, ammonium salts, or other commercially available anti-static agent.

FIG. 4 also shows that a reactor deactivator feed line 347 can be included on the MZCR 300. The feed line 347 is shown as connecting to the downcomer 340; however, it is contemplated that the reactor deactivator feed line 347 can be placed anywhere on the MZCR 300. It is also contemplated that the MZCR 300 can have multiple reactor deactivator feed lines 347. The reactor deactivator feed line 347 is useful on the MZCR 300 when the multiple zone configuration of FIG. 1 is utilized, since the MZCR 300 is the last of the two reactors 100 and 300. It is contemplated that a deactivator feed line can additionally or alternatively be included on the first reactor 100 when the multiple zone configuration of FIG. 2 is utilized.

In and aspect, the reactor deactivation agent introduced via feed line 347 can be carbon monoxide or an alcohol. In an aspect, the reactor deactivation agent is not water, so as to prevent the internals of the MZCR 300 (or first reactor 100) from rusting.

A reactor deactivation agent is useful when the MZCR 300 (and/or the first reactor 100) must be shut down. The reactor deactivation agent can lead to a stoppage of the polymerization reactions, which then can enable stoppage of the reactors. In another aspect, the reactor deactivation agent is useful to partially reduce, or moderate, the polymerization reactions in the MZCR 300 (and/or the first reactor 100). Moderation enables slowing the polymerization reaction enough that the MZCR 300 and/or the first reactor 100 can be stopped for about 20 to about 60 minutes and then restarted, for example, to start a new polyolefin product run. The amount of reactor deactivation agent required for a total stoppage is greater than the amount required for moderation.

Figure 5A:
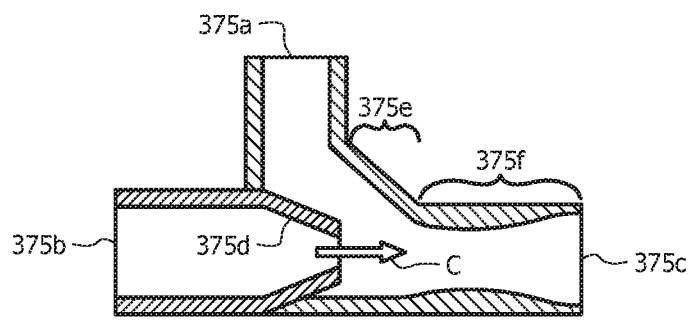
FIGS. 5A and 5B illustrate cross-sectional views of embodiments of an eductor.
Figure 5B:
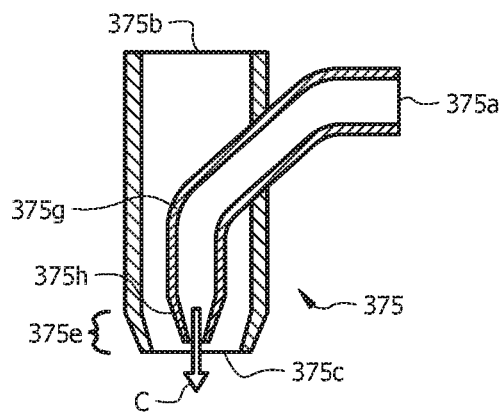
Figure 5C:
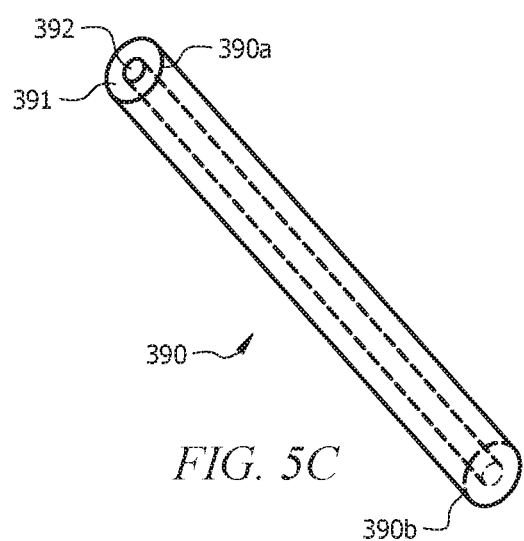
FIG. 5C illustrates a perspective view of a standpipe.
Figure 5D:
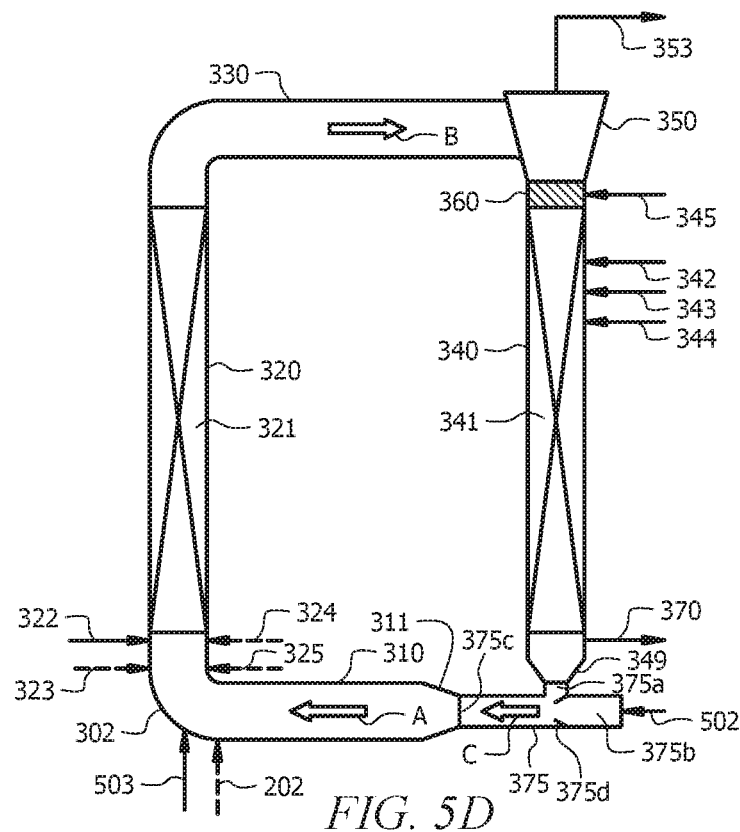
FIGS. 5D to 5H illustrate various aspects of the multi-zone circulating reactor having an eductor that can be utilized in FIG. 1 and/or FIG. 2 and with any combination of other aspects described herein.

FIGS. 5A and 5B illustrate cross-sectional views of embodiments of an eductor 375, and FIG. 5C illustrates a perspective view of a standpipe 390. The eductor 375 and/or standpipe 390 can be used with the MZCR 300 in FIG. 1 and/or FIG. 2, along with any combination of aspects shown in FIGS. 3 and 4. The configuration of the eductor 375 differs in various aspects between FIG. 5A and FIG. 5B, as is discussed below.

The eductor 375 of FIG. 5A is configured to increase a velocity of the fluids entering the eductor 375 such that the velocity of the fluids exiting the eductor 375 is higher than the velocity of the fluids entering the eductor 375. The design of the eductor 375 shown in FIG. 5A is intended to be exemplary and non-limiting, and other designs that function to increase the velocity of fluids that enter the eductor 375 are contemplated. The eductor 375 has two inlets 375a and 375b, and one outlet 375c. The inlet 375b and outlet 375c generally share the same longitudinal axis. The longitudinal axis of the inlet 375b is generally at an angle, for example 15° to 90°, relative to the longitudinal axis of the inlet 375b and outlet 375c.

Referring still to the eductor 375 in FIG. 5A, a reaction mixture containing polyolefin particles can enter the eductor 375 at inlet 375a. A motive fluid, for example, of recycled monomer/comonomer from conduit 502 or 503 in FIG. 1 or FIG. 2, can enter the eductor 375 at inlet 375b. The inlet 375b of the eductor 375 in FIG. 5A can be configured such that a portion 375d of the inlet 375b extends into the interior of the eductor 375 and is contoured in the shape of a nozzle such that the motive fluid is forced to flow at a higher velocity in the direction of arrow C. The flow of the motive fluid out of the nozzle-shaped portion 375d creates suction at inlet 375a that aids in drawing the reaction mixture into the eductor 375. The reaction mixture mixes with the motive fluid in the interior of the eductor 375, and the mixture flows in the direction of arrow C and out of the outlet 375c of the eductor 375 at an exit velocity that is higher than either or both of the inlet velocity of the motive fluid and the inlet velocity of the reaction mixture. In an aspect, a portion 375e of the body of the eductor 375 in FIG. 5A can be tapered such that the inner diameter of the portion 375e of the eductor 375 decreases in the direction of arrow C. In another aspect, a portion 375f of the body of the eductor 375 in FIG. 5A can be tapered such that the inner diameter of the portion 375f of the eductor 375 increases in the direction of arrow C. In another aspect, the motive fluid can be pressurized before entering the eductor 375, for example, by a pump or compressor positioned upstream of the eductor 375. In a further aspect, the eductor 375 of FIG. 5A can be oriented in the MZCR 300 such that the direction of flow indicated by arrow C is horizontal, vertical, or at an angle with respect to horizontal.

The eductor 375 of FIG. 5B is configured to increase a velocity of the fluids entering the eductor 375 such that the velocity of the fluids exiting the eductor 375 is higher than the velocity of the fluids entering the eductor 375. The design of the eductor 375 shown in FIG. 5B is intended to be exemplary and non-limiting, and other designs that function to increase the velocity of fluids that enter the eductor 375 are contemplated. The eductor 375 has two inlets 375a and 375b, and one outlet 375c. The inlet 375b and outlet 375c generally share the same longitudinal axis. The longitudinal axis of the inlet 375b is generally at an angle, for example perpendicular, relative to the longitudinal axis of the inlet 375b and outlet 375c.

Referring still to the eductor 375 in FIG. 5B, a motive fluid, for example, of recycled monomer/comonomer from conduit 502 or 503 in FIG. 1 or FIG. 2, can enter the eductor 375 at inlet 375a. A reaction mixture containing polyolefin particles can enter the eductor 375 at inlet 375b. This is the opposite configuration of the eductor 375 in FIG. 5A, where the reaction mixture enters inlet 375a and the motive fluid enters inlet 375b.

The inlet 375a of the eductor 375 in FIG. 5B can be configured such that a portion 375g of the inlet 375a extends into the interior of the eductor 375. The portion 375g bends within the interior of the eductor 375 such that the end 375h of the inlet 375a has a longitudinal axis that is parallel to or the same as the longitudinal axis of the inlet 375b and outlet 375c. The end 375h can also be contoured in the shape of a nozzle such that the motive fluid is forced to flow at a higher velocity in the direction of arrow C. The flow of the motive fluid out of the nozzle-shaped end 375h creates suction at inlet 375b that aids in drawing the reaction mixture into the eductor 375. The reaction mixture mixes with the motive fluid in the interior of the eductor 375, and the mixture flows in the direction of arrow C and out of the outlet 375c of the eductor 375 at an exit velocity that is higher than either or both of the inlet velocity of the motive fluid and the inlet velocity of the reaction mixture. In an aspect, a portion 375e of the eductor 375 can be tapered such that the inner diameter of the portion 375e of the eductor 375 decreases in the direction of arrow C. In another aspect, the motive fluid can be pressurized before entering the eductor 375, for example, by a pump or compressor positioned upstream of the eductor 375. In further aspect, the eductor 375 of FIG. 5B can be oriented in the MZCR 300 such that the direction of flow indicated by arrow C is horizontal, vertical, or at an angle with respect to horizontal.

FIG. 5C illustrates a perspective view of a standpipe 390. The standpipe 390 is generally a length of pipe having a wall thickness adequate for high pressure fluid. That is, the wall 391 of the standpipe 390 can have a thickness that is greater than the wall of the conduits which form the MZCR 300, due to the higher pressure of fluid that passes through the channel 392 of the standpipe 390. In aspects, the diameter of the standpipe 390 can be from about 2 to about 48 inches (about 5 to about 122 cm); alternatively, from about 12 to about 24 inches (about 30.5 to about 61 cm); alternatively, from about 6 to about 12 inches (about 15.2 to about 30.5 cm). In an aspect, a diameter of the standpipe 390 can be less than a diameter (e.g., inner diameter and/or outer diameter) of the lower conduit 310 of the MZCR 300. Generally, the standpipe 390 can have a uniform diameter along a length thereof such that end 390a of the standpipe 390 has an outer diameter and inner diameter that is equal to the outer diameter and inner diameter of the opposite end 390b. The thickness of the wall 391 of the standpipe 390 can be, for example, from about 0.1, 0.2, 0.3, 0.4, or 0.5 inches (about 0.254, 0.508, 0.762, 1.02, or 1.27 cm) to about 1, 1.5, 2, 2.5, 3, 3.5, 4, 4.5, or 5 inches (about 2.54, 3.81, 5.08, 6.35, 7.62, 8.89, 10.2, 11.4, or 12.7 cm). In a further aspect, the length of the standpipe 390 can be any length suitable for delivering the high pressure fluid to the MZCR 300, for example, 0.328, 1.64, 3.28, 4.92, 6.56, 8.20, 9.84, 11.5, 13.1, 14.8, or 16.4 ft (0.1, 0.5, 1, 1.5, 2.0, 2.5, 3.0, 3.5, 4.0, 4.5, or 5.0 meters). In yet a further aspect, it is contemplated that the standpipe 390 can include bends, elbow connectors, straight portions, or combinations thereof. Further, it is contemplated that the standpipe 390 can be formed from multiple piping segments, for example, to traverse the distance between a compressor and the MZCR 300 in the plant.

FIGS. 5D to 5J illustrate embodiments of the MZCR 300 that utilize the eductor 375 and/or standpipe 390 in various configurations and aspects. The configurations shown in FIGS. 5D to 5J can be utilized in the MZCR 300 of FIG. 1 and/or FIG. 2, along with any combination of aspects shown in FIGS. 3 and 4. Feed lines 323, 324, and 325 in each of FIGS. 5D to 5J are shown with dashed lines to indicate the optional use of these lines, since it is intended that the aspects and embodiments of the MZCR 300 shown in FIGS. 5D to 5J can be implemented in the MCZR 300 shown in FIG. 1 and/or FIG. 2.

In FIG. 5D, the eductor 375 of FIG. 5A is placed in the MZCR 300 such that inlet 375a is fluidly connected to the bottom portion 349 of the downcomer 340 and such that outlet 375c is fluidly connected to the end 311 of the lower conduit 310. The bottom portion 349 of the downcomer 340 can be tapered in a conical manner so as to facilitate flow of the downcomer product mixture into the inlet 375a of the eductor 375. Inlet 375b of the eductor 375 is fluidly connected to conduit 502 such that unreacted olefin monomer, unreacted olefin comonomer, diluent, or a combination thereof enters the eductor 375.

The flow of the unreacted olefin monomer, unreacted olefin comonomer, diluent, or a combination thereof out of the nozzle-shaped portion 375d creates suction at inlet 375a that aids in drawing the downcomer product mixture into the eductor 375. The downcomer product mixture mixes with the unreacted olefin monomer, unreacted olefin comonomer, diluent, or a combination thereof in the interior of the eductor 375 to form an eductor reaction mixture, and the eductor reaction mixture flows in the direction of arrow C and out of the outlet 375c of the eductor 375 and into the lower conduit 310. The eductor 375 helps the eductor reaction mixture exit the eductor 375 at an exit velocity that is i) greater than a saltation velocity of the eductor reaction mixture and up to about 30.48 m/s (100 ft/sec), or ii) greater than 110% of the saltation velocity of the eductor reaction mixture. The exit velocity of the eductor reaction mixture moves the mixture through the lower conduit 310 in the direction of arrow A, where the eductor reaction mixture mixes with additional unreacted olefin monomer, unreacted olefin comonomer, diluent, or a combination thereof provided by conduit 503 to form a lower conduit reaction mixture. The lower conduit reaction mixture mixes with feed components provided by feed lines 322, 323, 324, and/or 325 to form the riser reaction mixture. For the polymerization of FIG. 1, the first polyolefin received from conduit 202 can additionally mix with the eductor reaction mixture flowing in the lower conduit 310 such that the first polyolefin and the eductor reaction mixture flow in the lower conduit reaction mixture.

The angle between the longitudinal axis of the inlet 375a and inlet 375b in FIG. 5D is perpendicular, and the direction of flow of arrow C is horizontal.

The eductor 375 of FIG. 5D replaces the elbow connector 306 shown in FIG. 1 and FIG. 2.

Figure 5E:
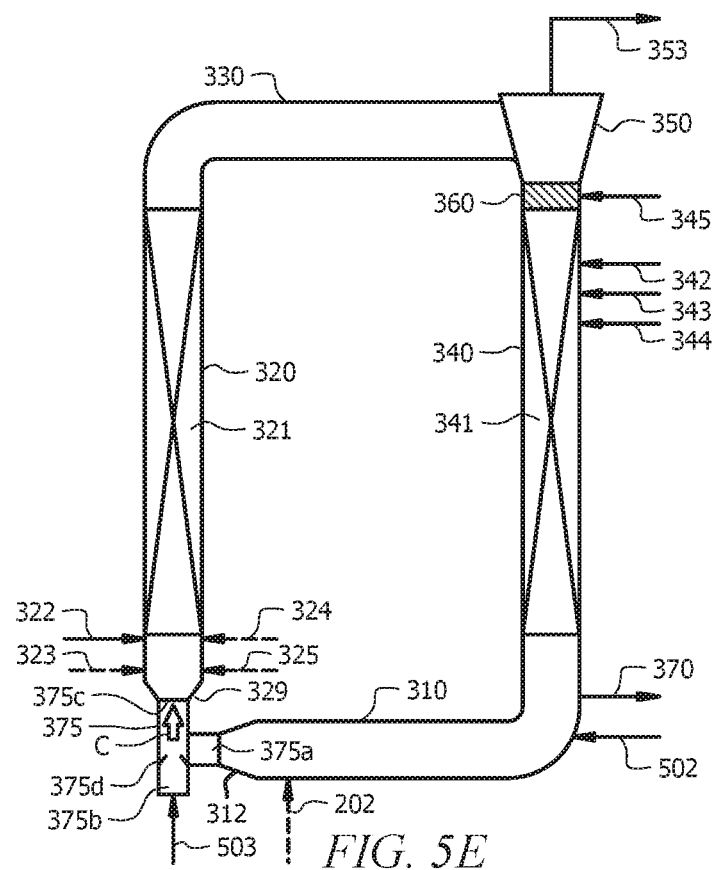

In FIG. 5E, the eductor 375 of FIG. 5A is placed in the MZCR 300 such that inlet 375a is fluidly connected to the end 312 of the lower conduit 310 and such that outlet 375c is fluidly connected to the bottom portion 329 of the riser

320. The bottom portion 329 of the riser 320 can be tapered in a conical manner so as to facilitate connection to the outlet 375c of the eductor 375. Inlet 375b of the eductor 375 is fluidly connected to conduit 503 such that unreacted olefin monomer, unreacted olefin comonomer, diluent, or a combination thereof enters the eductor 375.

The flow of the unreacted olefin monomer, unreacted olefin comonomer, diluent, or a combination thereof out of the nozzle-shaped portion 375d creates suction at inlet 375a that aids in drawing the lower conduit reaction mixture (e.g., containing the downcomer product mixture and any recycled components added via conduit 502) from the lower conduit 310 into the eductor 375. The lower conduit reaction mixture mixes with the additional unreacted olefin monomer, unreacted olefin comonomer, diluent, or a combination thereof in the interior of the eductor 375 to form the eductor reaction mixture, and the eductor reaction mixture flows in the direction of arrow C and out of the outlet 375c of the eductor 375. The eductor reaction mixture exits the eductor 375 at an exit velocity that is i) greater than a saltation velocity of the eductor reaction mixture and up to about 30.48 m/s (100 ft/sec), or ii) greater than 110% of the saltation velocity of the eductor reaction mixture. The eductor reaction mixture mixes with any added feed components via conduits 322, 323, 324, and/325 to form the riser reaction mixture. The exit velocity of the eductor reaction mixture helps move the riser reaction mixture (which contains the eductor reaction mixture and any components added via conduits 322, 323, 324, and/or 325) through riser 320 in an upward direction. The momentum of the riser reaction mixture through the riser 320 helps move the riser product mixture through the upper conduit 330. For the polymerization of FIG. 1, the first polyolefin received from conduit 202 can mix with the lower conduit reaction mixture flowing in the lower conduit 310 such that the first polyolefin and the lower conduit reaction mixture flow into the eductor 375.

The angle between the longitudinal axis of the inlet 375a and inlet 375b in FIG. 5E is perpendicular, and the direction of flow of arrow C is vertical.

It is contemplated that embodiments of the MZCR 300 can have an eductor 375 placed as shown in FIG. 5D in combination with an eductor placed as shown in FIG. 5E.

The eductor 375 of FIG. 5E replaces the elbow connector 302 shown in FIG. 1 and FIG. 2.

Figure 5F:
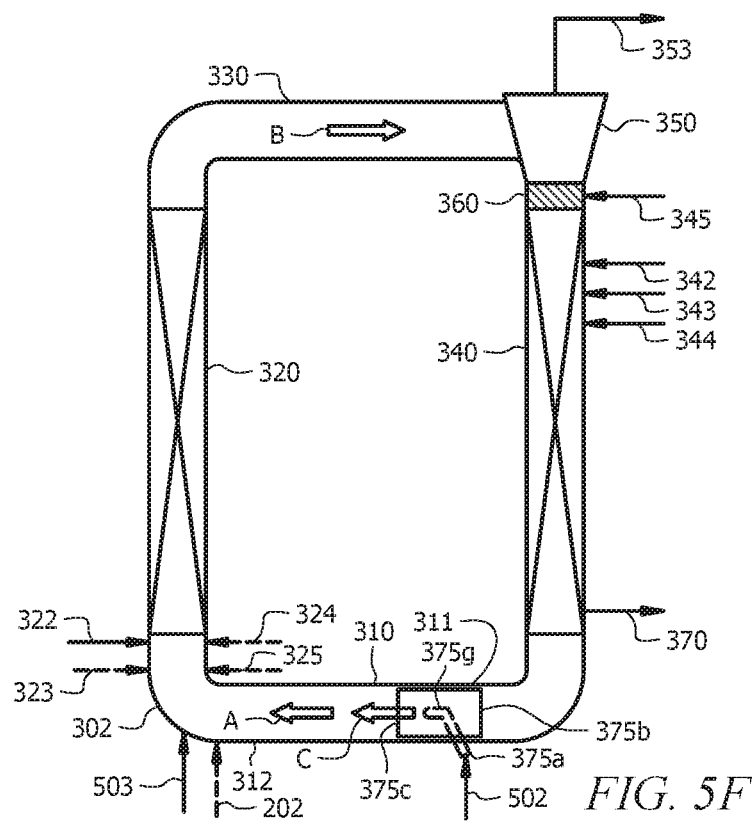

In FIG. 5F, the eductor 375 of FIG. 5B is placed in the MZCR 300 such that inlet 375b is fluidly connected to the end 311 of the lower conduit 310 and such that outlet 375c is fluidly connected to the end 312 of the lower conduit 310. Inlet 375a of the eductor 375 is fluidly connected to conduit 502 such that unreacted olefin monomer, unreacted olefin comonomer, diluent, or a combination thereof enters the eductor 375 via the inlet 375a.

The flow of the unreacted olefin monomer, unreacted olefin comonomer, diluent, or a combination thereof out of the portion 375g of the inlet 375a that extends into the interior of the eductor 375 creates suction at inlet 375b that aids in drawing the downcomer product mixture from the end 311 of the lower conduit 310 into the eductor 375. The downcomer product mixture mixes with the unreacted olefin monomer, unreacted olefin comonomer, diluent, or a combination thereof in the interior of the eductor 375 to form an eductor reaction mixture, and the eductor reaction mixture flows in the direction of arrow C and out of the outlet 375c of the eductor 375 and into the end 312 of the lower conduit 310. The eductor reaction mixture flows out of the eductor 375 at an exit velocity that is i) greater than a saltation velocity of the eductor reaction mixture and up to about 30.48 m/s (100 ft/sec), or ii) greater than 110% of the saltation velocity of the eductor reaction mixture. The exit velocity of the eductor reaction mixture moves the mixture through the lower conduit 310 and into the riser 320 (e.g., via the elbow connector 302). The eductor reaction mixture can combine with the additional unreacted olefin monomer, unreacted olefin comonomer, diluent, or a combination thereof provided by conduit 503, forming a lower conduit reaction mixture, and the lower conduit reaction mixture mixes with any feed components from lines 322, 323, 324, and/or 325 to form the riser reaction mixture. The riser reaction mixture moves through the riser 320 in an upward direction. The momentum of the riser reaction mixture through the riser 320 moves the riser product mixture through the upper conduit 330. For the polymerization of FIG. 1, the first polyolefin received from conduit 202 can mix with the eductor reaction mixture flowing in the lower conduit 310 such that the first polyolefin and the eductor reaction mixture flow in the lower conduit reaction mixture into the eductor 375.

The angle between the longitudinal axis of the inlet 375a and inlet 375b in FIG. 5F is less than 90°, and the direction of flow of arrow C is horizontal.

It is contemplated that embodiments of the MZCR 300 can have the eductor 375 as shown in FIG. 5F in combination with an eductor 375 placed as shown in FIG. 5D and/or with an eductor placed as shown in FIG. 5E.

Figure 5G:
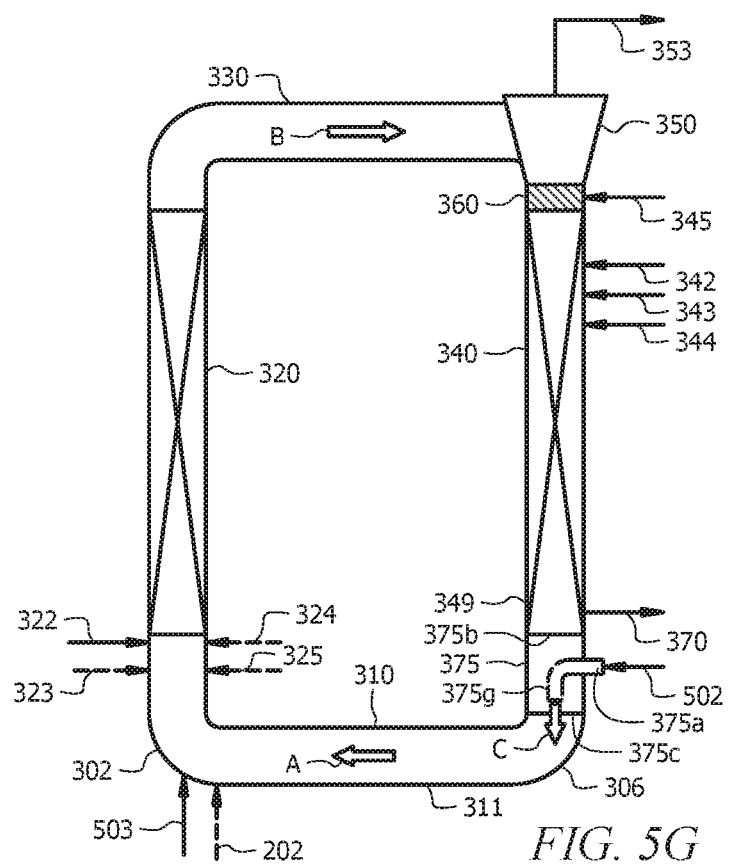

In FIG. 5G, the eductor 375 of FIG. 5B is placed in the MZCR 300 such that inlet 375b is fluidly connected to the bottom portion 349 of the downcomer 340 and such that outlet 375c is fluidly connected to the end 311 of the lower conduit 310 (e.g., via the elbow connector 306). Inlet 375a of the eductor 375 is fluidly connected to conduit 502 such that unreacted olefin monomer, unreacted olefin comonomer, diluent, or a combination thereof enters the eductor 375 via the inlet 375a.

The flow of the unreacted olefin monomer, unreacted olefin comonomer, diluent, or a combination thereof out of the portion 375g of the inlet 375a that extends into the interior of the eductor 375 creates suction at inlet 375b that aids in drawing the downcomer product mixture from the downcomer 340 into the eductor 375. The downcomer product mixture mixes with the unreacted olefin monomer, unreacted olefin comonomer, diluent, or a combination thereof in the interior of the eductor 375 to for an eductor reaction mixture, and the eductor reaction mixture flows in the direction of arrow C and out of the outlet 375c of the eductor 375 and into the end 311 of the lower conduit 310. The eductor reaction mixture exits the eductor 375 at an exit velocity that is i) greater than a saltation velocity of the eductor reaction mixture and up to about 30.48 m/s (100 ft/sec), or ii) greater than 110% of the saltation velocity of the eductor reaction mixture. The exit velocity helps to move the educator reaction mixture through the lower conduit 310. The eductor reaction mixture combines with the unreacted olefin monomer, unreacted olefin comonomer, diluent, or a combination thereof provided by conduit 503 to for the lower conduit reaction mixture. The lower conduit reaction mixture mixes with feed components added be any of feed conduits 322, 323, 324, and/or 325 to form the riser reaction mixture. The riser reaction mixture moves through the riser 320 in an upward direction. The riser reaction mixture exits the riser 320 as the riser product mixture, and the riser product mixture flows through the upper conduit 330 to the separator 350. For the polymerization of FIG. 1, the first polyolefin received from conduit 202 can mix with the eductor reaction mixture flowing in the lower conduit 310.

The angle between the longitudinal axis of the inlet 375*a* and inlet 375*b* in FIG. 5G is less than 90°, and the direction of flow of arrow C is vertical.

It is contemplated that embodiments of the MZCR 300 can have the eductor 375 as shown in FIG. 5G in combination with an eductor 375 placed as shown in FIG. 5D, with an eductor 375 placed as shown in FIG. 5E, with an eductor 375 placed as shown in FIG. 5F, or a combination thereof.

Figure 5H:
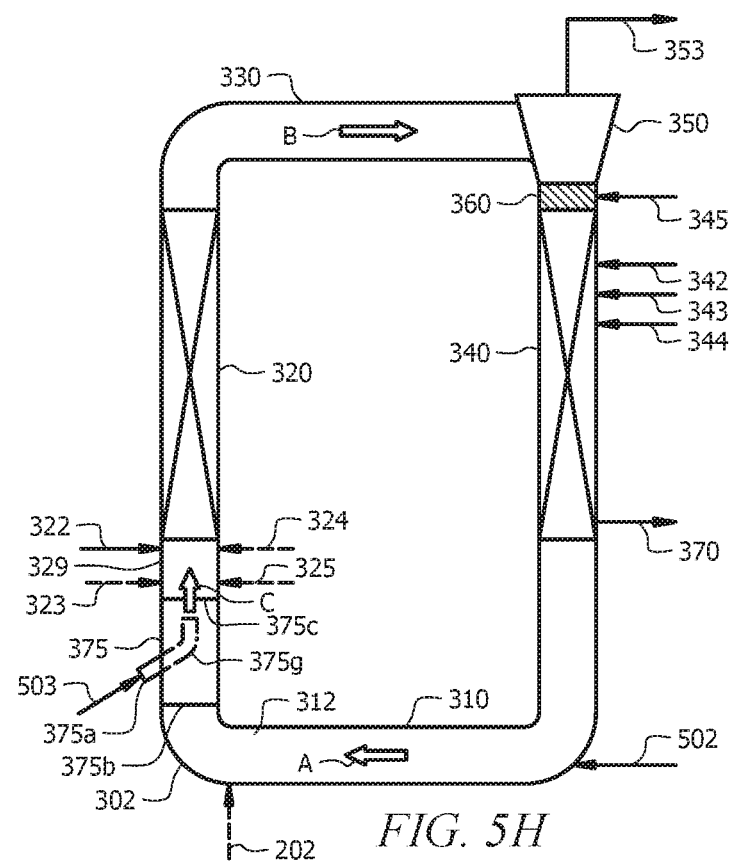

In FIG. 5H, the eductor 375 of FIG. 5B is placed in the MZCR 300 such that inlet 375*b* is fluidly connected to the end 312 of the lower conduit 310 and such that outlet 375*c* is fluidly connected to the bottom portion 329 of the riser 320 (e.g., via the elbow connector 302). Inlet 375*a* of the eductor 375 is fluidly connected to conduit 503 such that unreacted olefin monomer, unreacted olefin comonomer, diluent, or a combination thereof enters the eductor 375 via the inlet 375*a*.

The flow of the unreacted olefin monomer, unreacted olefin comonomer, diluent, or a combination thereof out of the portion 375*g* of the inlet 375*a* that extends into the interior of the eductor 375 creates suction at inlet 375*b* that aids in drawing the lower conduit reaction mixture from the lower conduit 310 into the eductor 375. The lower conduit reaction mixture received at inlet 375*b* can contain i) the downcomer product mixture, ii) unreacted olefin monomer, unreacted olefin comonomer, diluent, or a combination thereof provided by conduit 502, and optionally iii) the first polyolefin delivered via conduit 202 (see the polymerization in FIG. 1). The lower conduit reaction mixture received at inlet 375*b* mixes with the unreacted olefin monomer, unreacted olefin comonomer, diluent, or a combination thereof provided by conduit 503 in the interior of the eductor 375 to for the eductor reaction mixture, and the eductor reaction mixture flows in the direction of arrow C and out of the outlet 375*c* of the eductor 375. The eductor reaction mixture exits the eductor 375 at an exit velocity that is i) greater than a saltation velocity of the eductor reaction mixture and up to about 30.48 m/s (100 ft/sec), or ii) greater than 110% of the saltation velocity of the eductor reaction mixture. The eductor reaction mixture mixes with any feed components provided by feed conduits 322, 323, 324, and/or 325 to form the riser reaction mixture. The riser reaction mixture flows into the riser 320 and upward therethrough. The riser reaction mixture exits the riser 320 as the riser product mixture. The exit velocity of the riser product mixture helps to move the riser product mixture through the upper conduit 330 to the separator 350.

The angle between the longitudinal axis of the inlet 375*a* and inlet 375*b* in FIG. 5H is less than 90°, and the direction of flow of arrow C is vertical.

It is contemplated that embodiments of the MZCR 300 can have the eductor 375 as shown in FIG. 5H in combination with an eductor 375 placed as shown in FIG. 5D, with an eductor 375 placed as shown in FIG. 5E, with an eductor 375 placed as shown in FIG. 5F, with an eductor 375 placed as shown in FIG. 5G, or a combination thereof.

Figure 5I:
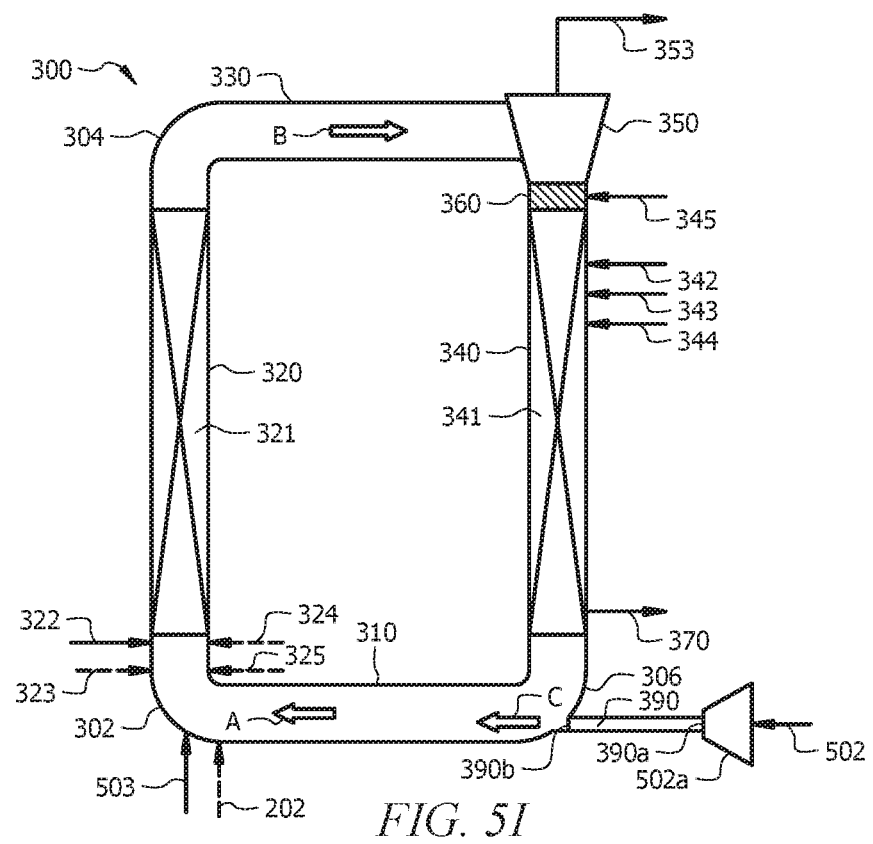
FIGS. 5I and 5J illustrate embodiments of the multi-zone circulating reactor having a standpipe that can be utilized in FIG. 1 and/or FIG. 2 and with any combination of other aspects described herein.

In FIG. 5I, the standpipe 390 of FIG. 5C is fluidly connected to the lower conduit 310 (e.g., via the elbow connector 306). The outlet 390*b* of the standpipe 390 connects to the MZCR 300. The inlet 390*a* of the standpipe 390 is fluidly connected to conduit 502, optionally via a compressor or pump 502*a*. The compressor or pump 502*a* is configured to increase the pressure of the unreacted olefin monomer, unreacted olefin comonomer, diluent, or a combination thereof received from conduit 502. The inlet 390*a* of the standpipe 390 can be directly connected to the outlet of the compressor or pump 502*a* so as to deliver the pressurized components to the interior of the MZCR 300 in the direction of arrow C. The pressured components enter the MZCR 300 and increase the velocity of the downcomer product mixture traveling out of the downcomer 340 and into the lower conduit 310 such that the velocity of the downcomer product mixture reaches a velocity that is i) greater than a saltation velocity of the downcomer product mixture and up to about 30.48 m/s (100 ft/sec), or ii) greater than 110% of the saltation velocity of the downcomer product mixture.

The direction of flow of arrow C in FIG. 5I is horizontal. It is contemplated that embodiments of the MZCR 300 can have the standpipe 390 as shown in FIG. 5I in combination with an eductor 375 placed as shown in FIG. 5D, with an eductor 375 placed as shown in FIG. 5E, with an eductor 375 placed as shown in FIG. 5F, with an eductor 375 placed as shown in FIG. 5G, with an eductor 375 placed as shown in FIG. 5H, or a combination thereof.

Figure 5J:
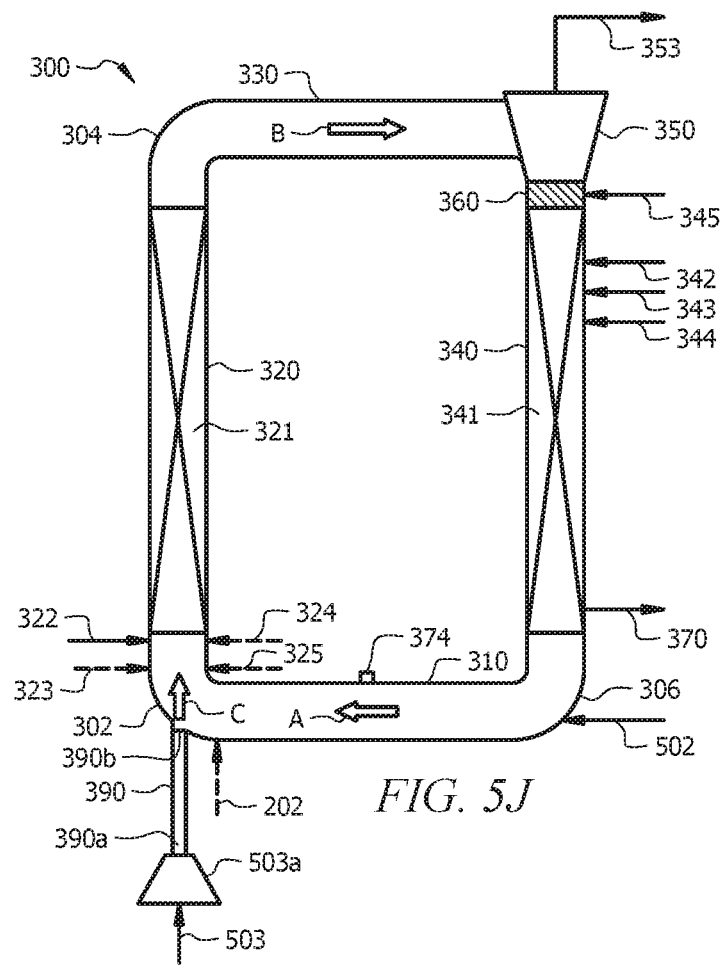

In FIG. 5J, the standpipe 390 of FIG. 5C is fluidly connected to the lower conduit 310 (e.g., via the elbow connector 302). The outlet 390*b* of the standpipe 390 connects to the MZCR 300. The inlet 390*a* of the standpipe 390 is fluidly connected to conduit 503, optionally via a compressor or pump 503*a*. The compressor or pump 503*a* is configured to increase the pressure of the unreacted olefin monomer, unreacted olefin comonomer, diluent, or a combination thereof received from conduit 502. The inlet 390*a* of the standpipe 390 can be directly connected to the outlet of the compressor or pump 502*a* so as to deliver the pressurized components to the interior of the MZCR 300 in the direction of arrow C. The pressured components enter the MZCR 300 and increase the velocity of the lower conduit reaction mixture traveling out of the lower conduit 310 such that a velocity of the lower conduit reaction mixture is i) greater than a saltation velocity of the lower conduit reaction mixture and up to about 30.48 m/s (100 ft/sec), or ii) greater than 110% of the saltation velocity of the lower conduit reaction mixture.

The direction of flow of arrow C in FIG. 5J is vertical. It is contemplated that embodiments of the MZCR 300 can have the standpipe 390 as shown in FIG. 5J in combination with an eductor 375 placed as shown in FIG. 5D, with an eductor 375 placed as shown in FIG. 5E, with an eductor 375 placed as shown in FIG. 5F, with an eductor 375 placed as shown in FIG. 5G, with an eductor 375 placed as shown in FIG. 5H, the standpipe 390 as shown in FIG. 5I, or a combination thereof.

Figure 6A:
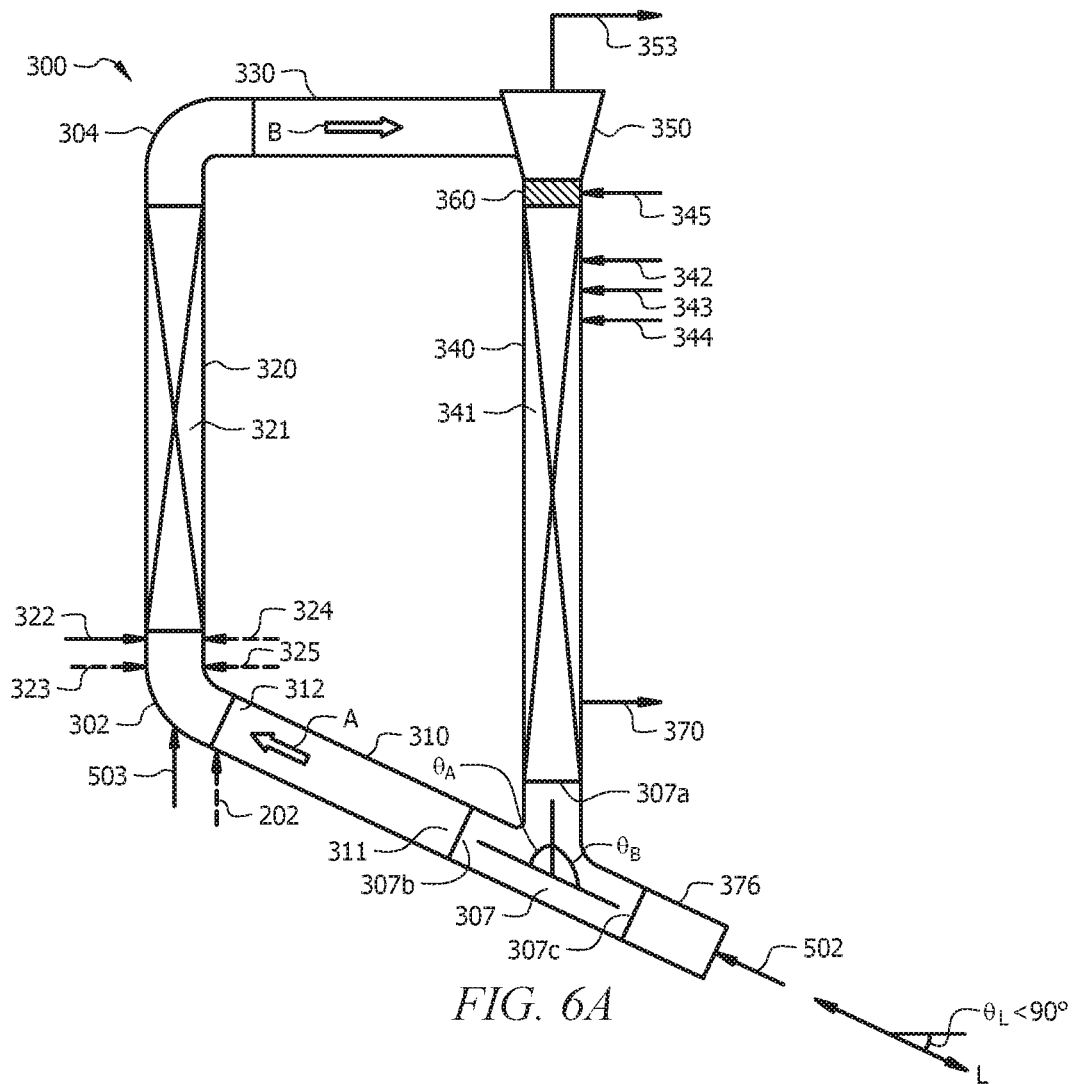
FIG. 6A illustrates a configuration of the multi-zone circulating reactor having a transition conduit that can be utilized in FIG. 1 and/or FIG. 2, along with any combination of aspects described herein.
Figure 6B:
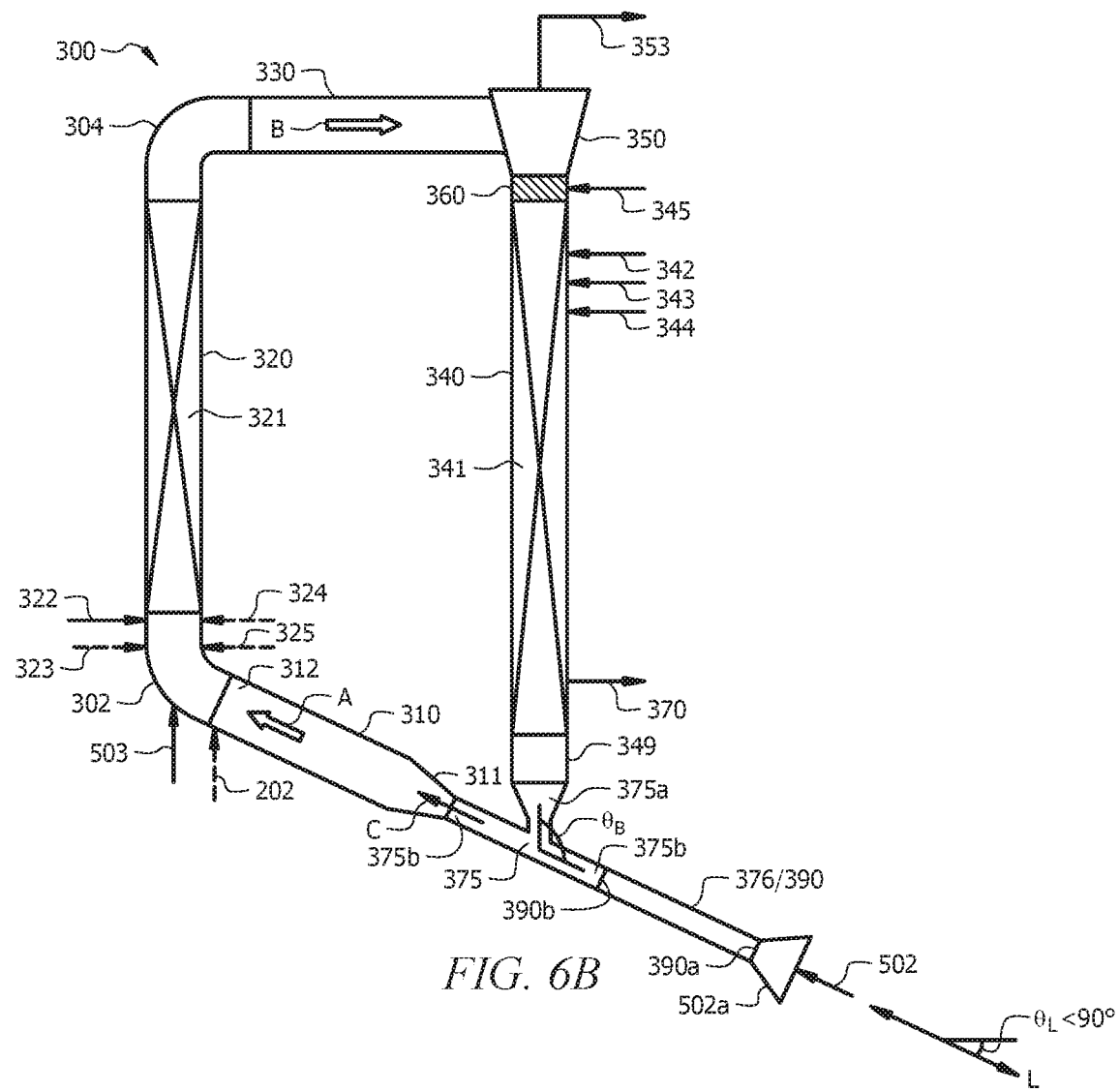
FIG. 6B illustrates the configuration of the multi-zone circulating reactor in FIG. 6A, having an eductor and standpipe instead of the transition conduit.
Figure 6C:
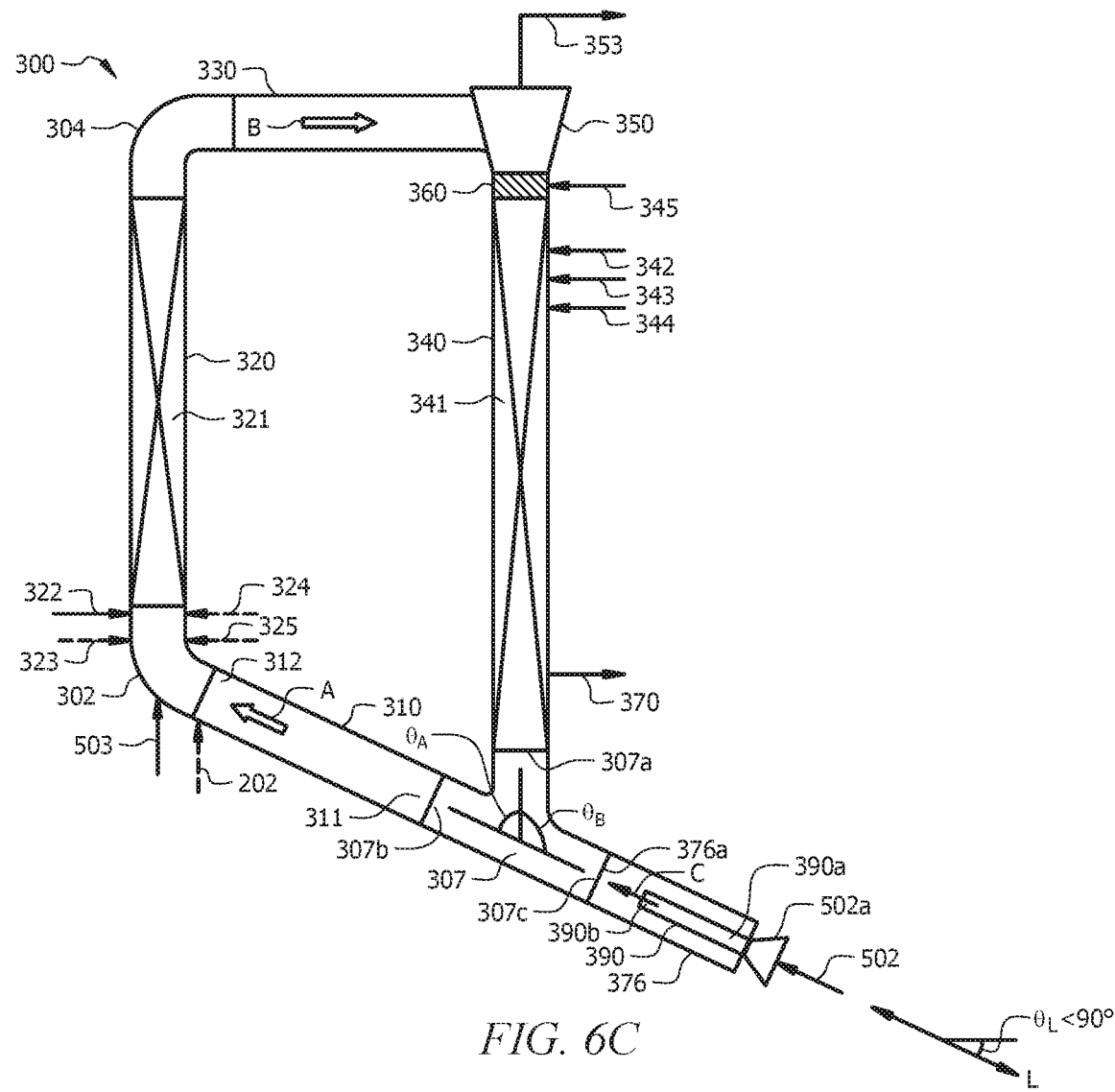
FIG. 6C illustrates the configuration of the multi-zone circulating reactor in FIG. 6A, having a standpipe placed inside the transition conduit.

FIGS. 6A to 6C illustrate the MZCR 300 having various additional aspects that can be utilized in FIG. 1 and/or FIG. 2 and with any combination of aspects shown in FIGS. 3, 4, and 5A to 5J. Feed lines 323, 324, and 325 are shown with dashed lines to indicate the optional use of these lines, since it is intended that the aspects and embodiments of the MZCR 300 shown in FIG. 6A can be implemented in the MCZR 300 shown in FIG. 1 and/or FIG. 2.

In FIG. 6A, the MZCR 300 that includes a transition conduit 376. The transition conduit 376 can be fluidly connected to the end 311 of the lower conduit 310 and to the bottom portion 349 of the downcomer 340. An angle of the lower conduit 310 with respect to horizontal can be less than about 90°; alternatively, greater than about 0° and less than about 90°; alternatively, in a range of from about 0° to about 45°; alternatively, in a range of from about 45° to about 67.5°. An angle of the transition conduit 376 with respect to horizontal can be less than about 90°; alternatively, greater than about 0° and less than about 90°; alternatively, in a range of from about 0° to about 45°; alternatively, in a range of from about 45° to about 67.5°. In an aspect, the lower conduit 330 and the transition conduit 376 are the same angle value with respect to horizontal. A length of the transition conduit 376 can be from about 0.305 m (1 ft) to about 4.57 m (15 ft); alternatively, about 1.83 m (6 ft) to about 4.57 m (15 ft); alternatively, from about 0.305 m (1 ft) to about 1.5 m (5 ft); alternatively, about 1.5 m (5 ft) to about 3.05 m (loft). FIG. 6A also shows that the transition conduit 376 can be fluidly connected to the conduit 502. In an aspect, part of the transition conduit 376 can be a flush and clean out chamber having a length of from about 0.305 m (1 ft) to about 1.5 m (5 ft); alternatively, about 1.5 m (5 ft) to about 3.05 m (loft).

FIG. 6A illustrates that the MZCR 300 can have elbow connector 302, elbow connector 304, and tee connector 307 (e.g., elbow connector 306 is replaced by tee connector 307 due to the presence of the transition conduit 376). As can be seen, elbow connector 302 can connect to the bottom portion 329 of the riser 320 and to the end 312 of the lower conduit 310. More specifically, end 302a of the elbow connector 302 can connect to the bottom portion 329 of the riser 320, and end 302b of the elbow connector 302 can connect to the end 312 of the lower conduit 310. Elbow connector 304 can connect to the top portion 328 of the riser 320 and to the end 331 of the upper conduit 330. More specifically, end 304a of the elbow connector 304 can connect to the top portion 328 of the riser 320, and end 304b of the elbow connector 304 can connect to the end 331 of the upper conduit 330. Tee connector 307 can connect to the bottom portion 349 of the downcomer 340, to the end 311 of the lower conduit 310, and to an end 376a of the transition conduit 376. More specifically, end 307a of the tee connector 307 can connect to the bottom portion 349 of the downcomer 340, end 307b of the tee connector 307 can connect to the end 311 of the lower conduit 310, and end 307c of the tee connector 307 can connect to the end 376a of the transition conduit 376. In an aspect, the a first angle $\theta_A$ formed between the end 307a and the end 307b of the tee connector 307 is equal to or less than about 90°, and an angle $\theta_B$ between the end 307a and the end 307c is equal to or greater than 90°.

In FIG. 6B, an eductor 375 is used in combination with a transition conduit 376 embodied as a standpipe 390. The eductor 375 is similar to that illustrated in FIG. 5A, except the angle between the longitudinal axis of the inlet 375a and inlet 375b in FIG. 6B is angle $\theta_B$ (angle $\theta_B$ is discussed for FIG. 6A). In an aspect, the angle $\theta_B$ in FIG. 6B that is between the longitudinal axis of inlet 375a and the longitudinal axis of inlet 375b is greater than 90° and less than 180°.

The eductor 375 is placed in the MZCR 300 such that inlet 375a is fluidly connected to the bottom portion 349 of the downcomer 340 and such that outlet 375c is fluidly connected to the end 311 of the lower conduit 310. The bottom portion 349 of the downcomer 340 can be tapered in a conical manner so as to facilitate flow of the reaction mixture into the inlet 375a of the eductor 375. The inlet 375b of the eductor 375 is fluidly connected to the outlet 390b of the standpipe 390. The inlet 390a of the standpipe 390 can be fluidly connected to a compressor or pump 502a.

The configuration and operation of the eductor 375 in FIG. 6B is similar to that described for FIG. 5D, except the recycled components are received at the inlet 375b at a higher pressure due to use of the standpipe 390 and compressor or pump 502a. The downcomer product mixture received in the inlet 375a from the downcomer 340 mixes with the pressurized unreacted olefin monomer, unreacted olefin comonomer, diluent, or a combination thereof in the interior of the eductor 375 to form a pressurized eductor reaction mixture, and the pressurized eductor reaction mixture flows in the direction of arrow C and out of the outlet 375c of the eductor 375 and into the lower conduit 310. The eductor reaction mixture exits the eductor 375 at an exit velocity that is i) greater than a saltation velocity of the eductor reaction mixture and up to about 30.48 m/s (100 ft/sec), or ii) greater than 110% of the saltation velocity of the eductor reaction mixture. The exit velocity of the pressurized eductor reaction mixture (containing recycled components and the downcomer product mixture) exiting the eductor 375 is higher than an inlet velocity of the reaction mixture at inlet 375a and the inlet velocity of the recycled components at inlet 375b.

The exit velocity helps to move the eductor reaction mixture through the lower conduit 310 in the direction of arrow A, where the eductor reaction mixture mixes with unreacted olefin monomer, unreacted olefin comonomer, diluent, or a combination thereof provided by conduit 503 to form the lower conduit reaction mixture. The lower conduit reaction mixture mixes with any feed components provided by conduits 322, 323, 324, and/or 325 to form the riser reaction mixture. For the polymerization of FIG. 1, the first polyolefin received from conduit 202 can additionally mix with the eductor reaction mixture flowing in the lower conduit 310.

In FIG. 6B, the eductor 375 replaces the tee connector 307 shown in FIG. 6A, and the transition conduit 376 of FIG. 6A is embodied as the standpipe 390 in FIG. 6B.

In alternative aspect for FIG. 6B, it is contemplated that the inlet 375b of the eductor 375 can be fluidly connected to conduit 502 such that unreacted olefin monomer, unreacted olefin comonomer, diluent, or a combination thereof enters the eductor 375 (i.e., in an embodiment, there is no standpipe 390) directly from the conduit 502. Alternatively still, it is contemplated that the outlet 390b of the standpipe 390 can be fluidly connected to the tee connector 307 of the MZCR 300 shown in FIG. 6A such that unreacted olefin monomer, unreacted olefin comonomer, diluent, or a combination thereof enters the MZCR 300 directly from the standpipe 300.

In FIG. 6C, a standpipe 390 of FIG. 5C is used in combination with the transition conduit 376 having the configuration shown in FIG. 6A. The standpipe 390 is fluidly connected to the lower conduit 310 (e.g., via the tee connector 307), and the outlet 390b of the standpipe 390 extends into the interior of the transition conduit 376. The inlet 390a of the standpipe 390 is fluidly connected to conduit 502, optionally via a compressor or pump 502a. The compressor or pump 502a is configured to increase the pressure of the unreacted olefin monomer, unreacted olefin comonomer, diluent, or a combination thereof received from conduit 502. While the inlet 390a of the standpipe 390 is shown in FIG. 6C as being inside the transition conduit 376, it is contemplated that the standpipe 390 can have portions that extend both inside and outside the transition conduit 376 such that the inlet 390a is outside the transition conduit 376 and the outlet 390b of the standpipe 390 is inside the transition conduit 376.

The inlet 390a of the standpipe 390 can be directly connected to the outlet of the compressor or pump 502a so as to deliver the pressurized components to the interior of the MZCR 300 in the direction of arrow C. The pressurized components enter the MZCR 300 and increase the velocity of the downcomer product mixture traveling out of the downcomer 340 and into the lower conduit 310 such that a velocity of the downcomer product mixture is i) greater than a saltation velocity of the downcomer product mixture and up to about 30.48 m/s (100 ft/sec), or ii) greater than 110% of the saltation velocity of the downcomer product mixture.

Figure 7:
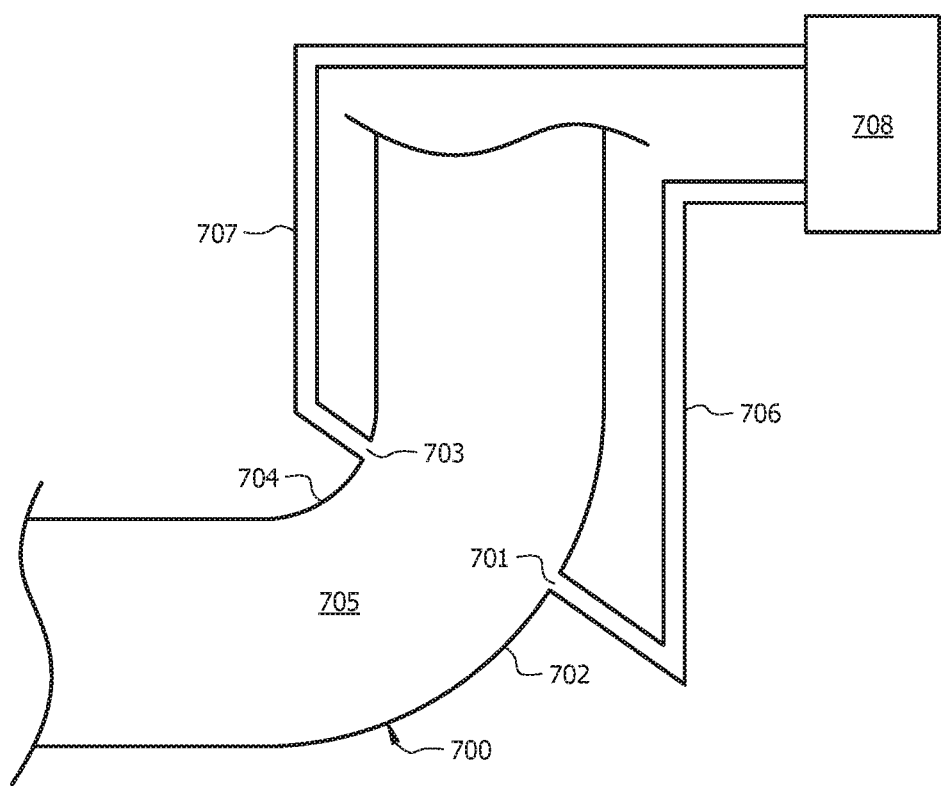
FIG. 7 illustrates an isolated view of an elbow connector having a smart elbow configuration.

FIG. 7 illustrates an isolated view of an elbow connector 700 having a smart elbow configuration. Any of elbow connectors 302, 304, and 306 can have the smart elbow configuration shown in FIG. 7 for elbow connector 700. That is, the elbow connector 700 can be the elbow connector 302 connected to the bottom portion 329 of the riser 320 and to the opposite end 312 of the lower conduit 310, the elbow connector 304 connected to the top portion 328 of the riser 320 and to the end 331 of the upper conduit 330, or the elbow connector 306 connected to the bottom portion 349 of the downcomer 340 and to the end 311 of the lower conduit 310.

In the smart elbow design, the elbow connector 700 can have a first tap 701 on an outside radius 702 of the elbow connector 700 and a second tap 703 on an inside radius 704 of the elbow connector 700. The taps 701 and 702 can generally be holes or openings formed in the wall of the tubular structure than forms the elbow connector 700 in order to fluidly connect the interior space 705 of the elbow connector 700 with the differential pressure meter 708 via sensing legs 706 and 707. The legs 706 and 707 can be constructed of conduit such as pipe or tubes. The sensing leg 706 on the outside radius 702 of the elbow connector 700 can be a high pressure leg, and sensing leg 707 on the inside radius 704 of the elbow connector 700 can be a low pressure leg.

As fluid passes through the elbow connector 700, the pressure at the outside radius 702 increases due to centrifugal force. A first pressure on the high pressure side of the elbow connector 700 is indicated by pressure in the sensing leg 706, and a second pressure on the low pressure side of the elbow connector 700 is indicated by a pressure in the sensing leg 707. The pressure in the sensing leg 706 is sensed by a sensing element on the meter 708, and the pressure in the sensing leg 707 is likewise sensed by a sensing element on the meter 708. The meter 708 can be configured to calculate the flow rate of the reaction mixture flowing through the elbow connector 700 based on the difference in the pressures sensed by the sensing elements of the differential pressure meter 708. In aspects, the differential pressure meter 708 can include a transmitter for transmitting a signal indicative of the pressure sensed by and/or flow rate calculated by the meter 708, for example, to a computer in a process control system and/or process monitoring system.

A flushing system can be included in the sensing legs 706 and 707 that is configured to flush polyolefin particles from the legs 706 and 707, for example, using a component in the reaction mixture, such as the olefin monomer, olefin comonomer, diluent, or an inert gas. In addition to the flushing system, screens can be included in the hole or opening formed by each of the taps 701 and 703. The screen can be a wire mesh metal material (e.g., Johnson® type screens) configured to allow gaseous components of the reaction mixture to pass while holding back solid polyolefin particles from flowing into the legs 706 and 707.

Alternatively, a diaphragm can be placed in each hole or opening formed by the tap 701 and/or tap 703 to mitigate the plugging of the taps 701 and/or 703 or plugging of the sensing legs 706 and/or 707 with polyolefin particles. The diaphragm(s) may be a flexible and relatively thin piece of material, and generally circular in shape, such as a disc. The diaphragm can be constructed of a metal (e.g., stainless steel) or polymer. In embodiments with diaphragms, sensing legs 706 and 707 can be filled with a fluid such as diluent, a hydraulic fluid (oil, mineral oil, etc.), or other fluid suitable for transmitting the pressure force for the length of the sensing legs 706 and 707 to the differential pressure meter 708. The fluid in the legs 706 and 707 may be generally hydraulically full. Therefore, as pressure is exerted on the diaphragm, the fluid inside the legs 706 and 707 then exerts pressure on the sensing elements of the differential pressure meter 708.

While FIG. 7 shows the taps 701 and 703 formed in the elbow connector 700, it is contemplated that the taps 701 and 703, sensing legs 706 and 707, and the differential pressure meter 708 can be located alternatively or additionally at other points in the MZCR reactor 300, such as the lower conduit 310, the riser 320, the upper conduit 330, the downcomer 340, or the tee connector 307 (of FIG. 4).

Figure 8A:
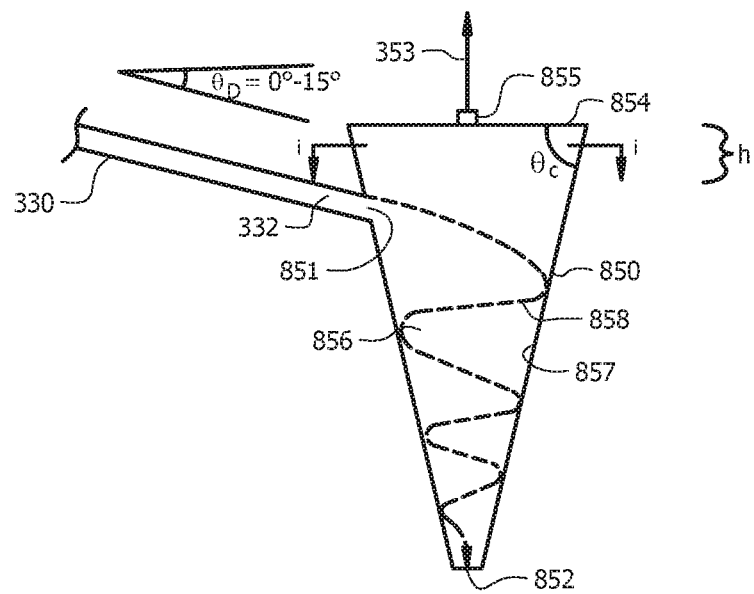
FIG. 8A is a side view of the separator of the multi-zone circulating reactor, embodied as a cyclone separator.
Figure 8B:
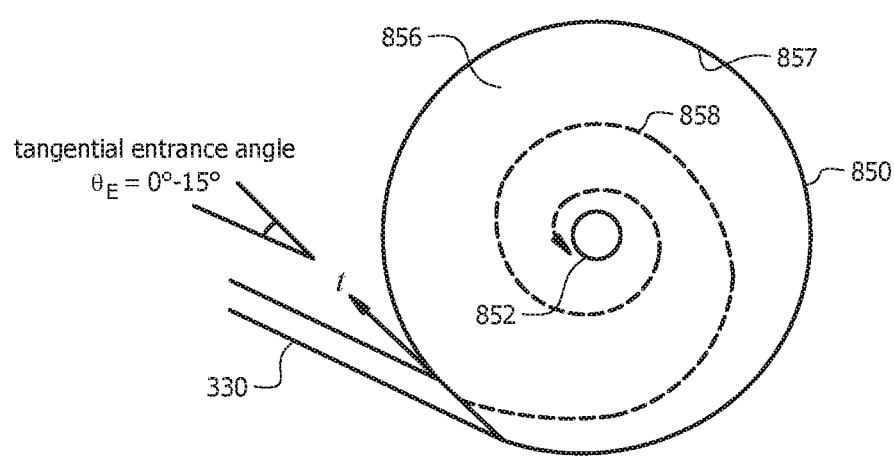
FIG. 8B is a top cross-sectional view of the cyclone separator of FIG. 8A, taken along sight line i-i shown in FIG. 8A.

FIG. 8A illustrates a side view of a cyclone separator 850, which can be a particular embodiment of the separator 350 shown in FIG. 1 and FIG. 2. FIG. 8B illustrates a top cross-sectional view of the cyclone separator 850 of FIG. 8A, taken along sight line i-i. The following discussion about the cyclone separator is with respect to both FIG. 8A and FIG. 8B.

As can be seen in FIGS. 8A and 8B, the cyclone separator 850 can be a hollow vessel having a conical shape. The top 854 of the cyclone separator 850 has a diameter that is greater than a diameter of the bottom 852 of the separator 850. In an aspect, the cone angle θc of the cyclone separator 850 can be about 45° to about 80°; alternatively, about 50° to about 75°; alternatively, about 60° to about 65°; alternatively, about 45° to about 60°; alternatively, about 60° to about 70°; alternatively, about 70° to about 80°.

The riser 320 is configured to produce a riser product mixture that flows from the riser 320, through the upper conduit 330, and into the cyclone separator 850. Thus, cyclone separator 850 can be configured to receive the riser product mixture (e.g., comprising solid particles of polyolefin particles and catalyst particles, and a gas mixture) at the separator inlet 851 via the upper conduit 330 and to separate the riser product mixture such that the gas mixture exits via the outlet 855 at the top 854 of the separator 850 (in line 353) and the solid particles exit the cyclone separator 850 via the bottom 852 of the cyclone separator 850 (e.g., into the liquid barrier).

The riser product mixture can enter the inner chamber 856 of the cyclone separator 850 via the inlet 851 and near the top 854 of the cyclone separator 850. A tangential velocity of the riser product mixture entering the inner chamber 856 forces the solid particles to flow in a downward spiral path 858, due to inward radial acceleration of the solid particles, and concurrently, due to gravitational force imparts downward acceleration on the solid particles in the inner chamber 856 of the cyclone separator 850. The result is a downward movement of separated solid particles along the inner wall 857 in the downward spiral path 858, while the gas mixture of the riser product mixture separates and moves upward in the chamber 856 and exits via the outlet 855. In an aspect, the cyclone separator 850 can particularly be a high efficiency cyclone configured to separate 99 wt. % or more of the solid particles which have a size of from about 2 μm to about 10 μm from the gas mixture.

In another aspect, an angle θc with respect to horizontal of the end 332 of the upper conduit 330 than connects to the cyclone separator 850 can be about 0° to about 15°. In yet another aspect, a vertical distance h between the top 854 of the separator 850 and where the upper conduit 330 connects to the separator 850 can be from about 0 m (0 ft) to about 6.10 m (20 ft); alternatively, from about 0.305 m (1 ft) to about 3.048 m (10 ft); alternatively, from about 0.305 m (1 ft) to about 1.52 m (5 ft).

In an aspect, cyclone separator 850 is a tangential flow cyclone, and inlet 851 is a tangential inlet. The tangential inlet 851 can have an entrance angle $\theta_E$ of about 0° to about 15°; alternatively, about 7° to about 11°, with respect to a tangent of the cyclone separator 850. Configuring the cyclone separator 850 as a tangential flow cyclone separator entails that the inlet 851 is a tangential inlet. The tangential inlet 351 can guide the riser product mixture entering the cyclone separator 850 toward the inner wall 857 to promote separation of the solid particles from the gas mixture in cyclone fashion as described above.

In another aspect, the tangential entrance velocity of the riser product mixture into the cyclone separator 850 can be from about 15.24 m/s (50 ft/sec) to about 30.48 m/s (100 ft/sec); alternatively, about 18.29 m/s (60 ft/sec) to about 27.43 m/s (90 ft/sec); alternatively, about 21.34 m/s (70 ft/sec) to about 24.39 m/s (80 ft/sec).

FIG. 9 illustrates an embodiment of the product separation system 400 depicted in FIG. 1 and FIG. 2. As can be seen, the product separation system 400 can be configured to separate the a product mixture containing the multimodal polyolefin received from the product discharge conduit 370 (if referring to the embodiment in FIG. 1) or product discharge conduit 110 (if referring to the embodiment in FIG. 2) into various streams, including a multimodal polyolefin conduit 401, an olefin monomer conduit 402, an olefin comonomer conduit 403, a diluent conduit 404, a heavies conduit 405, and a waste gas conduit 406. FIG. 9 illustrates additional conduits that are present in the product separation system 400, including side conduit 451 that can contain olefin monomer, gaseous components that are lighter than the olefin monomer, and optionally, diluent.

Equipment in the product separation system 400 can include one or more of a take-off valve 410, a heater 420, a separation vessel 430, a degassing vessel 440, a heavies distillation column 450, a lights distillation column 460, and a polishing apparatus 470.

In FIG. 9, the take-off valve 410 can be configured to receive the product mixture from the product discharge conduit 370 and to control the flow of the product mixture therethrough. The take-off valve 410 can be any type of control valve known in the art to be useful for controlling flow of the product mixture. Such valves include ball valves, v-ball valves, plug valves, globe valves and angle valves. In an aspect, the take-off valve 410 can have a diameter when 100% open in a range of from about 1.27 cm (0.5 inches) to about 7.62 cm (3 inches). In an aspect, the take-off valve 410 can have a flow channel diameter greater than the largest expected polymer particle size even when the valve 410 is required to be only a small amount open (for example, 20-25% open), which gives a wide control range for the range of openness of the take-off valve 410 (e.g., 20-100% open). The take-off valve 410 may be actuated by a signal from a controller configured to operate the take-off valve 410 in a continuous or a discontinuous (e.g., intermittently opened) manner. The controller may be configured to fully close and then fully open the take-off valve 410 at set intervals and for a certain duration, to actuate the take-off valve 410 to a percentage of openness, e.g., 20-100% open.

The product mixture can flow from the take-off valve 410 in conduit 411 to a heater 420. In an optional embodiment, one or more of a catalyst poison (also referred to as a catalyst deactivator) and a cocatalyst poison (also referred to as a cocatalyst deactivator) can be added to the conduit 411 via conduit 412. In such an embodiment, the product mixture with catalyst/cocatalyst poison/deactivator can flow from the take-off valve 410 in conduit 411 to the heater 420. It is contemplated that the poison and/or deactivator added via line 412 can be added anywhere in or upstream of the heater 420. Examples of the catalyst poison and/or cocatalyst poison include water and any alcohol.

The heater 420 can be coupled to the product discharge conduit 370, either directly, or as depicted in FIG. 9, via take-off valve 410 and conduit 411. In FIG. 9, the end 421 of the heater 420 is connected to the conduit 411. The heater 420 can be configured to receive the product mixture and to add heat to the product mixture as the product mixture passes through the heater 420. An objective of the heater 420 is to discharge the multimodal polyolefin in the product mixture at a temperature i) of about 54.4° C. (130° F.) to about 104.4° C. (220° F.), or ii) below a melting point of the multimodal polyolefin.

The heater 420 can have any configuration according to any configuration recognized in the art with the aid of this disclosure. For example, heater 420 can be an electric heater wrapped around portions of the conduit 411, a heat exchanger such as a shell and tube heat exchanger (e.g., where a heating medium is separated by structural elements which transfer heat to the product mixture flowing through the heater 420), a flashline heater (e.g., with heat added by steam into a jacket, by electric heaters, or by both in alternating portions along the heater 420), or combinations thereof. Flashline heater configurations are discussed further in U.S. Pat. Nos. 8,597,582 and 8,883,940, each of which is incorporated by reference in its entirety. In an aspect, the heater 420 can be configured as an open flow channel flashline heater, which is a jacketed pipe of a constant diameter that is heater with steam injected in the jacket at end 421 and condensate collected from the jacket at end 422 of the heater 420. In the open flow channel configuration, the jacket can include a common collection system for the steam that condenses to water in the jacket after transferring heat to the product mixture that moves through the heater 420. The collection system can comprise an open downward angle flow section configured to collect the condensate.

The separation vessel 430 can be coupled to the end 422 of the heater 420 either directly or, as shown in FIG. 9, via conduit 423. The separation vessel 430 is configured to separate the heated product mixture into a plurality of streams (e.g., conduit 431 and conduit 432) comprising vapor, a polymer product, or both vapor and polymer product. The vapor can include the gases separated from the multimodal polyolefin, and the polymer product can include the multimodal polyolefin. The separation vessel 430 can be embodied as a flash tank configured to provide a reduction in pressure of the product mixture such that olefin monomer, any optional olefin comonomer, diluent, and other components (e.g., nitrogen, hydrogen, oxygen, methane, ethane, propane, butane, isobutane, pentane, hexane, heavier hydrocarbons, or combinations thereof) separate from the multimodal polyolefin so as to yield conduit 431 comprising one or more of these gaseous components. To the extent that any liquid is contained in the heated product mixture, the pressure reduction provided in the flash tank can flash the liquid into the gas phase for flow in conduit 431.

The separation vessel 430 can be a hollow vessel having a cone-shaped bottom portion that directs the flow of the multimodal polyolefin to conduit 432. In an aspect, the separation vessel 430 can operate without a pressure reduction, for example, when the product mixture contains gas components and the multimodal polyolefin and no or a minimal amount of liquid, since a reduction in pressure is not needed for flashing a liquid component to a gas phase.

The multimodal polyolefin in conduit 432 can optionally flow to a degassing vessel 440 that can be configured to receive the polymer product (e.g., the multimodal polyolefin) from the separation vessel 430 and to remove at least a portion of a hydrocarbon (e.g., olefin monomer, any optional olefin comonomer, diluent, ethane, or combinations thereof) entrained within the polymer product. Conduit 441 can provide an inert gas (e.g., nitrogen or an inert hydrocarbon such as ethane, propane, n-butane, or isobutane) to the degassing vessel 440. The degassing vessel 440 can be operated at appropriate conditions (e.g., temperature, pressure, inert gas flow rate) such that the inert gas flows through the collection of polyolefin particles present in the degassing vessel 440, removes entrained hydrocarbon from the polyolefin particles, moves upwardly through the degassing vessel 440 with the removed hydrocarbon(s), and exits the degassing vessel 440 along with the previously entrained hydrocarbon in conduit 442. The degassed polymer product (e.g., multimodal polyolefin) can be recovered via conduit 401. The degassing vessel 440 can be configured for plug flow of polymer product from top to bottom. The residence time of polymer product in the degassing vessel 440 can be at least 10 minutes, at least 30 minutes, about 1 hour, or from about 1 hour to about 6 hours. The operating pressure of the degassing vessel 440 can be a vacuum pressure, atmospheric pressure, or greater than atmospheric pressure. In a particular aspect, the pressure of the degassing vessel 400 can be a pressure in the range of from about 0 psia to about 50 psia (about −0.101 MPaa to about 0.345 MPaa).

In an optional aspect, conduit 201 containing gaseous components recovered from the product mixture of the first reactor 100 in FIG. 1 or the product mixture of the MZCR 300 in FIG. 2 can be combined with the gaseous components in conduit 431 such that the vapor that flows in conduit 431 additionally contains said gaseous components from conduit 201.

The gaseous components in the vapor in conduit 431 can flow to a monomer recovery system 480. The monomer recovery system 480 can be configured to recover one or more of the olefin monomer, the olefin comonomer, the diluent, and other gaseous components (e.g., nitrogen, oxygen, hydrogen, or combinations thereof) from the vapor in conduit 431.

The monomer recovery system 480 in FIG. 9 is described in the context of recovery of the olefin monomer, olefin comonomer, diluent, and other gaseous components from conduit 431 by recovering these components in various streams to a desired purity via separation techniques such as distillation, absorption, membrane separation, flash separation, compression, condensation, or combinations thereof. The exact configuration of the monomer recovery system 480 can depend on which olefin monomer, which olefin comonomer, and which diluent are used in the polymerizations in the first reactor 100 and the MZCR 300. For example, for polymerization of ethylene monomer and 1-hexene comonomer with an isobutane diluent, the monomer recovery system 480 as illustrated in FIG. 9 can be utilized (as will be described in more detail below). Alternatively, when the olefin comonomer is closer in molecular weight to the olefin monomer (e.g., 1-butene or propylene is used as the comonomer instead of 1-hexene), a lights distillation column can be utilized where ethylene and lighter gaseous components are recovered from the top of the lights distillation column, isobutane is recovered from the bottom of the distillation column, and 1-butene or propylene can be recovered from the bottom and/or optionally from a side draw of the lights distillation column. In such as aspect, the ethylene and lighter components can be separately recovered in a polishing apparatus (embodiments and aspects are described for polishing apparatus 470 in FIG. 9). Alternatively, it is contemplated that the monomer recovery system 480 can be embodied simply as a compressor or series of compressors that recycle the vapor in conduit 431 to one or both of the first reactor 100 and MZCR 300, such as is described in the monomer recovery process in U.S. Pat. No. 5,376,742.

In the embodiment of the monomer recovery system 480 illustrated in FIG. 9, the monomer recovery system 480 includes a heavies distillation columns 450, a lights distillation column 460, and polishing apparatus 470.

The heavies distillation column 450 can be configured to separate at least one gaseous component from the group of gaseous components received into the column 450 from conduit 431. The components in conduit 431 can be introduced into the heavies distillation column 450 at a pressure in a range of from about 0.101 MPa (14.7 psi) to about 3.64 MPa (527.9 psi), alternatively, from about 0.108 MPa (15.7 psi) to about 2.40 MPa (348 psi), alternatively, from about 0.586 MPa (85 psi) to about 2.00 MPa (290 psi).

The heavies distillation column 450 can be operated at conditions (e.g., temperature, pressure, number of trays, reflux rate, heating rate, and other parameters for controlling the operation of a distillation column) suitable to recover heavy hydrocarbons in conduit 405, the olefin comonomer in conduit 403, and components lighter than the olefin comonomer in conduit 451. For example, the heavies distillation column 450 can be operated at a temperature in a range of from about 15° C. (59° F.) to about 233° C. (451.4° F.), alternatively, from about 20° C. (68° F.) to about 200° C. (392° F.), alternatively, from about 20° C. (68° F.) to about 180° C. (356° F.), and/or a pressure in a range of from about 0.101 MPa (14.7 psi) to about 3.64 MPa (527.9 psi), alternatively, from about 0.108 MPa (15.7 psi) to about 2.40 MPa (348 psi), alternatively, from about 0.586 MPa (85 psi) to about 2.00 MPa (290 psi).

In an aspect, the heavy hydrocarbons in conduit 405 include hydrocarbons heavier than the olefin comonomer (e.g., $C_{6+}$ hydrocarbons), the olefin comonomer in conduit 403 is 1-hexene, and the components lighter than the olefin comonomer in conduit 451 can include nitrogen, hydrogen, oxygen, methane, ethane, ethylene, propane, propylene, butane, 1-butene, isobutane, pentane, pentene or combinations thereof. In an additional aspect, the components in conduit 405 are in the liquid phase, the components in conduit 403 are in the liquid phase, and the components in conduit 451 are in the gas phase.

Components lighter than the olefin monomer may be present in conduit 451 in an amount of from about 80 wt. % to about 100 wt. % based on a total weight of the components in conduit 451; alternatively, from about 90 wt. % to about 99.999999 wt. %; alternatively, from about 99 wt. % to about 99.9999 wt. %. Components including $C_5$ and heavier hydrocarbons may be present in the conduit 451 in an amount from 0 wt. % to about 20 wt. % based on a total weight of the intermediate hydrocarbon stream; alternatively, from about 10 wt. % to about 0.000001 wt. %; alternatively, from about 1.0 wt. % to about 0.0001 wt. %.

Components including hexane and heavier hydrocarbons may be present in conduit 405 in an amount greater than about 85 wt. % based on a total weight of the components in conduit 405; alternatively, greater than about 90 wt. %; alternatively, greater than about 95 wt. %. In an embodiment, the components in conduit 405 can be directed to additional processing steps or processes, or alternatively they may be disposed of, as appropriate.

The components present in conduit 403 can include the olefin comonomer of 1-hexene. 1-hexene can be present in conduit in an amount of from about 20 wt. % to about 98 wt. % based on a total weight of the components in conduit 403; alternatively from about 40 wt. % to about 95 wt. %; alternatively, from about 50 wt. % to about 95 wt. %.

Either of conduits 403 and 405 can be routed so as to recycle the components therein to the first reactor 100 and/or to the MZCR 300.

The lights distillation column 460 can be configured to separate at least one gaseous component from the group of gaseous components received into the column 460 from conduit 451. The lights distillation column 460 can be operated at conditions (e.g., temperature, pressure, number of trays, reflux rate, heating rate, and other parameters for controlling the operation of a distillation column) suitable to recover olefin-free diluent in conduit 404, the diluent in conduit 461, and the olefin monomer combined with components lighter than the olefin comonomer in conduit 462. For example, the lights distillation column 460 can be operated at a temperature in a range of from about 50° C. (122° F.) to about 20° C. (68° F.); alternatively, from about 40° C. (104° F.) to about 10° C. (50° F.); alternatively, from about 30° C. (86° F.) to about 5° C. (41° F.), and a pressure in a range of from 0.101 MPa (14.7 psi) to about 3.64 MPa (527.9 psi), alternatively, from about 0.108 MPa (15.7 psi) to about 2.40 MPa (348 psi), alternatively, from about 0.586 MPa (85 psi) to about 2.00 MPa (290 psi).

In an aspect, the light components in conduit 462 include hydrocarbons lighter than the diluent, the components in conduit 461 can include the diluent and olefin monomer, and the components in conduit 404 can include the diluent. In an additional aspect, the components in conduit 404 are in the liquid phase, the components in conduit 461 are in the liquid phase, and the components in conduit 462 are in the gas phase.

The components emitted from the lights distillation column 460 in light hydrocarbon conduit 462 may comprise the olefin monomer (e.g., ethylene) and other light gases (e.g., ethane, methane, carbon dioxide, nitrogen, hydrogen, or combinations thereof). In an aspect, ethylene may be present in light hydrocarbon conduit 462 in an amount from about 50 wt. % to about 99 wt. % based on a total weight of components in the light hydrocarbon conduit 462; alternatively, from about 60 wt. % to about 98 wt. %; alternatively, from about 70 wt. % to about 95 wt. %.

The components emitted from the lights distillation column 460 in bottoms conduit 404 may comprise propylene, propane, butane, isobutane, pentane, or combinations thereof. In an aspect, the bottoms conduit may be free of olefins (i.e., "olefin-free"), alternatively, substantially free of olefins, alternatively, essentially free of olefins. For example, olefin(s) may be present in bottoms conduit 404 in an amount less than about 1.0 wt. % based on a total weight of the components in the bottoms conduit 404; alternatively, less than about 0.5 wt. %; alternatively, less than about 0.1 wt. %. The diluent may be present in the bottom conduit in an amount greater than about 99.0 wt. % based on a total weight of the components in the bottoms conduit 404; alternatively, greater than about 99.5 wt. %; alternatively, greater than about 99.9 wt. %.

The components emitted from the lights distillation column 460 in side draw conduit 461 can include isobutane and ethylene. For example, isobutane can be present in the side conduit 461 in an amount of greater than about 85 wt. % based on a total weight of components in the conduit 461; alternatively, greater than about 90 wt. %; alternatively, greater than about 95 wt. %. Ethylene can be present in the side conduit 461 in an amount of less than about 15 wt. % based on a total weight of components in the conduit 461; alternatively, less than about 10 wt. %; alternatively, less than about 5 wt. %.

Either of conduits 404 and 461 can be routed so as to recycle the components therein to the first reactor 100 and/or to the MZCR 300.

The polishing apparatus 470 can be configured to receive the conduit 462 and to separate the received gaseous components into olefin monomer in conduit 402 and waste gases in conduit 406. The polishing apparatus 470 can utilize any technique for separating the olefin monomer from the waste gases, for example, compression, distillation (e.g., utilizing cryogenic and/or vacuum conditions), absorption, membrane separation, condensation, or combinations thereof.

An example of the polishing apparatus 470 is found in U.S. Pat. No. 9,598,514, which is incorporated by reference in its entirety. In aspects, the polishing apparatus 470 can include an absorption reactor configured to selectively absorb the olefin monomer from among the components in conduit 462. Non-limiting examples of suitable absorption reactors and/or absorption reactor configurations include an absorption (distillation) tower, a pressure-swing absorption (PSA) configuration, a sparger tank, an agitation reactor, one or more compressors, one or more recycle pumps, or combinations thereof. The absorption reactor can contain a liquid absorption solvent system configured to selectively absorb the olefin monomer, and the components in conduit 462 can enter the absorption reactor so that the components (in the gas phase) bubble upwardly through the liquid absorption solvent system. The olefin monomer can be absorbed in the liquid absorption solvent system until saturation with the olefin monomer is reached. In an aspect, the olefin monomer can be liberated from the solvent by a reduction in pressure (e.g., pressure swing absorption) and/or by elevating the solvent temperature (e.g., the olefin monomer liberates as a gas from the solvent at elevated temperature). In an alternative aspect, a solvent circulation system can be utilized in the polishing apparatus 470 to circulate saturated liquid absorption solvent system to a regenerator of the polishing apparatus 470. The olefin monomer can be liberated from the solvent in the regenerator, and in such as aspect, the olefin monomer can flow in conduit 402 from the regenerator of the polishing apparatus 470.

In further aspects, the absorption reactor of the polishing apparatus 470 can include a packed bed or column configured to maintain smaller bubble sizes (e.g., of the gas components received from conduit 462), for example, so as to maintain a relatively large surface area of contact between the gas and the liquid solvent and to maintain an efficiency of mass transfer and/or absorption of the gas into the liquid. In aspects, the packing material of the packed bed or column can include a polymeric material, a metallic material, or combinations thereof. It is contemplated that in the pressure swing absorption configuration, the polishing apparatus 470 can include multiple absorption reactors operating in parallel such that at least one reactor can be taken off-line to liberate the olefin monomer from the liquid absorption solvent system while at least another reactor in parallel can be on-line to capture the olefin monomer received from conduit 462. An example of a suitable absorption reactor is illustrated in the Gas Processors Association, "Engineering Data Book" 10$^{th}$ ed. at FIG. 19-16, which is incorporated by reference in its entirety.

In aspects where the components in conduit 462 include ethylene as the olefin monomer and ethane is among the other gases, the absorption solvent system may be characterized as having a selectivity of ethylene to ethane where ethylene and ethane are present at the same partial pressure of about 40:1 at about 96.5 kPa (14 psi); alternatively, about 12:1 at about 138 kPa (20 psi); alternatively, about 6:1 at about 276 kPa (40 psi); alternatively, about 3:1 at about 1.24 MPa (180 psi) partial pressure.

In aspects, the absorption reactor of the polishing apparatus 470 can be configured to operate in a temperature range of from about 4.4° C. (40° F.) to about 43.3° C. (110° F.); alternatively, from about 4.4° C. (40° F.) to about 15.6° C. (60° F.); alternatively, from about 7.2° C. (45° F.) to about 12.8° C. (55° F.); alternatively, from about 10° C. (50° F.) to about 12.8° C. (55° F.); alternatively about 10° C. (50° F.).

In aspects, the absorption reactor of the polishing apparatus 470 can be configured to operate in a pressure range of from about 34.5 kPag (5 psig) to about 3.45 MPag (500 psig); alternatively, from about 0.345 MPag (50 psig) to about 3.10 MPag (450 psig); alternatively, from about 0.517 MPag (75 psig) to about 2.76 MPag (400 psig). In aspects that involve ethylene as the olefin monomer recovered in conduit 402 of the polishing apparatus 470, the absorption reactor can be configured to provide or maintain a suitable partial pressure of ethylene in a range of from about 6.89 kPaa (1 psia) to about 2.76 MPaa (400 psia); alternatively, from about 0.207 MPaa (30 psia) to about 1.38 MPaa (200 psia); alternatively, from about 0.276 MPaa (40 psia) to about 1.72 MPaa (250 psia); alternatively, from about 0.276 MPaa (40 psia) to about 0.517 MPaa (75 psia); alternatively, from about 0.276 MPag (40 psig) to about 0.414 MPag (60 psig); alternatively about 0.276 MPag (40 psig); alternatively, about 0.414 MPag (60 psig).

In aspects, the liquid absorption solvent system contains a solvent. The solvent can be an amine or an amine complex, an aromatic hydrocarbon, an olefin, or combinations thereof. Non-limiting examples of solvent amines include pyridine, benzylamine, and aniline. For example, the amine may comprise an aniline (phenylamine, aminobenzene); alternatively, aniline combined with dimethylformamide (DMF), and in embodiments, aniline and N-methylpyrrolidone (NMP). In aspects where the solvent comprises an aromatic hydrocarbon, the aromatic hydrocarbon may comprise an unsubstituted or alkyl substituted aryl groups. The aromatic hydrocarbon may be in the liquid phase under normal, ambient conditions. Suitable non-limiting examples include toluene, xylene, and the like. In aspects where the solvent comprises an olefin, non-limiting examples include olefins having 10 to 16 carbon atoms. For example, the olefin functioning as a solvent (which is not the olefin monomer from conduit 462 being absorbed) can comprise propylene tetramer, dodecene, tetradecene, hexadecene, or combinations thereof. In aspects, the solvent may be characterized as aprotic, that is, as not including a dissociable hydrogen atom. Not intending to be bound by theory, a dissociable hydrogen solvent may result in the hydrogenation of the double bond between carbons in an olefin such as ethylene. Further, the solvent may be characterized as polar, as having a slight polarity, or as having unidirectional, electric charge. Not intending to be bound by theory, a polar solvent may interact with and at least partially solubilize the salt.

In additional aspects, the liquid absorption solvent system can additionally include a complexing agent in addition to the solvent. In this configuration, the liquid absorption solvent can be capable of reversibly complexing with the olefin monomer. The complexing agent may include a metallic salt. The metallic salt can include a salt of one or more transition metals and a weakly-ionic halogen. Non-limiting examples of suitable transition metals include silver, gold, copper, platinum, palladium, and nickel. Non-limiting examples of suitable weakly-ionic halogens include chlorine and bromine. In aspects, a suitable transition metal salt may be characterized as having a high specificity for olefins. Non-limiting examples of suitable transition metal-halogen salts include silver chloride (AgCl) and copper chloride (CuCl). In a particular aspect, the salt employed in the liquid absorption solvent system comprises CuCl. Not seeking to be bound by theory, such a metallic salt may interact with the double carbon bonds of olefin monomers (e.g., ethylene).

In an aspect, the complexing agent may comprise a copper (I) carboxylate. Suitable copper (I) carboxylates include salts of copper (I) and mono-, di-, and/or tri-carboxylic acids containing 1-20 carbon atoms. The carboxylic acid component of the salt may comprise an aliphatic constituent, a cyclic constituent, an aryl constituent, or combinations thereof. Other suitable examples of copper (I) carboxylates include Cu(I) formate, Cu(I) acetate, Cu(I) propionate, Cu(I) butyrate, Cu(I) pentanoate, Cu(I) hexanoate, Cu(I) octanoate, Cu(I) decanoate, Cu(I) 2-ethyl-hexoate, Cu(I) hexadecanoate, Cu(I) tetradecanoate, Cu(I) methyl formate, Cu(I) ethyl acetate, Cu(I) n-propyl acetate, Cu(I) n-butyl acetate, Cu(I) ethyl propanoate, Cu(I) octoate, Cu(I) benzoate, Cu(I) p-t-butyl benzoate, and the like. Additionally, the complexing agent can include an adduct of a copper (I) carboxylate, for example, as disclosed herein, and boron trifluoride ($BF_3$).

In an additional and/or alternative aspect, the complexing agent may comprise a copper (I) sulfonate. Non-limiting examples of suitable copper (I) sulfonates include the copper (I) salts of sulfonic acids having 4 to 22 carbon atoms. The sulfonic acid component of the salt can include an aliphatic constituent, a cyclic constituent, an aryl constituent, or combinations thereof. The aliphatic sulfonic acids can be straight chain or branched. Examples of suitable aliphatic sulfonic acids include, but are not limited to, n-butanesulfonic acid, 2-ethyl-1-hexanesulfonic acid, 2-methylnonanesulfonic acid, dodecanesulfonic acid, 2-ethyl-5-n-pentyltridecanesulfonic acid, n-eicosanesulfonic acid, and the like. Examples of suitable aromatic sulfonic acids include benzenesulfonic acid, alkylbenzenesulfonic acids wherein the alkyl member contains from 1 to 16 carbon atoms, such as p-toluenesulfonic acid, dodecylbenzenesulfonic acid (o-, m-, and p-), p-hexadecylbenzenesulfonic acid, and the like, naphthalenesulfonic acid, phenolsulfonic acid, naphtholsulfonic acids, and halobenzenesulfonic acids, such as p-chlorobenzenesulfonic acid, p-bromobenzenesulfonic acid, and the like.

In an aspect, the complexing agent can also include a hindered olefin. For example, the complexing agent may additionally include a hindered olefin when the complexing agent without the hindered olefin forms a copper complex with insufficient solubility in the solvent. An example of such a hindered olefin is a propylene tetramer (i.e. dodecene). Not intending to be bound by theory, the hindered olefin may increase the solubility of the copper complex while being easily displaced by ethylene.

In various embodiments, the absorption solvent system can utilize one or more of the complexing agents disclosed in U.S. Pat. Nos. 5,104,570; 5,191,153; 5,259,986; and 5,523,512, each of which is incorporated by reference in its entirety.

Particular embodiments of the liquid absorption solvent system include copper chloride, aniline, and dimethylformamide (CuCl/aniline/DMF); alternatively, copper chloride, aniline, and N-methylpyrrolidone (CuCl/aniline/NMP); alternatively, copper (I) carboxylate and an aromatic solvent such as toluene or xylene; alternatively, copper (I) sulfonate and an aromatic solvent such as toluene or xylene; alternatively, an adduct of copper (I) carboxylate and $BF_3$ in an aromatic solvent such as toluene or xylene; alternatively, copper (I) 2-ethyl-hexanoate and propylene tetramer; alternatively, copper (I) 2-ethyl-hexanoate and dodecene; alternatively, copper (I) hexadecanoate and hexadecene; alternatively, copper (I) tetradecanoate and tetradecene.

Another example of the polishing apparatus 470 is found in U.S. Pat. No. 5,769,927. In aspects, the polishing apparatus 470 can include a condenser, a flash tank, and a membrane filtration unit. The components of conduit 462 can be subject to condensation in the condenser so that a portion of the components condenses to a liquid phase while another portion of the components remains in the gas phase. The resulting liquid from condensation can then be subjected to flash separation in the flash tank to form a vapor from the condensed liquid and residual liquid portion. The resulting gas from condensation can be subjected to membrane separation to recover the waste gases from the resulting gases. The residual liquid portion recovered from the flash step can include the olefin monomer in conduit 402, which can be recycled to the first reactor 100 and/or the MZCR 300, or otherwise consumed, treated, processed, and/or stored. The waste gases recovered from the membrane separation step can include hydrogen, oxygen, nitrogen, carbon dioxide, or combinations thereof in conduit 406. These waste gases can be flared.

When utilizing a polishing apparatus 470 that has a condenser, flash tank, and membrane filtration unit, the components in conduit 462 can be compressed prior to feeding to the condenser. The temperature and pressure of the components in conduit 462 exiting the lights distillation column 460 can be a temperature which can range from about 5° C. (41° F.) to about 20° C. (68° F.) and a pressure which can range of from about 0.101 MPa (14.7 psi) to about 0.586 MPa (85 psi). The pressure after compression can be in a range of from about 0.689 MPag (100 psig) to about 6.89 MPag (1,000 psig); alternatively, from about 0.689 MPag (100 psig) to about 3.45 MPag (500 psig); alternatively, from about 0.689 MPag (100 psig) to about 1.72 MPag (250 psig); alternatively, from about 1.38 MPag (200 psig) to about 6.89 MPag (1,000 psig); alternatively, from about 1.38 MPag (200 psig) to about 3.45 MPag (500 psig); alternatively, from about 1.38 MPag (200 psig) to about 1.72 MPag (250 psig). The temperature of the components in conduit 462 after compression may be slightly higher due to heat of compression.

In aspects, the condenser of the polishing apparatus 470 can be operated at a temperature in a range of from about −100° C. (−148° F.) to about 20° C. (68° F.); alternatively, from about −60° C. (−76° F.) to about 20° C. (68° F.); alternatively, from about −40° C. (−40° F.) to about 20° C. (68° F.). In additional aspects, the condenser of the polishing apparatus 470 can be operated at a pressure in a range of from about 0.689 MPag (100 psig) to about 6.89 MPag (1,000 psig); alternatively, from about 0.689 MPag (100 psig) to about 3.45 MPag (500 psig); alternatively, from about 0.689 MPag (100 psig) to about 1.72 MPag (250 psig); alternatively, from about 1.38 MPag (200 psig) to about 6.89 MPag (1,000 psig); alternatively, from about 1.38 MPag (200 psig) to about 3.45 MPag (500 psig); alternatively, from about 1.38 MPag (200 psig) to about 1.72 MPag (250 psig).

The temperature and pressure for operation of the flash tank of the polishing apparatus 470 can be that which is suitable to bring the olefin monomer in the residual condensed liquid in a range of about 0 MPa (0 psig) to about 0.345 MPag (50 psig) above the saturation vapor pressure of the olefin monomer at the temperature at which the flash tank is operated.

In aspects, the membrane filtration unit of the polishing apparatus 470 can contain a membrane that exhibits a substantially different permeability for the olefin monomer gas than for the other gases (e.g., nitrogen, hydrogen, carbon dioxide, oxygen, or combinations thereof) that are in the residual gas phase. The pressure of the residual gas components exiting the condenser can be sufficient to drive the pressure drop across the membrane of the membrane filtration unit. The waste gas stream 406 exiting the membrane filtration unit can be greater than 5° C. (41° F.), alternatively, greater than 10° C. (50° F.) colder than the temperature of the residual gas components that feed from the condenser to the membrane filtration unit.

The membrane can be relatively permeable to the olefin monomer and relatively impermeable to the other gases, or relatively permeable to the other gases and relatively impermeable to the monomer. When relatively permeable to the olefin monomer, the conduit 406 used to recover the waste gases is connected to the retentate side of the membrane filtration unit; whereas, when relatively permeable to the other gases, the conduit 406 used to recover the waste gases is connected to the permeate side of the membrane filtration unit.

Examples of membranes that are relatively permeable to the olefin monomer include polymers that can be used to make elastomeric membranes, for example, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, block copolymers of polyethers, polyamides, polyesters, or combinations thereof. Examples of membranes that are relatively permeable to the other gases include polymers that can be used to make glassy membranes, for example, polysulfones, polyimides, polyamides, polyaramides, polyphenylene oxide, polycarbonates, ethylcellulose, cellulose acetate, or combinations thereof.

FIGS. 10A to 10F illustrate the first reactor 100 having various additional aspects not shown in FIG. 1 and FIG. 2.

FIGS. 10A to 10F show the first reactor 100 is in a fluidized bed reactor configuration (also referred to as a gas phase reactor configuration). In such a configuration, and as described for the first reactor 100 in the description for FIGS. 1-2, the fluidized bed reactor can include a gas recycle system, which in FIGS. 10A to 10F is formed by equipment 120, 130, 122, 140, 124, 150, and 126. Equipment 120, 122, 124, and 126 are conduits; equipment 130 is a separator; equipment 140 is a condenser; and equipment 150 is a compressor. Feed components feed into the gas recycle system at conduit 124 via a combined feed conduit 107. The combined feed conduit 107 contains a mixture of the olefin monomer from conduit 102, the optional olefin comonomer from conduit 104, the diluent from conduit 106. The catalyst (optionally as art of a catalyst system) can be fed directly to the reaction vessel of the fluidized bed reactor 100 via conduit 108. While FIGS. 10A to 10F show conduits 102, 104, and 106 feeding to the gas recycle system via conduits 107 and 124, it is contemplated that the components in conduits 102, 104, 106 can be fed to the first reactor 100 at any suitable location, including i) directly to the reaction vessel of the first reactor 100, or ii) any of conduits 120, 122, 124, 126, and 133. Similarly, while FIGS. 10A to 10F show conduit 108 feeding to directly to the reaction vessel, it is contemplated that the catalyst can be fed in conduit 108 to the first reactor 100 at any suitable location, such as via any of conduits 107, 120, 122, 124, 126, and 133.

In operation, gaseous components flow from the top 101 of the first reactor 100 into conduit 120 of the gas recycle system. While the first reactor 100 can include a disengagement zone 114 configured to disengage the gaseous components in the fluidized bed from the solid polyolefin particles for flow in conduit 120, it is possible that some polyolefin particles can flow along with the gaseous components out of the top 101 of the first reactor 100 and into conduit 120.

In the gas recycle system of FIGS. 10A to 10F, an optional separator 130 can be included to separate the polyolefin particles from the gaseous components before the gaseous components enter downstream equipment such as the condenser 140 and compressor 150 (e.g., to avoid fouling of this equipment). The separator 130 can be configured as a settling tank or a cyclone separator as described herein. The solid polyolefin particles fall with the aid of gravity in the separator 130 and can separate from the gaseous components such that the solid olefin particles flow from the separator 130 in conduit 131, while the gaseous components continue along the gas recycle system in conduit 122. The gaseous components in conduit 122 can then flow into a condenser 140 in the gas recycle system that is configured to condense at least one of the gaseous components, for example, the diluent or condensing agent, used in the gas phase polymerization reactor. Condensation of the gaseous components forms a gas/liquid mixture that flows from the condenser 140 via conduit 124. The gas/liquid mixture can be combined with any components fed to the first reactor 100 via conduit 107. The conditions of conduit 124 can be such that diluent added via conduit 106 is in the liquid phase, while the olefin monomer added via conduit 102 is in the gas phase. It is contemplated that the optional olefin comonomer, if present, can be in the liquid phase or gas phase in conduit 124, depending on the boiling point of the olefin comonomer relative to the diluent/condensing agent. The gas/liquid mixture can then flow to in conduit 124 to compressor 150. The compressor 150 is configured to increase the pressure of the gas/liquid mixture so as to provide additional conditions under which the diluent/condensing agent condenses in the gas recycle system. The compressed gas/liquid mixture flows from the compressor 150 via conduit 126, back into the first reactor 100.

The solid polyolefin particles in conduit 131 can flow to a motive device 132. In an embodiment, the motive device 132 can be an eductor of a configuration as described in FIG. 5A or FIG. 5B. A motive device 132 embodied as an eductor can be appropriately sized for the smaller solids flow rate than the comparative solids flow of eductor 375 described in FIGS. 5D to 5H. In an eductor embodiment, the motive device 132 can receive the solid polyolefin particles in end 132a, a carrier gas in end 132b. The solid/gas mixture can exit end 132c and can flow back into the first reactor 100 via conduit 133. In an aspect, the carrier gas can be sourced from the gaseous components in conduit 122, conduit 201 (see FIGS. 1 and 2), conduit 501 (see FIGS. 1 and 2), conduit 502 (see FIGS. 1 and 2), or combinations thereof. In another embodiment, the motive device 132 can be a solids pump configured to receive the solid polyolefin particles from conduit 131 and to pump the solid polyolefin particles to the first reactor 100 via conduit 133.

The first reactor 100 in FIGS. 10A, 10B, and 10C can be used in FIG. 1, where the first reactor product mixture exits the reactor 100 in product discharge conduit 110. In each of FIGS. 10A, 10B, and 10C, a portion of the first reactor product mixture can flow from the product discharge conduit 110 into a sampling system 1000 while the remaining portion of the first reactor product mixture can flow from the product discharge conduit 110 into the product separation system 200.

Figure 10D:
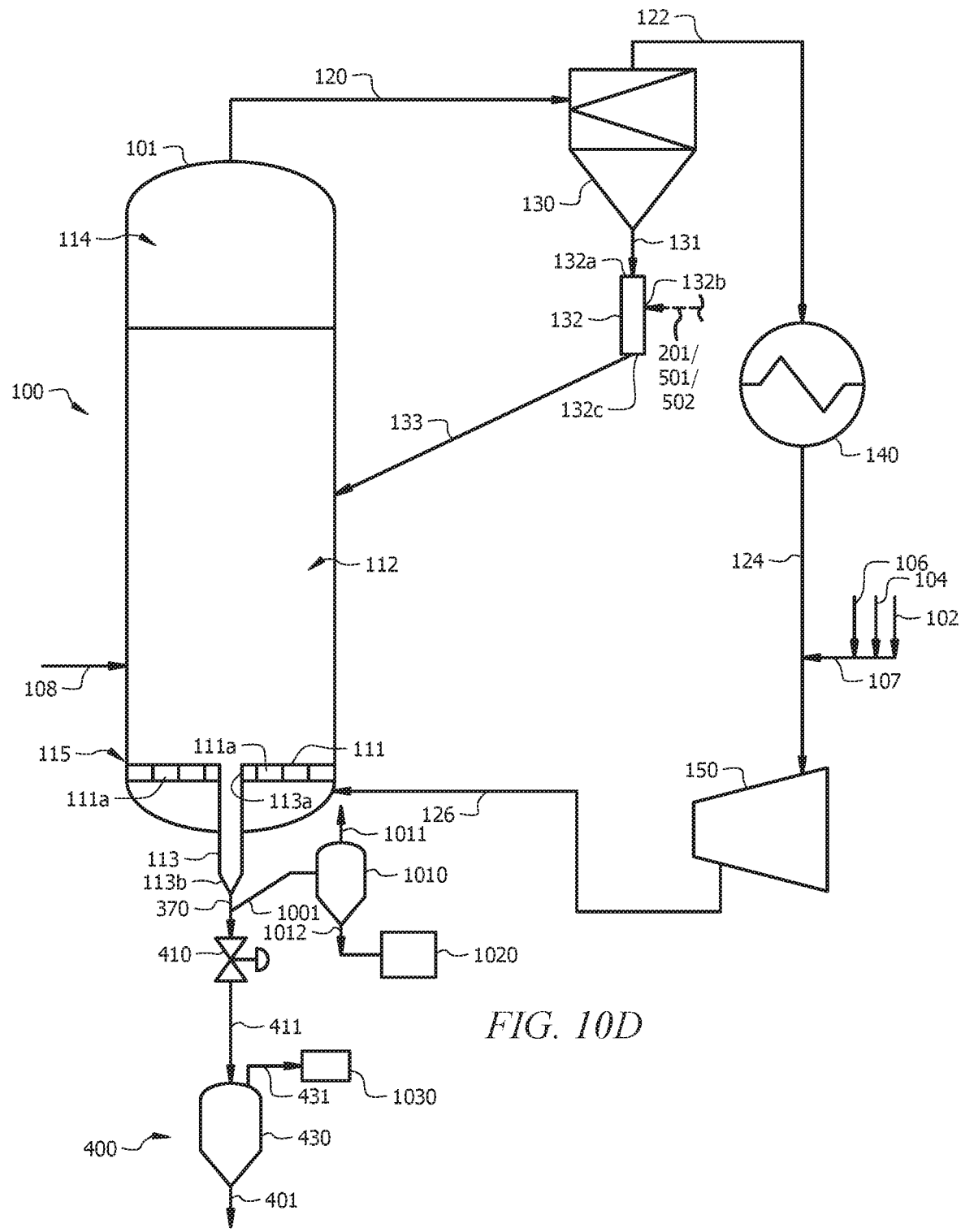
FIG. 10D illustrates the first reactor in a gas phase configuration for use in FIG. 2, utilizing a settling leg to move the reactor effluent to a separator for polyolefin recovery.
Figure 10E:
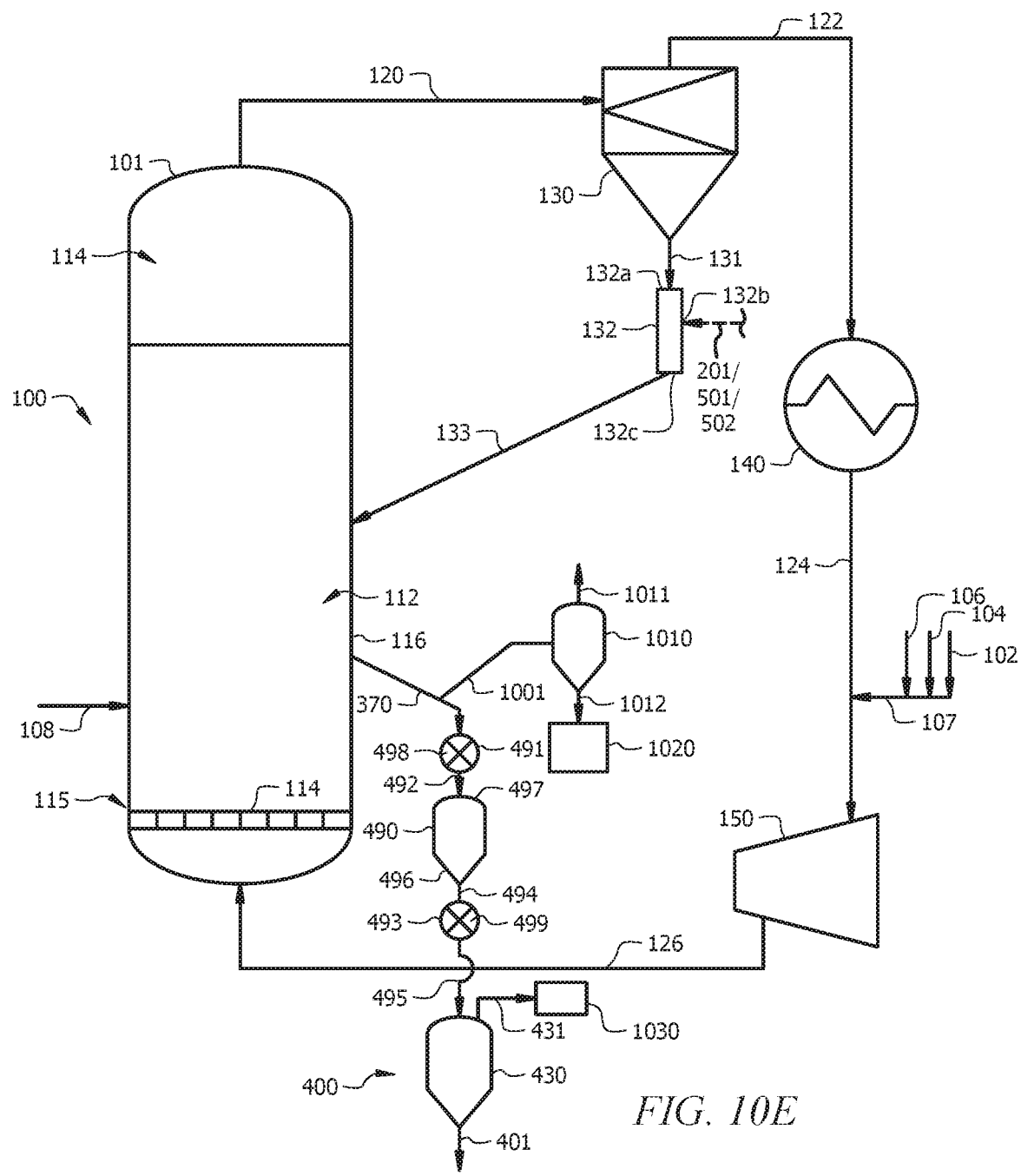
FIG. 10E illustrates the first reactor in a gas phase configuration for use in FIG. 2, utilizing a lock hopper to move the reactor effluent to a separator for polyolefin recovery.
Figure 10F:
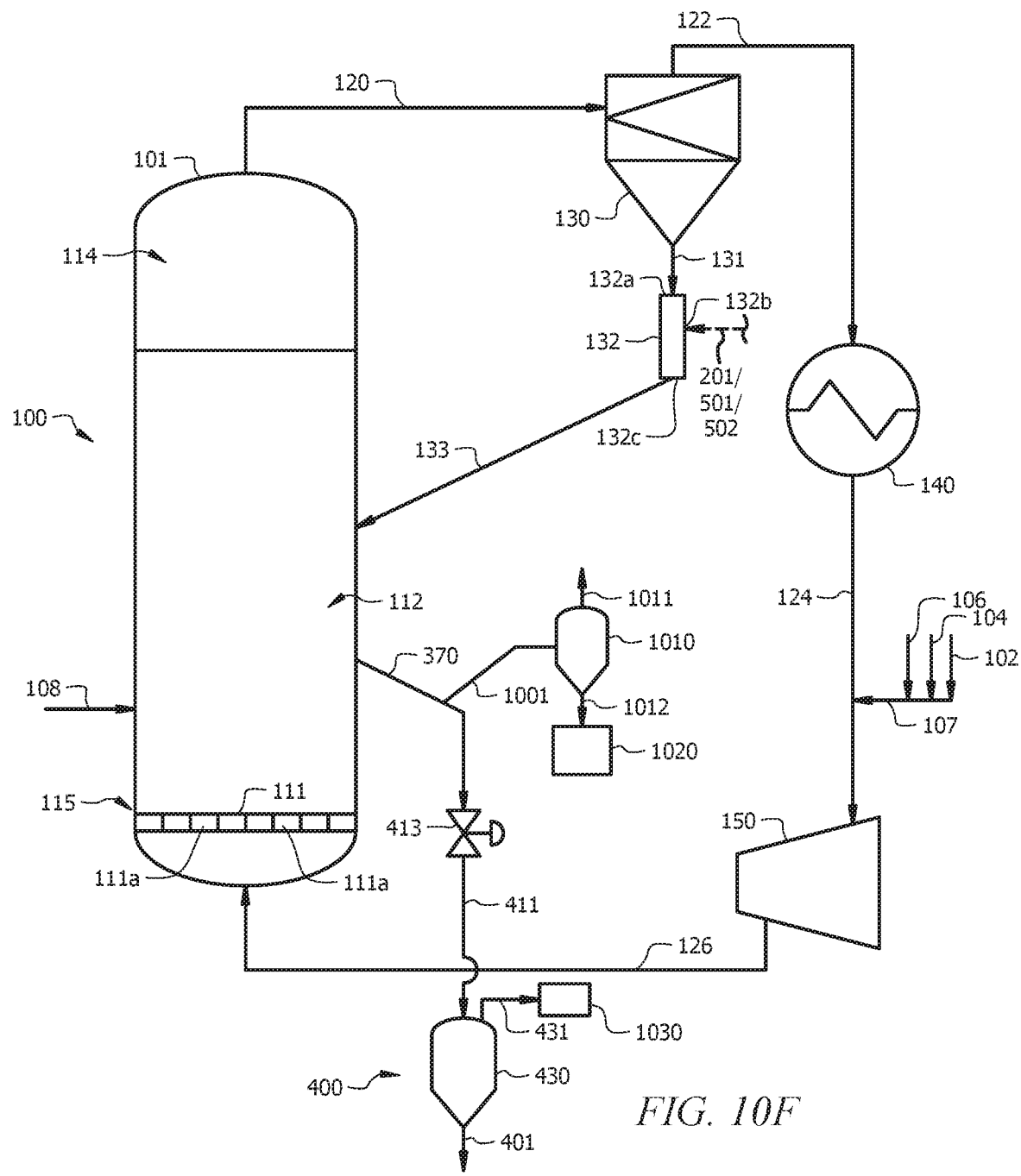
FIG. 10F illustrates the first reactor in a gas phase configuration for use in FIG. 2, utilizing a take-off valve to move the reactor effluent to a separator for polyolefin recovery.

The first reactor 100 as shown in FIGS. 10D, 10E, and 10F can be used in FIG. 2, where the first reactor product mixture containing the multimodal polyolefin exits the reactor 100 in product discharge conduit 370. In each of FIGS. 10D, 10E, and 10F, a portion of the first reactor product mixture can flow from the product discharge conduit 370 into a sampling system 1000 while the remaining portion of the first reactor product mixture can flow from the product discharge conduit 370 into the product separation system 400.

The sampling system 1000 in each of FIGS. 10A to 10F can be fluidly connected to the product discharge conduit 110 and configured to analyze a sample of the first polyolefin (for FIGS. 10A to 10C) or a sample of the multimodal polyolefin (for FIGS. 10D to 10F). The sampling system 1000 can include a sample conduit 110 through which a portion of the first reactor product mixture flows to a sample flash tank 1010. The sample flash tank 1010 can be configured to separate the solid polyolefin (e.g., the first polyolefin for FIGS. 10A to 10C or the multimodal polyolefin for FIGS. 10D to 10E) from the gaseous components such that the gaseous components can flow from the flash tank 1010 via conduit 1011 and such that the solid polyolefin can flow from the flash tank 101 via conduit 1012. The solid polyolefin in conduit 1012 can flow to a sample analyzer 1020 that can be configured to analyze a sample of the first polyolefin to determine the one or more properties of the solid polyolefin received via conduit 1012. The sample analyzer 1020 can be configured to perform a Raman analysis, configured as a gas chromatograph, or configured as a spectroscopy device. Commercially available examples of the sample analyzer 1020 include the RAMANRXN3™ Analyzer and the RAMANRXN4™ Analyzer.

FIGS. 10A to 10F also show a gas distributor 111 can be located inside a bottom portion 115 of the fluidized bed reactor (i.e., the first reactor 100). The gas distributor 111 can be configured with channels 111a through which the recycled gaseous components received from conduit 126 can be distributed inside the reactor 100 as the gaseous components pass through the gas distributor 111 into the polymerization zone 112 of the first reactor 100.

The unique aspects and product separation system 200 in each of FIGS. 10A, 10B, and 10C will now be described.

FIG. 10A shows a settling leg 113 placed partially within the bottom portion 115 of the fluidized bed reactor. At least a portion of the settling leg 113 can be placed inside the first reactor 100 such that an end 113a of the settling leg 113 opens to the gas distributor 111 and/or to the polymerization zone 112 and an opposite end 113b extends outside the first reactor 100. While the settling leg 113 is shown in FIG. 10A as being positioned in a center of the gas distributor 111, it is contemplated that the settling leg 113 can be placed off-center with respect to the gas distributor 111 and/or the reaction vessel of the first reactor 100.

The settling leg 113 can be in the form of a pipe. In an aspect, a diameter of the settling leg 113 is the same along the length of the settling leg 113; while in another aspect, the end 113b of the settling leg 113 can be conically tapered such that the diameter of the end 113b decreases in the downward direction. In an aspect, the settling leg 113 can have an inner diameter along the length of the settling leg in the range of from about 10.16 cm (4 inches) to about 30.48 cm (12 inches); alternatively, from about 15.24 cm (6 inches) to about 20.32 cm (8 inches); alternatively, from about 23.32 cm (8 inches) to about 30.48 cm (12 inches), including any portion (e.g., end 113b) that has an inner diameter than changes along the length of said portion.

Solid polyolefin particles of the first polyolefin can fall by force of gravity into the settling leg as the particles become too large for the fluidization forces to keep them fluidized in the polymerization zone 112. The particles that settle out of the fluidized bed in the first reactor 100 can flow into the end 113a of the settling leg 113 to the opposite end 113b of the settling leg 113b. The particles can move downward in the settling leg 113 from end 113a to end 113b as a moving bed in a plug-flow manner. The particles then can flow from the first reactor 100 via product discharge conduit 110 to the product separation system 200.

The product separation system 200 in FIG. 10A can include a take-off valve 210, a conduit 211, a separation vessel 230, conduit 201, and conduit 202. The product separation system 200 in FIG. 10B can optionally further include the treater 1030.

The take-off valve 210 can be configured to receive the first reactor product mixture from the product discharge conduit 110 and to control the flow of the first reactor product mixture therethrough. The take-off valve 210 can be any type of control valve known in the art to be useful for controlling flow of the product mixture. Such valves include ball valves, v-ball valves, plug valves, globe valves and angle valves. In an aspect, the take-off valve 210 can have a diameter when 100% open in a range of from about 1.27 cm (0.5 inches) to about 7.62 cm (3 inches). In an aspect, the take-off valve 210 can have a flow channel diameter greater than the largest expected polymer particle size even when the valve 210 is required to be only a small amount open (for example, 20-25% open), which gives a wide control range for the range of openness of the take-off valve 210 (e.g., 20-100% open). The take-off valve 210 may be actuated by a signal from a controller configured to operate the take-off valve 210 in a continuous or a discontinuous manner. The controller may be configured to fully close and then fully open the take-off valve 210 at set intervals and for a certain duration, to actuate the take-off valve 210 to a percentage of openness, e.g., 20-100% open.

The separation vessel 230 can be coupled to the end 113b of the settling leg 113 via conduits 110 and 211 as well as via the take-off valve 210. The separation vessel 230 can be configured to separate the first reactor product mixture into the first polyolefin in conduit 202 and into a gas mixture in conduit 201. The gas mixture in conduit 201 can include the gases separated from the first polyolefin. The separation vessel 230 can be embodied as a flash tank configured to provide a reduction in pressure of the product mixture such that olefin monomer, any optional olefin comonomer, diluent, and other components (e.g., nitrogen, hydrogen, oxygen, methane, ethane, propane, butane, isobutane, pentane, hexane, heavier hydrocarbons, or combinations thereof) separate from the first polyolefin so as to yield one or more of these gaseous components in conduit 201. To the extent that any liquid is contained in the first reactor product mixture, the pressure reduction provided in the flash tank can flash the liquid into the gas phase for flow in conduit 201. In an aspect, the separation vessel 230 can be a hollow vessel having a cone-shaped bottom portion that directs the flow of the first polyolefin to conduit 202. In an aspect, the separation vessel 230 can operate without a pressure reduction, for example, when the first reactor product mixture contains gas components and the first polyolefin and no or a minimal amount of liquid, since a reduction in pressure is not needed for flashing a liquid component to a gas phase.

In an optional aspect, FIG. 10A illustrates a treater 1030 that can be configured to treat the gas mixture in conduit 201. That is, the treater 1030 can be fluidly connected to the conduit 201. In aspects, the treater 1030 can be a flare stack, a ground flare, a pressure swing absorber, a membrane, or a combination thereof. In another optional aspect, it is contemplated that the conduit 201 can flow to the product separation system 400 for treatment of the gas mixture, as is described for FIG. 9.

FIG. 10B shows the product discharge conduit 110 placed on the side 116 of the fluidized bed reactor. While placed on the side 116 of the vessel of the fluidized bed reactor, it is contemplated that the product discharge conduit 110 can be placed on the bottom of the reactor vessel. The product discharge conduit 110 can be connected to the fluidized bed reactor such that an angle of the product discharge conduit 110 with respect to horizontal is in a range of −60° to 60°; alternatively, −45° to 45°; alternatively, −35° to 35°; alternatively, −25° to 25°; alternatively, 0° to 45°; alternatively, in a range of 10° to 35°; alternatively, in a range of 20° to 25°. For example, the angle of the product discharge conduit 110 with respect to horizontal can be −60°, −59°, −58°, −57°, −56°, −55°, −57°, −56°, −55°, −54°, −53°, −52°, −51°, −50°, −49°, −48°, −47°, −46°, −45°, −44°, −43°, −42°, −41°, −40°, −39°, −38°, −37°, −36°, −35°, −34°, −33°, −32°, −31°, −30°, −29°, −28°, −27°, −26°, −25°, −24°, −23°, −22°, −21°, −20°, −19°, −18°, −17°, −16°, −15°, −14°, −13°, −12°, −11°, −10°, −9°, −8°, −6°, −5°, −4°, −3°, −2°, −1°, 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, or 60°.

The product separation system 200 in FIG. 10B can include a lock hopper 240, cycling valves 241 and 243, conduit 242, conduit 244, conduit 245, a separation vessel 230, conduit 201, and conduit 202. The product separation system 200 in FIG. 10B can optionally further include the treater 1030.

FIG. 10B shows that a lock hopper 240 can be coupled to the product discharge conduit 110. In an aspect, the lock hopper 240 can be coupled to the product discharge conduit 110 by a first cycling valve 241 and a conduit 242. The lock hopper 240 can additionally be coupled to a separation vessel 230 via a second cycling valve 243 and conduits 244 and 245. The first cycling valve 241 can be coupled to an inlet 247 of the lock hopper 240, and the second cycling valve 243 can be coupled to an outlet 246 of the lock hopper 240. The first cycling valve 241 and the second cycling valve 243 can be configured to pass the first reactor product mixture into and out of the lock hopper 240 while keeping the contents inside the lock hopper 240 isolated from the conditions of the fluidized bed reactor and from the conditions of the separation vessel 230. That is, at no time is the interior space of the lock hopper 240 fluidly connected to the interior of the fluidized bed reactor or the interior of the separation vessel 230. For example, the cycling valves 241 and 243 can each have a plurality of chambers 248 and 249 that can be cycled, for example if there are four chambers, by a quarter rotation (if two chambers, then a half rotation and so on for more chambers). Upon each partial rotation, one of the chambers 248 of the first cycling valve 241 can fluidly connect to the product discharge conduit 110 so as to receive first reactor product mixture therein, while another one of the chambers 248 can fluidly connect with the lock hopper 240 via conduit 242 so that the first reactor product mixture falls down into the lock hopper 240 via conduit 242. In a similar matter, upon each partial rotation, one of the chambers 249 of the second cycling valve 243 can fluidly connect to the lock hopper 240 via conduit 244 so as to receive first reactor product mixture therein, while another one of the chambers 249 can fluidly connect with the separation vessel 230 via conduit 245 so that the first reactor product mixture falls down into the separation vessel 230. A controller can be configured to control the partial rotation of each of the first cycling valve 241 and the second cycling valve 243 so as to maintain or change a desired amount of the first reactor product mixture inside the lock hopper 240.

The lock hopper 240 can be a vessel configured to receive the first reactor product mixture and then pass the mixture out of the lock hopper 240 according to actuation of the first cycling valve 241 and the second cycling valve 243.

The separation vessel 230 can be coupled to the lock hopper 240 via the second cycling valve 243 and conduits 244 and 245. The separation vessel 230 can be configured to separate the first reactor product mixture into the first polyolefin in conduit 202 and into a gas mixture in conduit 201. The gas mixture in conduit 201 can include the gases separated from the first polyolefin. The separation vessel 230 can be embodied as a flash tank configured to provide a reduction in pressure of the product mixture such that olefin monomer, any optional olefin comonomer, diluent, and other components (e.g., nitrogen, hydrogen, oxygen, methane, ethane, propane, butane, isobutane, pentane, hexane, heavier hydrocarbons, or combinations thereof) separate from the first polyolefin so as to yield one or more of these gaseous components in conduit 201. To the extent that any liquid is contained in the first reactor product mixture, the pressure reduction provided in the flash tank can flash the liquid into the gas phase for flow in conduit 201. In an aspect, the separation vessel 230 can be a hollow vessel having a cone-shaped bottom portion that directs the flow of the first polyolefin to conduit 202. In an aspect, the separation vessel 230 can operate without a pressure reduction, for example, when the first reactor product mixture contains gas components and the first polyolefin and no or a minimal amount of liquid, since a reduction in pressure is not needed for flashing a liquid component to a gas phase.

In an optional aspect, FIG. 10B illustrates a treater 1030 that can be configured to treat the gas mixture in conduit 201. That is, the treater 1030 can be fluidly connected to the conduit 201. In aspects, the treater 1030 can be a flare stack, a ground flare, a pressure swing absorber, a membrane, or a combination thereof. In another optional aspect, it is contemplated that the conduit 201 can flow to the product separation system 400 for treatment of the gas mixture, as is described for FIG. 9.

FIG. 10C shows the product discharge conduit 110 placed on the side 116 of the fluidized bed reactor. While placed on the side 116 of the vessel of the fluidized bed reactor, it is contemplated that the product discharge conduit 110 can be placed on the bottom of the reactor vessel. The product discharge conduit 110 can be connected to the fluidized bed reactor such that an angle of the product discharge conduit 110 with respect to horizontal is in a range of −60° to 60°; alternatively, −45° to 45°; alternatively, −35° to 35°; alternatively, −25° to 25°; alternatively, 0° to 45°; alternatively, in a range of 10° to 35°; alternatively, in a range of 20° to 25°. For example, the angle of the product discharge conduit 110 with respect to horizontal can be −60°, −59°, −58°, −57°, −56°, −55°, −57°, −56°, −55°, −54°, −53°, −52°, −51°, −50°, −49°, −48°, −47°, −46°, −45°, −44°, −43°, −42°, −41°, −40°, −39°, −38°, −37°, −36°, −35°, −34°, −33°, −32°, −31°, −30°, −29°, −28°, −27°, −26°, −25°, −24°, −23°, −22°, −21°, −20°, −19°, −18°, −17°, −16°, −15°, −14°, −13°, −12°, −11°, 10°, −9°, −8°, 6°, −5°, −4°–3°–2°, 1°, 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, or 60°.

The product separation system 200 in FIG. 10C can include a continuous take-off valve 212, conduit 211, a separation vessel 230, conduit 201, and conduit 202. The product separation system 200 in FIG. 10C can optionally further include the treater 1030.

FIG. 10C shows a continuous take-off valve 212 fluidly connected to the product discharge conduit 110. The continuous take-off valve 212 can be configured to receive the first reactor product mixture from the product discharge conduit 110 and to control the flow of the first reactor product mixture therethrough. The continuous take-off valve 212 can be any type of control valve known in the art to be useful for controlling flow of the product mixture on a continuous basis. Such valves include ball valves, v-ball valves, plug valves, globe valves and angle valves. In an aspect, the continuous take-off valve 212 can have a flow channel diameter greater than the largest expected polymer particle size even when the valve 212 is required to be only a small amount open (for example, 20-25% open), which gives a wide control range for the range of openness of the continuous take-off valve 212 (e.g., 20-100% open). The continuous take-off valve 212 may be actuated by a signal from a controller configured to operate the continuous take-off valve 212 such that the first reactor product mixture flows in the product discharge conduit 110 in a continuous manner. The controller may be configured to actuate the continuous take-off valve 212 to a percentage of openness, e.g., 20-100% open.

The separation vessel 230 can be coupled to the continuous take-off valve 212 via conduit 211. The separation vessel 230 can be configured to separate the first reactor product mixture into the first polyolefin in conduit 202 and into a gas mixture in conduit 201. The gas mixture in conduit 201 can include the gases separated from the first polyolefin. The separation vessel 230 can be embodied as a flash tank configured to provide a reduction in pressure of the product mixture such that olefin monomer, any optional olefin comonomer, diluent, and other components (e.g., nitrogen, hydrogen, oxygen, methane, ethane, propane, butane, isobutane, pentane, hexane, heavier hydrocarbons, or combinations thereof) separate from the first polyolefin so as to yield one or more of these gaseous components in conduit 201. To the extent that any liquid is contained in the first reactor product mixture, the pressure reduction provided in the flash tank can flash the liquid into the gas phase for flow in conduit 201. In an aspect, the separation vessel 230 can be a hollow vessel having a cone-shaped bottom portion that directs the flow of the first polyolefin to conduit 202. In an aspect, the separation vessel 230 can operate without a pressure reduction, for example, when the first reactor product mixture contains gas components and the first polyolefin and no or a minimal amount of liquid, since a reduction in pressure is not needed for flashing a liquid component to a gas phase.

In an optional aspect, FIG. 10C illustrates a treater 1030 that can be configured to treat the gas mixture in conduit 201. That is, the treater 1030 can be fluidly connected to the conduit 201. In aspects, the treater 1030 can be a flare stack, a ground flare, a pressure swing absorber, a membrane, or a combination thereof. In another optional aspect, it is contemplated that the conduit 201 can flow to the product separation system 400 for treatment of the gas mixture, as is described for FIG. 9.

FIG. 10D shows a settling leg 113 placed partially within the bottom portion 115 of the fluidized bed reactor. At least a portion of the settling leg 113 can be placed inside the first reactor 100 such that an end 113a of the settling leg 113 opens to the gas distributor 111 and/or to the polymerization zone 112 and an opposite end 113b extends outside the first reactor 100. While the settling leg 113 is shown in FIG. 10D as being positioned in a center of the gas distributor 111, it is contemplated that the settling leg 113 can be placed off-center with respect to the gas distributor 111 and/or the reaction vessel of the first reactor 100.

The settling leg 113 can be in the form of a pipe. In an aspect, a diameter of the settling leg 113 is the same along the length of the settling leg 113; while in another aspect, the end 113b of the settling leg 113 can be conically tapered such that the diameter of the end 113b decreases in the downward direction. In an aspect, the settling leg 113 can have an inner diameter along the length of the settling leg in the range of from about 10.16 cm (4 inches) to about 30.48 cm (12 inches), including any portion (e.g., end 113b) that has an inner diameter than changes along the length of said portion.

Solid polyolefin particles of the first polyolefin can fall by force of gravity into the settling leg as the particles become too large for the fluidization forces to keep them fluidized in the polymerization zone 112. The particles that settle out of the fluidized bed in the first reactor 100 can flow into the end 113a of the settling leg 113 to the opposite end 113b of the settling leg 113b. The particles can move downward in the settling leg 113 from end 113a to end 113b as a moving bed in a plug-flow manner. The particles then can flow from the first reactor 100 via product discharge conduit 370 to the product separation system 200.

The product separation system 400 in FIG. 10D can include a take-off valve 410, a conduit 411, a separation vessel 430, conduit 431, and conduit 401. The product separation system 400 in FIG. 10D can optionally further include the treater 1030 and/or any combination of equipment shown in and described for FIG. 9.

The take-off valve 410 can be configured to receive the first reactor product mixture from the product discharge conduit 370 and to control the flow of the first reactor product mixture therethrough. The take-off valve 410 in FIG. 10D can be of a configuration for the take-off valve described for FIG. 9.

The separation vessel 430 can be coupled to the end 113b of the settling leg 113 via conduits 110 and 411 as well as via the take-off valve 410. The separation vessel 430 can be configured to separate the first reactor product mixture into the multimodal polyolefin in conduit 401 and into a gas mixture in conduit 431. The gas mixture in conduit 431 can include the gases separated from the first polyolefin. The separation vessel 430 can be a configuration for the separation vessel 430 described for FIG. 9, for example, embodied as a flash tank configured to provide a reduction in pressure of the product mixture such that olefin monomer, any optional olefin comonomer, diluent, and other components (e.g., nitrogen, hydrogen, oxygen, methane, ethane, propane, butane, isobutane, pentane, hexane, heavier hydrocarbons, or combinations thereof) separate from the multimodal polyolefin so as to yield one or more of these gaseous components in conduit 431. To the extent that any liquid is contained in the first reactor product mixture, the pressure reduction provided in the flash tank can flash the liquid into the gas phase for flow in conduit 431. In an aspect, the separation vessel 430 can be a hollow vessel having a cone-shaped bottom portion that directs the flow of the multimodal polyolefin to conduit 401. In an aspect, the separation vessel 430 can operate without a pressure reduction, for example, when the first reactor product mixture contains gas components and the multimodal polyolefin and no or a minimal amount of liquid, since a reduction in pressure is not needed for flashing a liquid component to a gas phase.

In an optional aspect, FIG. 10D illustrates a treater 1030 that can be configured to treat the gas mixture in conduit 431. That is, the treater 1030 can be fluidly connected to the conduit 431. In aspects, the treater 1030 can be a flare stack, a ground flare, a pressure swing absorber, a membrane, or a combination thereof. In alternative aspects, the treater 1030 can be the train of equipment shown in FIG. 9 that processes the gaseous components received from conduit 431.

FIG. 10E shows the product discharge conduit 370 placed on the side 116 of the fluidized bed reactor. While placed on the side 116 of the vessel of the fluidized bed reactor, it is contemplated that the product discharge conduit 370 can be placed on the bottom of the reactor vessel. The product discharge conduit 370 can be connected to the fluidized bed reactor such that an angle of the product discharge conduit 370 with respect to horizontal is in a range of −60° to 60°; alternatively, −45° to 45°; alternatively, −35° to 35°; alternatively, −25° to 25°; alternatively, 0° to 45°; alternatively, in a range of 10° to 35°; alternatively, in a range of 20° to 25°. For example, the angle of the product discharge conduit 370 with respect to horizontal can be −60°, −59°, −58°, −57°, −56°, −55°, −57°, −56°, −55°, −54°, −53°, −52°, −51°, −50°, −49°, −48°, −47°, −46°, −45°, −44°, −43°, −42°, −41°, −40°, −39°, −38°, −37°, −36°, −35°, −34°, −33°, −32°, −31°, −30°, −29°, −28°, −27°, −26°, −25°, −24°, −23°, −22°, −21°, −20°, −19°, −18°, −17°, −16°, −15°, −14°, −13°, −12°, −11°, −10°, −9°, −8°, −7°, −6°, −5°, −4°, −3°, −2°, −1°, 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, or 60°.

The product separation system 400 in FIG. 10E can include a lock hopper 490, cycling valves 491 and 493, conduit 492, conduit 494, conduit 495, a separation vessel 430, conduit 401, and conduit 431. The product separation system 400 in FIG. 10E can optionally further include the treater 1030 and/or any combination of equipment shown in and described for FIG. 9.

FIG. 10E shows that a lock hopper 490 can be coupled to the product discharge conduit 370. In an aspect, the lock hopper 490 can be coupled to the product discharge conduit 370 by a first cycling valve 491 and a conduit 492. The lock hopper 490 can additionally be coupled to a separation vessel 430 via a second cycling valve 493 and conduits 495 and 495. The first cycling valve 491 can be coupled to an inlet 497 of the lock hopper 490, and the second cycling valve 493 can be coupled to an outlet 496 of the lock hopper 490. The first cycling valve 491 and the second cycling valve 493 can be configured to pass the first reactor product mixture into and out of the lock hopper 490 while keeping the contents inside the lock hopper 490 isolated from the conditions of the fluidized bed reactor and from the conditions of the separation vessel 430. That is, at no time is the interior space of the lock hopper 490 fluidly connected to the interior of the fluidized bed reactor or the interior of the separation vessel 430. For example, the cycling valves 491 and 493 can each have a plurality of chambers 498 and 499 that can be cycled, for example if there are four chambers, by a quarter rotation (if two chambers, then a half rotation and so on for more chambers). Upon each partial rotation, one of the chambers 498 of the first cycling valve 491 can fluidly connect to the product discharge conduit 370 so as to receive first reactor product mixture therein, while another one of the chambers 498 can fluidly connect with the lock hopper 490 via conduit 492 so that the first reactor product mixture falls down into the lock hopper 490 via conduit 492. In a similar matter, upon each partial rotation, one of the chambers 499 of the second cycling valve 493 can fluidly connect to the lock hopper 490 via conduit 494 so as to receive first reactor product mixture therein, while another one of the chambers 499 can fluidly connect with the separation vessel 430 via conduit 495 so that the first reactor product mixture falls down into the separation vessel 430. A controller can be configured to control the partial rotation of each of the first cycling valve 491 and the second cycling valve 493 so as to maintain or change a desired amount of the first reactor product mixture inside the lock hopper 490.

The lock hopper 490 can be a vessel configured to receive the first reactor product mixture and then pass the mixture out of the lock hopper 490 according to actuation of the first cycling valve 491 and the second cycling valve 493.

The separation vessel 430 can be coupled to the lock hopper 490 via the second cycling valve 493 and conduits 494 and 495. The separation vessel 430 can be a configuration for the separation vessel 430 described for FIG. 9, for example, embodied as a flash tank configured to provide a reduction in pressure of the product mixture such that olefin monomer, any optional olefin comonomer, diluent, and other components (e.g., nitrogen, hydrogen, oxygen, methane, ethane, propane, butane, isobutane, pentane, hexane, heavier hydrocarbons, or combinations thereof) separate from the multimodal polyolefin so as to yield one or more of these gaseous components in conduit 431. To the extent that any liquid is contained in the first reactor product mixture, the pressure reduction provided in the flash tank can flash the liquid into the gas phase for flow in conduit 431. In an aspect, the separation vessel 430 can be a hollow vessel having a cone-shaped bottom portion that directs the flow of the multimodal polyolefin to conduit 401. In an aspect, the separation vessel 430 can operate without a pressure reduction, for example, when the first reactor product mixture contains gas components and the multimodal polyolefin and no or a minimal amount of liquid, since a reduction in pressure is not needed for flashing a liquid component to a gas phase.

In an optional aspect, FIG. 10E illustrates a treater 1030 that can be configured to treat the gas mixture in conduit 431. That is, the treater 1030 can be fluidly connected to the conduit 431. In aspects, the treater 1030 can be a flare stack, a ground flare, a pressure swing absorber, a membrane, or a combination thereof. In another optional aspect, it is contemplated that the conduit 431 can flow to the product separation system 400 for treatment of the gas mixture, as is described for FIG. 9.

FIG. 10F shows the product discharge conduit 370 placed on the side 116 of the fluidized bed reactor. While placed on the side 116 of the vessel of the fluidized bed reactor, it is contemplated that the product discharge conduit 370 can be placed on the bottom of the reactor vessel. The product discharge conduit 370 can be connected to the fluidized bed reactor such that an angle of the product discharge conduit 370 with respect to horizontal is in a range of −60° to 60°; alternatively, −45° to 45°; alternatively, −35° to 35°; alternatively, −25° to 25°; alternatively, 0° to 45°; alternatively, in a range of 10° to 35°; alternatively, in a range of 20° to 25°. For example, the angle of the product discharge conduit 370 with respect to horizontal can be −60°, −59°, −58°, −57°, −56°, −55°, −57°, −56°, −55°, −54°, −53°, −52°, −51°, −50°, −49°, −48°, −47°, −46°, −45°, −44°, −43°, −42°, −41°, −40°, −39°, −38°, −37°, −36°, −35°, −34°, −33°, −32°, −31°, −30°, −29°, −28°, −27°, −26°, −25°, −24°, −23°, −22°, −21°, −20°, −19°, −18°, −17°, −16°, −15°, −14°, −13°, −12°, −11°, −10°, −9°, −8°, −7°, −6°, −40, −30, −1°, 0°, 1°, 2°, 3°, 4°, 5°, 6°, 7°, 8°, 9°, 10°, 11°, 12°, 13°, 14°, 150, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, or 60°.

The product separation system 400 in FIG. 10F can include a continuous take-off valve 413, conduit 411, a separation vessel 430, conduit 401, and conduit 431. The product separation system 400 in FIG. 10E can optionally further include the treater 1030 and/or any combination of equipment shown in and described for FIG. 9.

FIG. 10F shows a continuous take-off valve 413 fluidly connected to the product discharge conduit 370. The continuous take-off valve 413 can be configured to receive the first reactor product mixture from the product discharge conduit 370 and to control the flow of the first reactor product mixture therethrough. The continuous take-off valve 413 can be any type of control valve known in the art to be useful for controlling flow of the product mixture on a continuous basis. Such valves include ball valves, v-ball valves, plug valves, globe valves and angle valves. In an aspect, the continuous take-off valve 413 can have a flow channel diameter greater than the largest expected polymer particle size even when the valve 413 is required to be only a small amount open (for example, 20-25% open), which gives a wide control range for the range of openness of the continuous take-off valve 413 (e.g., 20-100% open). The continuous take-off valve 413 may be actuated by a signal from a controller configured to operate the continuous take-off valve 413 such that the first reactor product mixture flows in the product discharge conduit 370 in a continuous manner. The controller may be configured to actuate the continuous take-off valve 413 to a percentage of openness, e.g., 20-100% open.

The separation vessel 430 can be coupled to the continuous take-off valve 413 via conduit 411. The separation vessel 430 can be configured to separate the first reactor product mixture into the first polyolefin in conduit 401 and into a gas mixture in conduit 431. The gas mixture in conduit 431 can include the gases separated from the first polyolefin. The separation vessel 430 can be embodied as a flash tank configured to provide a reduction in pressure of the product mixture such that olefin monomer, any optional olefin comonomer, diluent, and other components (e.g., nitrogen, hydrogen, oxygen, methane, ethane, propane, butane, isobutane, pentane, hexane, heavier hydrocarbons, or combinations thereof) separate from the first polyolefin so as to yield one or more of these gaseous components in conduit 431. To the extent that any liquid is contained in the first reactor product mixture, the pressure reduction provided in the flash tank can flash the liquid into the gas phase for flow in conduit 431. In an aspect, the separation vessel 430 can be a hollow vessel having a cone-shaped bottom portion that directs the flow of the first polyolefin to conduit 401. In an aspect, the separation vessel 430 can operate without a pressure reduction, for example, when the first reactor product mixture contains gas components and the first polyolefin and no or a minimal amount of liquid, since a reduction in pressure is not needed for flashing a liquid component to a gas phase.

In an optional aspect, FIG. 10F illustrates a treater 1030 that can be configured to treat the gas mixture in conduit 431. That is, the treater 1030 can be fluidly connected to the conduit 431. In aspects, the treater 1030 can be a flare stack, a ground flare, a pressure swing absorber, a membrane, or a combination thereof. In another optional aspect, it is contemplated that the conduit 431 can flow to the product separation system 400 for treatment of the gas mixture, as is described for FIG. 9.

The disclosed apparatuses and processes are configured to produce multimodal polyolefins.

In aspect, the multimodal polyolefins can comprise high density polyethylene (HDPE), medium density polyethylene (MDPE), low density polyethylene (LDPE), linear low density polyethylene (LLDPE), or combinations thereof. Any of the HDPE, MDPE, LDPE, LLDPE can be produced as a homopolymer or a copolymer (e.g., a polyolefin containing ethylene monomer units and comonomer units of a comonomer disclosed herein such as 1-hexene).

Other aspects and embodiments of the multimodal polyolefin compositions produced according to this disclosure are described as polyethylene resins A, B, C, D, and E below. Each polyethylene resin A, B, C, D, and E can comprise the first polyolefin made in polymerization zone 112 of the first reactor 100, the second polyolefin made in the polymerization zone 321 of the riser 320 of the MZCR 300, and the third polyolefin made in the polymerization zone 341 of the downcomer 340 of the MZCR 300.

In an aspect, the first polyolefin can be a HDPE resin and the second and third polyolefins can together form a LLDPE.

In an aspect, the first polyolefin in each polyethylene resin A, B, C, D, and E can be a low molecular weight (LMW) component of the multimodal polyolefin, the second polyolefin in each polyethylene resin A, B, C, D, and E can be an intermediate molecular weight (IMW) component of the multimodal polyolefin, and the third polyolefin in each polyethylene resin A, B, C, D, and E can be a high molecular weight component (HMW) of the multimodal polyolefin. It is contemplated that an amount or number of other components of the multimodal polyolefin may be present due to residual polymerization reactions that can occur in MZCR 300, for example, in one or more of the lower conduit 310, the upper conduit 330, and the separator 350 of the MZCR 300. Thus, in an aspect, the multimodal polyolefin (and thus in each polyethylene resin A, B, C, D, and E) can have from three to six molecular weight components and can be characterized as a trimodal polyolefin, a quadramodal polyolefin, a pentamodal polyolefin, or a hexamodal polyolefin.

In an aspect, the first polyolefin in each polyethylene resin A, B, C, D, and E can be a low molecular weight (LMW) component of the multimodal polyolefin, the second polyolefin in each polyethylene resin A, B, C, D, and E can be an intermediate molecular weight (IMW) component of the multimodal polyolefin, and the third polyolefin in each polyethylene resin A, B, C, D, and E can be a high molecular weight component (HMW) of the multimodal polyolefin. It is contemplated that an amount of other components of the multimodal polyolefin may be present due to residual polymerization reactions that can occur in MZCR 300, for example, in one or more of the lower conduit 310, the upper conduit 330, and the separator 350 of the MZCR 300.

In additional or alternative aspects, the first polyolefin (e.g., the LMW component) in each polyethylene resin A, B, C, D, and E that is produced in the polymerization zone 112 of the first reactor 100 can be a lower molecular weight polyethylene, and the third polyolefin (e.g., the HMW component) in each polyethylene resin A, B, C, D, and E that is produced in the polymerization zone 341 of the downcomer 340 can be a higher molecular weight polyethylene. The second polyolefin (e.g., the IMW component) in each polyethylene resin A, B, C, D, and E that is produced in the polymerization zone 321 of the riser 320. The terms "lower" and "higher" are used to describe the average molecular weight of a polyolefin relative to the average molecular weight of other polyolefins in the multimodal polyolefin composition, and are not meant to include only absolute values as recognized by those skilled in the art (e.g., "lower molecular weight" does not necessarily mean the average molecular weight has a "low" molecular weight, although very well could be). Thus, when the polyolefin produced in the polymerization zone 112 has a "lower molecular weight", it is intended that the polyolefin has an average molecular weight that is lower than the average molecular weight of other polyolefins in the multimodal polyolefin composition, e.g., lower than the "higher molecular weight" of the polyolefin made in the downcomer 340 and the intermediate molecular weight of the polyolefin made in the riser 320. Likewise, when the polyolefin produced in the polymerization zone 341 of the downcomer 340 has a "higher molecular weight" it is intended that the polyolefin has an average molecular weight that is higher than the molecular weight of other polyolefins in the multimodal polyolefin composition, e.g., higher than the "lower molecular weight" of the polyolefin made in the first reactor 100 and the intermediate molecular weight of the polyolefin made in the riser 320.

The multiple polymerization zones (e.g., polymerization zones 112, 321, and 341) in the disclosed apparatuses and processes give great flexibility in the properties of the multimodal polyolefins that can be made. The residence times, gas compositions, catalyst, catalyst injection rate, ratio of olefin monomer to catalyst, comonomer concentration, hydrogen concentration, and other parameters in the polymerization zones 112, 321, and 341 can be determined to produce a multimodal polyolefin having desirable properties.

One advantage of the multimodal polyolefins disclosed herein is their use in lightweighting. Lightweighting occurs when less of a multimodal polyolefin is used to form a pipe, film, or article than would otherwise be used, for example with a bimodal polyolefin, to form the same size of pipe, film, or article. The multimodal polyolefins that can be produced herein can have advantageous stiffness and Young's, Secant, and/or Flexural modulus values that enable lightweighting when forming a pipe, film, or article, while still having desired impact strength and environmental stress cracking resistance (ESCR) in the formed pipe, film, or article. Without being limited by theory, it is believed that the disclosed processes and apparatuses can be used to control the amount of the first polyolefin (also can be referred to as the low molecular weight (LMW) component) that is incorporated into the multimodal polyolefin. The control can be for an amount of the LMW component that advantageously leads to lightweighting when the multimodal polyolefin is used to produce pipe, film, or an article.

Another advantage of the multimodal polyolefins disclosed herein is a lower amount of gels in resins suitable for use as pipe. The lower gel count results in improved mechanical properties, aesthetics, and surface finish of the product. Generally, gels are higher molecular weight and/or crosslinked polymers (e.g., polyethylene) in the form of discrete particles. For purposes of counting these discrete particles, a countable gel has greater than 200 microns in size. Gels in the multimodal polyolefins (including the polyethylene resins disclosed herein) can be measured by extruding a 1 mm thick cast film on a 1.25" Killion single screw extruder with a slot die. An FS5 model OCS (Optical Control Systems, GmbH) gel counter with a light source can be used in transmission mode with the grey level set at 170 to detect the number of gels. Fewer gels are formed because the multiple zone polyolefin polymerizations disclosed herein produce a more homogeneous product. The multimodal molecular weight distribution can allow bridging of the low molecular weight (LMW) component and the high molecular weight (HMW) component with one or more other components such that the multimodal polyolefin has fewer gels that result when mixing components having disparate molecular weights (e.g., a HMW component and a LMW component).

Polyethylene resins A, B, C, D, and E are discussed below as exemplary embodiments of the multimodal polyolefins that can be made in the disclosed apparatuses and processes, and it is contemplated that other polyolefin resins can be made. In aspect, any multimodal polyolefin and any polyolefin resin made herein can be suitable for use as a film, a pipe, or an article formed by blow molding, small part blow molding, large part blow molding, extrusion molding, rotational molding, thermoforming, cast molding, and the like.

In an aspect, an amount of from about 20 to about 80 wt. %, alternatively from about 40 to about 60 wt. %, alternatively from about 45 to about 55 wt. %, alternatively about 50 wt. % of polyethylene resin A can comprise the first polyolefin and an amount of from about 80 to about 20 wt. %, alternatively from about 60 to about 40 wt. %, alternatively from about 55 to about 45 wt. %, alternatively about 50 wt. % of polyethylene resin A can comprise the second polyolefin and the third polyolefin. Stated another way, an amount of from about 20 to about 80 wt. %, alternatively from about 40 to about 60 wt. %, alternatively from about 45 to about 55 wt. %, alternatively about 50 wt. % of polyethylene resin A can comprise the LMW component and an amount of from about 80 to about 20 wt. %, alternatively from about 60 to about 40 wt. %, alternatively from about 55 to about 45 wt. %, alternatively about 50 wt. % of polyethylene resin A can comprise the IMW component and the HMW component. Stated another way, the LMW component of polyethylene resin A can be present in an amount of from about 20 wt. % to about 75 wt. %, the IMW component of polyethylene resin A can be present in an amount of from about 5 wt. % to about 40 wt. %, and the HMW component of polyethylene resin A can be present in an amount of from about 10 wt. % to about 60 wt. %.

In an aspect, the portion of polyethylene resin A that is made of the second polyolefin and the third polyolefin can include an amount of from about 1 to about 30 wt. % of the second polyolefin and an amount of from about 10 to about 79 wt. % of the third polyolefin.

In an aspect, the portion of polyethylene resin A that is made of the IMW component and the HMW component can include an amount of from about 1 to about 30 wt. % of the IMW component and an amount of from about 10 to about 79 wt. % of the HMW component.

In an aspect, polyethylene resin A can have a density in a range of about 0.930 to about 0.970 g/ml, when tested in accordance with ISO 1183 at 23° C.

In an aspect, polyethylene resin A can have a melt index ($MI_2$) in a range of from about 0.1 to about 30 g/10 min, when tested in accordance with ISO 1133 at 190° C. under a force of 2.16 kg.

In an aspect, polyethylene resin A can have a high load melt index (HLMI) of from about 1 to about 45 g/10 min, when tested in accordance with ISO 1133 at 190° C. under a force of 2.16 kg.

In an aspect, polyethylene resin A can have a comonomer content in a range of from about 0 to about 6 wt. %.

In an aspect, polyethylene resin A can have a weight average molecular weight ($M_w$) in a range of from about 250 to about 1,500 kg/mol.

In an aspect, polyethylene resin A can have a number average molecular weight ($M_n$) in a range of from about 4.8 to about 84 kg/mol.

In an aspect, polyethylene resin A can have a z-average molecular weight ($M_z$) in a range of from about 500 to about 5,000 kg/mol.

In an aspect, polyethylene resin A can have a polydispersity index (dispersity or PDI or $M_w/M_n$) in a range of from about 18 to about 52.

In an aspect, polyethylene resin A can have a long chain branching index in a range of from about 0 to about 0.96.

In an aspect, polyethylene resin A can have a shear induced crystallization (SIC) index in a range of from about 0.15 to about 8. The SIC index is determined by the following equation: SIC index=($t_{onset,SIC}$@1000×$t_{onset,quiescent}$)/(HLMI*100) where $t_{onset,SIC}$@1000 is measured in seconds and is the time required for crystallization onset under shear rate of 1000 $s^{-1}$, and where $t_{onset, quiescent}$ is measured in seconds and is the crystallization onset time at a temperature of 125° C. under no shear, determined in isothermal mode by differential scanning calorimetry.

In an aspect, the second polyolefin (e.g., the IMW component) of polyethylene resin A that is produced in polymerization zone 321 of the riser 320 can have an average molecular weight ($M_w$, $M_n$, or MO greater than an average molecular weight ($M_w$, $M_n$, or $M_z$) of the first polyolefin (e.g., the LMW component) of polyethylene resin A that is produced in the polymerization zone 112 of the first reactor 100 and less than an average molecular weight ($M_w$, $M_n$, or $M_w$) of the third polyolefin (e.g., the HMW component) of polyethylene resin A that is produced in the polymerization zone 341 of the downcomer 340.

In an aspect, polyethylene resin A can have an environmental stress cracking resistance (ESCR) of equal to or greater than about 800 hours; alternatively, greater than about 900 hours; alternatively, greater than about 1,000 hours, when tested in accordance with ISO 16770.

In an aspect, polyethylene resin A can have a value for rapid crack propagation (RCP) that is at least 100%; alternatively, at least 110%; alternatively, at least 120%; alternatively, at least 130%; alternatively, at least 140% of the value for RCP of a bimodal polyethylene.

In an aspect, polyethylene resin A can have a value for rapid crack propagation (RCP) that is at least 100%; alternatively, at least 110%; alternatively, at least 120%; alternatively, at least 130%; alternatively, at least 140% of the value for RCP of a bimodal polyethylene.

In an aspect, polyethylene resin A can have a resistance to slow crack growth of at least 100%; alternatively, at least 110%; alternatively, at least 120%; alternatively, at least 130%; alternatively, at least 140% of the value for resistance to slow crack growth of a bimodal polyethylene, when tested in accordance with ASTM F1473, with the caveat that the resistance to slow crack growth is defined as the polyethylene notch tensile test (PENT) failure time.

In an aspect, polyethylene resin A can have a tensile impact strength of from about 135 to about 165 kJ/m$^2$.

In an aspect, polyethylene resin A can have a gel count of less than about 950 gels/m$^2$. Alternatively, polyethylene resin A can have a gel count of less than about 900 gels/m$^2$; alternatively, less than about 850 gels/m$^2$; alternatively, less than about 800 gels/m$^2$; alternatively, less than about 750 gels/m$^2$; alternatively, a gel count of less than about 700 gels/m$^2$; alternatively, less than about 650 gels/m$^2$; alternatively, less than about 600 gels/m$^2$.

In an aspect, polyethylene resin A can be made by an embodiment of the process having a combination of the aspects described herein.

In an aspect, polyethylene resin A can be suitable for use as a film, a pipe, or an article formed by blow molding, small part blow molding, large part blow molding, extrusion molding, rotational molding, thermoforming, cast molding, and the like.

In an aspect, an amount of from about 20 to about 75 wt. % of polyethylene resin B can comprise the first polyolefin, an amount of from about 5 to about 40 wt. % of polyethylene resin B can comprise the second polyolefin, and an amount of from about 10 to about 60 wt. % of polyethylene resin B can comprise the third polyolefin. Stated another way, an amount of from about 20 to about 75 wt. % of polyethylene resin B can comprise the LMW component, an amount of from about 5 to about 40 wt. % of polyethylene resin B can comprise the IMW component, and an amount of from about 10 to about 60 wt. % of polyethylene resin B can comprise the HMW component. Stated another way, the LMW component of polyethylene resin B can be present in an amount of from about 20 wt. % to about 75 wt. %, the IMW component of polyethylene resin B can be present in an amount of from about 5 wt. % to about 40 wt. %, and the HMW component of polyethylene resin B can be present in an amount of from about 10 wt. % to about 60 wt. %.

In an aspect, polyethylene resin B can be a trimodal polyethylene resin.

In aspect, an amount of from about 40 to about 60 wt. % of polyethylene resin B can comprise the first polyolefin, an amount of from about 20 to about 40 wt. % of polyethylene resin B can comprise the second polyolefin, and an amount of from about 10 to about 30 wt. % of polyethylene resin B can comprise the third polyolefin. Stated another way, an amount of from about 40 to about 60 wt. % of polyethylene resin B can comprise the LMW component, an amount of from about 20 to about 40 wt. % of polyethylene resin B can comprise the IMW component, and an amount of from about 10 to about 30 wt. % of polyethylene resin B can comprise the HMW component. Stated another way, the LMW component of polyethylene resin B can be present in an amount of from about 40 wt. % to about 60 wt. %, the IMW component of polyethylene resin B can be present in an amount of from about 20 wt. % to about 40 wt. %, and the HMW component of polyethylene resin B can be present in an amount of from about 10 wt. % to about 30 wt. %.

In aspect, an amount of from about 50 wt. % of polyethylene resin B can comprise the first polyolefin, an amount of from about 30 wt. % of polyethylene resin B can comprise the second polyolefin, and an amount of from about 20 wt. % of polyethylene resin B can comprise the third polyolefin. Stated another way, an amount of from about 50 wt. % of polyethylene resin B can comprise the LMW component, an amount of from about 30 wt. % of polyethylene resin B can comprise the IMW component, and an amount of from about 20 wt. % of polyethylene resin B can comprise the HMW component. Stated another way, the LMW component of polyethylene resin B can be present in an amount of from about 50 wt. %, the IMW component of polyethylene resin B can be present in an amount of from about 30 wt. %, and the HMW component of polyethylene resin B can be present in an amount of from about 20 wt. %.

In an aspect, polyethylene resin B can have a long chain branching content of less than about 0.01 long chain branches per 1,000 carbon atoms.

In an aspect, polyethylene resin B can be a copolymer formed using a comonomer in at least one of the first reactor 100 and the MZCR 300. The copolymer can have a comonomer content of from greater than about 0 wt. % to about 20 wt. %; alternatively, from greater than about 0 wt. % to about 6 wt. %; alternatively, from about 2 wt. % to about 6 wt. %; alternatively, from about 1 wt. % to about 5 wt. %; alternatively, from greater than about 6 wt. % to about 20 wt. %; alternatively, from greater than about 6 wt. % to about 15 wt. %; or alternatively, from greater than about 6 wt. % to about 10 wt. %.

In an aspect, the comonomer for polyethylene resin B can be 1-butene, 1-hexene, 1-octene, or combinations thereof.

In an aspect, polyethylene resin B can have density of from about 0.900 g/cc to about 0.980 g/cc, when tested in accordance with ASTM D1505; alternatively, a density of less than about 0.960 g/cc, when tested in accordance with ASTM D1505; alternatively, a density of from greater than about 0.940 g/cc to about 0.960 g/cc, when tested in accordance with ASTM D1505; alternatively, a density of from about 0.920 g/cc to about 0.940 g/cc, when tested in accordance with ASTM D1505.

In an aspect, polyethylene resin B can have a melt index (MI$_2$) of less than about 1 g/10 min, when tested in accordance with ASTM D1238 under a force of 2.16 kg.

In an aspect, polyethylene resin B can have a high load melt index (HLMI) of from about 1 g/10 min to less than about 20 g/10 min, when tested in accordance with ASTM D1238 under a force of 21.6 kg.

In an aspect, polyethylene resin B can have a weight average molecular weight (M$_w$) of from about 150 kg/mol to about 1,000 kg/mol.

In an aspect, polyethylene resin B can have a number average molecular weight (M$_n$) of from about 7.5 kg/mol to about 30 kg/mol.

In an aspect, polyethylene resin B can have a z-average molecular weight (M$_z$) of from about 1,000 kg/mol to about 5,000 kg/mol; alternatively, from about 1,000 kg/mol to about 3,500 kg/mol.

In an aspect, polyethylene resin B can have a (z+1)-average molecular weight (M$_{z+1}$) of from about 2,000 kg/mol to about 9,000 kg/mol.

In an aspect, polyethylene resin B can have a polydispersity index (dispersity or PDI or M$_w$/M$_n$) of from about 5 to about 60.

In an aspect, polyethylene resin B can have a polydispersity index (dispersity or PDI or $M_w/M_n$) of less than about 18.

In an aspect, polyethylene resin B can have a magnitude of slip-stick of from about 300 psi to about 1,000 psi (about 2.07 MPa to about 6.89 MPa).

In an aspect, the LMW component of polyethylene resin B is a homopolymer.

In an aspect, the LMW component of polyethylene resin B can have a density of less than about 0.960 g/cc or alternatively, from equal to or greater than about 0.960 g/cc to about 0.985 g/cc, when tested in accordance with ASTM D1505.

In an aspect, the LMW component of polyethylene resin B can have a melt index ($MI_2$) of from about 3 g/10 min to about 400 g/10 min, when tested in accordance with ASTM D1238 under a force of 2.16 kg.

In an aspect, the LMW component of polyethylene resin B can have a high load melt index (HLMI) of from about 160 g/10 min to about 41,000 g/10 min, when tested in accordance with ASTM D1238 under a force of 21.6 kg.

In an aspect, the LMW component of polyethylene resin B can have a weight average molecular weight ($M_w$) of from about 20 kg/mol to about 150 kg/mol.

In an aspect, the LMW component of polyethylene resin B can have a number average molecular weight ($M_n$) of from about 5 kg/mol to about 25 kg/mol; alternatively, from about 5 kg/mol to about 15 kg/mol.

In an aspect, the LMW component of polyethylene resin B can have a z-average molecular weight ($M_z$) of from about 100 kg/mol to about 340 kg/mol.

In an aspect, the LMW component of polyethylene resin B can have a polydispersity index (dispersity or PDI or $M_w/M_n$) of from about 1 to about 30; alternatively, from about 1 to about 15.

In an aspect, the LMW component of polyethylene resin B can have a short chain branching content of from about 0 to about 5 short chain branches per 1,000 carbon atoms; alternatively, from about 0 to about 4 short chain branches per 1,000 carbon atoms; alternatively, from about 0 to about 3 short chain branches per 1,000 carbon atoms; alternatively, from about 0 to about 2 short chain branches per 1,000 carbon atoms; alternatively, from about 0 to about 1 short chain branches per 1,000 carbon atoms.

In an aspect, the IMW component of polyethylene resin B can be a copolymer.

In an aspect, the IMW component of polyethylene resin B can have a first comonomer content of from greater than about 0 wt. % to about 10 wt. %; alternatively, from greater than about 0 wt. % to about 4 wt. %.

In an aspect, the IMW component if polyethylene resin B can have a density of from equal to or greater than about 0.915 g/cc to about 0.970 g/cc, when tested in accordance with ASTM D1505.

In an aspect, the IMW component of polyethylene resin B can have a melt index ($MI_2$) of from about 0.1 g/10 min to about 30 g/10 min, when tested in accordance with ASTM D1238 under a force of 2.16 kg.

In an aspect, the IMW component of polyethylene resin B can have a high load melt index (HLMI) of from about 5 g/10 min to about 1,500 g/10 min, when tested in accordance with ASTM D1238 under a force of 21.6 kg.

In an aspect, the IMW component of polyethylene resin B can have a weight average molecular weight ($M_w$) of from about 85 kg/mol to about 350 kg/mol.

In an aspect, the weight average molecular weight ($M_w$) of the IMW component of polyethylene resin B can be greater than the weight average molecular weight ($M_w$) of the LMW component of polyethylene resin B.

In an aspect, the IMW component of polyethylene resin B can have a number average molecular weight ($M_n$) of from about 10 kg/mol to about 185 kg/mol; alternatively, from about 10 kg/mol to about 100 kg/mol; alternatively, from about 10 kg/mol to about 35 kg/mol.

In an aspect, the IMW component of polyethylene resin B can have a z-average molecular weight ($M_z$) of from about 215 kg/mol to about 2,300 kg/mol.

In an aspect, the IMW component of polyethylene resin B can have a polydispersity index (dispersity or PDI or $M_w/M_n$) of from about 2.5 to about 35; alternatively, from about 2.5 to about 25.

In an aspect, the IMW component of polyethylene resin B can have a short chain branching content of from about 0.1 to about 10 short chain branches per 1,000 carbon atoms; alternatively, from about 0.1 to about 8 short chain branches per 1,000 carbon atoms; alternatively, from about 0.2 to about 7 short chain branches per 1,000 carbon atoms; alternatively, from about 0.3 to about 6 short chain branches per 1,000 carbon atoms; alternatively, from about 0.4 to about 5 short chain branches per 1,000 carbon atoms.

In an aspect, the HMW component of polyethylene resin B can be a copolymer.

In an aspect, the HMW component of polyethylene resin B can have a comonomer content of greater than about 0 wt. % to about 10 wt. %; alternatively, from about 1 wt. % to about 10 wt. %.

In an aspect, the comonomer content in the HMW component of polyethylene resin B can be greater than the comonomer content of the IMW component of polyethylene resin B.

In an aspect, the HMW component of polyethylene resin B can have a density of from equal to or greater than about 0.900 g/cc to about 0.960 g/cc; alternatively, from equal to or greater than about 0.900 g/cc to about 0.940 g/cc; or alternatively, from equal to or greater than about 0.900 g/cc to about 0.930 g/cc, when tested in accordance with ASTM D1505.

In an aspect, the HMW component can have a melt index ($MI_2$) of less than about 0.1 g/10 min, when tested in accordance with ASTM D1238 under a force of 2.16 kg.

In an aspect, the HMW component of polyethylene resin B can have a high load melt index (HLMI) of from about 0.005 g/10 min to about 2 g/10 min, when tested in accordance with ASTM D1238 under a force of 21.6 kg.

In an aspect, the HMW component of polyethylene resin B can have weight average molecular weight ($M_w$) of greater than about 350 kg/mol; alternatively, from greater than about 350 kg/mol to about 1,500 kg/mol.

In an aspect, the HMW component of polyethylene resin B can have a number average molecular weight ($M_n$) of from about 75 kg/mol to about 200 kg/mol.

In an aspect, the HMW component of polyethylene resin B can have a z-average molecular weight ($M_z$) of from about 1,700 kg/mol to about 4,600 kg/mol.

In an aspect, the HMW component of polyethylene resin B can have a polydispersity index (dispersity or PDI or $M_w/M_n$) of from about 2 to about 20; alternatively, from about 2 to about 15.

In an aspect, the HMW component of polyethylene resin B can have a short chain branching content of from about 1 to about 15 short chain branches per 1,000 carbon atoms; alternatively, from about 2 to about 13 short chain branches per 1,000 carbon atoms; alternatively, from about 3 to about 12 short chain branches per 1,000 carbon atoms; alternatively, from about 4 to about 11 short chain branches per 1,000 carbon atoms; alternatively, from about 5 to about 10 short chain branches per 1,000 carbon atoms.

In an aspect, polyethylene resin B can have a Young's modulus (E) of equal to or greater than about 900 MPa; alternatively from about 900 MPa to about 1350 MPa, when tested in accordance with ASTM D638.

In an aspect, polyethylene resin B can have a tensile yield stress of equal to or greater than about 20 MPa; alternatively, from about 20 MPa to about 30 MPa, when tested in accordance with ASTM D638.

In an aspect, polyethylene resin B can have a tensile yield strain of from about 5% to about 25%, when tested in accordance with ASTM D638.

In an aspect, polyethylene resin B can have a tensile natural draw ratio at room temperature of from about 300% to about 600%, when tested in accordance with ASTM D638.

In an aspect, polyethylene resin B can have a tensile natural draw ratio at 80° C. of less than 500%; alternatively, of less than about 400%; alternatively, from about 250% to about 400%; alternatively, less than about 300%, when tested in accordance with ASTM D638.

In an aspect, polyethylene resin B can have a strain hardening modulus of from about 50 MPa to about 90 MPa, when tested in accordance with ISO 18488-2015(E).

In an aspect, polyethylene resin B can have an environmental stress cracking resistance (ESCR) of equal to or greater than about 1,000 hours, when tested in accordance with ASTM D1693 (condition A).

In an aspect, polyethylene resin B can have a resistance to slow crack growth of equal to or greater than about 800 h; alternatively, equal to or greater than about 2,000 h; alternatively, equal to or greater than about 5,000 h; or alternatively, equal to or greater than about 10,000 h, when tested in accordance with ASTM F1473, with the caveat that the resistance to slow crack growth is defined as the polyethylene notch tensile test (PENT) failure time.

In an aspect, polyethylene resin B can have a resistance to slow crack growth of equal to or greater than about 8,760 h; alternatively, equal to or greater than about 10,000 h; alternatively, equal to or greater than about 15,000 h; alternatively, equal to or greater than about 25,000 h; alternatively, equal to or greater than about 50,000 h; alternatively, equal to or greater than about 100,000 h; or alternatively, equal to or greater than about 500,000 h, when tested in accordance with ISO 16770 at 80° C. and 6 MPa, with the caveat that the resistance to slow crack growth is defined as the full notch creep test (FNCT) failure time.

In an aspect, polyethylene resin B can have a resistance to slow crack growth of equal to or greater than about 100 h; alternatively, equal to or greater than about 500 h; alternatively, equal to or greater than about 1,000 h; alternatively, equal to or greater than about 5,000 h; alternatively, equal to or greater than about 10,000 h; or alternatively, equal to or greater than about 15,000 h, when tested in accordance with ISO 13479:2009(E) at 4.6 MPa, with the caveat that the resistance to slow crack growth is defined as the notched pipe test (NPT) failure time.

In an aspect, polyethylene resin B can have a viscous relaxation time of from about 0.5 s to about 7.5 s.

In an aspect, polyethylene resin B can have an $\eta_0$ (eta_0) of equal to or greater than about $0.7 \times 10^5$ Pa-s; alternatively, equal to or greater than about $1.0 \times 10^5$ Pa-s; alternatively from about $0.7 \times 10^5$ Pa-s to about $2.0 \times 10^6$ Pa-s.

In an aspect, polyethylene resin B can have an $\eta_{251}$ (eta_251) of less than about $1.5 \times 10^3$ Pa-s.

In an aspect, polyethylene resin B can have a storage modulus (G') of from about 225,000 Pa to about 325,000 Pa, wherein G' is measured at 190° C. and 251 rad/s in accordance with ASTM D4440.

In an aspect, polyethylene resin B can have a loss modulus (G") of from about 100,000 Pa to about 200.00 Pa, wherein G" is measured at 190° C. and 251 rad/s in accordance with ASTM D4440.

In an aspect, polyethylene resin B can have a tan δ of from about 0.3 to about 0.7; wherein tan δ is the ratio of the loss modulus (G") to storage modulus (G'), wherein G" and G' are measured at 190° C. and 251 rad/s in accordance with ASTM D4440.

In an aspect, polyethylene resin B can be suitable for use as a film, a pipe, or an article formed by blow molding, small part blow molding, large part blow molding, extrusion molding, rotational molding, thermoforming, cast molding, and the like.

In an aspect, polyethylene resin B can have a gel count of less than about 950 gels/m$^2$. Alternatively, polyethylene resin B can have a gel count of less than about 900 gels/m$^2$; alternatively, less than about 850 gels/m$^2$; alternatively, less than about 800 gels/m$^2$; alternatively, less than about 750 gels/m$^2$; alternatively, a gel count of less than about 700 gels/m$^2$; alternatively, less than about 650 gels/m$^2$; alternatively, less than about 600 gels/m$^2$.

In an aspect, polyethylene resin B can be made by an embodiment of the process having a combination of the aspects described herein.

In an aspect, an amount of from about 40 to about 60 wt. % of polyethylene resin C can comprise the first polyolefin, an amount of from about 5 to about 15 wt. % of polyethylene resin C can comprise the second polyolefin, and an amount of from about 30 to about 50 wt. % of polyethylene resin C can comprise the third polyolefin. Stated another way, an amount of from about 40 to about 60 wt. % of polyethylene resin C can comprise the LMW component, an amount of from about 5 to about 15 wt. % of polyethylene resin C can comprise the IMW component, and an amount of from about 30 to about 50 wt. % of polyethylene resin C can comprise the HMW component. Stated another way, the LMW component of polyethylene resin C can present in an amount of from about 40 wt. % to about 60 wt. %, the IMW component of polyethylene resin C can be present in an amount of from about 5 wt. % to about 15 wt. %, and the HMW component of polyethylene resin C can be present in an amount of from about 30 wt. % to about 50 wt. %.

In aspect, an amount of from about 40 to about 60 wt. % of polyethylene resin C can comprise the first polyolefin, an amount of from about 5 to about 35 wt. % of polyethylene resin C can comprise the second polyolefin, and an amount of from about 15 to about 50 wt. % of polyethylene resin C can comprise the third polyolefin. Stated another way, an amount of from about 40 to about 60 wt. % of polyethylene resin C can comprise the LMW component, an amount of from about 5 to about 35 wt. % of polyethylene resin C can comprise the IMW component, and an amount of from about 15 to about 50 wt. % of polyethylene resin C can comprise the HMW component. Stated another way, the LMW component of polyethylene resin C can be present in an amount of from about 40 wt. % to about 60 wt. %, the IMW component of polyethylene resin C can be present in an amount of from about 5 wt. % to about 35 wt. %, and the HMW component of polyethylene resin C can be present in an amount of from about 15 wt. % to about 50 wt. %.

In aspect, an amount of from about 50 wt. % of polyethylene resin C can comprise the first polyolefin, an amount of from about 30 wt. % of polyethylene resin C can comprise the second polyolefin, and an amount of from about 20 wt. % of polyethylene resin C can comprise the third polyolefin. Stated another way, an amount of from about 50 wt. % of polyethylene resin C can comprise the LMW component, an amount of from about 30 wt. % of polyethylene resin C can comprise the IMW component, and an amount of from about 20 wt. % of polyethylene resin C can comprise the HMW component. Stated another way, the LMW component of polyethylene resin C can be present in an amount of from about 50 wt. %, the IMW component of polyethylene resin C can be present in an amount of from about 30 wt. %, and the HMW component of polyethylene resin C can be present in an amount of from about 20 wt. %.

In an aspect, polyethylene resin C can be a copolymer formed using a comonomer in at least one of the first reactor 100 and the MZCR 300. The copolymer can have a comonomer content of from greater than about 0 wt. % to about 20 wt. %; alternatively, from greater than about 0 wt. % to about 6 wt. %; alternatively, from about 2 wt. % to about 6 wt. %; alternatively, from about 1 wt. % to about 5 wt. %; alternatively, from greater than about 6 wt. % to about 20 wt. %; alternatively, from greater than about 6 wt. % to about 15 wt. %; or alternatively, from greater than about 6 wt. % to about 10 wt. %.

In an aspect, the LMW component of polyethylene resin C can have a weight average molecular weight ($M_w$) of from about 25 kg/mol to about 65 kg/mol.

In an aspect, the IMW component of polyethylene resin C can have a weight average molecular weight ($M_w$) of from about 100 kg/mol to about 200 kg/mol.

In an aspect, the weight average molecular weight ($M_w$) of the HMW component of polyethylene resin C can be greater than the weight average molecular weight ($M_w$) of the IMW component of polyethylene resin C.

In an aspect, the HMW component of polyethylene resin C can have a weight average molecular weight ($M_w$) of from about 400 kg/mol to about 925 kg/mol.

In an aspect, the LMW component of polyethylene resin C can have a short chain branching content of from about 0 to about 2 short chain branches per 1,000 carbon atoms.

In an aspect, the IMW component of polyethylene resin C can have a short chain branching content of from about 0.1 to about 5 short chain branches per 1,000 carbon atoms.

In an aspect, the HMW component of polyethylene resin C can have a short chain branching content of from about 2 to about 12 short chain branches per 1,000 carbon atoms.

In an aspect, polyethylene resin C can have a slow crack growth, and a resistance to slow crack growth can be of equal to or greater than about 3,000 h, when tested in accordance with ASTM F1473, with the caveat that resistance to slow crack growth is defined as the polyethylene notch tensile test (PENT) failure time.

In an aspect, polyethylene resin C can be a trimodal polyethylene resin.

In an aspect, polyethylene resin C can have a resistance to slow crack growth of equal to or greater than about 8,760 h, when tested in accordance with ISO 16770 at 80° C. and 6 MPa, with the caveat that the resistance to slow crack growth is defined as the full notch creep test (FNCT) failure time.

In an aspect, polyethylene resin C can have a resistance to slow crack growth of equal to or greater than about 1,000 h, when tested in accordance with ISO 13479:2009(E) at 4.6 MPa, wherein the resistance to slow crack growth is defined as the notched pipe test (NPT) failure time.

In an aspect, polyethylene resin C can have a weight average molecular weight ($M_w$) of from about 200 kg/mol to about 400 kg/mol.

In an aspect, polyethylene resin C can have a number average molecular weight ($M_n$) of from about 7.5 kg/mol to about 20 kg/mol.

In an aspect, polyethylene resin C can have a z-average molecular weight ($M_z$) of from about 1,000 kg/mol to about 3,300 kg/mol.

In an aspect, polyethylene resin C can have an $\eta_0$ (eta_0) of equal to or greater than about $1.0 \times 10^5$ Pa-s.

In an aspect, polyethylene resin C can be formed into a pipe. Additionally, polyethylene resin C can be suitable for use as a film or an article formed by blow molding, small part blow molding, large part blow molding, extrusion molding, rotational molding, thermoforming, cast molding, and the like.

In an aspect, polyethylene resin C can have a gel count of less than about 750 gels/m$^2$. Alternatively, polyethylene resin C can have a gel count of less than about 700 gels/m$^2$; alternatively, less than about 650 gels/m$^2$; alternatively, less than about 600 gels/m$^2$.

In an aspect, polyethylene resin C can be made by an embodiment of the process having a combination of the aspects described herein.

In an aspect, an amount of from about 40 to about 60 wt. % of polyethylene resin D can comprise the first polyolefin, an amount of from about 5 to about 15 wt. % of polyethylene resin D can comprise the second polyolefin, and an amount of from about 30 to about 50 wt. % of polyethylene resin D can comprise the third polyolefin. Stated another way, an amount of from about 40 to about 60 wt. % of polyethylene resin D can comprise the LMW component, an amount of from about 5 to about 15 wt. % of polyethylene resin D can comprise the IMW component, and an amount of from about 30 to about 50 wt. % of polyethylene resin D can comprise the HMW component. Stated another way, the LMW component of polyethylene resin D can present in an amount of from about 40 wt. % to about 60 wt. %, the IMW component of polyethylene resin D can be present in an amount of from about 5 wt. % to about 15 wt. %, and the HMW component of polyethylene resin D can be present in an amount of from about 30 wt. % to about 50 wt. %.

In aspect, an amount of from about 40 to about 60 wt. % of polyethylene resin D can comprise the first polyolefin, an amount of from about 5 to about 35 wt. % of polyethylene resin D can comprise the second polyolefin, and an amount of from about 15 to about 50 wt. % of polyethylene resin D can comprise the third polyolefin. Stated another way, an amount of from about 40 to about 60 wt. % of polyethylene resin D can comprise the LMW component, an amount of from about 5 to about 35 wt. % of polyethylene resin D can comprise the IMW component, and an amount of from about 15 to about 50 wt. % of polyethylene resin D can comprise the HMW component. Stated another way, the LMW component of polyethylene resin D can be present in an amount of from about 40 wt. % to about 60 wt. %, the IMW component of polyethylene resin D can be present in an amount of from about 5 wt. % to about 35 wt. %, and the HMW component of polyethylene resin D can be present in an amount of from about 15 wt. % to about 50 wt. %.

In aspect, an amount of from about 50 wt. % of polyethylene resin D can comprise the first polyolefin, an amount of from about 30 wt. % of polyethylene resin D can comprise the second polyolefin, and an amount of from about 20 wt. % of polyethylene resin D can comprise the third polyolefin. Stated another way, an amount of from about 50 wt. % of polyethylene resin D can comprise the LMW component, an amount of from about 30 wt. % of polyethylene resin D can comprise the IMW component, and an amount of from about 20 wt. % of polyethylene resin D can comprise the HMW component. Stated another way, the LMW component of polyethylene resin D can be present in an amount of from about 50 wt. %, the IMW component of polyethylene resin D can be present in an amount of from about 30 wt. %, and the HMW component of polyethylene resin D can be present in an amount of from about 20 wt. %.

In an aspect, polyethylene resin D can be a copolymer formed using a comonomer in at least one of the first reactor 100 and the MZCR 300. The copolymer can have a comonomer content of from greater than about 0 wt. % to about 20 wt. %; alternatively, from greater than about 0 wt. % to about 6 wt. %; alternatively, from about 2 wt. % to about 6 wt. %; alternatively, from about 1 wt. % to about 5 wt. %; alternatively, from greater than about 6 wt. % to about 20 wt. %; alternatively, from greater than about 6 wt. % to about 15 wt. %; or alternatively, from greater than about 6 wt. % to about 10 wt. %.

In an aspect, the LMW component of polyethylene resin D can have a weight average molecular weight ($M_w$) of from about 30 kg/mol to about 50 kg/mol.

In an aspect, the IMW component of polyethylene resin D can have a weight average molecular weight ($M_w$) of from about 90 kg/mol to about 150 kg/mol.

In an aspect, the HMW component of polyethylene resin D can have a weight average molecular weight ($M_w$) of from about 450 kg/mol to about 750 kg/mol.

In an aspect, the LMW component of polyethylene resin D can have a short chain branching content of from about 0.1 to about 2 short chain branches per 1,000 carbon atoms.

In an aspect, the IMW component of polyethylene resin D can have a short chain branching content of from about 0.1 to about 5 short chain branches per 1,000 carbon atoms.

In an aspect, the HMW component of polyethylene resin D can have a short chain branching content of from about 2 to about 10 short chain branches per 1,000 carbon atoms.

In an aspect, polyethylene resin D can have a tensile strength in the machine direction (MD) of greater than about 13,000 psi (about 89.6 MPa), when tested in accordance with ASTM D638 at 90 MPa.

In an aspect, polyethylene resin D can be a trimodal polyethylene resin.

In an aspect, polyethylene resin D can have a tensile strength in the transverse direction (TD) of greater than about 6,000 psi (about 41.4 MPa), when tested in accordance with ASTM D638 at 41 MPa.

In an aspect, polyethylene resin D can have an $\eta_0$ (eta_0) of equal to or greater than about $1.0 \times 10^5$ Pa-s.

In an aspect, polyethylene resin D can be formed into a film. Additionally, polyethylene resin D can be suitable for use as a pipe or an article formed by blow molding, small part blow molding, large part blow molding, extrusion molding, rotational molding, thermoforming, cast molding, and the like.

In an aspect, polyethylene resin D can be made by an embodiment of the process having a combination of the aspects described herein.

In an aspect, the multimodal polyolefin is a polyethylene resin E made by an embodiment of the process having a combination of the aspects described herein.

In an aspect, polyethylene resin E can be suitable for use as a pipe, film, or an article formed by blow molding, small part blow molding, large part blow molding, extrusion molding, rotational molding, thermoforming, cast molding, and the like.

In an aspect, polyethylene resin E can be a trimodal polyethylene resin.

In an aspect, polyethylene resin E can be a copolymer formed using a comonomer in at least one of the first reactor 100 and the MZCR 300. The copolymer can have a comonomer content of from greater than about 0 wt. % to about 20 wt. %; alternatively, from greater than about 0 wt. % to about 6 wt. %; alternatively, from about 2 wt. % to about 6 wt. %; alternatively, from about 1 wt. % to about 5 wt. %; alternatively, from greater than about 6 wt. % to about 20 wt. %; alternatively, from greater than about 6 wt. % to about 15 wt. %; or alternatively, from greater than about 6 wt. % to about 10 wt. %.

In an aspect, the multimodal polyolefin that is a polyethylene resin A, B, C, D, or E can be produced using Ziegler-Natta catalyst in each of polymerization zones 112, 321, and 341. Stated another way, the multimodal polyolefin that is a polyethylene resin A, B, C, D, or E can be produced using Ziegler-Natta catalyst in each of the first reactor 100, the riser 320 of the MZCR 300, and the downcomer 340 of the MZCR 300. Put yet another way, the multimodal polyolefin that is a polyethylene resin A, B, C, D, or E can be produced using Ziegler-Natta catalyst in each of the first reactor 100 and the MZCR 300.

In an aspect, the LMW component of the multimodal polyolefin that is polyethylene resin A, B, C, D, or E can be produced in a polymerization zone 112 in the substantial absence of any comonomer described herein. Stated another way, the LMW component of the multimodal polyolefin that is polyethylene resin A, B, C, D, or E can be produced in the first reactor 100 in the substantial absence of any comonomer described herein.

In an aspect, the IMW component of the multimodal polyolefin that is polyethylene resin A, B, C, D, or E can be produced in polymerization zone 321 in the presence of a comonomer and hydrogen. Stated another way, the IMW component of the multimodal polyolefin that is polyethylene resin A, B, C, D, or E can be produced in the riser 320 of the MZCR 300 in the presence of a comonomer and hydrogen.

In an aspect, the HMW component of the multimodal polyolefin that is polyethylene resin A, B, C, D, or E can be produced in a polymerization zone 341 in the presence of a comonomer and hydrogen. Stated another way, the HMW component of the multimodal polyolefin that is polyethylene resin A, B, C, D, or E can be produced in the downcomer 340 of the MZCR 300 in the presence of a comonomer and hydrogen.

In an aspect, the amount of comonomer used in the polymerization zone 341 is greater than the amount of comonomer used in the polymerization zone 321. Stated another way, the amount of comonomer used in the downcomer 340 of the MZCR 300 is greater than the amount of comonomer used in the riser 320 of the MZCR 300.

In an aspect, the amount of hydrogen used in the polymerization zone 321 is greater than the amount of hydrogen used in the polymerization zone 341. Stated another way, the amount of hydrogen used in the riser 320 of the MZCR 300 is greater than the amount of hydrogen used in the downcomer 340 of the MZCR 300.

In an aspect, any of polyethylene resins A, B, C, D, or E can have an $\eta_{251}$ (eta_251) of less than about $1.5 \times 10^3$ Pa-s.

In an aspect, the first reactor 100 that produces the LMW component of any of polyethylene resins A, B, C, D, or E can be a gas phase reactor (also referred to as fluidized bed reactor). Stated another way, the polymerization zone 112 that produces the LMW component of any of polyethylene resins A, B, C, D, or E can be a gas phase reaction zone (also referred to as fluidized bed reaction zone).

In an aspect, the polymerization zone 321 of the MZCR 300 that produces the IMW component of any of polyethylene resins A, B, C, D, or E is a fast fluidization reaction zone. Stated another way, the polymerization zone 321 of the MZCR 300 that produces the IMW component of any of polyethylene resins A, B, C, D, or E operates under fast fluidization conditions. Stated another way, the riser 320 of the MZCR 300 that produces the IMW component of any of polyethylene resins A, B, C, D, or E operates under fast fluidization conditions.

In an aspect, the polymerization zone 341 of the MZCR 300 that produces the HMW component of any of polyethylene resins A, B, C, D, or E is a plug flow reaction zone. Stated another way, the polymerization zone 341 of the MZCR 300 that produces the HMW component of any of polyethylene resins A, B, C, D, or E operates under plug flow conditions. Stated another way, the downcomer 340 of the MZCR 300 that produces the HMW component of any of polyethylene resins A, B, C, D, or E operates under plug flow conditions.

ADDITIONAL ASPECTS

Apparatuses and processes for multiple reactor and multiple zone polyolefin polymerization have been described. Described below are process A, process B, process C, process D, apparatus A, apparatus B, apparatus C, apparatus D, polyethylene resin A, polyethylene resin B, polyethylene resin C, polyethylene resin D, polyethylene resin E and polyethylene resin F.

A first aspect of process A, which is a process for producing a multimodal polyolefin, is that process A comprises (a) polymerizing ethylene in a first reactor to produce a first polyolefin, (b) polymerizing ethylene in a first reaction mixture in a riser of a second reactor to produce a second polyolefin, (c) passing the first reaction mixture through an upper conduit from the riser to a separator, (d) recovering, in the separator, the second polyolefin from the first reaction mixture, (e) passing the second polyolefin from the separator into a downcomer of the second reactor, optionally via a liquid barrier, (f) polymerizing ethylene in a second reaction mixture in the downcomer to produce a third polyolefin, (g) passing the second reaction mixture through a lower conduit from the downcomer to the riser, and (h) one of (1) after step (a) and before steps (b)-(g), receiving the first polyolefin into the second reactor, or (2) before step (a) and after steps (b)-(g), receiving the second polyolefin and the third polyolefin into the first reactor.

In a second aspect of process A which can be used in combination with the first aspect of process A, the riser has a width-to-height ratio of less than about 0.1.

In a third aspect of process A which can be used in combination with any of the first to the second aspects of process A, the downcomer has a width-to-height ratio of less than about 0.1.

In a fourth aspect of process A which can be used in combination with any of the first to the third aspects of process A, the upper conduit has a length-to-diameter ratio of about 5 to about 20.

In a fifth aspect of process A which can be used in combination with any of the first to the fourth aspects of process A, the lower conduit has a length-to-diameter ratio of about 5 to about 20.

In a sixth aspect of process A which can be used in combination with any of the first to the fifth aspects of process A, process A further comprises adding or removing heat from the riser.

In a seventh aspect of process A which can be used in combination with any of the first to the sixth aspects of process A, process A further comprises adding or removing heat from the downcomer.

In an eighth aspect of process A which can be used in combination with any of the first to the seventh aspects of process A, the second reactor further comprises a transition conduit fluidly connected to the end of the lower conduit.

In a ninth aspect of process A which can be used in combination with the eighth aspect of process A, an angle of the transition conduit with respect to horizontal is less than about 90°.

In a tenth aspect of process A which can be used in combination with any of the eighth through the ninth aspects of process A, a length of the transition conduit is from about 6 feet to about 15 feet.

In an eleventh aspect of process A which can be used in combination with any of the eighth through the tenth aspects of process A, the second reactor further comprises a first elbow connector connected to a bottom portion of the riser and to an end of the lower conduit, and a second elbow connector connected to a top portion of the riser and to an end of the upper conduit, an a tee connector having a first connecting portion connected a bottom section of the downcomer, a second connecting portion connected to the lower conduit, and a third end connected to an end of the transition conduit, wherein a first angle between the first end and the second end is equal to or less than about 90° and a second angle between the second end and the third end is equal to or greater than 90°.

In a twelfth aspect of process A which can be used in combination with any of the first to the eleventh aspects of process A, the second reactor further comprises a first elbow connector connected to a bottom portion of the riser and to an end of the lower conduit, and a second elbow connector connected to a top portion of the riser and to an end of the upper conduit, and a third elbow connector connected to a bottom portion of the downcomer and to another end of the lower conduit.

In a thirteen aspect of process A which can be used in combination with the twelfth aspect of process A, at least one of the first, the second, or the third elbow connector has an inner diameter (d) and a radius ($R_c$) of an inner curvature, and process A further comprises maintaining, by at least one of the first, the second, or the third elbow, a Dean number ($D_n$) of the first or second reaction mixture flowing therein to be higher than 3,000,000, where $D_n = \rho V d/\mu * (d/2R_c)^{1/2}$ and wherein $\rho$ is a density of the first or second reaction mixture, V is a circulation velocity of the first or second reaction mixture, and $\mu$ is a dynamic viscosity of the first or second reaction mixture.

In a fourteenth aspect of process A which can be used in combination with any of the first to the thirteen aspects of process A, process A further comprises an elbow connector connected i) to the bottom portion of the riser and to the opposite end of the lower conduit, ii) to the top portion of the riser and to the end of the upper conduit, or iii) to the bottom portion of the downcomer and to the end of the lower conduit, wherein the elbow connector comprises a first tap on an outside radius of the elbow connector, a second tap on an inside radius of the elbow connector, a first sensing leg coupling the first tap to a differential pressure meter, and a second sensing leg coupling the second tap to the differential pressure meter.

In a fifteenth aspect of process A which can be used in combination with any of the first to the fourteenth aspects of process A, the second reactor has an internal surface which is polished to a root mean square of less than about 3.8 microns (150 microinches).

In a sixteenth aspect of process A which can be used in combination with any of the first to the fifteenth aspects of process A, an internal surface of the first reactor or an internal surface of the second reactor has a rust inhibitor coating.

In a seventeenth aspect of process A which can be used in combination with any of the first to the sixteenth aspects of process A, at least a portion of the first reactor or at least a portion of the second reactor is made of carbon steel, stainless steel, or a combination thereof.

In an eighteenth aspect of process A which can be used in combination with any of the first to the seventeenth aspects of process A, at least a portion of the first reactor or at least a portion of the second reactor is made of carbon steel, wherein the carbon steel is a low temperature carbon steel.

In a nineteenth aspect of process A which can be used in combination with any of the first to the eighteenth aspects of process A, one or more thermowells are located on the second reactor.

In a twentieth aspect of process A which can be used in combination with any of the first to the nineteenth aspects of process A, the second reactor further comprises an eductor or a standpipe coupled to the lower conduit or to a transition conduit fluidly connected to an end of the lower conduit.

In a twenty-first aspect of process A which can be used in combination with any of the first to the twentieth aspects of process A, the second reactor further comprises a gas density meter configured to measure a density of the first reaction mixture in the riser.

In a twenty-second aspect of process A which can be used in combination with any of the first to the twenty-first aspects of process A, the first polyolefin is a lower molecular weight polyethylene, the third polyolefin is a higher molecular weight polyethylene.

In a twenty-third aspect of process A which can be used in combination with the twenty-second aspect of process A, the second polyolefin has an average molecular weight greater ($M_w$, $M_n$, or $M_w$) than an average molecular weight ($M_w$, $M_n$, or $M_w$) of the first polyolefin and less than an average molecular weight of the third polyolefin.

In a twenty-fourth aspect of process A which can be used in combination with any of the first to the twenty-third aspects of process A, from about 20 to about 80 wt. % of the multimodal polyolefin comprises the first polyolefin and from about 80 to about 20 wt. % of the multimodal polyolefin comprises the second polyolefin and the third polyolefin.

In a twenty-fifth aspect of process A which can be used in combination with any of the first to the twenty-fourth aspects of process A, the multimodal polyolefin has a density in a range of from about 0.930 to about 0.970 g/ml when tested in accordance with ASTM D1505, a melt index in a range of from about 0.1 to about 30 g/10 min when tested in accordance with ASTM D1238 under a force of 2.16 kg and a temperature of 190° C., a comonomer content in a range of from 0 to about 6 wt. %, and a $M_w$ in a range of from about 250 to about 1,500 kg/mol.

In a twenty-sixth aspect of process A which can be used in combination with the twenty-fifth aspect of process A, the multimodal polyolefin has a high load melt index of from about 1 to about 45 g/10 min when tested in accordance with ASTM D1238 under a force of 21.6 kg and a temperature of 190° C., a $M_z$ in a range of from about 500 to about 5,000 kg/mol, a $M_w/Mn$ in a range of from about 18 to about 52, a long chain branching index in a range of from 0 to about 0.96, and a shear induced crystallization (SIC) index in a range of from about 0.15 to about 8.

In a twenty-seventh aspect of process A which can be used in combination with any of the first to the twenty-sixth aspects of process A, the first reactor is a loop slurry reactor, a fluidized bed reactor, an autoclave reactor, a tubular reactor, a horizontal gas phase reactor, a continuous stirred-tank reactor, or a solution reactor.

A first aspect of process B, which is a process for producing a multimodal polyolefin, is that process B comprises (a) polymerizing ethylene in a first reactor to produce a first polyolefin, (b) polymerizing ethylene in a first reaction mixture in a riser of a second reactor to produce a second polyolefin contained in a riser product mixture, (c) passing the riser product mixture through an upper conduit from the riser to a separator, (d) recovering, in the separator, the second polyolefin from the riser product mixture, (e) passing the second polyolefin from the separator into a downcomer of the second reactor, optionally via a liquid barrier, (f) polymerizing ethylene in a second reaction mixture in the downcomer to produce a third polyolefin in a downcomer product mixture, (g) passing the downcomer product mixture through a lower conduit from the downcomer to the riser, and (h) one of (1) after step (a) and before steps (b)-(g), receiving the first polyolefin into the second reactor, or (2) before step (a) and after steps (b)-(g), receiving the second polyolefin and the third polyolefin into the first reactor.

In a second aspect of process B which can be used in combination with the first aspect of process B, process B further comprises discharging a portion of the downcomer product mixture containing the multimodal polyolefin from the downcomer of the second reactor.

In a third aspect of process B which can be used in combination with any of the first to the second aspects of process B, the downcomer product mixture is discharged through a product discharge conduit that is fluidly connected to the downcomer i) on a bottom half of the downcomer or ii) on or near a bottom tangent of the downcomer, wherein the product discharge conduit is fluidly connected to a continuous take-off valve or a discontinuous take-off valve.

In a fourth aspect of process B which can be used in combination with any of the first to the third aspects of process B, the product discharge conduit is connected to the downcomer such that an angle of the product discharge conduit with respect to horizontal is from about −60° to about 60°.

In a fifth aspect of process B which can be used in combination with any of the first to the fourth aspects of process B, process B further comprises passing the portion of the downcomer product mixture through a heater, wherein the heater is coupled to the product discharge conduit.

In a sixth aspect of process B which can be used in combination with the fifth aspect of process B, process B further comprises adding a catalyst or cocatalyst poison or deactivator to the downcomer product mixture in or upstream of the heater.

In a seventh aspect of process B which can be used in combination with any of the first to the sixth aspects of process B, process B further comprises discharging a polymer product in the downcomer product mixture from the heater at a temperature i) of from about 54.4° C. (130° F.) to about 104.4° C. (220° F.), or ii) below a melting point of the polymer product.

In an eighth aspect of process B which can be used in combination with any of the first to the seventh aspects of process B, process B further comprises receiving the downcomer product mixture from the heater into a separation vessel, and separating, in the separation vessel, the downcomer product mixture into a plurality of streams, each of the plurality of streams comprising a vapor, a polymer product, or both the vapor and the polymer product.

In a ninth aspect of process B which can be used in combination with the eighth aspect of process B, process B further comprises recovering one or more of an olefin monomer, an olefin comonomer, and a diluent from at least one of the plurality of streams comprising the vapor, and recycling one or more of the olefin monomer, the olefin comonomer, and the diluent to the first reactor, the second reactor, or both the first reactor and the second reactor.

In a tenth aspect of process B which can be used in combination with any of the first to the seventh aspects of process B, process B further comprises receiving the polymer product from the separation vessel into a degassing vessel, and removing, in the degassing vessel, at least a portion of a hydrocarbon entrained within the polymer product.

In an eleventh aspect of process B which can be used in combination with any of the first to the tenth aspects of process B, process B further comprises discharging a product mixture containing the multimodal polyolefin from the first reactor.

In a twelfth aspect of process B which can be used in combination with the eleventh aspect of process B, the product mixture is discharged through a product discharge conduit that is fluidly connected to the first reactor, wherein the product discharge conduit is fluidly connected to a continuous take-off valve or a discontinuous take-off valve.

In a thirteenth aspect of process B which can be used in combination with the twelfth aspect of process B, the product discharge conduit is connected to the first reactor such that an angle of the product discharge conduit with respect to horizontal is from about −600° to 60°.

In a fourteenth aspect of process B which can be used in combination with any of the first to the thirteenth aspects of process B, process B further comprises passing the product mixture through a heater, wherein the heater is coupled to the product discharge conduit.

In a fifteenth aspect of process B which can be used in combination with the fourteenth aspect of process B, process B further comprises adding a catalyst or cocatalyst poison or deactivator to the downcomer product mixture in or upstream of the heater.

In a sixteenth aspect of process B which can be used in combination with any of the first to the fifteenth aspects of process B, process B further comprises discharging a polymer product in the product mixture from the heater at a temperature i) of from about 54.4° C. (130° F.) to about 104.4° C. (220° F.), or ii) below a melting point of the polymer product.

In a seventeenth aspect of process B which can be used in combination with any of the first to the fifteenth aspects of process B, process B further comprises receiving the product mixture from the heater into a separation vessel, and separating, in the separation vessel, the product mixture into a plurality of streams, each of the plurality of streams comprising a vapor, a polymer product, or both the vapor and the polymer product.

In an eighteenth aspect of process B which can be used in combination with the seventeenth aspect of process B, process B further comprises recovering one or more of an olefin monomer, an olefin comonomer, and a diluent from at least one of the plurality of streams comprising the vapor, and recycling one or more of the olefin monomer, the olefin comonomer, and the diluent to the first reactor, the second reactor, or both the first reactor and the second reactor.

In a nineteenth aspect of process B which can be used in combination with any of the first to the eighteenth aspects of process B, process B further comprises receiving the polymer product from the separation vessel into a degassing vessel, and removing, in the degassing vessel, at least a portion of a hydrocarbon entrained within the polymer product.

In a twentieth aspect of process B which can be used in combination with any of the first to the nineteenth aspects of process B, the separator comprises a cyclone separator.

In a twenty-first aspect of process B which can be used in combination with the twentieth aspect of process B, the cyclone separator is a high efficiency cyclone separator, and process B further comprises separating, by the cyclone separator, 99 wt. % or more of solid particles in a riser product mixture from gas in the riser product mixture, wherein the solid particles have a size of about from about 2 µm to about 10 µm.

In a twenty-second aspect of process B which can be used in combination with any of the first to the twenty-first aspects of process B, the cyclone separator has a cone angle with respect to horizontal of from about 45° to about 80°.

In a twenty-third aspect of process B which can be used in combination with any of the first to the twenty-second aspects of process B, the cyclone separator has a tangential entrance angle of from 0° to about 15°.

In a twenty-fourth aspect of process B which can be used in combination with any of the first to the twenty-third aspects of process B, wherein the riser product mixture in step (c) is passed into a tangential entrance of the separator at a tangential entrance velocity of from about 15.24 m/s (50 ft/sec) to about 30.48 m/s (100 ft/sec).

In a twenty-fifth aspect of process B which can be used in combination with any of the first to the twenty-fourth aspects of process B, an angle with respect to horizontal of an opposite end of the upper conduit which fluidly connects to the cyclone separator is about 0° to about 15°.

In a twenty-sixth aspect of process B which can be used in combination with any of the first to the twenty-fifth aspects of process B, an opposite end of the upper conduit connects to the cyclone separator at a location of from about 0 m (0 ft) to about 6.10 m (20 ft) below a top of the cyclone separator.

In a twenty-seventh aspect of process B which can be used in combination with any of the first to the twenty-sixth aspects of process B, process B further comprises adding a reactor deactivation system to the second reactor, wherein the reactor deactivation system is configured to moderate or kill polymerization reactions in the riser, the downcomer, or both the riser and the downcomer.

In a twenty-eighth aspect of process B which can be used in combination with any of the first to the twenty-seventh aspects of process B, the separator comprises a flash tank or a flash chamber.

In a twenty-ninth aspect of process B which can be used in combination with any of the first to the twenty-eighth aspects of process B, the first polyolefin is a lower molecular weight polyethylene, the third polyolefin is a higher molecular weight polyethylene.

In a thirtieth aspect of process B which can be used in combination with the twenty-ninth aspect of process B, the second polyolefin has an average molecular weight ($M_v$, $M_n$, or $M_w$) greater than an average molecular weight ($M_v$, $M_n$, or $M_w$) of the first polyolefin and less than an average molecular weight of the third polyolefin.

In a thirty-first aspect of process B which can be used in combination with any of the first to the thirtieth aspects of process B, the first reactor is a loop slurry reactor, a fluidized bed reactor, an autoclave reactor, a tubular reactor, a horizontal gas phase reactor, a continuous stirred-tank reactor, or a solution reactor.

In a thirty-second aspect of process B which can be used in combination with any of the first to the thirty-first aspects of process B, wherein from about 20 to about 80 wt. % of the multimodal polyolefin comprises the first polyolefin and from about 80 to about 20 wt. % of the multimodal polyolefin comprises the second polyolefin and the third polyolefin.

In a thirty-third aspect of process B which can be used in combination with any of the first to the thirty-second aspects of process B, the multimodal polyolefin has a density in a range of from about 0.930 to about 0.970 g/ml, a melt index in a range of from about 0.1 to about 30 g/10 min when tested in accordance with ASTM D1238 under a force of 2.16 kg and a temperature of 190° C., a comonomer content in a range of from 0 to about 6 wt. %, and a $M_w$ in a range of from about 250 to about 1,500 kg/mol.

In a thirty-fourth aspect of process B which can be used in combination with the thirty-third aspect of process B, the multimodal polyolefin has a high load melt index of from about 1 to about 45 g/10 min when tested in accordance with ASTM D1238 under a force of 21.6 kg and a temperature of 190° C., a $M_z$ in a range of from about 500 to about 5,000 kg/mol, a $M_w/M_n$ in a range of from about 18 to about 52, a long chain branching index in a range of from 0 to about 0.96, and a shear induced crystallization (SIC) index in a range of from about 0.15 from about 8.

A first aspect of process C, which is a process for producing a multimodal polyolefin, performed with i) a first reactor having a first polymerization zone, and ii) a second reactor having a second polymerization zone in a riser and a third polymerization zone in a downcomer, is that process C comprises (a) polymerizing ethylene in the first polymerization zone to produce a first polyolefin, (b) passing a first reaction mixture upward through the second polymerization zone of the riser, wherein a second polyolefin is produced in the second polymerization zone, (c) receiving the first reaction mixture from the second polymerization zone in a separator, (d) separating, by the separator, a first polyolefin product from the received first reaction mixture, (e) passing the first polyolefin product through a barrier section of the second reactor and into the third polymerization zone, (f) adding, in the third polymerization zone, the first polyolefin product to a second reaction mixture, (g) passing the second reaction mixture downward through the third polymerization zone of the downcomer, wherein a third polyolefin is produced in the third polymerization zone, (h) repeating steps (b)-(g) n times, wherein n=1 to 100,000 and (i) one of 1) adding the first polyolefin to the second reactor at a location upstream of the second polymerization zone with respect to a direction of flow of the first reaction mixture in the second polymerization zone, and withdrawing the multimodal polyolefin from the downcomer, or 2) withdrawing a portion of a second polyolefin product from the second reactor, adding the portion of the second polyolefin product to the first polymerization zone of the first reactor, and withdrawing the multimodal polyolefin from the first reactor.

In a second aspect of process C which can be used in combination with the first aspect of process C, a gas composition of the second reaction mixture is different than a gas composition of the third reaction mixture.

In a third aspect of process C which can be used in combination with any of the first to the second aspects of process C, the gas composition of the second reaction mixture comprises at least two selected from monomer, diluent, and a catalyst.

In a fourth aspect of process C which can be used in combination with any of the first to the third aspects of process C, the gas composition of the third reaction mixture comprises at least two selected from hydrogen, monomer, comonomer, diluent, and a catalyst.

In a fifth aspect of process C which can be used in combination with any of the first to the fourth aspects of process C, wherein the barrier section is a liquid barrier comprising an inert liquid, wherein a concentration of the inert liquid in the liquid barrier is greater than a concentration of the inert liquid in the second polymerization zone and in the third polymerization zone.

In a sixth aspect of process C which can be used in combination with any of the first to the fifth aspects of process C, process C further comprises injecting comonomer into the third polymerization zone via one or more locations in the downcomer, wherein the third polyolefin is a copolymer.

In a seventh aspect of process C which can be used in combination with any of the first to the sixth aspects of process C, process C further comprises injecting an anti-static agent into one or more locations of the second reactor.

In an eighth aspect of process C which can be used in combination with the seventh aspect of process C, the step of injecting an anti-static agent comprises injecting a mixture comprising the anti-static agent and a carrier fluid into the one or more locations via one or more anti-static agent feed lines, wherein a concentration of the anti-static agent in each of the one or more anti-static agent feed lines is about 1 ppm to about 50 ppm based on weight of the carrier fluid in each of the one or more anti-static agent feed lines.

In a ninth aspect of process C which can be used in combination with any of the first to the eighth aspects of process C, a concentration of the anti-static agent in the second reactor is about 1 ppm to about 50 ppm based on weight of the carrier fluid in the second reactor.

In a tenth aspect of process C which can be used in combination with any of the first to the ninth aspects of process C, after passing the first reaction mixture upward through the second polymerization zone of the riser and before receiving the first reaction mixture in the separator, the process further comprises flowing the first reaction mixture through an upper conduit that fluidly connects the riser and the separator, wherein the first reaction mixture flows in the upper conduit at a velocity that is i) greater than a saltation velocity of the first reaction mixture and up to about 30.48 m/s (100 ft/sec), or ii) greater than 110% of the saltation velocity of the first reaction mixture.

In an eleventh aspect of process C which can be used in combination with any of the first to the tenth aspects of process C, after passing the second reaction mixture downward through the third polymerization zone of the downcomer, the process further comprises flowing the second reaction mixture through a lower conduit that fluidly connects the downcomer and the riser, wherein the second reaction mixture flows in the lower conduit at a velocity that is i) greater than a saltation velocity of the second reaction mixture and up to about 30.48 m/s (100 ft/sec), or ii) greater than 110% of the saltation velocity of the second reaction mixture.

In a twelfth aspect of process C which can be used in combination with any of the first to the eleventh aspects of process C, process C further comprises analyzing a sample of the first reaction mixture or the second reaction mixture at one or more locations in the second reactor to determine a concentration of gas, liquid, or solid in the first reaction mixture or the second reaction mixture, and to determine a concentration of monomer, comonomer, diluent, hydrogen, inert component, or polymer in the first reaction mixture or the second reaction mixture.

In a thirteenth aspect of process C which can be used in combination with any of the first to the twelfth aspects of process C, process C further comprises controlling a level of the first polyolefin product in the separator such that the first polyolefin product has a residence time of about 1 second to about 30 minutes in the separator.

In a fourteenth aspect of process C which can be used in combination with any of the first to the thirteenth aspects of process C, from about 20 to about 80 wt. % of the multimodal polyolefin comprises the first polyolefin and from about 80 to about 20 wt. % of the multimodal polyolefin comprises the second polyolefin and the third polyolefin.

In a fifteenth aspect of process C which can be used in combination with any of the first to the fourteenth aspects of process C, the multimodal polyolefin has a density in a range of from about 0.930 to about 0.970 g/ml when tested in accordance with ASTM D1505, a melt index in a range of from about 0.1 to about 30 g/10 min when tested in accordance with ASTM D1238 under a force of 2.16 kg and a temperature of 190° C., a comonomer content in a range of from about 0 to about 6 wt. %, and a $M_w$ in a range of from about 250 to about 1,500 kg/mol.

In a sixteenth aspect of process C which can be used in combination with the fifteenth aspect of process C, the multimodal polyolefin has a high load melt index of from about 1 to about 45 g/10 min when tested in accordance with ASTM D1238 under a force of 21.6 kg and a temperature of 190° C., a $M_z$ in a range of from about 500 to about 5,000 kg/mol, a Mw/Mn in a range of from about 18 to about 52, a long chain branching index in a range of from 0 to about 0.96, and a shear induced crystallization (SIC) index in a range of from about 0.15 to about 8.

In a seventeenth aspect of process C which can be used in combination with any of the first to the sixteenth aspects of process C, the first polymerization zone is in a loop slurry reactor, a fluidized bed reactor, an autoclave reactor, a tubular reactor, a horizontal gas phase reactor, a continuous stirred-tank reactor, or a solution reactor.

In an eighteenth aspect of process C which can be used in combination with any of the first to the seventeenth aspects of process C, the $M_w$ of the first polyolefin and the $M_w$ of the third polyolefin differ by an amount of greater than 10%, wherein step (b) comprises passing the first reaction mixture upward through the second polymerization zone of the riser such that an average residence time of the first reaction mixture in the second polymerization zone during a single pass is in a range of about 1 second to about 5 minutes.

In a nineteenth aspect of process C which can be used in combination with any of the fifteenth aspect or the eighteenth aspect of process C, the $M_w$ of the first polyolefin and the $M_w$ of the third polyolefin differ by an amount of greater than 10%, wherein step (g) comprises passing the second reaction mixture downward through the third polymerization zone of the downcomer such that an average residence time of the second reaction mixture in the third polymerization zone during a single pass is in a range of about 5 seconds to about 15 minutes.

In a twentieth aspect of process C which can be used in combination with any of the eighteenth aspect or the nineteenth aspect of process C, step (a) comprises polymerizing the first polyolefin in the first polymerization zone such that an average residence time of the first polyolefin in the first polymerization zone is in a range of about 1 second to about 14 hours; alternatively, about 1 second to about 12 hours; alternatively, about 1 second to about 10 hours; alternatively, about 1 second to about 8 hours; alternatively, about 2 hours to about 14 hours; alternatively, about 4 hours to about 14 hours; alternatively, about 4 hours to about 12 hours; alternatively, from about 1 hour to about 3 hours; alternatively, about 1 second to about 5 minutes; alternatively, less than 10 hours; alternatively, greater than 1 hour.

A first aspect of process D, which is a process for producing a multimodal polyolefin, is that process D comprises (a) polymerizing ethylene in a first reactor to produce a first polyolefin, (b) polymerizing ethylene in a first reaction mixture in a riser of a second reactor to produce a second polyolefin, (c) passing the first reaction mixture through an upper conduit from the riser to a separator, (d) recovering, in the separator, the second polyolefin from the first reaction mixture, (e) passing the second polyolefin from the separator into a downcomer of the second reactor, optionally via a liquid barrier, (f) polymerizing ethylene in a second reaction mixture in the downcomer to produce a third polyolefin, (g) passing the second reaction mixture through a lower conduit from the downcomer to the riser, and (h) one of (1) after step (a) and before steps (b)-(g), receiving the first polyolefin from the first reactor into the second reactor; or (2) before step (a) and after steps (b)-(g), receiving the second polyolefin and the third polyolefin from the second reactor into the first reactor.

In a second aspect of process D which can be used in combination with the first aspect of process D, the first reactor is a fluidized bed reactor, wherein receiving the first polyolefin from the first reactor into the second reactor comprises receiving the first polyolefin into a settling leg placed at least partially within a bottom portion of the fluidized bed reactor, wherein an end of the settling leg opens to the gas distributor and an opposite end extends outside the fluidized bed reactor.

In a third aspect of process D which can be used in combination with any of the first to the second aspects of process D, the settling leg has an inner diameter of from about 10.16 cm (4 inches) to about 30.48 cm (12 inches).

In a fourth aspect of process D which can be used in combination with any of the first to the third aspects of process D, process D further comprises receiving the first polyolefin and a gas mixture from the settling leg into a separation vessel, separating, by the separation vessel, the first polyolefin from a gas mixture, and treating the gas mixture, wherein the step of treating comprises a flaring a component of the gas mixture, capturing a component of the gas mixture in a pressure swing absorber, filtering a component of the gas mixture in a membrane, or a combination thereof.

In a fifth aspect of process D which can be used in combination with any of the first to the fourth aspects of process D, process D further comprises analyzing a sample of the first polyolefin obtain via a sample take-off conduit fluidly connected to the settling leg.

In a sixth aspect of process D which can be used in combination with any of the first to the fifth aspects of process D, the first reactor is a fluidized bed reactor, wherein receiving the first polyolefin from the first reactor into the second reactor comprises flowing the first polyolefin and a gas mixture from the fluidized bed reactor into a lock hopper via a product discharge conduit and a first cycling valve.

In a seventh aspect of process D which can be used in combination with the sixth aspect of process D, process D further comprises flowing the first polyolefin and the gas mixture from the lock hopper to a separation vessel via a second cycling valve, separating the first polyolefin from the gas mixture, and treating the gas mixture, wherein the step of treating comprises a flaring a component of the gas mixture, capturing a component of the gas mixture in a pressure swing absorber, filtering a component of the gas mixture in a membrane, or a combination thereof.

In an eighth aspect of process D which can be used in combination with any of the first to the seventh aspects of process D, process D further comprises analyzing a sample of the first polyolefin obtain via a sample take-off conduit fluidly connected to the product discharge conduit.

In a ninth aspect of process D which can be used in combination with any of the first to the eighth aspects of process D, the first reactor is a fluidized bed reactor, wherein receiving the first polyolefin from the first reactor into the second reactor comprises controlling a flow of the first polyolefin in a product discharge conduit fluidly connected to the fluidized bed reactor with a continuous take-off valve fluidly connected to the product discharge conduit.

In a tenth aspect of process D which can be used in combination with the ninth aspect of process D, process D further comprises receiving the first polyolefin and a gas mixture into a separation vessel coupled to the continuous take-off valve, separating, by the separation vessel, the first polyolefin from the gas mixture, and treating the gas mixture, wherein the step of treating comprises a flaring a component of the gas mixture, capturing a component of the gas mixture in a pressure swing absorber, filtering a component of the gas mixture in a membrane, or a combination thereof.

In an eleventh aspect of process D which can be used in combination with any of the first to the tenth aspects of process D, process D further comprises analyzing a sample of the first polyolefin obtain via a sample take-off conduit fluidly connected to the product discharge conduit.

In a twelfth aspect of process D which can be used in combination with any of the first to the eleventh aspects of process D, the first reactor is a fluidized bed reactor, wherein the second polyolefin and the third polyolefin from the second reactor are received into the first reactor, and process D further comprises receiving the multimodal polyolefin into a settling leg placed at least partially within a bottom portion of the fluidized bed reactor, wherein an end of the settling leg opens to the gas distributor and an opposite end extends outside the fluidized bed reactor.

In a thirteenth aspect of process D which can be used in combination with the twelfth aspect of process D, the settling leg has an inner diameter of from about 10.16 cm (4 inches) to about 30.48 cm (12 inches).

In a fourteenth aspect of process D which can be used in combination with any of the first to the thirteen aspects of process D, process D further comprises receiving the multimodal polyolefin and a gas mixture in a separation vessel coupled to the settling leg, separating, by the separation vessel, the multimodal polyolefin from the gas mixture, and treating the gas mixture, wherein the step of treating comprises a flaring a component of the gas mixture, capturing a component of the gas mixture in a pressure swing absorber, filtering a component of the gas mixture in a membrane, or a combination thereof.

In a fifteenth aspect of process D which can be used in combination with any of the first to the fourteenth aspects of process D, process D further comprises analyzing a sample of the multimodal polyolefin obtain via a sample take-off conduit fluidly connected to the product discharge conduit.

In a sixteenth aspect of process D which can be used in combination with any of the first to the fifteen aspects of process D, the first reactor is a fluidized bed reactor, wherein the second polyolefin and the third polyolefin from the second reactor are received into the first reactor, and process D further comprises flowing the multimodal polyolefin and a gas mixture from the fluidized bed reactor into a lock hopper via a product discharge conduit and a first cycling valve.

In a seventeenth aspect of process D which can be used in combination with the sixteenth aspect of process D, process D further comprises flowing the multimodal polyolefin and the gas mixture from the lock hopper to a separation vessel via a second cycling valve, separating the multimodal polyolefin from the gas mixture, and treating the gas mixture, wherein the step of treating comprises a flaring a component of the gas mixture, capturing a component of the gas mixture in a pressure swing absorber, filtering a component of the gas mixture in a membrane, or a combination thereof.

In an eighteenth aspect of process D which can be used in combination with any of the first to the seventeenth aspects of process D, process D further comprises analyzing a sample of the multimodal polyolefin obtain via a sample take-off conduit fluidly connected to the product discharge conduit.

In a nineteenth aspect of process D which can be used in combination with any of the first to the eighteenth aspects of process D, the first reactor is a fluidized bed reactor, wherein the second polyolefin and the third polyolefin from the second reactor are received into the first reactor, and process D further comprises controlling a flow of the multimodal polyolefin in a product discharge conduit fluidly connected to the fluidized bed reactor with a continuous take-off valve fluidly connected to the product discharge conduit.

In a twentieth aspect of process D which can be used in combination with the nineteenth aspect of process D, process D further comprises receiving the multimodal polyolefin and a gas mixture into a separation vessel coupled to the continuous take-off valve, separating, by the separation vessel, the multimodal polyolefin from the gas mixture, and treating the gas mixture, wherein the step of treating comprises a flaring a component of the gas mixture, capturing a component of the gas mixture in a pressure swing absorber, filtering a component of the gas mixture in a membrane, or a combination thereof.

In a twenty-first aspect of process D which can be used in combination with any of the first to the twentieth aspects of process D, process D further comprises analyzing a sample of the multimodal polyolefin obtain via a sample take-off conduit fluidly connected to the product discharge conduit.

In a twenty-second aspect of process D which can be used in combination with any of the first to the twenty-first aspects of process D, the first polyolefin is a lower molecular weight polyethylene, the third polyolefin is a higher molecular weight polyethylene.

In a twenty-third aspect of process D which can be used in combination with the twenty-second aspect of process D, the second polyolefin has an average molecular weight ($M_w$, $M_n$, or $M_w$) greater than an average molecular weight ($M_v$, $M_n$, or $M_w$) of the first polyolefin and less than an average molecular weight of the third polyolefin.

In a twenty-fourth aspect of process D which can be used in combination with any of the first to the twenty-third aspects of process D, from about 20 to about 80 wt. % of the multimodal polyolefin comprises the first polyolefin and from about 80 to about 20 wt. % of the multimodal polyolefin comprises the second polyolefin and the third polyolefin.

In a twenty-fifth aspect of process D which can be used in combination with any of the first to the twenty-fourth aspects of process D, the multimodal polyolefin has a density in a range of from about 0.930 to about 0.970 g/ml when tested in accordance with ASTM D1505, a melt index in a range of from about 0.1 to about 30 g/10 min when tested in accordance with ASTM D1238 under a force of 2.16 kg and a temperature of 190° C., a comonomer content in a range of from 0 to about 6 wt. %, and a $M_w$ in a range of from about 250 to about 1,500 kg/mol.

In a twenty-sixth aspect of process D which can be used in combination with the twenty-fifth aspect of process D, the multimodal polyolefin has a high load melt index of from about 1 to about 45 g/10 min when tested in accordance with ASTM D1238 under a force of 21.6 kg and a temperature of 190° C., a $M_z$ in a range of from about 500 to about 5,000 kg/mol, a Mw/Mn in a range of from about 18 to about 52, a long chain branching index in a range of from 0 to about 0.96, and a shear induced crystallization (SIC) index in a range of from about 0.15 to about 8.

In a twenty-seventh aspect of process D which can be used in combination with any of the first to the twenty-sixth aspects of process D, the first reactor is a loop slurry reactor, a fluidized bed reactor, an autoclave reactor, a tubular reactor, a horizontal gas phase reactor, a continuous stirred-tank reactor, or a solution reactor.

A first aspect of apparatus A which is an apparatus for producing a multimodal polyolefin, comprising a first reactor configured to produce a first polyolefin, a second reactor configured to produce a second polyolefin and a third polyolefin, where the second reactor comprises a riser configured to produce the second polyolefin, an upper conduit having an end fluidly connected to a top portion of the riser, a separator fluidly connected to an opposite end of the upper conduit, a downcomer configured to produce the third polyolefin, wherein a top portion of the downcomer is fluidly connected to the separator, optionally via a liquid barrier in the top portion of the downcomer, and a lower conduit having an end fluidly connected to a bottom portion of the downcomer and an opposite end fluidly connected to a bottom portion of the riser, wherein the second reactor is configured to receive the first polyolefin from the first reactor, or, the first reactor is configured to receive the second polyolefin and the third polyolefin from the second reactor.

In a second aspect of apparatus A which can be used in combination with the first aspect of apparatus A, the riser has a width-to-height ratio of less than about 0.1.

In a third aspect of apparatus A which can be used in combination with any of the first to the second aspects of apparatus A, the downcomer has a width-to-height ratio of less than about 0.1.

In a fourth aspect of apparatus A which can be used in combination with any of the first to the third aspects of apparatus A, the upper conduit has a length-to-diameter ratio of about 5 to about 20.

In a fifth aspect of apparatus A which can be used in combination with any of the first to the fourth aspects of apparatus A, the lower conduit has a length-to-diameter ratio of about 5 to about 20.

In a sixth aspect of apparatus A which can be used in combination with any of the first to the fifth aspects of apparatus A, apparatus A further comprises a heat apparatus configured to add or remove heat from the riser.

In a seventh aspect of apparatus A which can be used in combination with any of the first to the sixth aspects of apparatus A, apparatus A further comprises a heat apparatus configured to add or remove heat from the downcomer.

In an eighth aspect of apparatus A which can be used in combination with any of the first to the fourth aspects of apparatus A, the second reactor further comprises a transition conduit fluidly connected to the end of the lower conduit.

In a ninth aspect of apparatus A which can be used in combination with the eighth aspect of apparatus A, an angle of the transition conduit with respect to horizontal is less than about 90°.

In a tenth aspect of apparatus A which can be used in combination with any of the first to the ninth aspects of apparatus A, a length of the transition conduit is from about 6 feet to about 15 feet.

In an eleventh aspect of apparatus A which can be used in combination with any of the first to the tenth aspects of apparatus A, the second reactor further comprises a first elbow connector connected to the bottom portion of the riser and to the opposite end of the lower conduit, and a second elbow connector connected to the top portion of the riser and to the end of the upper conduit, and a tee connector having a first end connected to the bottom portion of the downcomer, a second end connected to the lower conduit, and a third end connected to an end of the transition conduit, wherein a first angle between the first end and the second end is equal to or less than about 90° and a second angle between the second end and the third end is equal to or greater than 90°.

In a twelfth aspect of apparatus A which can be used in combination with any of the first to the eleventh aspects of apparatus A, the second reactor further comprises a first elbow connector connected to the bottom portion of the riser and to the opposite end of the lower conduit, a second elbow connector connected to the top portion of the riser and to the end of the upper conduit, and a third elbow connector connected to the bottom portion of the downcomer and to the end of the lower conduit.

In a thirteenth aspect of apparatus A which can be used in combination with the twelfth aspect of apparatus A, at least one of the first, the second, or the third elbow connector has an inner diameter (d) and a radius ($R_c$) of an inner curvature and is configured to maintain a Dean number ($D_n$) of a reaction mixture flowing therein to be a value in a range of from about 1,000,000 to about 5,000,000, where $D_n = \rho V d / \mu * (d/2R_c)^{1/2}$ and where p is a density of the reaction mixture, V is a circulation velocity of the reaction mixture, and µ is a dynamic viscosity of the reaction mixture.

In a fourteenth aspect of apparatus A which can be used in combination with any of the first to the thirteenth aspects of apparatus A, apparatus A further comprises an elbow connector connected i) to the bottom portion of the riser and to the opposite end of the lower conduit, ii) to the top portion of the riser and to the end of the upper conduit, or iii) to the bottom portion of the downcomer and to the end of the lower conduit, wherein the elbow connector comprises a first tap on an outside radius of the elbow connector, a second tap on an inside radius of the elbow connector, a first sensing leg coupling the first tap to a differential pressure meter, and a second sensing leg coupling the second tap to the differential pressure meter.

In a fifteenth aspect of apparatus A which can be used in combination with any of the first to the fourteenth aspects of apparatus A, the second reactor has an internal surface which is polished to a root mean square of less than about 150 microinches.

In a sixteenth aspect of apparatus A which can be used in combination with any of the first to the fifteenth aspects of apparatus A, apparatus A further comprises a rust inhibitor coating on an internal surface of the first reactor or an internal surface of the second reactor.

In a seventeenth aspect of apparatus A which can be used in combination with any of the first to the sixteenth aspects of apparatus A, at least a portion of the first reactor or at least a portion of the second reactor is made of carbon steel, stainless steel, or a combination thereof.

In an eighteenth aspect of apparatus A which can be used in combination with any of the first to the seventeenth aspects of apparatus A, at least a portion of the first reactor or at least a portion of the second reactor is made of carbon steel, wherein the carbon steel is a low temperature carbon steel.

In a nineteenth aspect of apparatus A which can be used in combination with any of the first to the eighteenth aspects of apparatus A, apparatus A further comprises one or more thermowells located on the second reactor.

In a twentieth aspect of apparatus A which can be used in combination with any of the first to the nineteenth aspects of apparatus A, the second reactor further comprises an eductor or a standpipe coupled to the lower conduit or to a transition conduit that is fluidly connected to the end of the lower conduit.

In a twenty-first aspect of apparatus A which can be used in combination with any of the first to the twentieth aspects of apparatus A, the second reactor further comprises a gas density meter configured to measure a density of a reaction mixture in the riser.

In a twenty-second aspect of apparatus A which can be used in combination with any of the first to the twenty-first aspects of apparatus A, the first polyolefin is a lower molecular weight polyethylene, the third polyolefin is a higher molecular weight polyethylene.

In a twenty-third aspect of apparatus A which can be used in combination with the twenty-second aspect of apparatus A, the second polyolefin has an average molecular weight greater ($M_w$, $M_n$, or $M_w$) than an average molecular weight ($M_w$, $M_n$, or $M_w$) of the first polyolefin and less than an average molecular weight of the third polyolefin.

In a twenty-fourth aspect of apparatus A which can be used in combination with any of the first to the twenty-third aspects of apparatus A, from about 20 to about 80 wt. % of the multimodal polyolefin comprises the first polyolefin and from about 8 to about 20 wt. % of the multimodal polyolefin comprises the second polyolefin and the third polyolefin.

In a twenty-fifth aspect of apparatus A which can be used in combination with any of the first to the twenty-fourth aspects of apparatus A, the multimodal polyolefin has a density in a range of from about 0.930 to about 0.970 g/ml when tested in accordance with ASTM D1505, a melt index in a range of from about 0.1 to about 30 g/10 min when tested in accordance with ASTM D1238 under a force of 2.16 kg and a temperature of 190° C., a comonomer content in a range of from 0 to about 6 wt. %, and a $M_w$ in a range of from about 250 to about 1,500 kg/mol.

In a twenty-sixth aspect of apparatus A which can be used in combination with the twenty-fifth aspect of apparatus A, the multimodal polyolefin has a high load melt index of from about 1 to about 45 g/10 min when tested in accordance with ASTM D1238 under a force of 21.6 kg and a temperature of 190° C., a $M_z$ in a range of from about 500 to about 5,000 kg/mol, a Mw/Mn in a range of from about 18 to about 52, a long chain branching index in a range of from 0 to about 0.96, and a shear induced crystallization (SIC) index in a range of from about 0.15 to about 8.

In a twenty-seventh aspect of apparatus A which can be used in combination with any of the first to the twenty-sixth aspects of apparatus A, wherein the first reactor is a loop slurry reactor, a fluidized bed reactor, an autoclave reactor, a tubular reactor, a horizontal gas phase reactor, a continuous stirred-tank reactor, or a solution reactor.

A first aspect of apparatus B which is an apparatus for producing a multimodal polyolefin, comprising a first reactor configured to produce a first polyolefin, a second reactor configured to produce a second polyolefin and a third polyolefin, where the second reactor comprises a riser configured to produce the second polyolefin, an upper conduit having an end fluidly connected to a top portion of the riser, a separator fluidly connected to an opposite end of the upper conduit, a downcomer configured to produce the third polyolefin, wherein a top portion of the downcomer is fluidly connected to the separator, optionally via a liquid barrier in the top portion of the downcomer, and a lower conduit having an end fluidly connected to a bottom portion of the downcomer and an opposite end fluidly connected to a bottom portion of the riser, wherein the second reactor is configured to receive the first polyolefin from the first reactor, or, the first reactor is configured to receive the second polyolefin and the third polyolefin from the second reactor.

In a second aspect of apparatus B which can be used in combination with the first aspect of apparatus B, apparatus B further comprises a first product discharge conduit fluidly connected to the first reactor, and a second product discharge conduit fluidly connected to the bottom portion of the downcomer.

In a third aspect of apparatus B which can be used in combination with any of the first to the second aspects of apparatus B, the first product discharge conduit or the second product discharge conduit is fluidly connected to a take-off valve, wherein the take-off valve is configured as a continuous take-off valve or a discontinuous take-off valve.

In a fourth aspect of apparatus B which can be used in combination with any of the first to the third aspects of apparatus B, the second product discharge conduit is connected to the downcomer such that an angle of the second product discharge conduit with respect to horizontal is 0° to 45°.

In a fifth aspect of apparatus B which can be used in combination with any of the first to the fourth aspects of apparatus B, apparatus B further comprises a heater coupled to the second product discharge conduit and configured to receive a product mixture and to add heat to the product mixture.

In a sixth aspect of apparatus B which can be used in combination with the fifth aspect of apparatus B, apparatus B further comprises a catalyst or cocatalyst poison or deactivator added to the product mixture in or upstream of the heater.

In a seventh aspect of apparatus B which can be used in combination with any of the first to the sixth aspects of apparatus B, the heater is further configured to discharge the multimodal polyolefin in the product mixture at a temperature i) of about 54.4° C. (130° F.) to about 104.4° C. (220° F.), or ii) below a melting point of the multimodal polyolefin.

In an eighth aspect of apparatus B which can be used in combination with any of the first to the seventh aspects of apparatus B, apparatus B further comprises a separation vessel fluidly connected to an opposite end of the heater, wherein the separation vessel is configured to separate the product mixture into a plurality of streams, each of the plurality of streams comprising a vapor, a polymer product, or both the vapor and the polymer product.

In a ninth aspect of apparatus B which can be used in combination with the eighth aspect of apparatus B, apparatus B further comprises a monomer recovery system configured to recover one or more of an olefin monomer, an olefin comonomer, and a diluent from at least one of the plurality of streams comprising the vapor and configured to recycle one or more of the olefin monomer, the olefin comonomer, and the diluent to the first reactor, the second reactor, or both the first reactor and the second reactor.

In a tenth aspect of apparatus B which can be used in combination with any of the first to the ninth aspects of apparatus B, apparatus B further comprises a degassing vessel configured to receive the polymer product from the separation vessel and to remove at least a portion of a hydrocarbon entrained within the polymer product.

In an eleventh aspect of apparatus B which can be used in combination with any of the first to the tenth aspects of apparatus B, the separator comprises a cyclone separator.

In a twelfth aspect of apparatus B which can be used in combination with the eleventh aspect of apparatus B, the riser is configured to produce a riser product mixture comprising solid particles and a gas mixture, wherein the cyclone separator is configured to receive the riser product mixture via the upper conduit, wherein the cyclone separator is a high efficiency cyclone separator configured to separate 99 wt. % or more of the solid particles which have a size of from about 2 μm to about 10 μm from the gas mixture.

In a thirteenth aspect of apparatus B which can be used in combination with any of the first to the twelfth aspects of apparatus B, the cyclone separator is configured to have a cone angle with respect to horizontal of about 45° to about 80°.

In a fourteenth aspect of apparatus B which can be used in combination with any of the first to the thirteenth aspects of apparatus B, the cyclone separator is configured to have an entrance angle of 0° to about 15° with respect to a tangent of the cyclone separator.

In a fifteenth aspect of apparatus B which can be used in combination with any of the first to the fourteenth aspects of apparatus B, the cyclone separator is configured to have a tangential entrance velocity of from about 15.24 m/s to about 30.48 m/s.

In a sixteenth aspect of apparatus B which can be used in combination with any of the first to the fifteenth aspects of apparatus B, an angle with respect to horizontal of the opposite end of the upper conduit which fluidly connects to the cyclone separator is about 0° to about 15°.

In a seventeenth aspect of apparatus B which can be used in combination with any of the first to the sixteenth aspects of apparatus B, a vertical distance between the opposite end of the upper conduit and a top of the cyclone separator is from about 0 m (0 ft) to about 6.10 m (20 ft).

In an eighteenth aspect of apparatus B which can be used in combination with any of the first to the seventeenth aspects of apparatus B, apparatus B further comprises a reactor deactivation system in the second reactor, wherein the reactor deactivation system is configured to moderate or kill polymerization reactions in the riser, the downcomer, or both the riser and the downcomer.

In a nineteenth aspect of apparatus B which can be used in combination with any of the first to the eighteenth aspects of apparatus B, the separator comprises a flash tank or a flash chamber.

In a twentieth aspect of apparatus B which can be used in combination with any of the first to the nineteenth aspects of apparatus B, the first polyolefin is a lower molecular weight polyethylene, the third polyolefin is a higher molecular weight polyethylene.

In a twenty-first aspect of apparatus B which can be used in combination with the twentieth aspect of apparatus B, the second polyolefin has an average molecular weight ($M_w$, $M_n$, or $M_z$) greater than an average molecular weight ($M_w$, $M_n$, or $M_z$) of the first polyolefin and less than an average molecular weight of the third polyolefin.

In a twenty-second aspect of apparatus B which can be used in combination with any of the first to the twenty-first aspects of apparatus B, the first reactor is a loop slurry reactor, a fluidized bed reactor, an autoclave reactor, a tubular reactor, a horizontal gas phase reactor, a continuous stirred-tank reactor, or a solution reactor.

In a twenty-third aspect of apparatus B which can be used in combination with any of the first to the twenty-second aspects of apparatus B, from about 20 to about 80 wt. % of the multimodal polyolefin comprises the first polyolefin and from about 80 to about 20 wt. % of the multimodal polyolefin comprises the second polyolefin and the third polyolefin.

In a twenty-fourth aspect of apparatus B which can be used in combination with any of the first to the twenty-third aspects of apparatus B, the multimodal polyolefin has a density in a range of from about 0.930 to about 0.970 g/ml, a melt index in a range of from about 0.1 to about 30 g/10 min when tested in accordance with ASTM D1238 under a force of 2.16 kg and a temperature of 190° C., a comonomer content in a range of from 0 to about 6 wt. %, and a $M_w$ in a range of from about 250 to about 1,500 kg/mol.

In a twenty-fifth aspect of apparatus B which can be used in combination with the twenty-fourth aspect of apparatus B, the multimodal polyolefin has a high load melt index of from about 1 to about 45 g/10 min when tested in accordance with ASTM D1238 under a force of 21.6 kg and a temperature of 190° C., a $M_z$ in a range of from about 500 to about 5,000 kg/mol, a Mw/Mn in a range of about 18 to about 52, a long chain branching index in a range of from about 0 to about 0.96, and a shear induced crystallization (SIC) index in a range of from about 0.15 to about 8.

A first aspect of apparatus C which is an apparatus for producing a multimodal polyolefin, comprising a first reactor configured to produce a first polyolefin, a second reactor configured to produce a second polyolefin and a third polyolefin, where the second reactor comprises a riser configured to produce the second polyolefin, an upper conduit having an end fluidly connected to a top portion of the riser, a separator fluidly connected to an opposite end of the upper conduit and configured to separate a polyolefin product from a first reaction mixture received from the upper conduit, a downcomer configured to produce the third polyolefin, wherein a top portion of the downcomer is fluidly connected to the separator, optionally via a liquid barrier in the top portion of the downcomer, and a lower conduit having an end fluidly connected to a bottom portion of the downcomer and an opposite end fluidly connected to a bottom portion of the riser, wherein the lower conduit is configured to pass a second reaction mixture from the downcomer to the riser, wherein the second reactor is configured to receive the first polyolefin from the first reactor, or, the first reactor is configured to receive the second polyolefin and the third polyolefin from the second reactor.

In a second aspect of apparatus C which can be used in combination with the first aspect of apparatus C, a gas composition of the second reaction mixture is different than a gas composition of the third reaction mixture.

In a third aspect of apparatus C which can be used in combination with any of the first to the second aspects of apparatus C, the gas composition of the second reaction mixture comprises at least two selected from monomer, diluent, and a catalyst.

In a fourth aspect of apparatus C which can be used in combination with the third aspect of apparatus C, the gas composition of the third reaction mixture comprises at least two selected from hydrogen, monomer, comonomer, diluent, and a catalyst.

In a fifth aspect of apparatus C which can be used in combination with any of the first to the fourth aspects of apparatus C, the liquid barrier comprises an inert liquid, wherein a concentration of the inert liquid in the liquid barrier is greater than a concentration of the inert liquid in the downcomer and in the riser.

In a sixth aspect of apparatus C which can be used in combination with any of the first to the fifth aspects of apparatus C, the second reactor further comprises one or more comonomer feed lines configured to inject comonomer into the downcomer, wherein the third polyolefin is a copolymer.

In a seventh aspect of apparatus C which can be used in combination with any of the first to the sixth aspects of apparatus C, apparatus C further comprises one or more anti-static agent feed lines configured to inject an anti-static agent into the second reactor.

In an eighth aspect of apparatus C which can be used in combination with the seventh aspect of apparatus C, the one or more anti-static agent lines are configured to inject a mixture comprising the anti-static agent and a carrier fluid, wherein a concentration of the anti-static agent in each of the one or more anti-static agent feed lines is about 1 ppm to about 50 ppm based on weight of the carrier fluid in each of the one or more anti-static agent feed lines.

In a ninth aspect of apparatus C which can be used in combination with any of the first to the eighth aspects of apparatus C, where a concentration of the anti-static agent in the second reactor is about 1 ppm to about 50 ppm based on weight of the carrier fluid in the second reactor.

In a tenth aspect of apparatus C which can be used in combination with any of the first to the ninth aspects of apparatus C, the upper conduit is configured to pass the first reaction mixture from the riser to the separator at a velocity that is i) greater than a saltation velocity of the first reaction mixture and up to about 30.48 m/s (100 ft/sec), or ii) greater than 110% of the saltation velocity of the first reaction mixture.

In an eleventh aspect of apparatus C which can be used in combination with any of the first to the tenth aspects of apparatus C, the lower conduit is further configured to pass the second reaction mixture from the downcomer to the riser at a velocity that is i) greater than a saltation velocity of the second reaction mixture and up to about 30.48 m/s (100 ft/sec), or ii) greater than 110% of the saltation velocity of the second reaction mixture.

In a twelfth aspect of apparatus C which can be used in combination with any of the first to the eleventh aspects of apparatus C, apparatus C further comprises a sample analyzer configured to: i) analyze a sample of the first reaction mixture or the second reaction mixture at one or more locations in the second reactor, ii) determine a concentration of gas, liquid, or solid in the first reaction mixture or the second reaction mixture, and iii) determine a concentration of monomer, comonomer, diluent, hydrogen, inert component, or polymer in the first reaction mixture or the second reaction mixture.

In a thirteenth aspect of apparatus C which can be used in combination with any of the first to the twelfth aspects of apparatus C, the separator comprises a level controller coupled to the separator and configured to control a level of the polyolefin product in the separator such that the polyolefin product has a residence time of about 1 minute to about 30 minutes in the separator.

In a fourteenth aspect of apparatus C which can be used in combination with any of the first to the thirteenth aspects of apparatus C, from about 20 to about 80 wt. % of the multimodal polyolefin comprises the first polyolefin and from about 80 to about 20 wt. % of the multimodal polyolefin comprises the second polyolefin and the third polyolefin.

In a fifteenth aspect of apparatus C which can be used in combination with any of the first to the fourteenth aspects of apparatus C, the multimodal polyolefin has a density in a range of from about 0.930 to about 0.970 g/ml when tested in accordance with ASTM D1505, a melt index in a range of from about 0.1 to about 30 g/10 min when tested in accordance with ASTM D1238 under a force of 2.16 kg and a temperature of 190° C., a comonomer content in a range of from 0 to about 6 wt. %, and a $M_w$ in a range of from about 250 to about 1,500 kg/mol.

In a sixteenth aspect of apparatus C which can be used in combination with the fifteenth aspect of apparatus C, the multimodal polyolefin has a high load melt index of from about 1 to about 45 g/10 min when tested in accordance with ASTM D1238 under a force of 21.6 kg and a temperature of 190° C., a $M_z$ in a range of from about 500 to about 5,000 kg/mol, a Mw/Mn in a range of from about 18 to about 52, a long chain branching index in a range of from about 0 to about 0.96, and a shear induced crystallization (SIC) index in a range of from about 0.15 to about 8.

In a seventeenth aspect of apparatus C which can be used in combination with any of the first to the sixteenth aspects of apparatus C, the first reactor is a loop slurry reactor, a fluidized bed reactor, an autoclave reactor, a tubular reactor, a horizontal gas phase reactor, a continuous stirred-tank reactor, or a solution reactor.

A first aspect of apparatus D which is an apparatus for producing a multimodal polyolefin, comprising a first reactor configured to produce a first polyolefin, a second reactor configured to produce a second polyolefin and a third polyolefin, where the second reactor comprises a riser configured to produce the second polyolefin, an upper conduit having an end fluidly connected to a top portion of the riser, a separator fluidly connected to an opposite end of the upper conduit, a downcomer configured to produce the third polyolefin, wherein a top portion of the downcomer is fluidly connected to the separator, optionally via a liquid barrier in the top portion of the downcomer, and a lower conduit having an end fluidly connected to a bottom portion of the downcomer and an opposite end fluidly connected to a bottom portion of the riser, wherein the second reactor is configured to receive the first polyolefin from the first reactor, or, the first reactor is configured to receive the second polyolefin and the third polyolefin from the second reactor.

In a second aspect of apparatus D which can be used in combination with the first aspect of apparatus D, the second reactor is configured to receive the first polyolefin from the first reactor, wherein the first reactor comprises a fluidized bed reactor, a gas distributor located inside the fluidized bed reactor in a bottom portion thereof, and a settling leg placed at least partially within the bottom portion of the fluidized bed reactor, wherein an end of the settling leg opens to the gas distributor and an opposite end extends outside the fluidized bed reactor.

In a third aspect of apparatus D which can be used in combination with any of the first to the second aspects of apparatus D, wherein the settling leg has an inner diameter of from about 10.16 cm (4 inches) to about 30.48 cm (12 inches).

In a fourth aspect of apparatus D which can be used in combination with any of the first to the third aspects of apparatus D, apparatus D further comprises a separation vessel coupled to the settling leg and configured to separate the first polyolefin from a gas mixture, and a treater configured to treat the gas mixture, wherein the treater comprises a flare stack or ground flare, a pressure swing absorber, a membrane, or a combination thereof.

In a fifth aspect of apparatus D which can be used in combination with any of the first to the fourth aspects of apparatus D, apparatus D further comprises a product discharge conduit fluidly connected to the settling leg, and a sampling system fluidly connected to the product discharge conduit and configured to analyze a sample of the first polyolefin.

In a sixth aspect of apparatus D which can be used in combination with any of the first to the fifth aspects of apparatus D, the second reactor is configured to receive the first polyolefin from the first reactor, wherein the first reactor comprises a fluidized bed reactor, a product discharge conduit fluidly connected to the fluidized bed reactor, a lock hopper coupled to the product discharge conduit, a first cycling valve coupled to the product discharge conduit and to the lock hopper, and a second cycling valve coupled to an outlet of the lock hopper.

In a seventh aspect of apparatus D which can be used in combination with the sixth aspect of apparatus D, apparatus D further comprises a separation vessel coupled to the second cycling valve and configured to separate the first polyolefin from a gas mixture, and a treater configured to treat the gas mixture, wherein the treater comprises a flare stack or ground flare, a pressure swing absorber, a membrane, or a combination thereof.

In an eighth aspect of apparatus D which can be used in combination with any of the first to the seventh aspects of apparatus D, apparatus D further comprises a sampling system fluidly connected to the product discharge conduit and configured to analyze a sample of the first polyolefin.

In a ninth aspect of apparatus D which can be used in combination with any of the first to the eighth aspects of apparatus D, the second reactor is configured to receive the first polyolefin from the first reactor, wherein the first reactor comprises a fluidized bed reactor, a product discharge conduit fluidly connected to the fluidized bed reactor, and a continuous take-off valve fluidly connected to the product discharge conduit.

In a tenth aspect of apparatus D which can be used in combination with the ninth aspect of apparatus D, apparatus D further comprises a separation vessel coupled to the continuous take-off valve and configured to separate the first polyolefin from a gas mixture, and a treater configured to treat the gas mixture, wherein the treater comprises a flare stack or ground flare, a pressure swing absorber, a membrane, or a combination thereof.

In an eleventh aspect of apparatus D which can be used in combination with any of the first to the tenth aspects of apparatus D, apparatus D further comprises a sampling system fluidly connected to the product discharge conduit and configured to analyze a sample of the first polyolefin.

In a twelfth aspect of apparatus D which can be used in combination with any of the first to the eleventh aspects of apparatus D, the first reactor is configured to receive the second polyolefin and the third polyolefin from the second reactor, wherein the first reactor comprises a fluidized bed reactor, a gas distributor located inside the fluidized bed reactor in a bottom portion thereof, and a settling leg placed at least partially within the bottom portion of the fluidized bed reactor, wherein an end of the settling leg opens to the gas distributor and an opposite end extends outside the fluidized bed reactor.

In a thirteenth aspect of apparatus D which can be used in combination with the twelfth aspect of apparatus D, the settling leg has an inner diameter of from about 10.16 cm (4 inches) to about 30.48 cm (12 inches).

In a fourteenth aspect of apparatus D which can be used in combination with any of the first to the thirteenth aspects of apparatus D, apparatus D further comprises a separation vessel coupled to the settling leg and configured to separate the multimodal polyolefin from a gas mixture, and a treater configured to treat the gas mixture, wherein the treater comprises a flare stack or ground flare, a pressure swing absorber, a membrane, or a combination thereof.

In a fifteen aspect of apparatus D which can be used in combination with any of the first to the fourteenth aspects of apparatus D, apparatus D further comprises a product discharge conduit fluidly connected to the settling leg, and a sampling system fluidly connected to the product discharge conduit and configured to analyze a sample of the multimodal polyolefin.

In a sixteenth aspect of apparatus D which can be used in combination with any of the first to the fifteenth aspects of apparatus D, the first reactor is configured to receive the second polyolefin and the third polyolefin from the second reactor, wherein the first reactor comprises a fluidized bed reactor, a product discharge conduit fluidly connected to the fluidized bed reactor, a lock hopper coupled to the product discharge conduit, a first cycling valve coupled to the product discharge conduit and to an inlet of the lock hopper, and a second cycling valve coupled to an outlet of the lock hopper.

In a seventeenth aspect of apparatus D which can be used in combination with the sixteenth aspect of apparatus D, apparatus D further comprises a separation vessel coupled to the second cycling valve and configured to separate the multimodal polyolefin from a gas mixture, and a treater configured to treat the gas mixture, wherein the treater comprises a flare stack or ground flare, a pressure swing absorber, a membrane, or a combination thereof.

In an eighteenth aspect of apparatus D which can be used in combination with any of the first to the seventeenth aspects of apparatus D, apparatus D further comprises a sampling system fluidly connected to the product discharge conduit and configured to analyze a sample of the multimodal polyolefin.

In a nineteenth aspect of apparatus D which can be used in combination with any of the first to the eighteenth aspects of apparatus D, the first reactor is configured to receive the second polyolefin and the third polyolefin from the second reactor, wherein the first reactor comprises a fluidized bed reactor, a product discharge conduit fluidly connected to the fluidized bed reactor, and a continuous take-off valve fluidly connected to the product discharge conduit.

In a twentieth aspect of apparatus D which can be used in combination with the nineteenth aspect of apparatus D, apparatus D further comprises a separation vessel coupled to the continuous take-off valve and configured to separate the multimodal polyolefin from a gas mixture, and a treater configured to treat the gas mixture, wherein the treater comprises a flare stack or ground flare, a pressure swing absorber, a membrane, or a combination thereof.

In a twenty-first aspect of apparatus D which can be used in combination with any of the first to the twentieth aspects of apparatus D, apparatus D further comprises a sampling system fluidly connected to the product discharge conduit and configured to analyze a sample of the multimodal polyolefin.

In a twenty-second aspect of apparatus D which can be used in combination with any of the first to the twenty-first aspects of apparatus D, the first polyolefin is a lower molecular weight polyethylene, the third polyolefin is a higher molecular weight polyethylene.

In a twenty-third aspect of apparatus D which can be used in combination with the twenty-second aspect of apparatus D, the second polyolefin has an average molecular weight ($M_w$, $M_n$, or $M_w$) greater than an average molecular weight ($M_w$, $M_n$, or $M_w$) of the first polyolefin and less than an average molecular weight of the third polyolefin.

In a twenty-fourth aspect of apparatus D which can be used in combination with any of the first to the twenty-third aspects of apparatus D, wherein from about 20 to about 80 wt. % of the multimodal polyolefin comprises the first polyolefin and from about 80 to about 20 wt. % of the multimodal polyolefin comprises the second polyolefin and the third polyolefin.

In a twenty-fifth aspect of apparatus D which can be used in combination with any of the first to the twenty-fourth aspects of apparatus D, the multimodal polyolefin has a density in a range of from about 0.930 to about 0.970 g/ml when tested in accordance with ASTM D1505, a melt index in a range of from about 0.1 to about 30 g/10 min when tested in accordance with ASTM D1238 under a force of 2.16 kg and a temperature of 190° C., a comonomer content in a range of from 0 to about 6 wt. %, and a $M_w$ in a range of from about 250 to about 1,500 kg/mol.

In a twenty-sixth aspect of apparatus D which can be used in combination with the twenty-fifth aspect of apparatus D, the multimodal polyolefin has a high load melt index of from about 1 to about 45 g/10 min when tested in accordance with ASTM D1238 under a force of 21.6 kg and a temperature of 190° C., a $M_z$ in a range of from about 500 to about 5,000 kg/mol, a Mw/Mn in a range of from about 18 to about 52, a long chain branching index in a range of from 0 to about 0.96, and a shear induced crystallization (SIC) index in a range of from about 0.15 to about 8.

In a twenty-seventh aspect of apparatus D which can be used in combination with any of the first to the twenty-sixth aspects of apparatus D, the first reactor is a loop slurry reactor, a fluidized bed reactor, an autoclave reactor, a tubular reactor, a horizontal gas phase reactor, a continuous stirred-tank reactor, or a solution reactor.

In a first aspect, polyethylene resin A can comprise the first polyolefin made in polymerization zone 112 of the first reactor 100, the second polyolefin made in the polymerization zone 321 of the riser 320 of the MZCR 300, and the third polyolefin made in the polymerization zone 341 of the downcomer 340 of the MZCR 300.

In a second aspect that can be in combination with the first aspect, the first polyolefin in polyethylene resin A can be a low molecular weight (LMW) component of the multimodal polyolefin, the second polyolefin in polyethylene resin A can be an intermediate molecular weight (IMW) component of the multimodal polyolefin, and the third polyolefin in polyethylene resin A can be a high molecular weight component (HMW) of the multimodal polyolefin.

In a third aspect that can be in combination with the first and second aspects, the first polyolefin (e.g., the LMW component) in polyethylene resin A that is produced in the polymerization zone 112 of the first reactor 100 can be a lower molecular weight polyethylene, the second polyolefin (e.g., the IMW component) in polyethylene resin A that is produced in the polymerization zone 321 of the riser 320, the third polyolefin (e.g., the HMW component) in polyethylene resin A that is produced in the polymerization zone 341 of the downcomer 340 can be a higher molecular weight polyethylene, or combinations thereof.

In a fourth aspect that can be in combination with any of the first to third aspects, an amount of from about 20 to about 80 wt. % of polyethylene resin A can comprise the first polyolefin and an amount of from about 80 to about 20 wt. % of polyethylene resin A can comprise the second polyolefin and the third polyolefin.

In a fifth aspect that can be in combination with any of the first to fourth aspects, an amount of from about 20 to about 80 wt. % of polyethylene resin A can comprise the LMW components and an amount of from about 80 to about 20 wt. % of polyethylene resin A can comprise the IMW component and the HMW component.

In a sixth aspect that can be in combination with any of the first to fifth aspects, the LMW component can be present in polyethylene resin A in an amount of from about 20 wt. % to about 75 wt. %, the IMW component can be present in polyethylene resin A in an amount of from about 5 wt. % to about 40 wt. %, and the HMW component can be present in polyethylene resin A in an amount of from about 10 wt. % to about 60 wt. %.

In a seventh aspect that can be in combination with any of the first to sixth aspects, polyethylene resin A can have a density in a range of about 0.930 to about 0.970 g/ml, when tested in accordance with ISO 1183 at 23° C.

In an eighth aspect that can be in combination with any of the first to seventh aspects, polyethylene resin A can have a melt index ($MI_2$) in a range of from about 0.1 to about 30 g/10 min, when tested in accordance with ISO 1133 at 190° C. under a force of 2.16 kg.

In a ninth aspect that can be in combination with any of the first to eighth aspects, polyethylene resin A can have a high load melt index (HLMI) of from about 1 to about 45 g/10 min, when tested in accordance with ISO 1133 at 190° C. under a force of 21.6 kg.

In a tenth aspect that can be in combination with any of the first to ninth aspects, polyethylene resin A can have a comonomer content in a range of from about 0 to about 6 wt. %.

In an eleventh aspect that can be in combination with any of the first to tenth aspects, polyethylene resin A can have a weight average molecular weight ($M_w$) in a range of from about 250 to about 1,500 kg/mol.

In a twelfth aspect that can be in combination with any of the first to eleventh aspects, polyethylene resin A can have a z-average molecular weight ($M_z$) in a range of from about 500 to about 5,000 kg/mol.

In a thirteenth aspect that can be in combination with any of the first to twelfth aspects, polyethylene resin A can have a polydispersity index (dispersity or PDI or $M_w/M_n$) in a range of from about 18 to about 52.

In a fourteenth aspect that can be in combination with any of the first to thirteenth aspects, polyethylene resin A can have a long chain branching index in a range of from about 0 to about 0.96.

In a fifteenth aspect that can be in combination with any of the first to fourteenth aspects, polyethylene resin A can have a shear induced crystallization (SIC) index in a range of from about 0.15 to about 8.

In a sixteenth aspect that can be in combination with any of the first to fifteenth aspects, the second polyolefin (e.g., the IMW component) in polyethylene resin A that is produced in polymerization zone 321 of the riser 320 can have an average molecular weight ($M_w$, $M_n$, or $M_w$) greater than an average molecular weight ($M_w$, $M_n$, or $M_w$) of the first polyolefin (e.g., the LMW component) in polyethylene resin A that is produced in the polymerization zone 112 of the first reactor 100 and less than an average molecular weight ($M_w$, $M_n$, or $M_z$) of the third polyolefin (e.g., the HMW component) in polyethylene resin A that is produced in the polymerization zone 341 of the downcomer 340.

In a seventeenth aspect that can be in combination with any of the first to sixteenth aspects, polyethylene resin A can have an environmental stress cracking resistance (ESCR) of equal to or greater than about 800 hours; alternatively, greater than about 900 hours; alternatively, greater than about 1,000 hours, when tested in accordance with ISO 16770.

In an eighteenth aspect that can be in combination with any of the first to seventeenth aspects, polyethylene resin A can have a value for rapid crack propagation (RCP) that is at least 100%; alternatively, at least 110%; alternatively, at least 120%; alternatively, at least 130%; alternatively, at least 140% of the value for RCP of a bimodal polyethylene.

In a nineteenth aspect that can be in combination with any of the first to eighteenth aspects, polyethylene resin A can have a value for rapid crack propagation (RCP) that is at least 100%; alternatively, at least 110%; alternatively, at least 120%; alternatively, at least 130%; alternatively, at least 140% of the value for RCP of a bimodal polyethylene.

In a twentieth aspect that can be in combination with any of the first to nineteenth aspects, polyethylene resin A can have a resistance to slow crack growth of at least 100%; alternatively, at least 110%; alternatively, at least 120%; alternatively, at least 130%; alternatively, at least 140% of the value for resistance to slow crack growth of a bimodal polyethylene, when tested in accordance with ASTM F1473, with the caveat that the resistance to slow crack growth is defined as the polyethylene notch tensile test (PENT) failure time.

In a twenty-first aspect that can be in combination with any of the first to twentieth aspects, polyethylene resin A can have a tensile impact strength of from about 135 to about 165 kJ/m$^2$.

In a twenty-second aspect that can be in combination with any of the first to twenty-first aspects, polyethylene resin A can be made by any embodiment of the process having any combination of the aspects described herein.

In a twenty-third aspect that can be in combination with any of the first to twenty-second aspects, polyethylene resin A can have a gel count of less than about 950 gels/m$^2$; alternatively, polyethylene resin A can have a gel count of less than about 900 gels/m$^2$; alternatively, less than about 850 gels/m$^2$; alternatively, less than about 800 gels/m$^2$; alternatively, less than about 750 gels/m$^2$; alternatively, a gel count of less than about 700 gels/m$^2$; alternatively, less than about 650 gels/m$^2$; alternatively, less than about 600 gels/m$^2$.

In a first aspect, polyethylene resin B can comprise the first polyolefin made in polymerization zone 112 of the first reactor 100, the second polyolefin made in the polymerization zone 321 of the riser 320 of the MZCR 300, and the third polyolefin made in the polymerization zone 341 of the downcomer 340 of the MZCR 300.

In a second aspect that can be in combination with the first aspect, the first polyolefin in polyethylene resin B can be a low molecular weight (LMW) component of the multimodal polyolefin, the second polyolefin in polyethylene resin B can be an intermediate molecular weight (IMW) component of the multimodal polyolefin, and the third polyolefin in polyethylene resin B can be a high molecular weight component (HMW) of the multimodal polyolefin.

In a third aspect that can be in combination with any of the first and the second aspects, the first polyolefin (e.g., the LMW component) in polyethylene resin B that is produced in the polymerization zone 112 of the first reactor 100 can be a lower molecular weight polyethylene, the second polyolefin (e.g., the IMW component) in polyethylene resin B that is produced in the polymerization zone 321 of the riser 320, the third polyolefin (e.g., the HMW component) in polyethylene resin B that is produced in the polymerization zone 341 of the downcomer 340 can be a higher molecular weight polyethylene, or combinations thereof.

In a fourth aspect that can be in combination with any of the first to the third aspects, the LMW component is present in polyethylene resin B in an amount of from about 20 wt. % to about 75 wt. %.

In a fifth aspect that can be in combination with any of the first to the fourth aspects, the IMW component is present in polyethylene resin B in an amount of from about 5 wt. % to about 40 wt. %.

In a sixth aspect that can be in combination with any of the first to the fifth aspects, the HMW component is present in polyethylene resin B in an amount of from about 10 wt. % to about 60 wt. %.

In a seventh aspect that can be in combination with any of the first to the sixth aspects, the LMW component in polyethylene resin B has a weight average molecular weight of from about 20 kg/mol to about 150 kg/mol.

In an eighth aspect that can be in combination with any of the first to the seventh aspects, the IMW component in polyethylene resin B has a weight average molecular weight of from about 85 kg/mol to about 350 kg/mol.

In a ninth aspect that can be in combination with any of the first to the eighth aspects, the HMW component in polyethylene resin B has weight average molecular weight of greater than about 350 kg/mol.

In a tenth aspect that can be in combination with any of the first to the ninth aspects, the weight average molecular weight of the IMW component in polyethylene resin B is greater than the weight average molecular weight of the LMW component.

In an eleventh aspect that can be in combination with any of the first to the tenth aspects, the LMW component in polyethylene resin B has a short chain branching content of from about 0 to about 5 short chain branches per 1,000 carbon atoms.

In a twelfth aspect that can be in combination with any of the first to the eleventh aspects, the IMW component in polyethylene resin B has a short chain branching content of from about 0.1 to about 10 short chain branches per 1,000 carbon atoms.

In a thirteenth aspect that can be in combination with any of the first to the twelfth aspects, the HMW component in polyethylene resin B has a short chain branching content of from about 1 to about 15 short chain branches per 1,000 carbon atoms.

In a fourteenth aspect that can be in combination with any of the first to the thirteenth aspects, the polyethylene resin B has a magnitude of slip-stick of from about 300 psi to about 1,000 psi (about 2.07 MPa to about 6.89 MPa).

In a fifteenth aspect that can be in combination with any of the first to the fourteenth aspects, the polyethylene resin B is a trimodal polyethylene resin.

In a sixteenth aspect that can be in combination with any of the first to the fifteen aspects, polyethylene resin B can have a long chain branching content of less than about 0.01 long chain branches per 1,000 carbon atoms.

In a seventeenth aspect that can be in combination with any of the first to the sixteenth aspects, polyethylene B comprises a comonomer, the polyethylene resin B has a comonomer content of from greater than about 0 wt. % to about 20 wt. %.

In an eighteenth aspect that can be in combination with any of the first to the seventeenth aspects, the comonomer in the polyethylene resin B comprises 1-butene, 1-hexene, 1-octene, or combinations thereof.

In a nineteenth aspect that can be in combination with any of the first to the eighteenth aspects, the polyethylene resin B can have a comonomer content of from greater than about 0 wt. % to about 6 wt. %.

In a twentieth aspect that can be in combination with any of the first to the nineteenth aspects, the polyethylene resin B can have a comonomer content of from about 2 wt. % to about 6 wt. %.

In a twenty-first aspect that can be in combination with any of the first to the twentieth aspects, the polyethylene resin B can have a comonomer content of from about 1 wt. % to about 5 wt. %.

In a twenty-second aspect that can be in combination with any of the first to the twenty-first aspects, the polyethylene resin B can have a comonomer content of from greater than about 6 wt. % to about 20 wt. %; alternatively, from greater than about 6 wt. % to about 15 wt. %; alternatively, from greater than about 6 wt. % to about 10 wt. %.

In a twenty-third aspect that can be in combination with any of the first to the twenty-second aspects, the polyethylene resin B can have a density of from about 0.900 g/cc to about 0.980 g/cc, when tested in accordance with ASTM D1505.

In a twenty-fourth aspect that can be in combination with any of the first to the twenty-third aspects, the polyethylene resin B can have a density of less than about 0.960 g/cc, when tested in accordance with ASTM D1505.

In a twenty-fifth aspect that can be in combination with any of the first to the twenty-fourth aspects, the polyethylene resin B can have a density of from greater than about 0.940 g/cc to about 0.960 g/cc, when tested in accordance with ASTM D1505.

In a twenty-sixth aspect that can be in combination with any of the first to the twenty-fifth aspects, the polyethylene resin B can have a density of from about 0.920 g/cc to about 0.940 g/cc, when tested in accordance with ASTM D1505.

In a twenty-seventh aspect that can be in combination with any of the first to the twenty-sixth aspects, the polyethylene resin B can have a melt index of less than about 1 g/10 min, when tested in accordance with ASTM D1238 under a force of 2.16 kg.

In a twenty-eighth aspect that can be in combination with any of the first to the twenty-seventh aspects, the polyethylene resin B can have a high load melt index of from about 1 g/10 min to less than about 20 g/10 min, when tested in accordance with ASTM D1238 under a force of 21.6 kg.

In a twenty-ninth aspect that can be in combination with any of the first to the twenty-eighth aspects, the polyethylene resin B can have a weight average molecular weight ($M_w$) of from about 150 kg/mol to about 1,000 kg/mol.

In a thirtieth aspect that can be in combination with any of the first to the twenty-ninth aspects, the polyethylene resin B can have a number average molecular weight ($M_n$) of from about 7.5 kg/mol to about 30 kg/mol.

In a thirty-first aspect that can be in combination with any of the first to the thirtieth aspects, the polyethylene resin B can have a z-average molecular weight ($M_z$) of from about 1,000 kg/mol to about 5,000 kg/mol; alternatively from about 1,000 kg/mol to about 3,500 kg/mol.

In a thirty-second aspect that can be in combination with any of the first to the thirty-first aspects, the polyethylene resin B can have a (z+1)-average molecular weight ($M_{z+1}$) of from about 2,000 kg/mol to about 9,000 kg/mol.

In a thirty-third aspect that can be in combination with any of the first to the thirty-second aspects, the polyethylene resin B can have a polydispersity index (PDI) of from about 5 to about 60.

In a thirty-fourth aspect that can be in combination with any of the first to the thirty-third aspects, the polyethylene resin B can have a polydispersity index (PDI) of less than about 18.

In a thirty-fifth aspect that can be in combination with any of the first to the thirty-fourth aspects, the LMW component of the polyethylene resin B is a homopolymer.

In a thirty-sixth aspect that can be in combination with any of the first to the thirty-fifth aspects, the LMW component of the polyethylene resin B has a density of less than about 0.960 g/cc, when tested in accordance with ASTM D1505.

In a thirty-seventh aspect that can be in combination with any of the first to the thirty-sixth aspects, the LMW component of the polyethylene resin B has a density of from equal to or greater than about 0.960 g/cc to about 0.985 g/cc, when tested in accordance with ASTM D1505.

In a thirty-eighth aspect that can be in combination with any of the first to the thirty-seventh aspects, the LMW component of the polyethylene resin B has a melt index of from about 3 g/10 min to about 400 g/10 min, when tested in accordance with ASTM D1238 under a force of 2.16 kg; and wherein the LMW component has a high load melt index of from about 160 g/10 min to about 41,000 g/10 min, when tested in accordance with ASTM D1238 under a force of 21.6 kg.

In a thirty-ninth aspect that can be in combination with any of the first to the thirty-eighth aspects, the LMW component of the polyethylene resin B has a number average molecular weight ($M_n$) of from about 5 kg/mol to about 25 kg/mol; alternatively, from about 5 kg/mol to about 15 kg/mol.

In a fortieth aspect that can be in combination with any of the first to the thirty-ninth aspects, the LMW component of the polyethylene resin B has a z-average molecular weight ($M_z$) of from about 100 kg/mol to about 340 kg/mol.

In a forty-first aspect that can be in combination with any of the first to the fortieth aspects, the LMW component of the polyethylene resin B has a polydispersity index (PDI) of from about 1 to about 30; alternatively, from about 1 to about 15.

In a forty-second aspect that can be in combination with any of the first to the forty-first aspects, the LMW component of the polyethylene resin B has a short chain branching content of from about 0 to about 4 short chain branches per 1,000 carbon atoms.

In a forty-third aspect that can be in combination with any of the first to the forty-second aspects, the LMW component of the polyethylene resin B has a short chain branching content of from about 0 to about 3 short chain branches per 1,000 carbon atoms.

In a forty-fourth aspect that can be in combination with any of the first to the forty-third aspects, the LMW component of the polyethylene resin B has a short chain branching content of from about 0 to about 2 short chain branches per 1,000 carbon atoms.

In a forty-fifth aspect that can be in combination with any of the first to the forty-fourth aspects, the LMW component of the polyethylene resin B has a short chain branching content of from about 0 to about 1 short chain branches per 1,000 carbon atoms.

In a forty-sixth aspect that can be in combination with any of the first to the forty-fifth aspects, the IMW component of the polyethylene resin B is a copolymer.

In a forty-seventh aspect that can be in combination with any of the first to the forty-sixth aspects, the IMW component of the polyethylene resin B has a first comonomer content of from greater than about 0 wt. % to about 10 wt. %; alternatively, from greater than about 0 wt. % to about 4 wt. %.

In a forty-eighth aspect that can be in combination with any of the first to the forty-seventh aspects, the IMW component of the polyethylene resin B has a density of from equal to or greater than about 0.915 g/cc to about 0.970 g/cc, when tested in accordance with ASTM D1505.

In a forty-ninth aspect that can be in combination with any of the first to the forty-eighth aspects, the IMW component of the polyethylene resin B has a melt index of from about 0.1 g/10 min to about 30 g/10 min, when tested in accordance with ASTM D1238 under a force of 2.16 kg.

In a fiftieth aspect that can be in combination with any of the first to the forty-ninth aspects, the IMW component of the polyethylene resin B has a high load melt index of from about 5 g/10 min to about 1,500 g/10 min, when tested in accordance with ASTM D1238 under a force of 21.6 kg.

In a fifty-first aspect that can be in combination with any of the first to the fiftieth aspects, the IMW component of the polyethylene resin B has a number average molecular weight ($M_n$) of from about 10 kg/mol to about 185 kg/mol; alternatively, from about 10 kg/mol to about 100 kg/mol; alternatively, from about 10 kg/mol to about 35 kg/mol.

In a fifty-second aspect that can be in combination with any of the first to the fifty-first aspects, the IMW component of the polyethylene resin B has a z-average molecular weight ($M_z$) of from about 215 kg/mol to about 2,300 kg/mol.

In a fifty-third aspect that can be in combination with any of the first to the fifty-second aspects, the IMW component of the polyethylene resin B has a polydispersity index (PDI) of from about 2.5 to about 35; alternatively from about 2.5 to about 25.

In a fifty-fourth aspect that can be in combination with any of the first to the fifty-third aspects, the IMW component of the polyethylene resin B has a short chain branching content of from about 0.1 to about 8 short chain branches per 1,000 carbon atoms.

In a fifty-fifth aspect that can be in combination with any of the first to the fifty-fourth aspects, the IMW component of the polyethylene resin B has a short chain branching content of from about 0.2 to about 7 short chain branches per 1,000 carbon atoms.

In a fifty-sixth aspect that can be in combination with any of the first to the fifty-fifth aspects, the IMW component of the polyethylene resin B has a short chain branching content of from about 0.3 to about 6 short chain branches per 1,000 carbon atoms.

In a fifty-seventh aspect that can be in combination with any of the first to the fifty-sixth aspects, the IMW component of the polyethylene resin B has a short chain branching content of from about 0.4 to about 5 short chain branches per 1,000 carbon atoms.

In a fifty-eighth aspect that can be in combination with any of the first to the fifty-seventh aspects, the HMW component of the polyethylene resin B is a copolymer.

In a fifty-ninth aspect that can be in combination with any of the first to the fifty-eighth aspects, the HMW component of the polyethylene resin B has a second comonomer content of greater than about 0 wt. % to about 10 wt. %; alternatively from about 1 wt. % to about 10 wt. %.

In a sixtieth aspect that can be in combination with any of the first to the fifty-ninth aspects, the second comonomer content of the polyethylene resin B is greater than the first comonomer content.

In a sixty-first aspect that can be in combination with any of the first to the sixtieth aspects, the HMW component of the polyethylene resin B has a density of from equal to or greater than about 0.900 g/cc to about 0.960 g/cc; alternatively from equal to or greater than about 0.900 g/cc to about 0.940 g/cc; alternatively, from equal to or greater than about 0.900 g/cc to about 0.930 g/cc, when tested in accordance with ASTM D1505.

In a sixty-second aspect that can be in combination with any of the first to the sixty-first aspects, the HMW component of the polyethylene resin B has a melt index of less than about 0.1 g/10 min, when tested in accordance with ASTM D1238 under a force of 2.16 kg.

In a sixty-third aspect that can be in combination with any of the first to the sixty-second aspects, the HMW component of the polyethylene resin B has a high load melt index of from about 0.005 g/10 min to about 2 g/10 min, when tested in accordance with ASTM D1238 under a force of 21.6 kg.

In a sixty-fourth aspect that can be in combination with any of the first to the sixty-third aspects, the HMW component of the polyethylene resin B has weight average molecular weight of from greater than about 350 kg/mol to about 1,500 kg/mol.

In a sixty-fifth aspect that can be in combination with any of the first to the sixty-fourth aspects, the HMW component of the polyethylene resin B has a number average molecular weight ($M_n$) of from about 75 kg/mol to about 200 kg/mol.

In a sixty-sixth aspect that can be in combination with any of the first to the sixty-fifth aspects, the HMW component of the polyethylene resin B has a z-average molecular weight ($M_z$) of from about 1,700 kg/mol to about 4,600 kg/mol.

In a sixty-seventh aspect that can be in combination with any of the first to the sixty-sixth aspects, the HMW component of the polyethylene resin B has a polydispersity index (PDI) of from about 2 to about 20; alternatively, from about 2 to about 15.

In a sixty-eighth aspect that can be in combination with any of the first to the sixty-seventh aspects, the HMW component of the polyethylene resin B has a short chain branching content of from about 2 to about 13 short chain branches per 1,000 carbon atoms.

In a sixty-ninth aspect that can be in combination with any of the first to the sixty-eighth aspects, the HMW component of the polyethylene resin B has a short chain branching content of from about 3 to about 12 short chain branches per 1,000 carbon atoms.

In a seventieth aspect that can be in combination with any of the first to the sixty-ninth aspects, the HMW component of the polyethylene resin B has a short chain branching content of from about 4 to about 11 short chain branches per 1,000 carbon atoms.

In a seventy-first aspect that can be in combination with any of the first to the seventieth aspects, the HMW component of the polyethylene resin B has a short chain branching content of from about 5 to about 10 short chain branches per 1,000 carbon atoms.

In a seventy-second aspect that can be in combination with any of the first to the seventy-first aspects, the polyethylene resin B can have a Young's modulus (E) of equal to or greater than about 900 MPa; alternatively, from about 900 MPa to about 1350 MPa, when tested in accordance with ASTM D638.

In a seventy-third aspect that can be in combination with any of the first to the seventy-second aspects, the polyethylene resin B can have a tensile yield stress of equal to or greater than about 20 MPa; alternatively, from about 20 MPa to about 30 MPa, when tested in accordance with ASTM D638.

In a seventy-fourth aspect that can be in combination with any of the first to the seventy-third aspects, the polyethylene resin B can have a tensile yield strain of from about 5% to about 25%, when tested in accordance with ASTM D638.

In a seventy-fifth aspect that can be in combination with any of the first to the seventy-fourth aspects, the polyethylene resin B can have a tensile natural draw ratio at room temperature of from about 300% to about 600%, when tested in accordance with ASTM D638.

In a seventy-sixth aspect that can be in combination with any of the first to the seventy-fifth aspects, the polyethylene resin B can have a tensile natural draw ratio at 80° C. of less than 500%, when tested in accordance with ASTM D638.

In a seventy-seventh aspect that can be in combination with any of the first to the seventy-sixth aspects, the polyethylene resin B can have a tensile natural draw ratio at 80° C. of less than about 400%, when tested in accordance with ASTM D638.

In a seventy-eighth aspect that can be in combination with any of the first to the seventy-seventh aspects, the polyethylene resin B can have a tensile natural draw ratio at 80° C. of from about 250% to about 400%, when tested in accordance with ASTM D638.

In a seventy-ninth aspect that can be in combination with any of the first to the seventy-eighth aspects, the polyethylene resin B can have a tensile natural draw ratio at 80° C. of less than about 300%, when tested in accordance with ASTM D638.

In an eightieth aspect that can be in combination with any of the first to the seventy-ninth aspects, the polyethylene resin B can have a strain hardening modulus of from about 50 MPa to about 90 MPa, when tested in accordance with ISO 18488-2015(E).

In an eighty-first aspect that can be in combination with any of the first to the eightieth aspects, the polyethylene resin B can have an environmental stress cracking resistance (ESCR) of equal to or greater than about 1,000 hours, when tested in accordance with ASTM D1693 (condition A).

In an eighty-second aspect that can be in combination with any of the first to the eighty-first aspects, the polyethylene resin B can have a resistance to slow crack growth of equal to or greater than about 800 h; alternatively, equal to or greater than about 2,000 h; alternatively, equal to or greater than about 5,000 h; alternatively equal to or greater than about 10,000 h, when tested in accordance with ASTM F1473, wherein the resistance to slow crack growth is defined as the polyethylene notch tensile test (PENT) failure time.

In an eighty-third aspect that can be in combination with any of the first to the eighty-second aspects, the polyethylene resin B can have a resistance to slow crack growth of equal to or greater than about 8,760 h; alternatively, equal to or greater than about 10,000 h; alternatively, equal to or greater than about 15,000 h; alternatively, equal to or greater than about 25,000 h; alternatively, equal to or greater than about 50,000 h; alternatively, equal to or greater than about 100,000 h; alternatively, equal to or greater than about 500,000 h, when tested in accordance with ISO 16770 at 80° C. and 6 MPa, wherein the resistance to slow crack growth is defined as the full notch creep test (FNCT) failure time.

In an eighty-fourth aspect that can be in combination with any of the first to the eighty-third aspects, the polyethylene resin B can have a resistance to slow crack growth of equal to or greater than about 100 h; alternatively, equal to or greater than about 500 h; alternatively, equal to or greater than about 1,000 h; alternatively, equal to or greater than about 5,000 h; alternatively equal to or greater than about 10,000 h; alternatively equal to or greater than about 15,000 h, when tested in accordance with ISO 13479:2009(E) at 4.6 MPa, wherein the resistance to slow crack growth is defined as the notched pipe test (NPT) failure time.

In an eighty-fifth aspect that can be in combination with any of the first to the eighty-fourth aspects, the polyethylene resin B can have a viscous relaxation time of from about 0.5 s to about 7.5 s.

In an eighty-sixth aspect that can be in combination with any of the first to the eighty-fifth aspects, the polyethylene resin B can have an $\eta_0$ (eta_0) of equal to or greater than about $0.7 \times 10^5$ Pa–s; alternatively, equal to or greater than about $1.0 \times 10^5$ Pa–s; alternatively, from about $0.7 \times 10^5$ Pa–s to about $2.0 \times 10^6$ Pa–s.

In an eighty-seventh aspect that can be in combination with any of the first to the eighty-sixth aspects, the polyethylene resin B can have an $\eta_{251}$ (eta_251) of less than about $1.5 \times 10^3$ Pa–s.

In an eighty-eighth aspect that can be in combination with any of the first to the eighty-seventh aspects, the polyethylene resin B can have a storage modulus (G') of from about 225,000 Pa to about 325,000 Pa, wherein G' is measured at 190° C. and 251 rad/s in accordance with ASTM D4440.

In an eighty-ninth aspect that can be in combination with any of the first to the eighty-eighth aspects, the polyethylene resin B can have a loss modulus (G") of from about 100,000 Pa to about 200.00 Pa, wherein G" is measured at 190° C. and 251 rad/s in accordance with ASTM D4440.

In a ninetieth aspect that can be in combination with any of the first to the eighty-ninth aspects, the polyethylene resin B can have a tan δ of from about 0.3 to about 0.7; wherein tan δ is the ratio of the loss modulus (G") to storage modulus (G'), wherein G" and G' are measured at 190° C. and 251 rad/s in accordance with ASTM D4440.

In a ninety-first aspect that can be in combination with any of the first to the ninetieth aspects, the polyethylene resin B is made by a process described herein.

In a first aspect, polyethylene resin C can comprise the first polyolefin made in polymerization zone 112 of the first reactor 100, the second polyolefin made in the polymerization zone 321 of the riser 320 of the MZCR 300, and the third polyolefin made in the polymerization zone 341 of the downcomer 340 of the MZCR 300.

In a second aspect that can be in combination with the first aspect, the first polyolefin in polyethylene resin C can be a low molecular weight (LMW) component of the multimodal polyolefin, the second polyolefin in polyethylene resin C can be an intermediate molecular weight (IMW) component of the multimodal polyolefin, and the third polyolefin in polyethylene resin C can be a high molecular weight component (HMW) of the multimodal polyolefin.

In a third aspect that can be in combination with any of the first and the second aspects, the first polyolefin (e.g., the LMW component) in polyethylene resin C that is produced in the polymerization zone 112 of the first reactor 100 can be a lower molecular weight polyethylene, the second polyolefin (e.g., the IMW component) in polyethylene resin C that is produced in the polymerization zone 321 of the riser 320, the third polyolefin (e.g., the HMW component) in polyethylene resin C that is produced in the polymerization zone 341 of the downcomer 340 can be a higher molecular weight polyethylene, or combinations thereof.

In a fourth aspect that can be in combination with any of the first to the third aspects, the LMW component is present in polyethylene resin C in an amount of from about 40 wt. % to about 60 wt. %.

In a fifth aspect that can be in combination with any of the first to the fourth aspects, the IMW component is present in polyethylene resin C in an amount of from about 5 wt. % to about 15 wt. %.

In a sixth aspect that can be in combination with any of the first to the fifth aspects, the HMW component is present in polyethylene resin C in an amount of from about 30 wt. % to about 50 wt. %.

In a seventh aspect that can be in combination with any of the first to the sixth aspects, the LMW component in polyethylene resin C has a weight average molecular weight of from about 25 kg/mol to about 65 kg/mol.

In an eighth aspect that can be in combination with any of the first to the seventh aspects, the IMW component in polyethylene resin C has a weight average molecular weight of from about 100 kg/mol to about 200 kg/mol.

In a ninth aspect that can be in combination with any of the first to the eighth aspects, the HMW component in polyethylene resin C has weight average molecular weight of from about 400 kg/mol to about 925 kg/mol.

In a tenth aspect that can be in combination with any of the first to the ninth aspects, the LMW component in polyethylene resin C has a short chain branching content of from about 0 to about 2 short chain branches per 1,000 carbon atoms.

In an eleventh aspect that can be in combination with any of the first to the tenth aspects, the IMW component in polyethylene resin C has a short chain branching content of from about 0.1 to about 5 short chain branches per 1,000 carbon atoms.

In a twelfth aspect that can be in combination with any of the first to the eleventh aspects, the HMW component in polyethylene resin C has a short chain branching content of from about 2 to about 12 short chain branches per 1,000 carbon atoms.

In a thirteenth aspect that can be in combination with any of the first to the twelfth aspects, the polyethylene resin C has a resistance to slow crack growth of equal to or greater than about 3,000 h, when tested in accordance with ASTM F1473, wherein the resistance to slow crack growth is defined as the polyethylene notch tensile test (PENT) failure time.

In a fourteenth aspect that can be in combination with any of the first to the thirteenth aspects, the weight average molecular weight of the HMW in polyethylene resin C is greater than the weight average molecular weight of the IMW.

In a fifteenth aspect that can be in combination with any of the first to the fourteenth aspects, the polyethylene resin C is a trimodal polyethylene resin.

In a sixteenth aspect that can be in combination with any of the first to the fifteenth aspects, polyethylene resin C can have a resistance to slow crack growth of equal to or greater than about 8,760 h, when tested in accordance with ISO 16770 at 80° C. and 6 MPa, wherein the resistance to slow crack growth is defined as the full notch creep test (FNCT) failure time.

In a seventeenth aspect that can be in combination with any of the first to the sixteenth aspects, polyethylene resin C has a resistance to slow crack growth of equal to or greater than about 1,000 h, when tested in accordance with ISO 13479:2009(E) at 4.6 MPa, wherein the resistance to slow crack growth is defined as the notched pipe test (NPT) failure time.

In an eighteenth aspect that can be in combination with any of the first to the seventeenth aspects, polyethylene resin C has a weight average molecular weight ($M_w$) of from about 200 kg/mol to about 400 kg/mol.

In a nineteenth aspect that can be in combination with any of the first to the eighteenth aspects, polyethylene resin C has a number average molecular weight ($M_n$) of from about 7.5 kg/mol to about 20 kg/mol.

In a twentieth aspect that can be in combination with any of the first to the nineteenth aspects, polyethylene resin C has a z-average molecular weight ($M_z$) of from about 1,000 kg/mol to about 3,300 kg/mol.

In a twenty-first aspect that can be in combination with any of the first to the twentieth aspects, polyethylene resin C has an $\eta_0$ (eta_0) of equal to or greater than about $1.0 \times 10^5$ Pa-s.

In a twenty-second aspect that can be in combination with any of the first to the twenty-first aspects, polyethylene resin C is made by a process described herein.

In a first aspect, polyethylene resin D can comprise the first polyolefin made in polymerization zone 112 of the first reactor 100, the second polyolefin made in the polymerization zone 321 of the riser 320 of the MZCR 300, and the third polyolefin made in the polymerization zone 341 of the downcomer 340 of the MZCR 300.

In a second aspect that can be in combination with the first aspect, the first polyolefin in polyethylene resin D can be a low molecular weight (LMW) component of the multimodal polyolefin, the second polyolefin in polyethylene resin D can be an intermediate molecular weight (IMW) component of the multimodal polyolefin, and the third polyolefin in polyethylene resin D can be a high molecular weight component (HMW) of the multimodal polyolefin.

In a third aspect that can be in combination with any of the first and the second aspects, the first polyolefin (e.g., the LMW component) in polyethylene resin D that is produced in the polymerization zone 112 of the first reactor 100 can be a lower molecular weight polyethylene, the second polyolefin (e.g., the IMW component) in polyethylene resin D that is produced in the polymerization zone 321 of the riser 320, the third polyolefin (e.g., the HMW component) in polyethylene resin D that is produced in the polymerization zone 341 of the downcomer 340 can be a higher molecular weight polyethylene, or combinations thereof.

In a fourth aspect that can be in combination with any of the first to the third aspects, the LMW component is present in polyethylene resin D in an amount of from about 40 wt. % to about 60 wt. %.

In a fifth aspect that can be in combination with any of the first to the fourth aspects, the IMW component is present in polyethylene resin D in an amount of from about 5 wt. % to about 15 wt. %.

In a sixth aspect that can be in combination with any of the first to the fifth aspects, the HMW component is present in polyethylene resin D in an amount of from about 30 wt. % to about 50 wt. %.

In a seventh aspect that can be in combination with any of the first to the sixth aspects, the LMW component in polyethylene resin D has a weight average molecular weight of from about 30 kg/mol to about 50 kg/mol.

In an eighth aspect that can be in combination with any of the first to the seventh aspects, the IMW component in polyethylene resin D has a weight average molecular weight of from about 90 kg/mol to about 150 kg/mol.

In a ninth aspect that can be in combination with any of the first to the eighth aspects, the HMW component in polyethylene resin D has weight average molecular weight of from about 450 kg/mol to about 750 kg/mol.

In a tenth aspect that can be in combination with any of the first to the ninth aspects, the LMW component in polyethylene resin D has a short chain branching content of from about 0.1 to about 2 short chain branches per 1,000 carbon atoms.

In an eleventh aspect that can be in combination with any of the first to the tenth aspects, the IMW component in polyethylene resin D has a short chain branching content of from about 0.1 to about 5 short chain branches per 1,000 carbon atoms.

In a twelfth aspect that can be in combination with any of the first to the eleventh aspects, the HMW component in polyethylene resin D has a short chain branching content of from about 2 to about 10 short chain branches per 1,000 carbon atoms.

In a thirteenth aspect that can be in combination with any of the first to the twelfth aspects, the polyethylene resin D has a tensile strength in the machine direction (MD) of greater than about 13,000 psi (89.6 MPa), when tested in accordance with ASTM D638 at 90 MPa.

In a fourteenth aspect that can be in combination with any of the first to the thirteenth aspects, the polyethylene resin D is a trimodal polyethylene resin.

In a fifteenth aspect that can be in combination with any of the first to the fourteenth aspects, the polyethylene resin D has a tensile strength in the transverse direction (TD) of greater than about 6,000 psi (about 41.4 MPa), when tested in accordance with ASTM D638 at 41 MPa.

In a sixteenth aspect that can be in combination with any of the first to the fifteenth aspects, the polyethylene resin D $\eta_0$ (eta_0) of equal to or greater than about $1.0 \times 10^5$ Pa-s.

In a seventeenth aspect that can be in combination with any of the first to the sixteenth aspects, polyethylene resin D is made by a process described herein.

In a first aspect, polyethylene resin E is a Ziegler Natta-catalyzed polyethylene resin.

In a second aspect that can be in combination with the first aspect, polyethylene resin E can comprise the first polyolefin made in polymerization zone 112 of the first reactor 100, the second polyolefin made in the polymerization zone 321 of the riser 320 of the MZCR 300, and the third polyolefin made in the polymerization zone 341 of the downcomer 340 of the MZCR 300.

In a third aspect that can be in combination with any of the first and the second aspects, the first polyolefin in polyethylene resin E can be a low molecular weight (LMW) component of the multimodal polyolefin, the second polyolefin in polyethylene resin E can be an intermediate molecular weight (IMW) component of the multimodal polyolefin, and the third polyolefin in polyethylene resin E can be a high molecular weight component (HMW) of the multimodal polyolefin.

In a fourth aspect that can be in combination with any of the first to the third aspects, the first polyolefin (e.g., the LMW component) in polyethylene resin E that is produced in the polymerization zone 112 of the first reactor 100 can be a lower molecular weight polyethylene, the second polyolefin (e.g., the IMW component) in polyethylene resin E that is produced in the polymerization zone 321 of the riser 320, the third polyolefin (e.g., the HMW component) in polyethylene resin E that is produced in the polymerization zone 341 of the downcomer 340 can be a higher molecular weight polyethylene, or combinations thereof.

In a fifth aspect that can be in combination with any of the first to the fourth aspects, the LMW component in polyethylene resin E is produced in a first reaction zone in the substantial absence of a comonomer, wherein the LMW component is present in an amount of from about 20 wt. % to about 75 wt. %.

In a sixth aspect that can be in combination with any of the first to the fifth aspects, the IMW component in polyethylene resin E is produced in a second reaction zone in the presence of a first amount of comonomer and a first amount of hydrogen.

In a seventh aspect that can be in combination with any of the first to the sixth aspects, the IMW component is present in polyethylene resin E in an amount of from about 5 wt. % to about 40 wt. %.

In an eighth aspect that can be in combination with any of the first to the seventh aspects, the HMW component in polyethylene resin E is produced in a third reaction zone in the presence of a second amount of comonomer and a second amount of hydrogen.

In a ninth aspect that can be in combination with any of the first to the eighth aspects, the second amount of comonomer in polyethylene resin E is greater than the first amount of comonomer.

In a tenth aspect that can be in combination with any of the first to the ninth aspects, first amount of hydrogen in polyethylene resin E is greater than the second amount of hydrogen.

In an eleventh aspect that can be in combination with any of the first to the tenth aspects, the HMW component is present in polyethylene resin E in an amount of from about 10 wt. % to about 60 wt. %.

In a twelfth aspect that can be in combination with any of the first to the eleventh aspects, the LMW component in polyethylene resin E has a weight average molecular weight of from about 20 kg/mol to about 150 kg/mol.

In a thirteenth aspect that can be in combination with any of the first to the twelfth aspects, the IMW component in polyethylene resin E has a weight average molecular weight of from about 85 kg/mol to about 350 kg/mol.

In a fourteenth aspect that can be in combination with any of the first to the thirteenth aspects, the HMW component in polyethylene resin E has weight average molecular weight of greater than about 350 kg/mol.

In a fifteenth aspect that can be in combination with any of the first to the fourteenth aspects, the weight average molecular weight of the IMW component in polyethylene resin E is greater than the weight average molecular weight of the LMW component.

In a sixteenth aspect that can be in combination with any of the first to the fifteenth aspects, the LMW component in polyethylene resin E has a short chain branching content of from about 0 to about 5 short chain branches per 1,000 carbon atoms.

In a seventeenth aspect that can be in combination with any of the first to the sixteenth aspects, the IMW component in polyethylene resin E has a short chain branching content of from about 0.1 to about 10 short chain branches per 1,000 carbon atoms.

In an eighteenth aspect that can be in combination with any of the first to the seventeenth aspects, the HMW component in polyethylene resin E has a short chain branching content of from about 1 to about 15 short chain branches per 1,000 carbon atoms.

In a nineteenth aspect that can be in combination with any of the first to the eighteenth aspects, the polyethylene resin E has an $\eta_{251}$ (eta_251) of less than about $1.5 \times 10^3$ Pa-s.

In a twentieth aspect that can be in combination with any of the first to the nineteenth aspects, the polyethylene resin E is a trimodal polyethylene resin.

In a twenty-first aspect that can be in combination with any of the first to the twentieth aspects, a first reactor in polyethylene resin E comprises the first reaction zone.

In a twenty-second aspect that can be in combination with any of the first to the twenty-first aspects, the first reaction zone in polyethylene resin E comprises a gas phase reaction zone.

In a twenty-third aspect that can be in combination with any of the first to the twenty-second aspects, a second reactor in polyethylene resin E comprises the second reaction zone and the third reaction zone.

In a twenty-fourth aspect that can be in combination with any of the first to the twenty-third aspects, the second reaction zone in polyethylene resin E comprises a riser.

In a twenty-fifth aspect that can be in combination with any of the first to the twenty-fourth aspects, the second reaction zone in polyethylene resin E comprises a fast fluidization reaction zone.

In a twenty-sixth aspect that can be in combination with any of the first to the twenty-fifth aspects, the third reaction zone in polyethylene resin E comprises a downcomer.

In a twenty-seventh aspect that can be in combination with any of the first to the twenty-sixth aspects, the third reaction zone in polyethylene resin E comprises a plug flow reaction zone.

In a first aspect, polyethylene resin F is a Ziegler Natta-catalyzed polyethylene resin.

In a second aspect that can be in combination with the first aspect, polyethylene resin F can comprise the first polyolefin made in polymerization zone 112 of the first reactor 100, the second polyolefin made in the polymerization zone 321 of the riser 320 of the MZCR 300, and the third polyolefin made in the polymerization zone 341 of the downcomer 340 of the MZCR 300.

In a third aspect that can be in combination with any of the first and the second aspects, the first polyolefin in polyethylene resin F can be a low molecular weight (LMW) component of the multimodal polyolefin, the second polyolefin in polyethylene resin F can be an intermediate molecular weight (IMW) component of the multimodal polyolefin, and the third polyolefin in polyethylene resin F can be a high molecular weight component (HMW) of the multimodal polyolefin.

In a fourth aspect that can be in combination with any of the first to the third aspects, the first polyolefin (e.g., the LMW component) in polyethylene resin F that is produced in the polymerization zone 112 of the first reactor 100 can be a lower molecular weight polyethylene, the second polyolefin (e.g., the IMW component) in polyethylene resin F that is produced in the polymerization zone 321 of the riser 320, the third polyolefin (e.g., the HMW component) in polyethylene resin F that is produced in the polymerization zone 341 of the downcomer 340 can be a higher molecular weight polyethylene, or combinations thereof.

In a fifth aspect that can be in combination with any of the first to the fourth aspects, the LMW component in polyethylene resin F is produced in a gas phase reaction zone in the substantial absence of a comonomer, In a sixth aspect that can be in combination with any of the first to the fifth aspects, the LMW component is present in polyethylene resin F in an amount of from about 20 wt. % to about 75 wt. %.

In a seventh aspect that can be in combination with any of the first to the sixth aspects, the IMW component in polyethylene resin F is produced in a fast fluidization reaction zone in the presence of a first amount of comonomer and a first amount of hydrogen.

In an eighth aspect that can be in combination with any of the first to the seventh aspects, the IMW component is present in polyethylene resin F in an amount of from about 5 wt. % to about 40 wt. %.

In a ninth aspect that can be in combination with any of the first to the eighth aspects, the HMW component in polyethylene resin F is produced in a plug flow reaction zone in the presence of a second amount of comonomer and a second amount of hydrogen.

In a tenth aspect that can be in combination with any of the first to the ninth aspects, the second amount of comonomer in polyethylene resin F is greater than the first amount of comonomer.

In an eleventh aspect that can be in combination with any of the first to the tenth aspects, first amount of hydrogen in polyethylene resin F is greater than the second amount of hydrogen.

In a twelfth aspect that can be in combination with any of the first to the eleventh aspects, the HMW component is present in polyethylene resin F in an amount of from about 10 wt. % to about 60 wt. %.

In a thirteenth aspect that can be in combination with any of the first to the twelfth aspects, the LMW component in polyethylene resin F has a weight average molecular weight of from about 20 kg/mol to about 150 kg/mol.

In a fourteenth aspect that can be in combination with any of the first to the thirteenth aspects, the IMW component in polyethylene resin F has a weight average molecular weight of from about 85 kg/mol to about 350 kg/mol.

In a fifteenth aspect that can be in combination with any of the first to the fourteenth aspects, the HMW component in polyethylene resin F has weight average molecular weight of greater than about 350 kg/mol.

In a sixteenth aspect that can be in combination with any of the first to the fifteenth aspects, the weight average molecular weight of the IMW component in polyethylene resin F is greater than the weight average molecular weight of the LMW component.

In a seventeenth aspect that can be in combination with any of the first to the sixteenth aspects, the LMW component in polyethylene resin F has a short chain branching content of from about 0 to about 5 short chain branches per 1,000 carbon atoms.

In an eighteenth aspect that can be in combination with any of the first to the seventeenth aspects, the IMW component in polyethylene resin F has a short chain branching content of from about 0.1 to about 10 short chain branches per 1,000 carbon atoms.

In a nineteenth aspect that can be in combination with any of the first to the eighteenth aspects, the HMW component in polyethylene resin F has a short chain branching content of from about 1 to about 15 short chain branches per 1,000 carbon atoms.

In a twentieth aspect that can be in combination with any of the first to the nineteenth aspects, the polyethylene resin F has an $\eta_{251}$ (eta_251) of less than about $1.5 \times 10^3$ Pa-s.

In a twenty-first aspect that can be in combination with any of the first to the twentieth aspects, the polyethylene resin F is a trimodal polyethylene resin.

In a twenty-second aspect that can be in combination with any of the first to the twenty-first aspects, a first reactor in polyethylene resin F comprises the gas phase reaction zone.

In a twenty-third aspect that can be in combination with any of the first to the twenty-second aspects, a second reactor in polyethylene resin F comprises a riser and a downcomer.

In a twenty-fourth aspect that can be in combination with any of the first to the twenty-third aspects, the riser in polyethylene resin F comprises the fast fluidization reaction zone, and wherein the downcomer comprises the plug flow reaction zone.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the disclosed inventive subject matter. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

What is claimed is:

1. An apparatus for producing a multimodal polyolefin, comprising:
    a first reactor configured to produce a first polyolefin;
    a second reactor configured to produce a second polyolefin and a third polyolefin, where the second reactor comprises:
        a riser configured to produce the second polyolefin;
        an upper conduit having an end fluidly connected to a top portion of the riser;
        a separator fluidly connected to an opposite end of the upper conduit;
        a downcomer configured to produce the third polyolefin, wherein a top portion of the downcomer is fluidly connected to the separator, optionally via a liquid barrier in the top portion of the downcomer; and
        a lower conduit having an end fluidly connected to a bottom portion of the downcomer and an opposite end fluidly connected to a bottom portion of the riser,
    (a) wherein:
        either (i) the second reactor is configured to receive the first polyolefin from the first reactor, or,
        (ii) the first reactor is configured to receive the second polyolefin and the third polyolefin from the second reactor; and
    (b) wherein the second reactor has an internal surface which is polished to a root mean square of less than about 150 microinches.

2. The apparatus of claim 1, further comprising:
    a heat apparatus configured to add or remove heat from the downcomer.

3. The apparatus of claim 1, the second reactor is configured to receive the first polyolefin from the first reactor, the apparatus further comprising:
    a first product discharge conduit fluidly connected to the first reactor; and
    a second product discharge conduit fluidly connected to the bottom portion of the downcomer,
    wherein the first product discharge conduit or the second product discharge conduit is fluidly connected to a take-off valve, wherein the take-off valve is configured as a continuous take-off valve or a discontinuous take-off valve.

4. The apparatus of claim 3, wherein second product discharge conduit is fluidly connected to the downcomer i) on a bottom half of the downcomer or ii) on or near a bottom tangent of the downcomer.

5. The apparatus of claim 3, wherein the second product discharge conduit is connected to the downcomer such that an angle of the second product discharge conduit with respect to horizontal is from about −60° to about 60°.

6. The apparatus of claim 1, wherein the separator comprises a cyclone separator configured to receive a riser product mixture comprising solid particles and a gas mixture via the upper conduit, wherein the cyclone separator is a high efficiency cyclone separator configured to separate 99 wt. % or more of the solid particles from the gas mixture.

7. The apparatus of claim 6, wherein the 99 wt. % or more of the solid particles that are separated have a particle size of greater than about 10 μm.

8. The apparatus of claim 1, further comprising:
a settling leg, a lock hopper, or a continuous take-off valve coupled to the first reactor; and
a separation vessel coupled to the settling leg, the lock hopper, or the continuous take-off valve, wherein the separation vessel is additionally coupled to the second reactor,
wherein the second reactor is configured to receive the first polyolefin from the first reactor via the separation vessel and via the settling leg, the lock hopper, or the continuous take-off valve.

9. The apparatus of claim 8, wherein the first reactor is a fluidized bed reactor.

10. The apparatus of claim 1, wherein the second reactor further comprises an eductor.

11. An apparatus for producing a multimodal polyolefin, comprising:
a first reactor configured to produce a first polyolefin;
a second reactor configured to produce a second polyolefin and a third polyolefin, where the second reactor comprises:
a riser configured to produce the second polyolefin;
an upper conduit having an end fluidly connected to a top portion of the riser;
a separator fluidly connected to an opposite end of the upper conduit;
a downcomer configured to produce the third polyolefin, wherein a top portion of the downcomer is fluidly connected to the separator, optionally via a liquid barrier in the top portion of the downcomer; and
a lower conduit having an end fluidly connected to a bottom portion of the downcomer and an opposite end fluidly connected to a bottom portion of the riser,
(a) wherein:
either (i) the second reactor is configured to receive the first polyolefin from the first reactor, or,
(ii) the first reactor is configured to receive the second polyolefin and the third polyolefin from the second reactor; and
(b) wherein the second reactor further comprises:
a first elbow connector connected to the bottom portion of the riser and to the opposite end of the lower conduit;
a second elbow connector connected to the top portion of the riser and to the end of the upper conduit; and
a third elbow connector connected to the bottom portion of the downcomer and to the end of the lower conduit,
wherein at least one of the first, the second, or the third elbow connector has an inner diameter (d) and a radius ($R_c$) of an inner curvature and is configured to maintain a Dean number ($D_n$) of a reaction mixture flowing therein to be a value in a range of from about 1,000,000 to about 5,000,000, where $D_n = \rho V d/\mu^* (d/2R_c)^{1/2}$ and where $\rho$ is a density of the reaction mixture, V is a circulation velocity of the reaction mixture, and μ is a dynamic viscosity of the reaction mixture.

12. The apparatus of claim 11, wherein at least one of the first, second, or third elbow connector comprises:
a first tap on an outside radius of the elbow connector;
a second tap on an inside radius of the elbow connector;
a first sensing leg coupling the first tap to a differential pressure meter; and
a second sensing leg coupling the second tap to the differential pressure meter.

13. An apparatus for producing a multimodal polyolefin, comprising:
a first reactor configured to produce a first polyolefin;
a second reactor configured to produce a second polyolefin and a third polyolefin, where the second reactor comprises:
a riser configured to produce the second polyolefin;
an upper conduit having an end fluidly connected to a top portion of the riser;
a separator fluidly connected to an opposite end of the upper conduit;
a downcomer configured to produce the third polyolefin, wherein a top portion of the downcomer is fluidly connected to the separator, optionally via a liquid barrier in the top portion of the downcomer; and
a lower conduit having an end fluidly connected to a bottom portion of the downcomer and an opposite end fluidly connected to a bottom portion of the riser,
wherein:
either (i) the second reactor is configured to receive the first polyolefin from the first reactor, or,
(ii) the first reactor is configured to receive the second polyolefin and the third polyolefin from the second reactor; and
further comprising:
(a) a settling leg, a lock hopper, or a continuous take-off valve coupled to the first reactor;
(b) a separation vessel coupled to the settling leg, the lock hopper, or the continuous take-off valve, wherein the separation vessel is additionally coupled to the second reactor,
wherein the second reactor is configured to receive the first polyolefin from the first reactor via the separation vessel and via the settling leg, the lock hopper, or the continuous take-off valve,
(c) a sample take-off conduit fluidly connected to the settling leg, the lock hopper, or the continuous take-off valve; and
(d) a sample analyzer coupled to the sample take-off conduit and configured to analyze a sample of the first polyolefin to determine one or more properties of the first polyolefin.

14. An apparatus for producing a multimodal polyolefin, comprising:
a first reactor configured to produce a first polyolefin;
a second reactor configured to produce a second polyolefin and a third polyolefin, where the second reactor comprises:
a riser configured to produce the second polyolefin;
an upper conduit having an end fluidly connected to a top portion of the riser;
a separator fluidly connected to an opposite end of the upper conduit;
a downcomer configured to produce the third polyolefin, wherein a top portion of the downcomer is fluidly connected to the separator, optionally via a liquid barrier in the top portion of the downcomer; and
a lower conduit having an end fluidly connected to a bottom portion of the downcomer and an opposite end fluidly connected to a bottom portion of the riser, (a) wherein:
  either (i) the second reactor is configured to receive the first polyolefin from the first reactor, or,
  (ii) the first reactor is configured to receive the second polyolefin and the third polyolefin from the second reactor; and
(b) wherein the second reactor further comprises an eductor; wherein the eductor has a suction inlet, a motive fluid inlet, and an outlet; wherein the suction inlet is fluidly connected to the bottom portion of the downcomer; wherein the motive fluid inlet is fluidly connected to a recycle conduit comprising unreacted monomer, unreacted comonomer, diluent, or a combination thereof; and wherein the outlet is fluidly connected to the end of the lower conduit.

15. The apparatus of claim 14, wherein the second reactor further comprises a standpipe having an end connected to the motive fluid inlet of the eductor and an opposite end fluidly connected to the recycle conduit.

16. An apparatus for producing a multimodal polyolefin, comprising:
a first reactor configured to produce a first polyolefin;
a second reactor configured to produce a second polyolefin and a third polyolefin, where the second reactor comprises:
  a riser configured to produce the second polyolefin;
  an upper conduit having an end fluidly connected to a top portion of the riser;
  a separator fluidly connected to an opposite end of the upper conduit;
  a downcomer configured to produce the third polyolefin, wherein a top portion of the downcomer is fluidly connected to the separator, optionally via a liquid barrier in the top portion of the downcomer; and
  a lower conduit having an end fluidly connected to a bottom portion of the downcomer and an opposite end fluidly connected to a bottom portion of the riser,
(a) wherein:
  either (i) the second reactor is configured to receive the first polyolefin from the first reactor, or,
  (ii) the first reactor is configured to receive the second polyolefin and the third polyolefin from the second reactor; and
(b) wherein the second reactor further comprises an eductor; wherein the eductor has a suction inlet, a motive fluid inlet, and an outlet; wherein the suction inlet is fluidly connected to the end of the lower conduit; wherein the motive fluid inlet is fluidly connected to a recycle conduit comprising unreacted monomer, unreacted comonomer, diluent, or a combination thereof; and wherein the outlet is fluidly connected to the opposite end of the lower conduit.

17. An apparatus for producing a multimodal polyolefin, comprising:
a first reactor configured to produce a first polyolefin;
a second reactor configured to produce a second polyolefin and a third polyolefin, where the second reactor comprises:
  a riser configured to produce the second polyolefin;
  an upper conduit having an end fluidly connected to a top portion of the riser;
  a separator fluidly connected to an opposite end of the upper conduit;
  a downcomer configured to produce the third polyolefin, wherein a top portion of the downcomer is fluidly connected to the separator, optionally via a liquid barrier in the top portion of the downcomer; and
  a lower conduit having an end fluidly connected to a bottom portion of the downcomer and an opposite end fluidly connected to a bottom portion of the riser,
(a) wherein:
  either (i) the second reactor is configured to receive the first polyolefin from the first reactor, or,
  (ii) the first reactor is configured to receive the second polyolefin and the third polyolefin from the second reactor; and
(b) wherein the second reactor further comprises an eductor; wherein the eductor has a suction inlet, a motive fluid inlet, and an outlet; wherein the suction inlet is fluidly connected to the opposite end of the lower conduit; wherein the motive fluid inlet is fluidly connected to a recycle conduit comprising unreacted monomer, unreacted comonomer, diluent, or a combination thereof; and wherein the outlet is fluidly connected to the bottom portion of the riser.

18. An apparatus for producing a multimodal polyolefin, comprising:
a first reactor configured to produce a first polyolefin;
a second reactor configured to produce a second polyolefin and a third polyolefin, where the second reactor comprises:
  a riser configured to produce the second polyolefin;
  an upper conduit having an end fluidly connected to a top portion of the riser;
  a separator fluidly connected to an opposite end of the upper conduit;
  a downcomer configured to produce the third polyolefin, wherein a top portion of the downcomer is fluidly connected to the separator, optionally via a liquid barrier in the top portion of the downcomer; and
  a lower conduit having an end fluidly connected to a bottom portion of the downcomer and an opposite end fluidly connected to a bottom portion of the riser,
(a) wherein:
  either (i) the second reactor is configured to receive the first polyolefin from the first reactor, or,
  (ii) the first reactor is configured to receive the second polyolefin and the third polyolefin from the second reactor; and
(b) wherein the second reactor further comprises a standpipe having an end fluidly connected to the end or the opposite end of the lower conduit, wherein the standpipe has an opposite end fluidly connected to a recycle conduit comprising unreacted monomer, unreacted comonomer, diluent, or a combination thereof.

19. The apparatus of claim 18, wherein the second reactor has an internal surface which is polished to a root mean square of less than about 150 microinches.

20. An apparatus for producing a multimodal polyolefin, comprising:
a first reactor configured to produce a first polyolefin;
a second reactor configured to produce a second polyolefin and a third polyolefin, where the second reactor comprises:
  a riser configured to produce the second polyolefin;
  an upper conduit having an end fluidly connected to a top portion of the riser;
  a separator fluidly connected to an opposite end of the upper conduit;

a downcomer configured to produce the third polyolefin, wherein a top portion of the downcomer is fluidly connected to the separator, optionally via a liquid barrier in the top portion of the downcomer; and a lower conduit having an end fluidly connected to a bottom portion of the downcomer and an opposite end fluidly connected to a bottom portion of the riser, (a) wherein:

either (i) the second reactor is configured to receive the first polyolefin from the first reactor, or, (ii) the first reactor is configured to receive the second polyolefin and the third polyolefin from the second reactor; and (b) wherein the second reactor further comprises:

a transition conduit having an end fluidly connected to the end of the lower conduit and to the bottom portion of the downcomer; and a standpipe placed in the transition conduit, wherein the standpipe is fluidly connected to a recycle conduit comprising unreacted monomer, unreacted comonomer, diluent, or a combination thereof.

21. The apparatus of claim 20, wherein the second reactor has an internal surface which is polished to a root mean square of less than about 150 microinches.

* * * * *